US010837195B2

(12) United States Patent
Wiseman

(10) Patent No.: US 10,837,195 B2
(45) Date of Patent: Nov. 17, 2020

(54) CUSTOMIZABLE TENTING SYSTEM

(71) Applicant: James John Wiseman, Midland, MI (US)

(72) Inventor: James John Wiseman, Midland, MI (US)

(*) Notice: Subject to any disclaimer, the term of this patent is extended or adjusted under 35 U.S.C. 154(b) by 0 days.

(21) Appl. No.: 16/404,692

(22) Filed: May 6, 2019

(65) Prior Publication Data
US 2019/0338551 A1 Nov. 7, 2019

Related U.S. Application Data

(60) Provisional application No. 62/666,817, filed on May 4, 2018.

(51) Int. Cl.
E04H 15/30 (2006.01)
E04H 15/34 (2006.01)

(52) U.S. Cl.
CPC .......... E04H 15/30 (2013.01); E04H 15/34 (2013.01)

(58) Field of Classification Search
CPC ............ E04H 15/18; E04H 15/30; A45F 4/14
See application file for complete search history.

(56) References Cited

U.S. PATENT DOCUMENTS

| 197,878 A | * | 12/1877 | Michaelis | ............... E04H 15/30 135/95 |
| 794,036 A | * | 7/1905 | McCall | ................... E04H 15/18 135/97 |
| 872,404 A | * | 12/1907 | Burch | ..................... E04H 15/30 135/95 |
| 928,391 A | * | 7/1909 | Lukenbill | ............... E04H 15/30 135/95 |

(Continued)

FOREIGN PATENT DOCUMENTS

| CH | 316049 A | * | 9/1956 | ............... A45F 4/14 |
| FR | 2533425 A1 | * | 3/1984 | ............ E04H 15/18 |

(Continued)

OTHER PUBLICATIONS

International Search Report and Written Opinion of International Search Authority of Application No. PCT/US2019/030967 dated Aug. 15, 2019; 7 pages.

Primary Examiner — Noah Chandler Hawk
(74) Attorney, Agent, or Firm — Dean W. Amburn; Amburn Law PLLC

(57) ABSTRACT

The present invention is directed to a tent shelter that is adapted for various uses, designs configurations and combinations, along with riggings and accessories. It includes a flat material for its main body having anchor points along its peripheral edges. An anchor apparatus (including a hole) can be coupled at the anchor points. It also includes anchor apparatuses used to couple the tent shelter to another tent shelter, tent shelter accessories or a fixed object using a paracord or other materials. It also includes different ridged, hinge and awning assemblies to support the tent. The assemblies can anchor, manipulate, adjust and support the tent. An awning assembly coupled to the pole rigging system can be coupled to a tent shelter when laid flat. A hinged rigging system can be adjusted and supported so that the tent can be manipulated into desirable shapes including a shape that folds into a container.

17 Claims, 85 Drawing Sheets

(56) References Cited

U.S. PATENT DOCUMENTS

| | | | | |
|---|---|---|---|---|
| 1,260,612 A | * | 3/1918 | Whall | E04H 15/30 135/95 |
| 1,895,911 A | * | 1/1933 | Bosson, Jr. | A45F 4/14 2/89 |
| 2,268,317 A | * | 12/1941 | Till | A45F 4/14 2/89 |
| 3,282,274 A | * | 11/1966 | Scott | E04H 15/18 135/142 |
| 3,699,986 A | * | 10/1972 | Kirkham | E04H 15/18 135/97 |
| 4,072,158 A | | 2/1978 | O'Brien et al. | |
| 4,862,906 A | | 9/1989 | Jordon | |
| 5,769,106 A | * | 6/1998 | Achuff | A41D 15/04 135/95 |
| 5,915,400 A | | 6/1999 | Pohl et al. | |

FOREIGN PATENT DOCUMENTS

| | | |
|---|---|---|
| RU | 14050 | 6/2000 |
| SU | 1379437 A1 | 3/1988 |

* cited by examiner

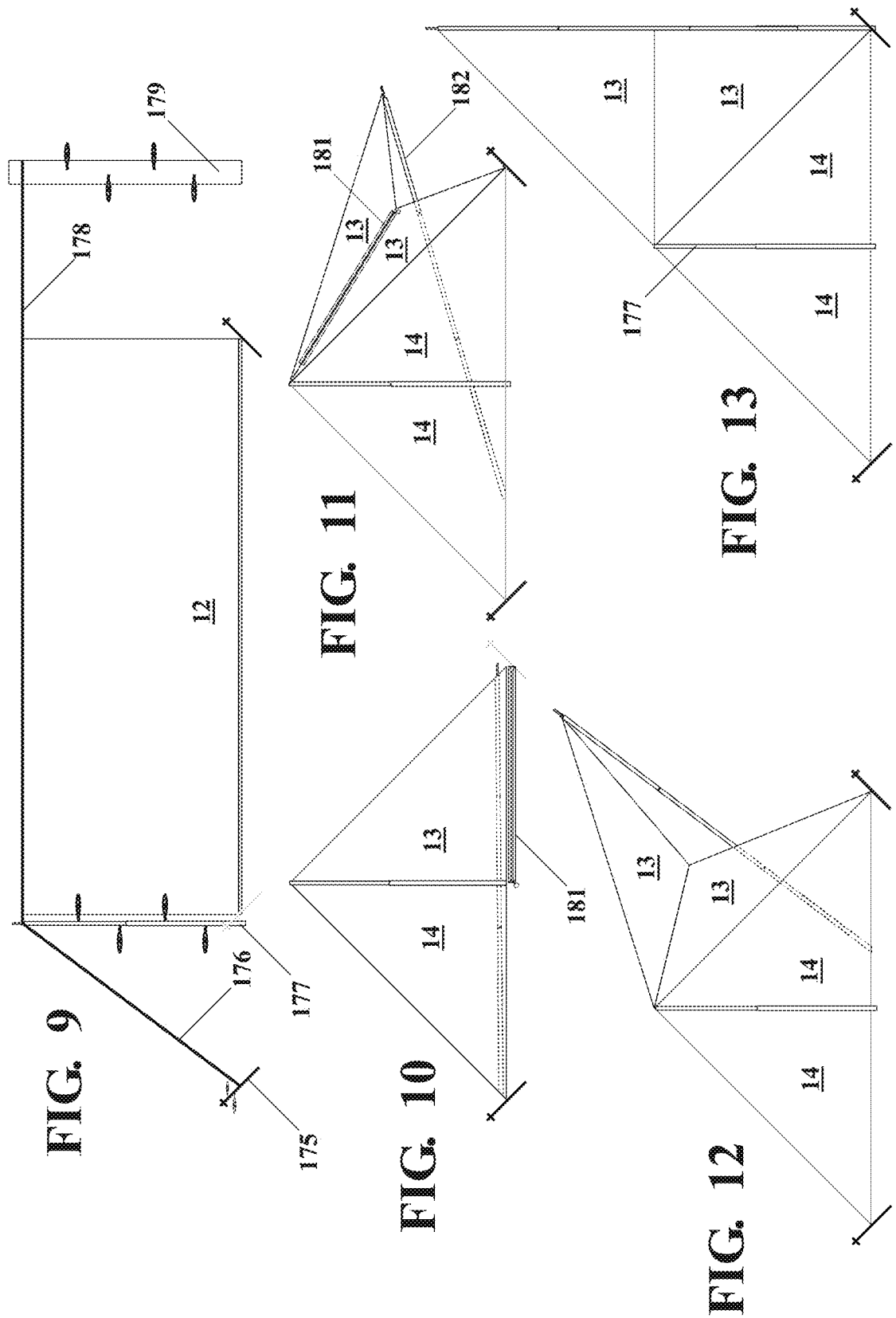

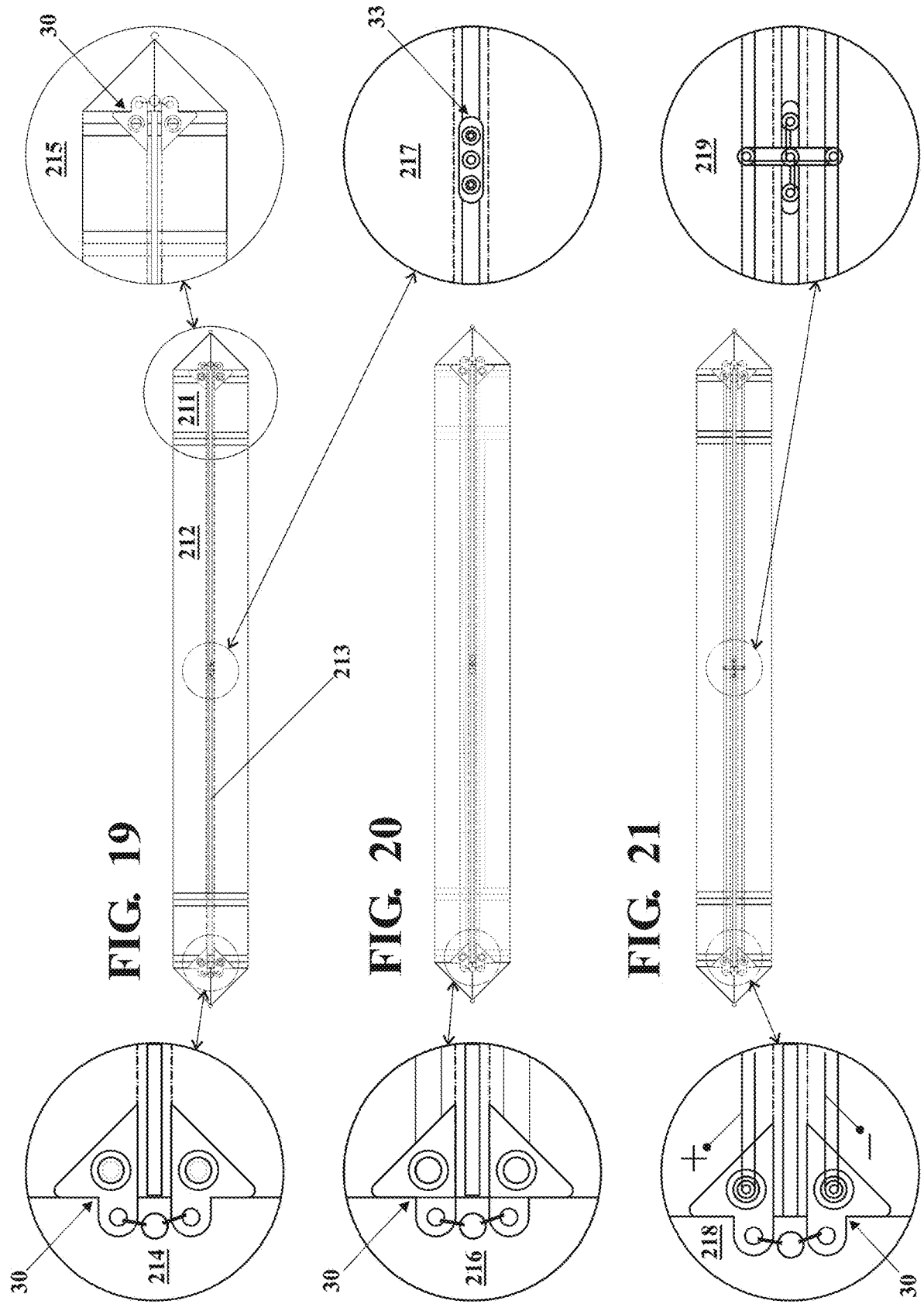

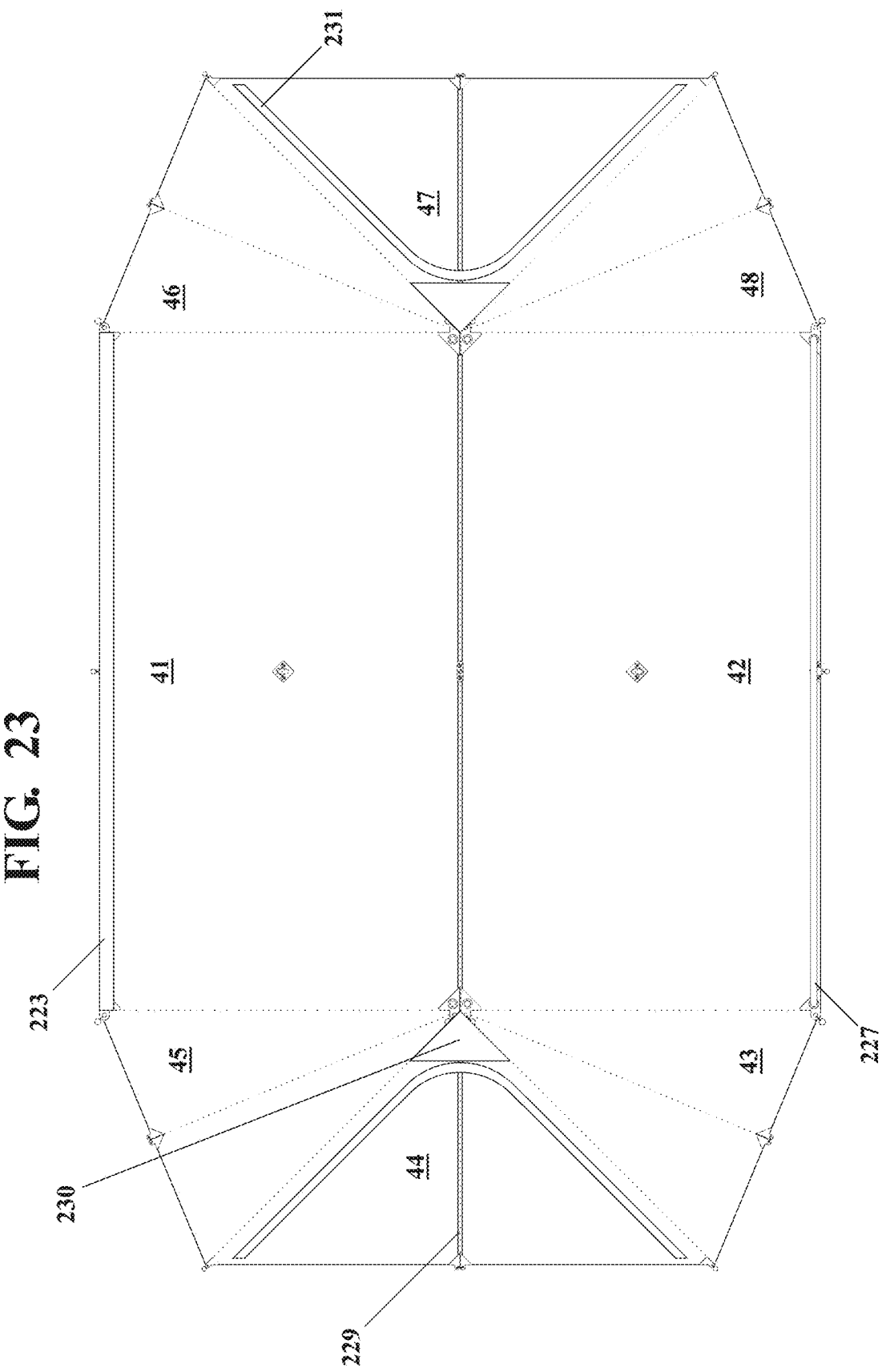

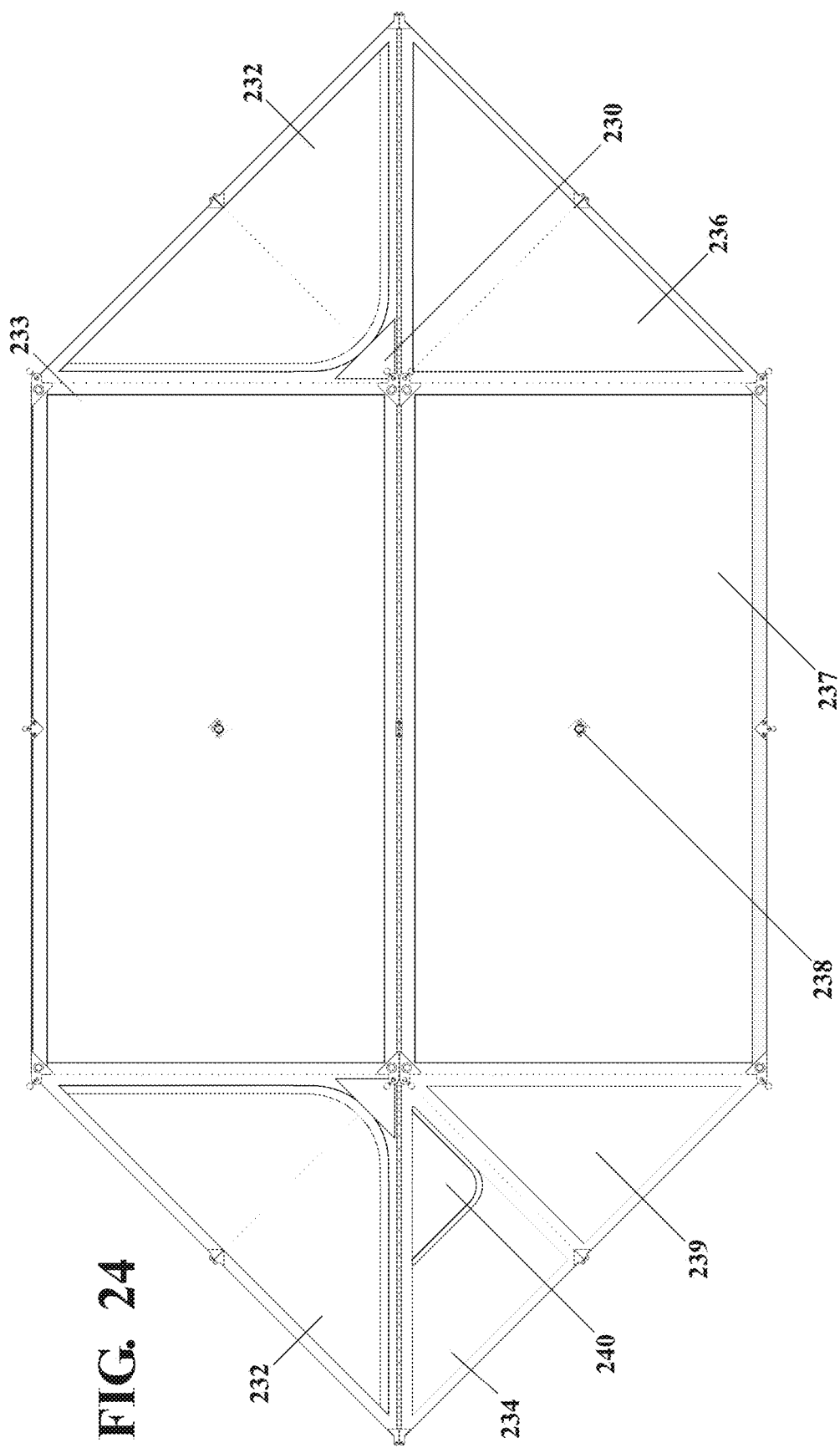

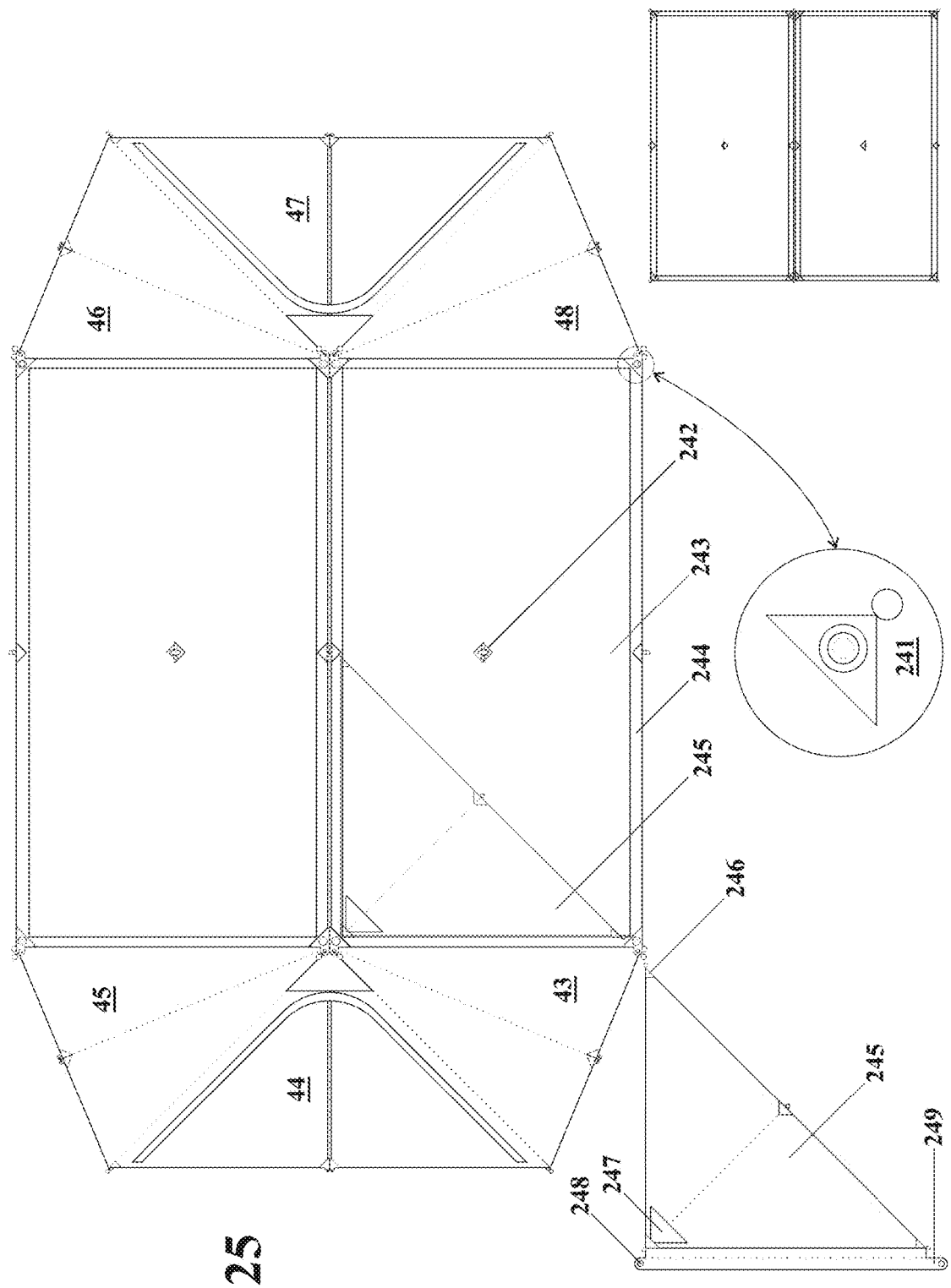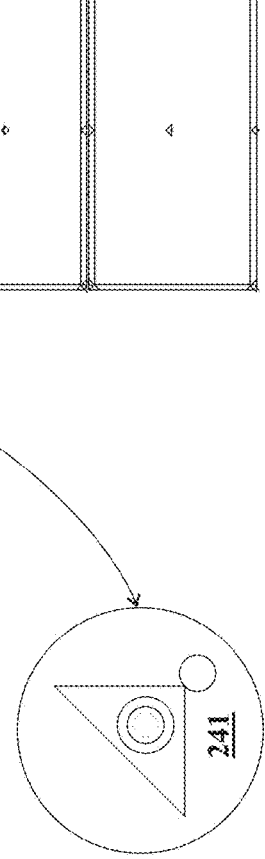

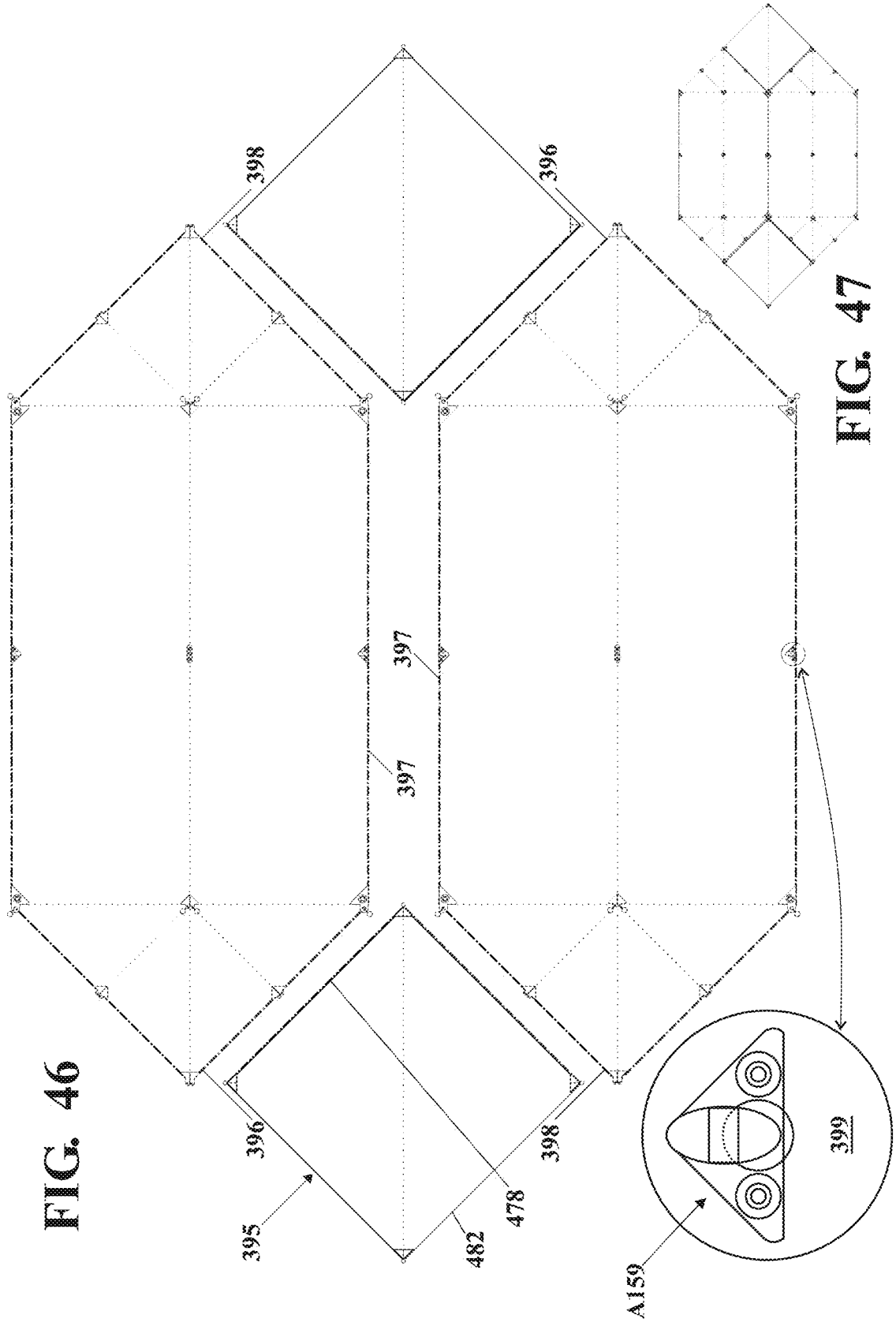

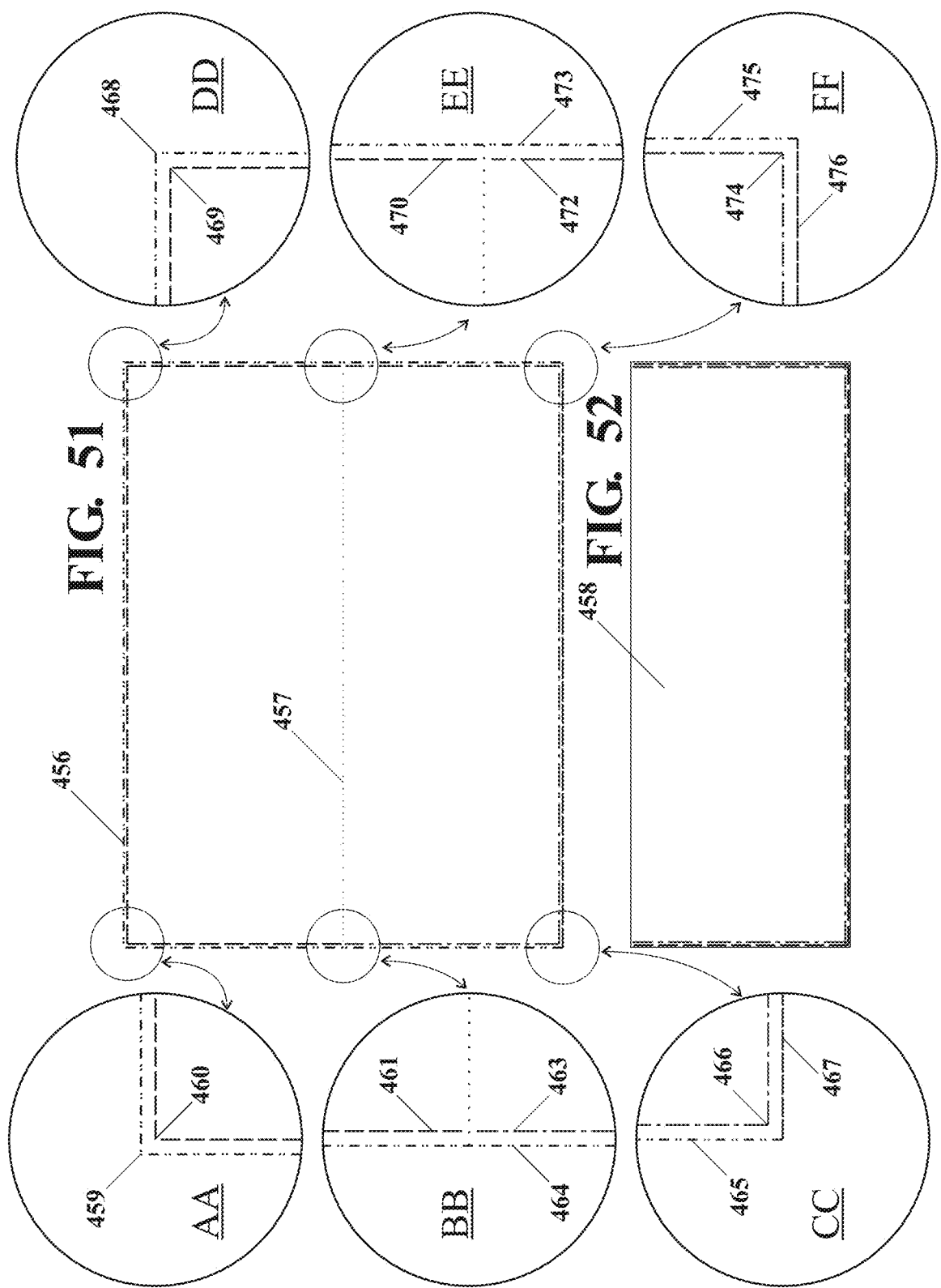

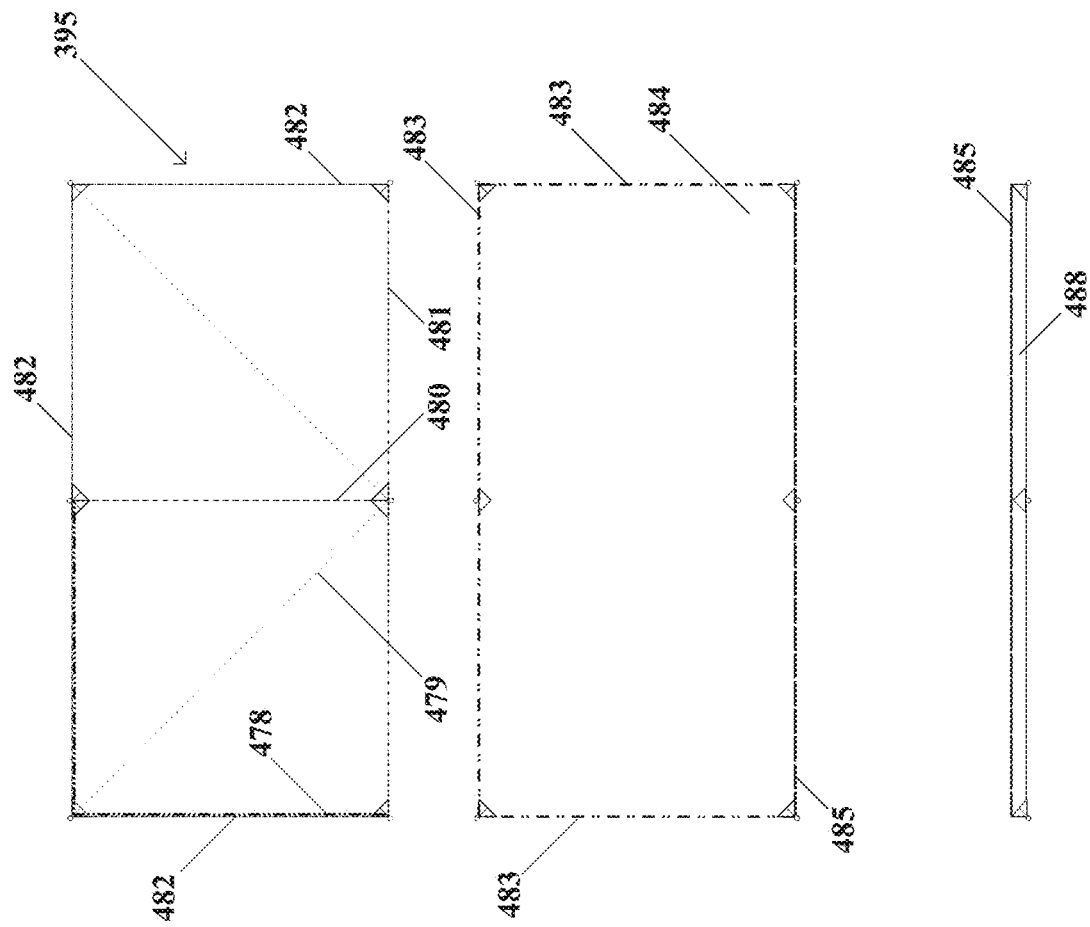

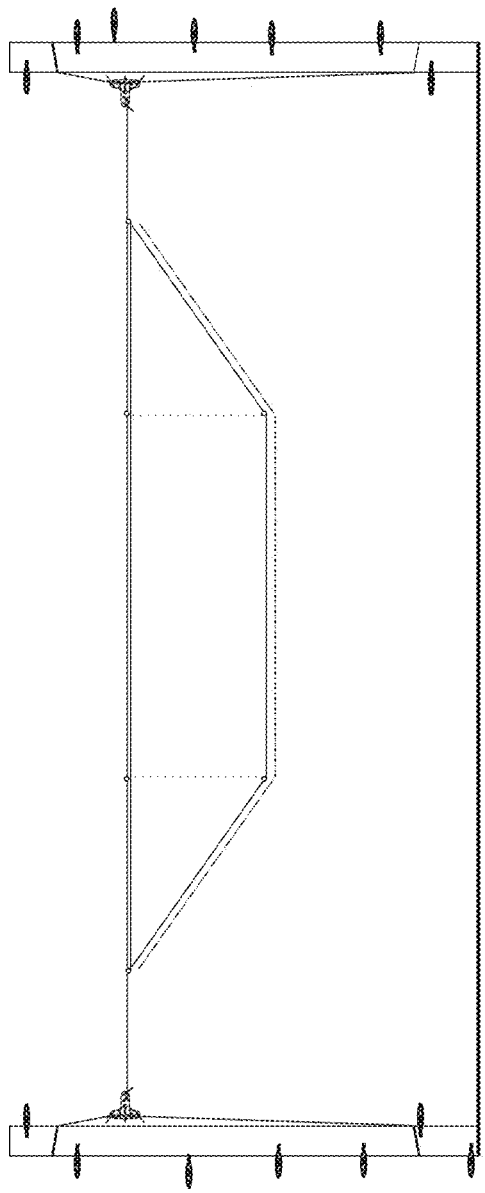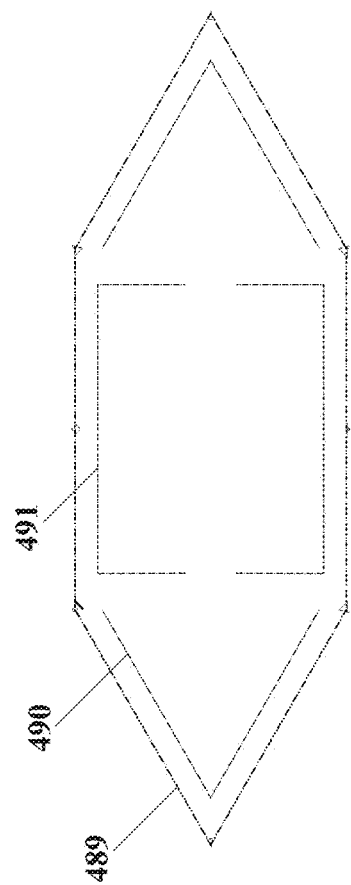

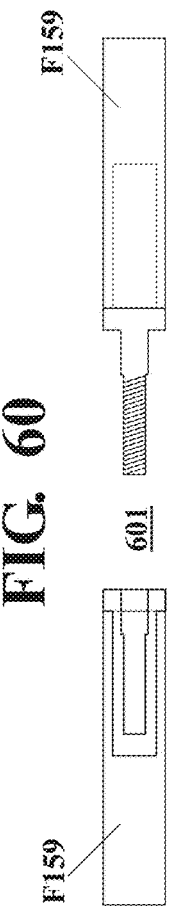
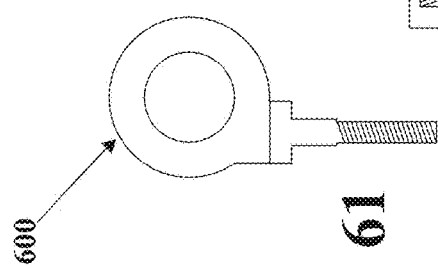
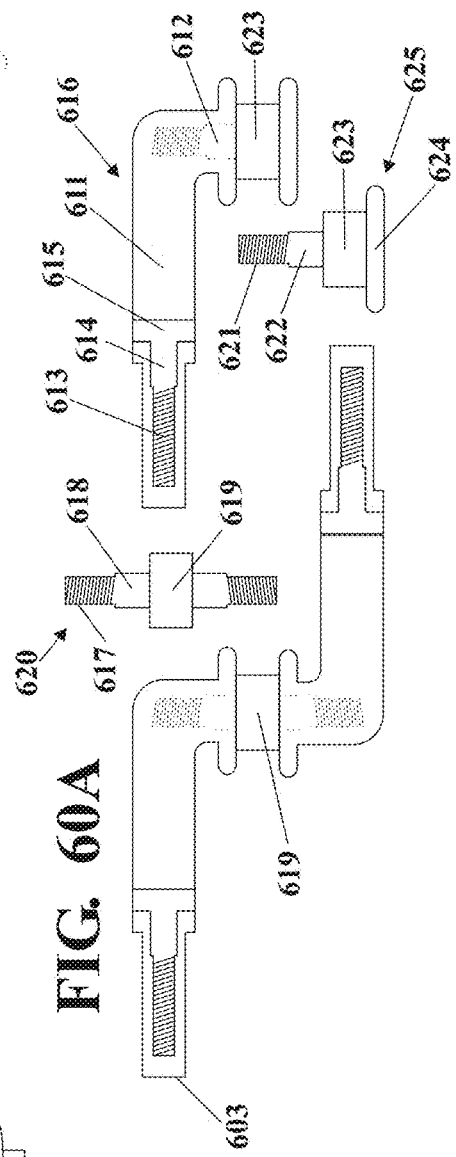
FIG. 60
FIG. 60A
FIG. 61
FIG. 62
FIG. 63

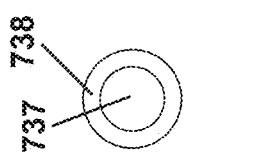
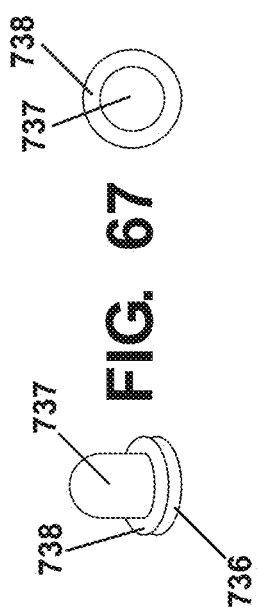
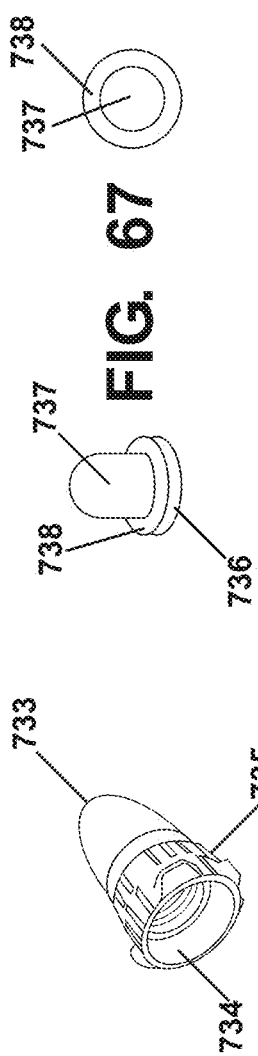
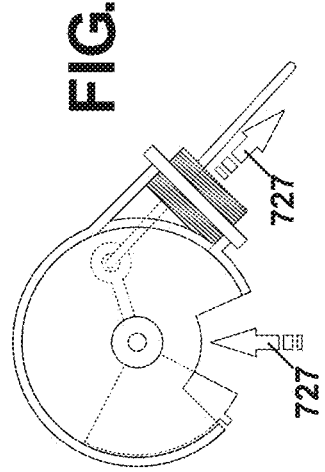
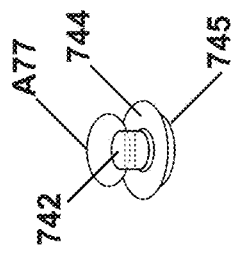
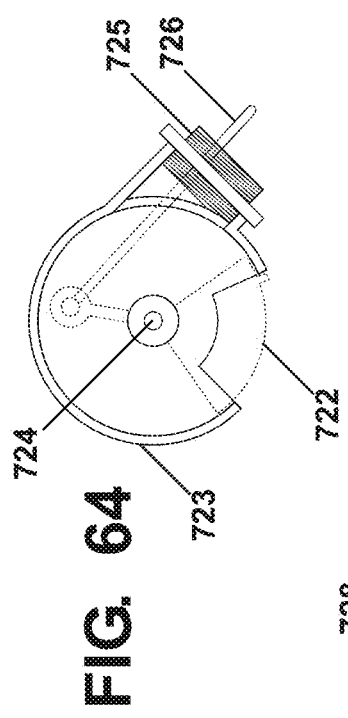
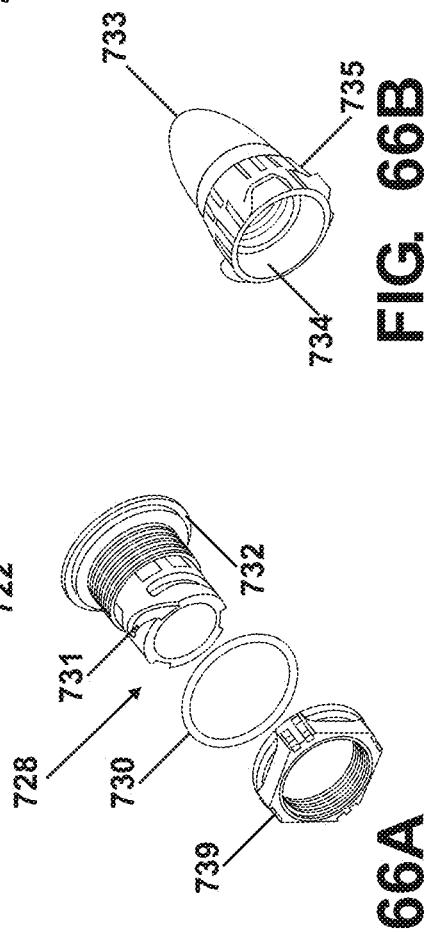
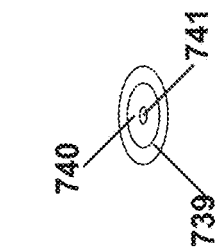
FIG. 64
FIG. 65
FIG. 66A
FIG. 66B
FIG. 67
FIG. 68
FIG. 69

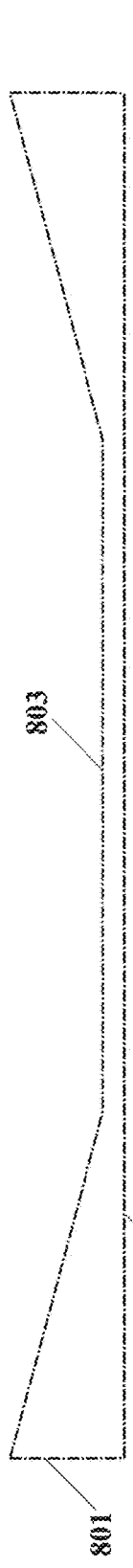
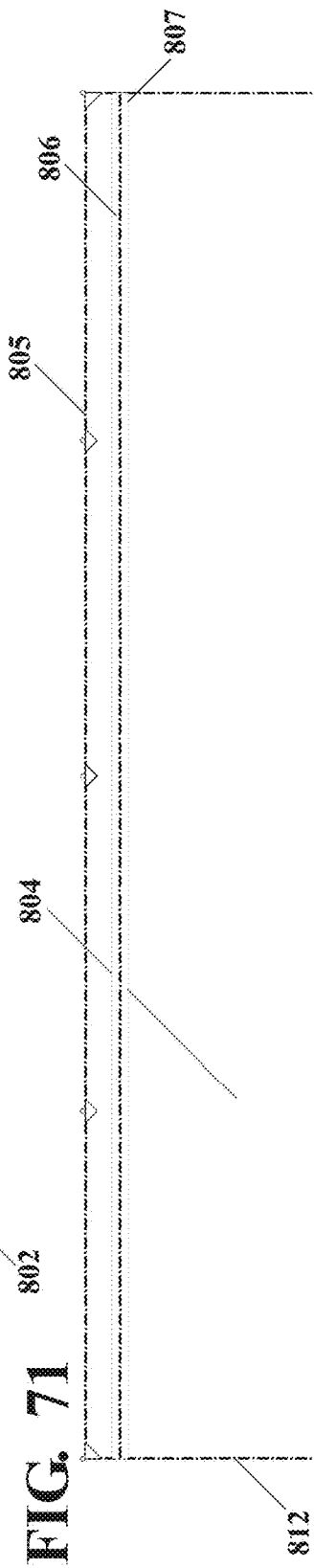
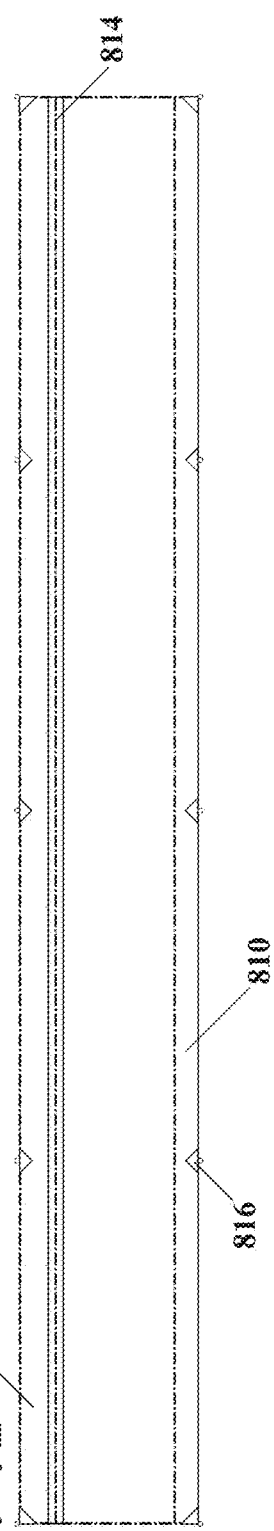
FIG. 70
FIG. 71
FIG. 72

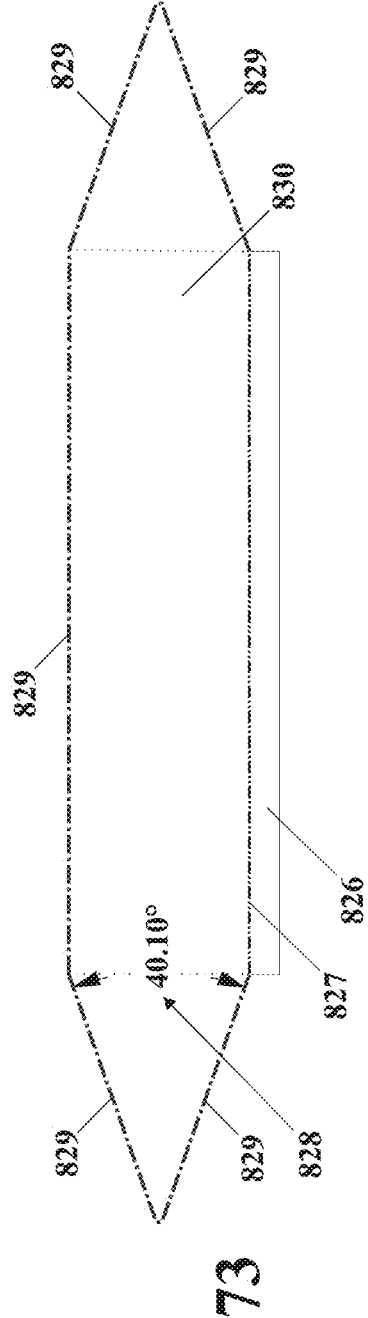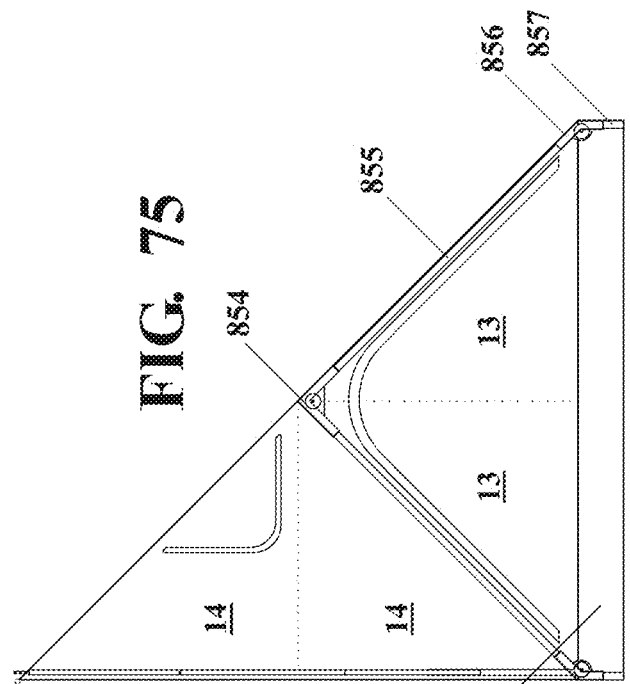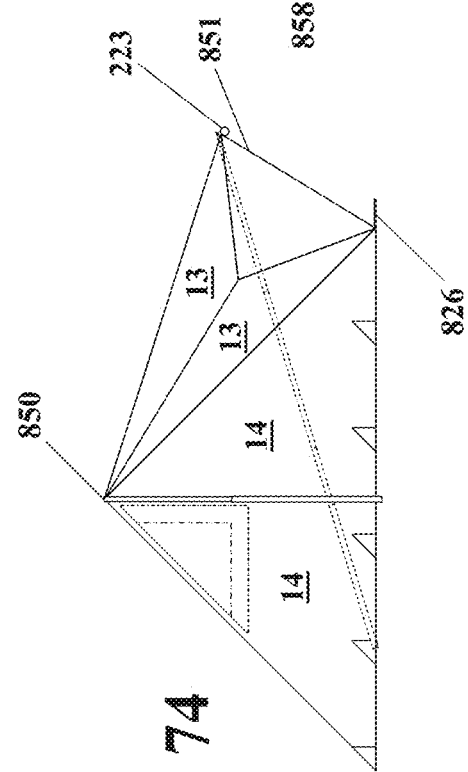

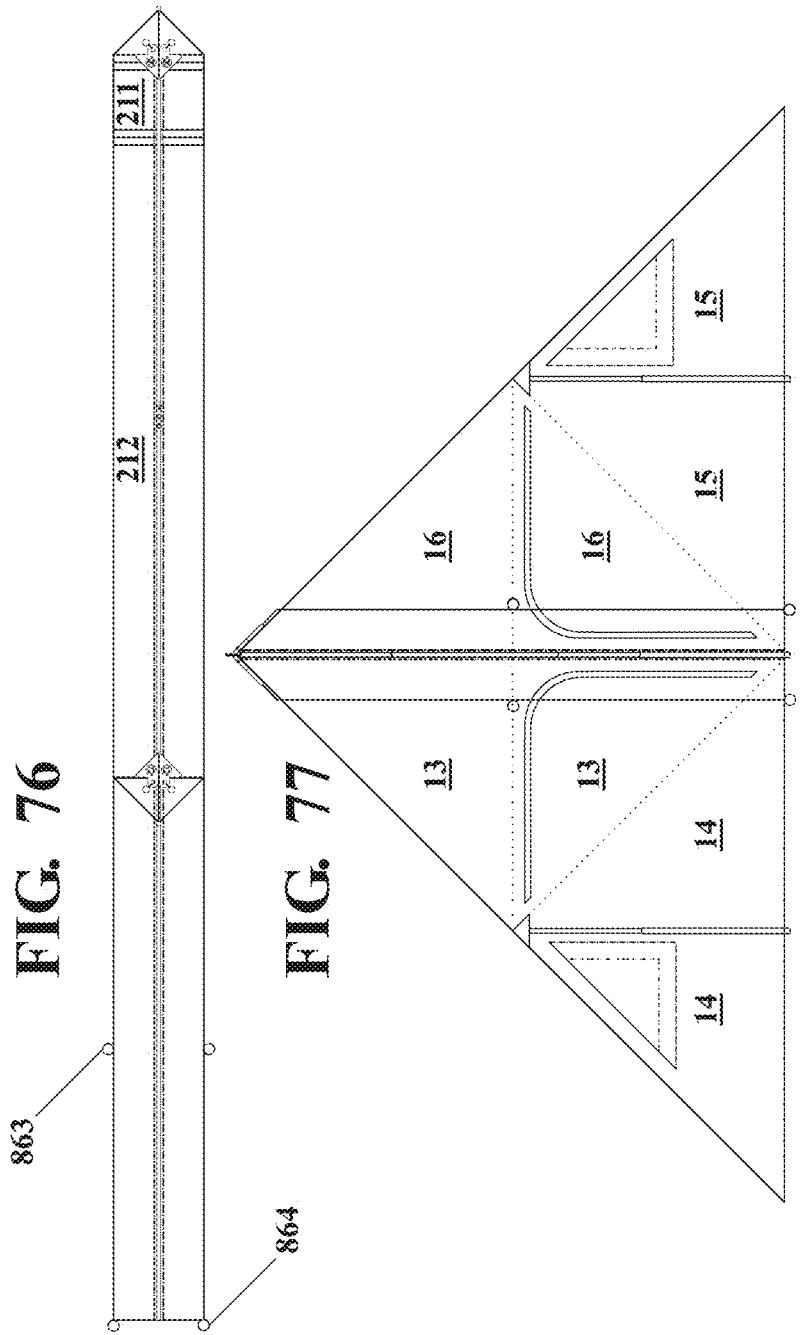

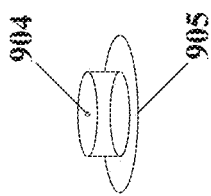
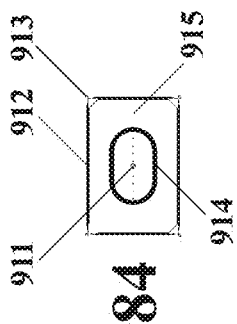
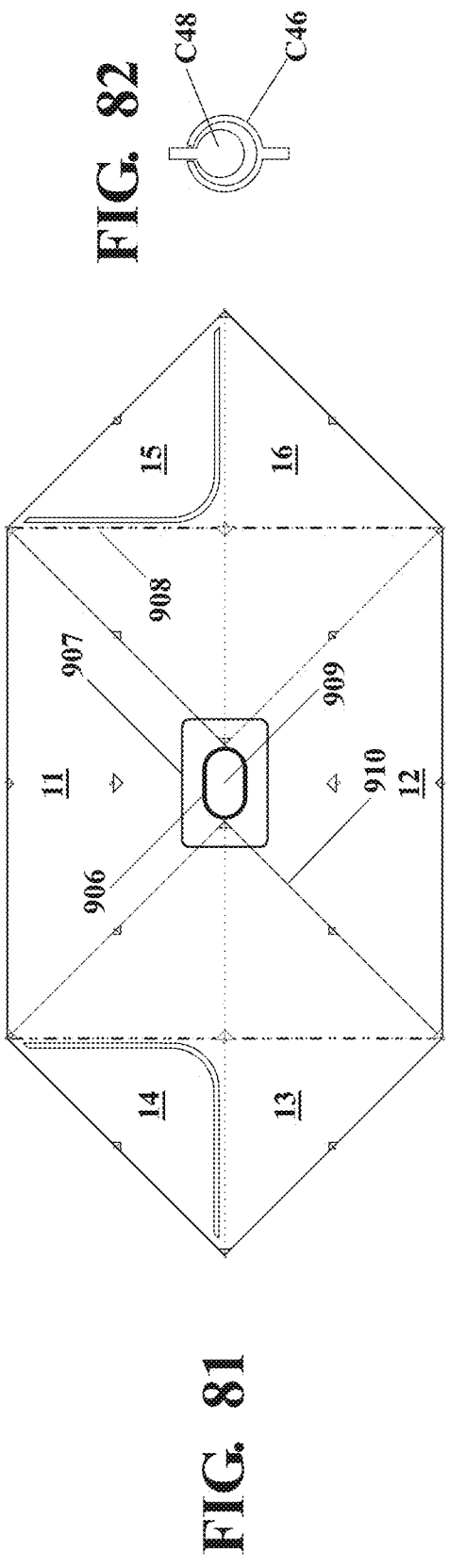
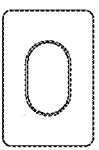
FIG. 78 FIG. 79 FIG. 80 FIG. 82 FIG. 81 FIG. 83 FIG. 84 FIG. 85

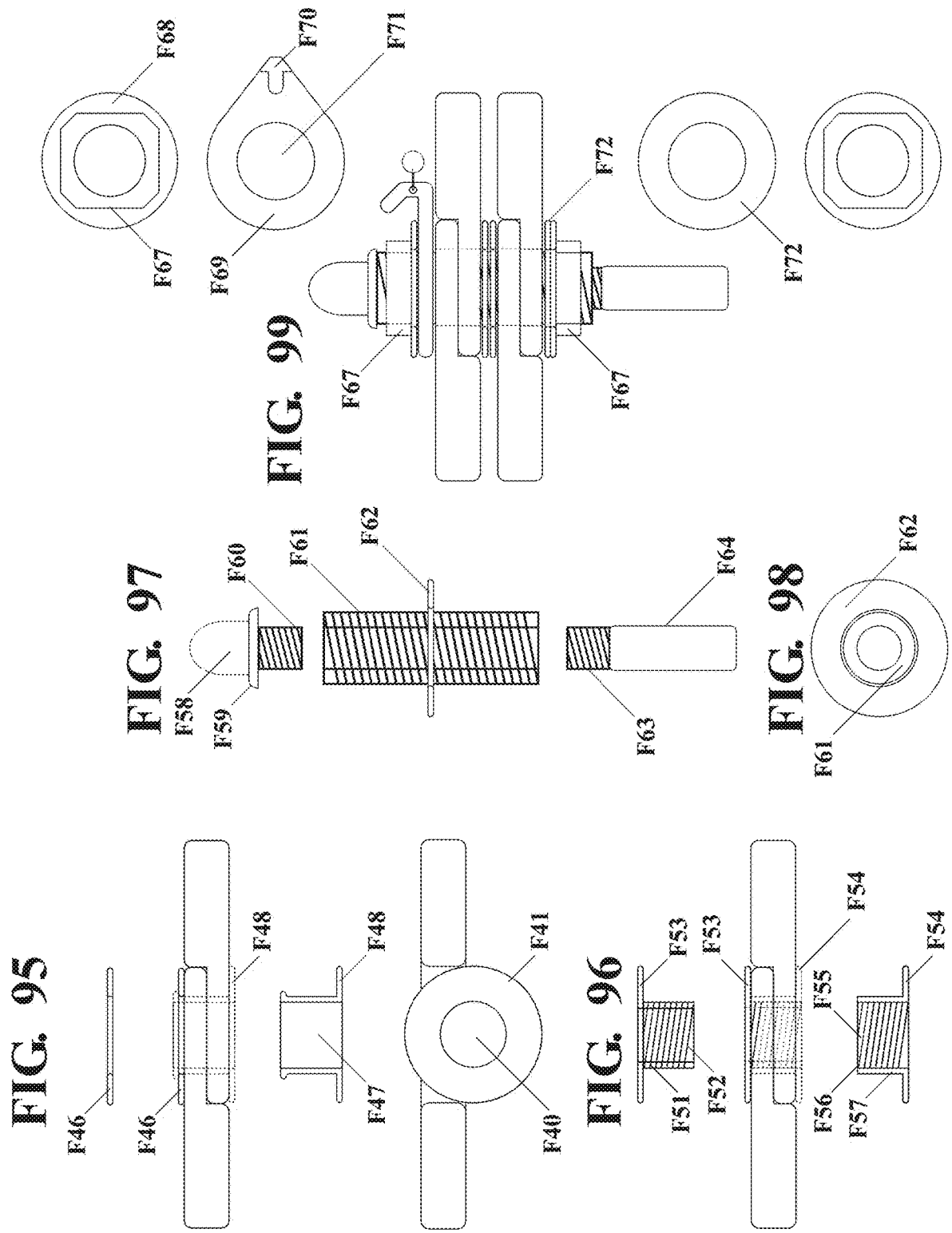

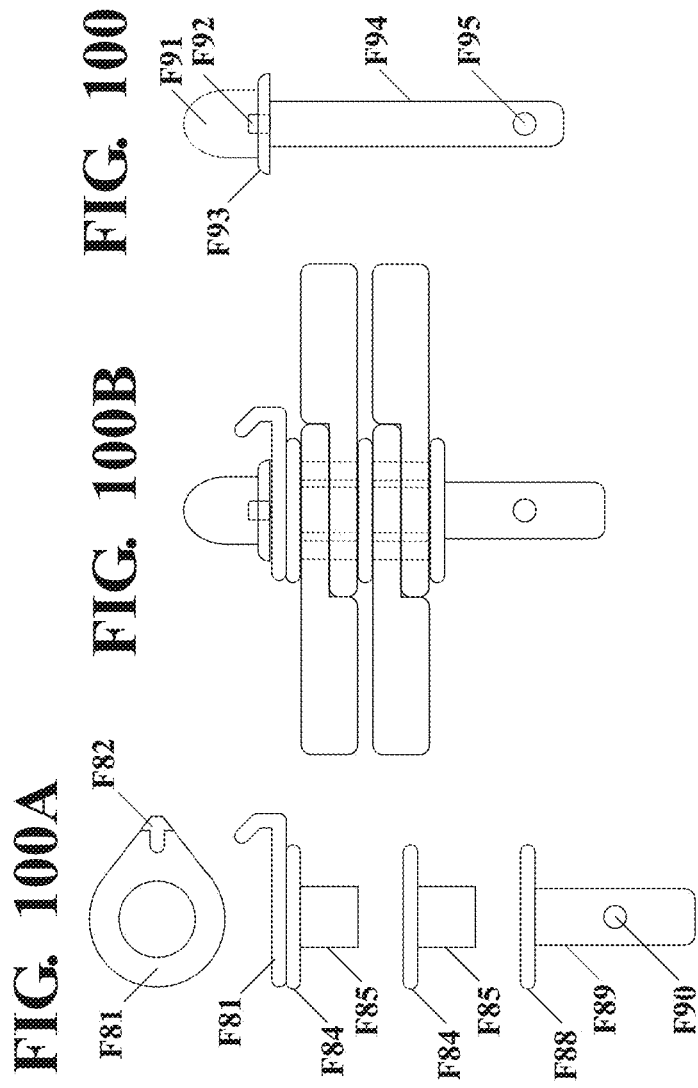

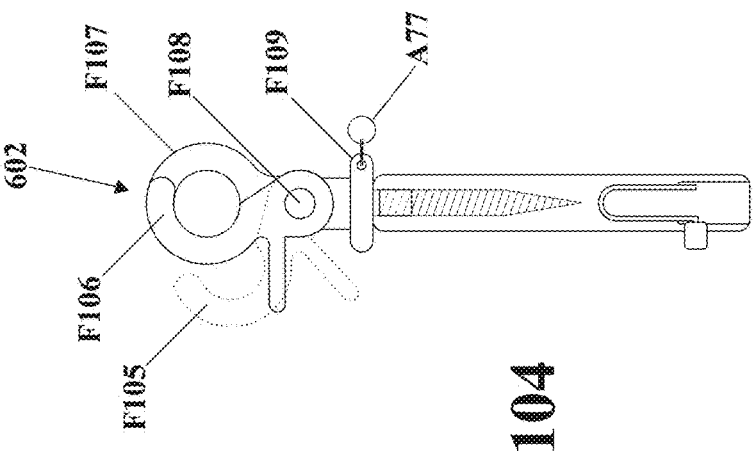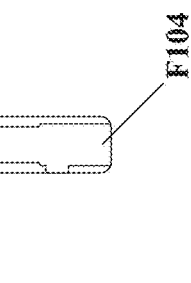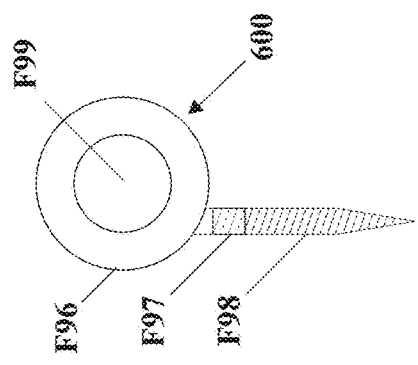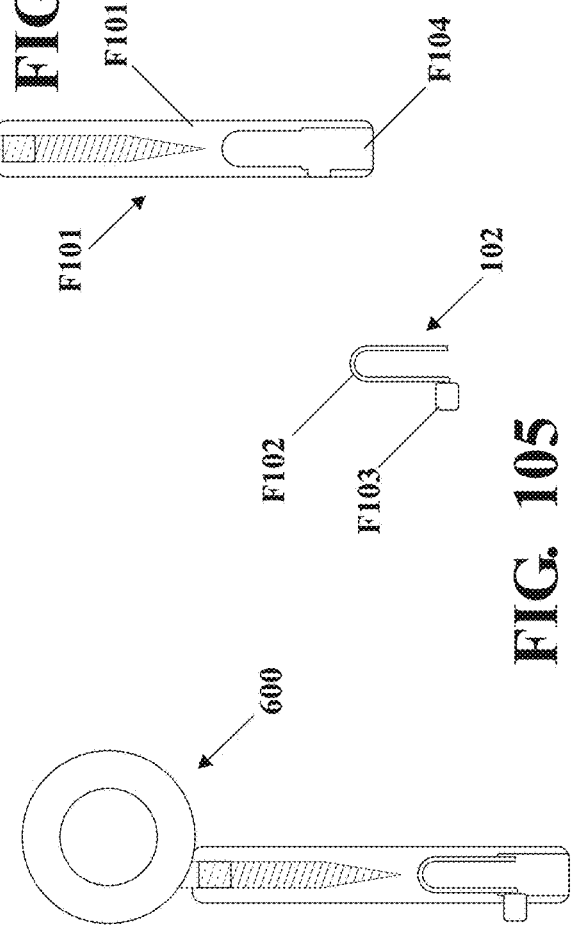
FIG. 102
FIG. 103
FIG. 104
FIG. 105
FIG. 101
FIG. 106

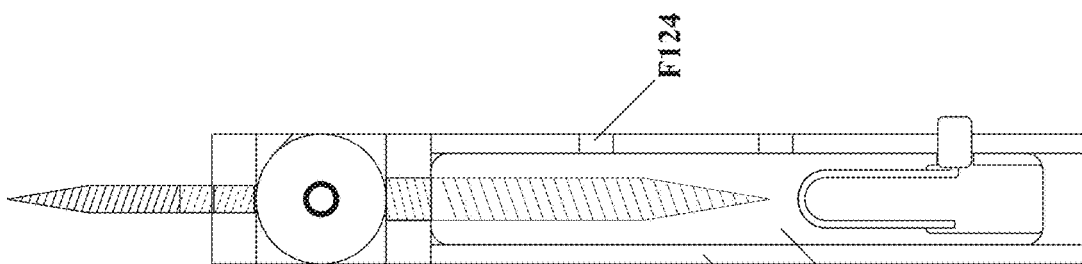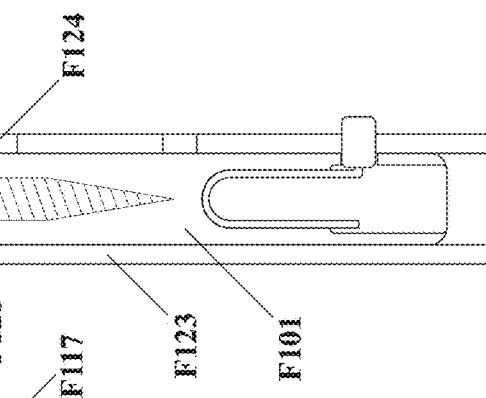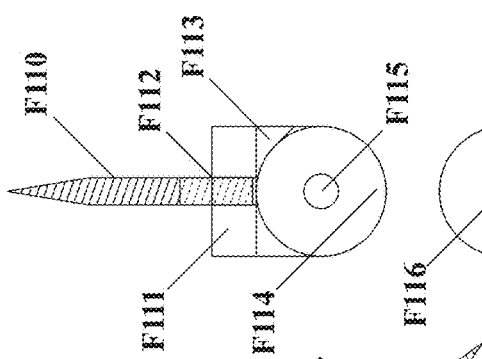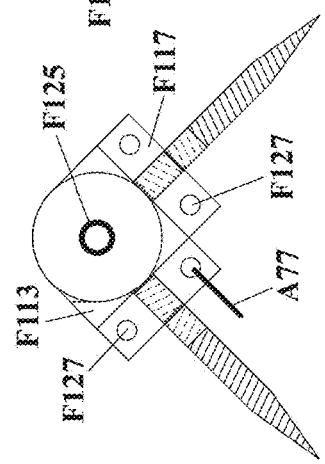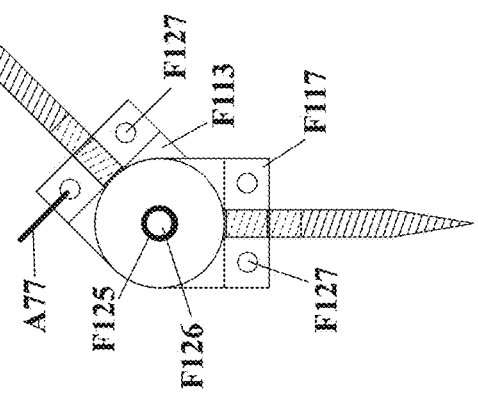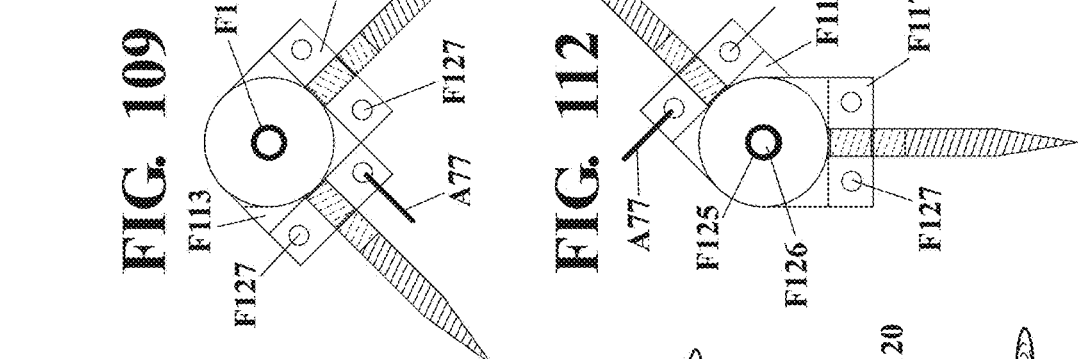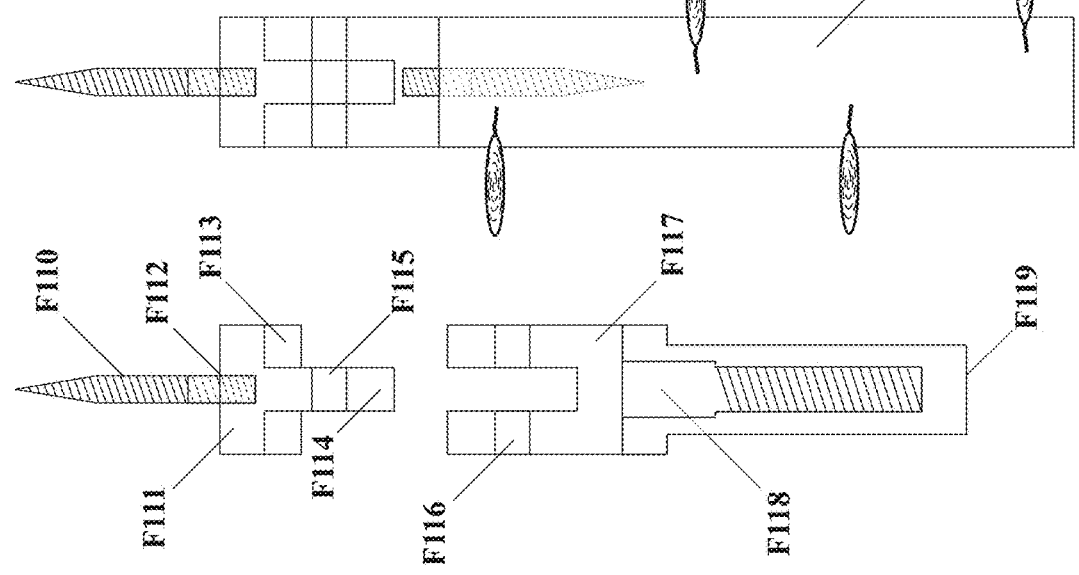

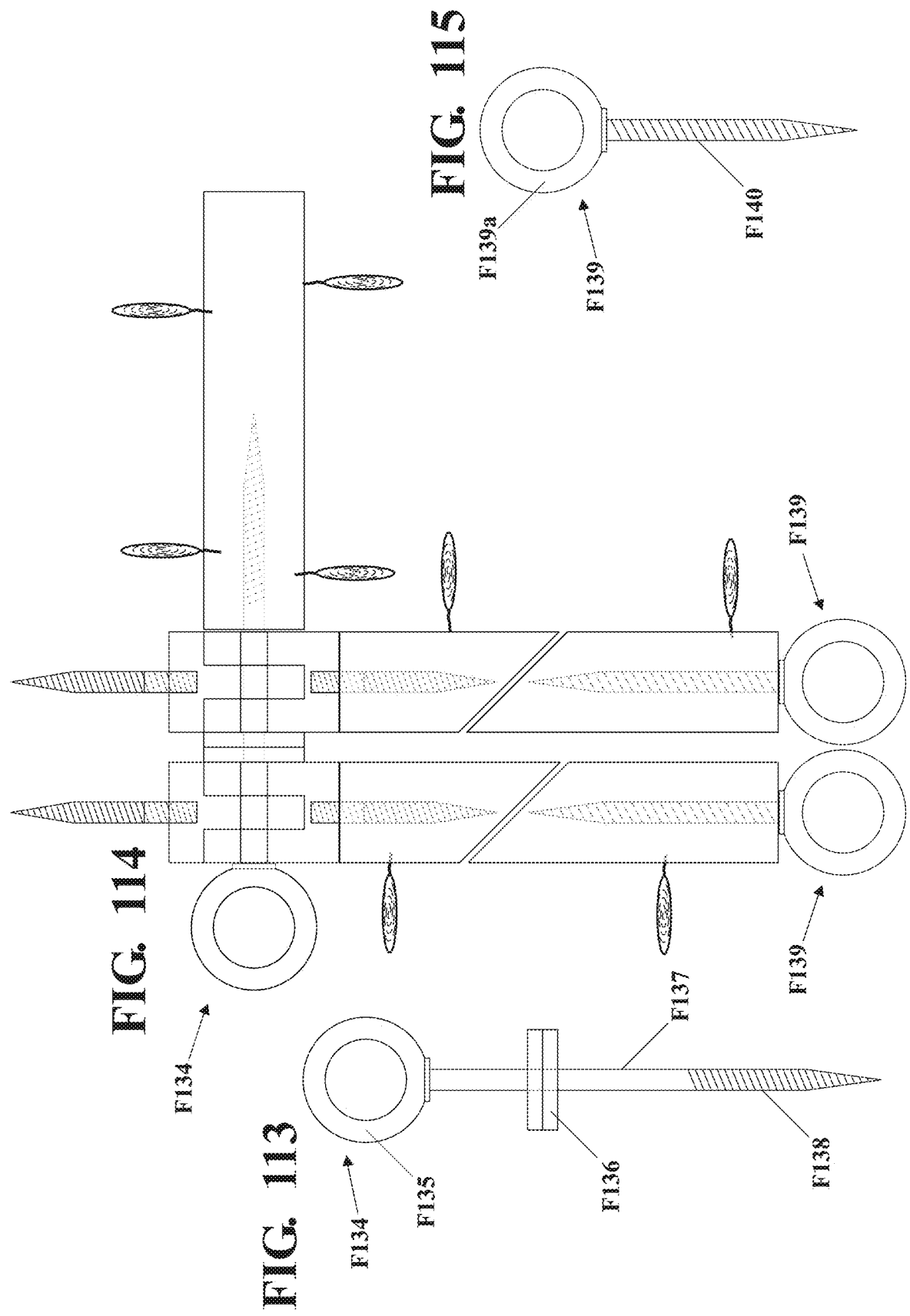

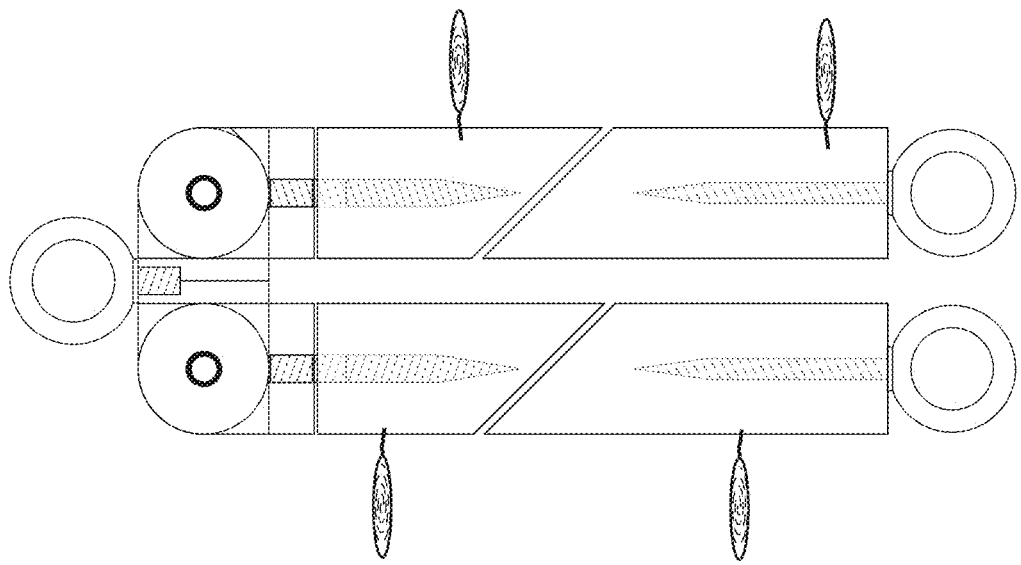
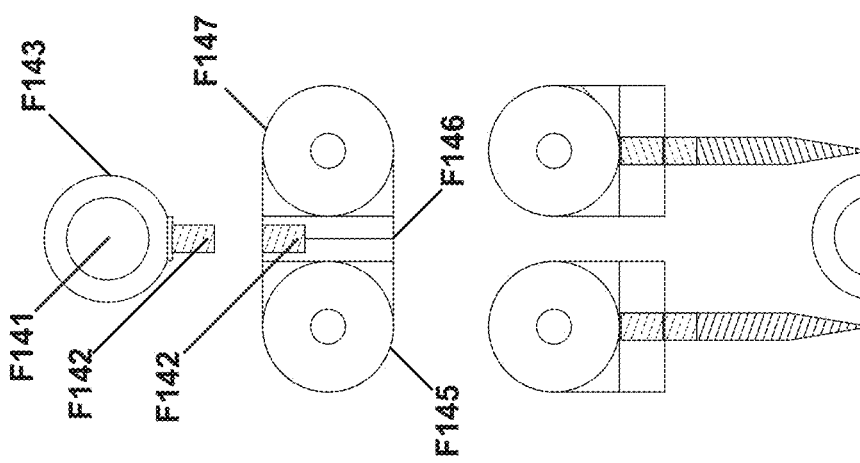
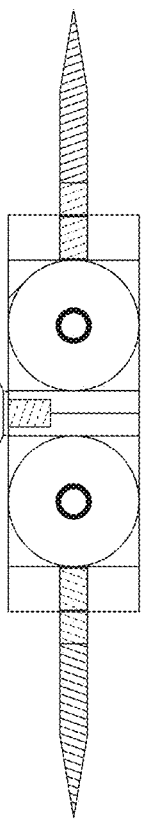

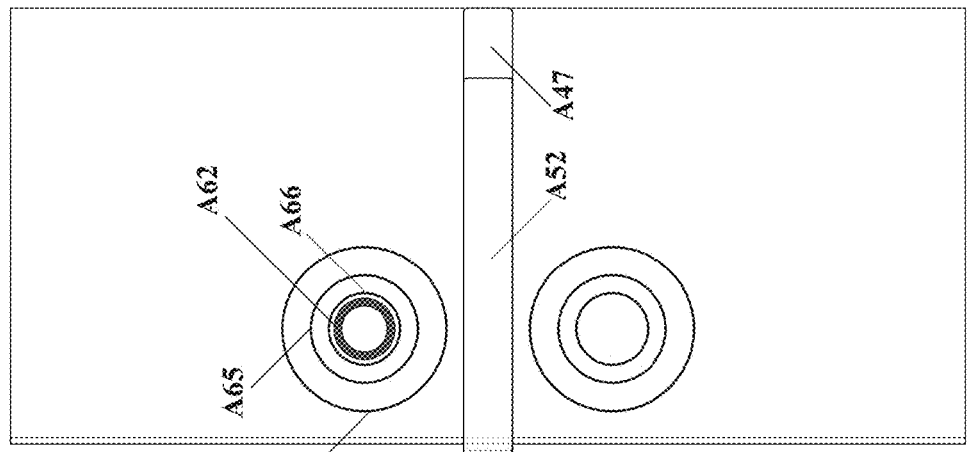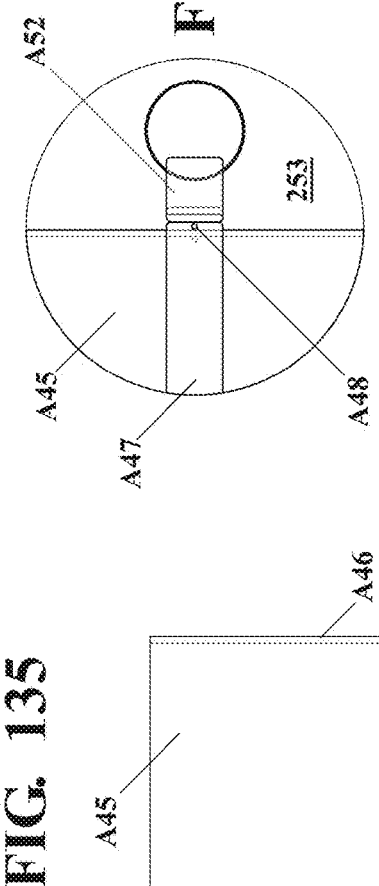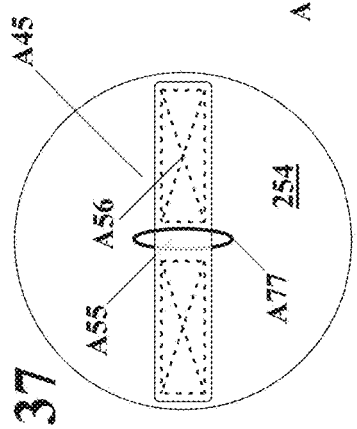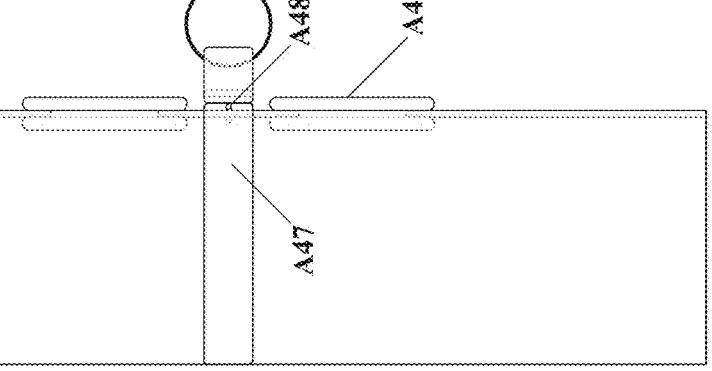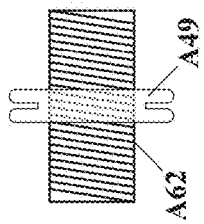

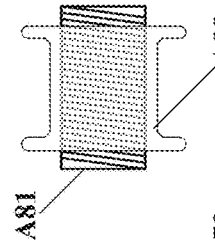
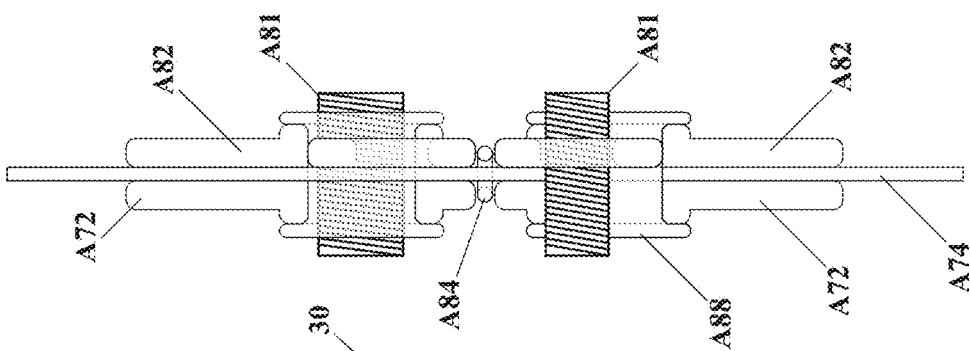
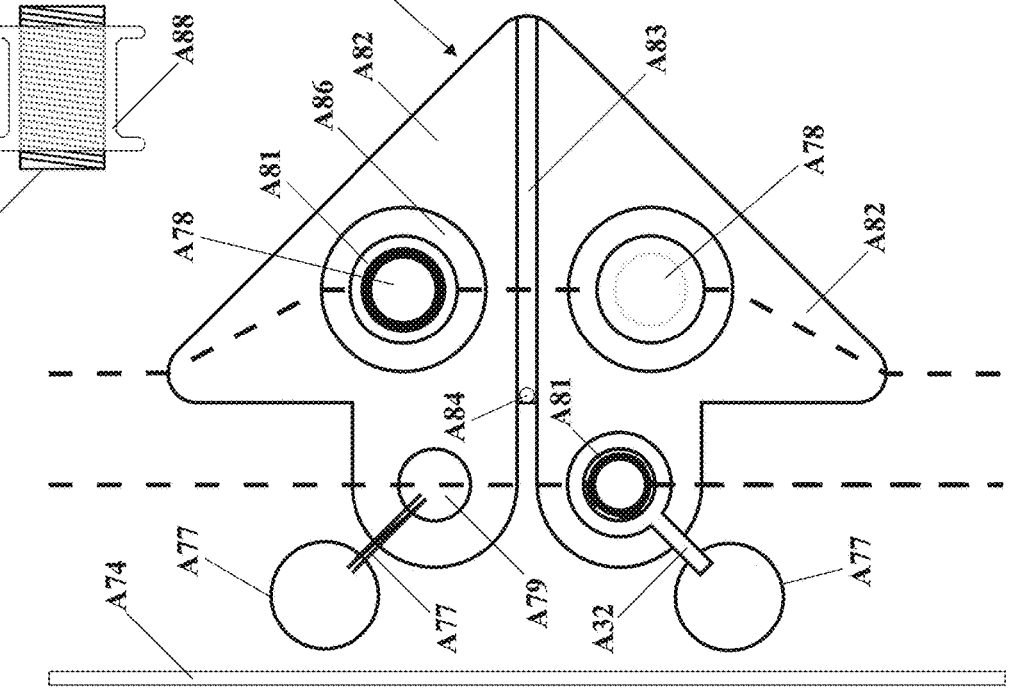
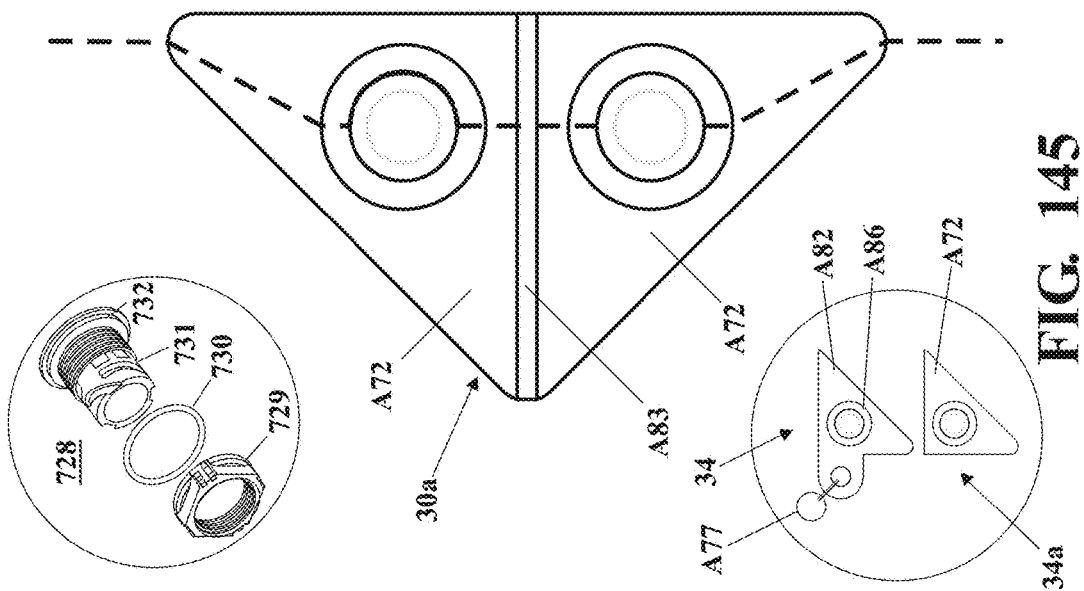
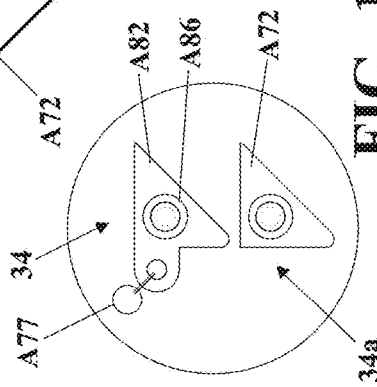

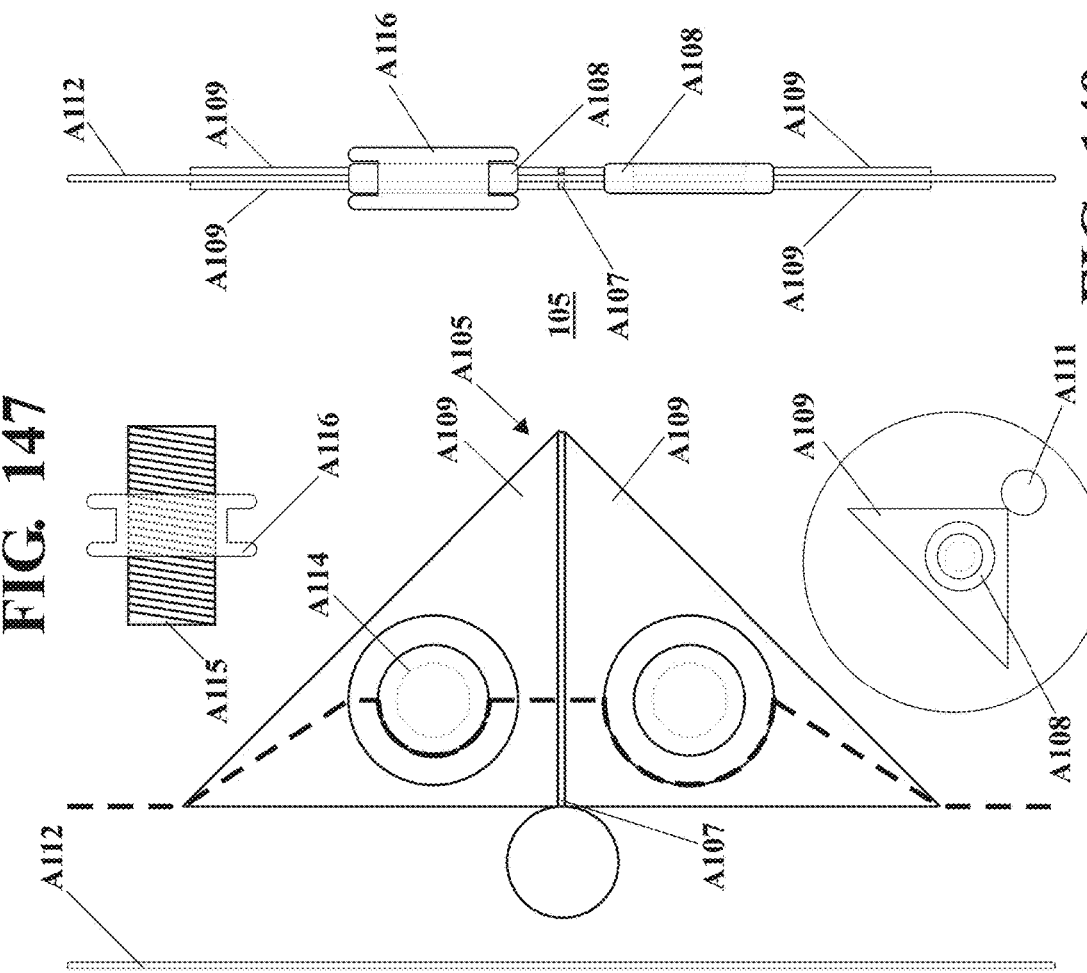
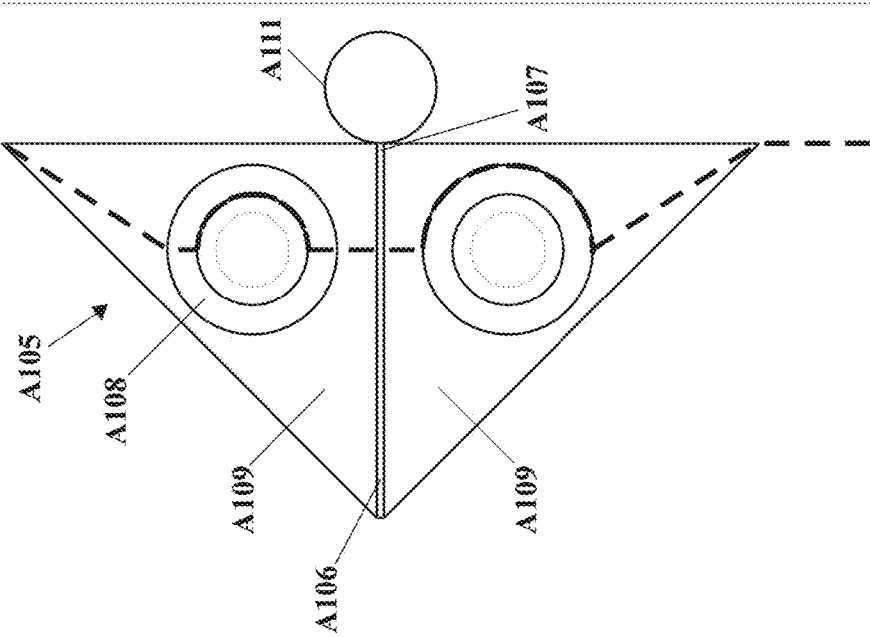

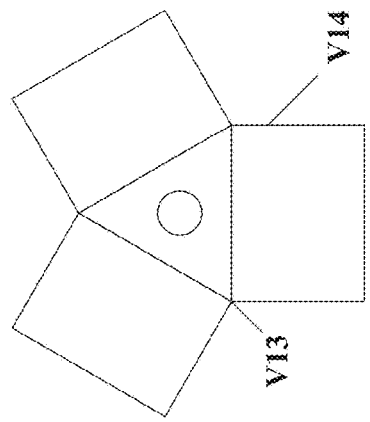
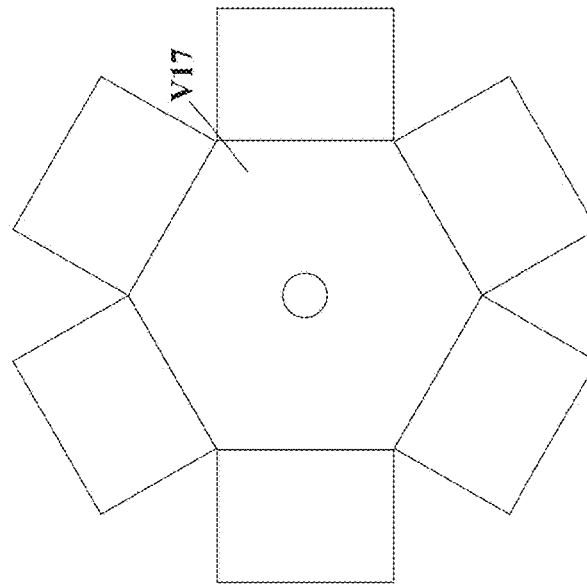
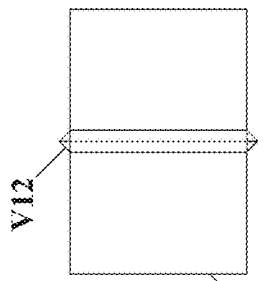
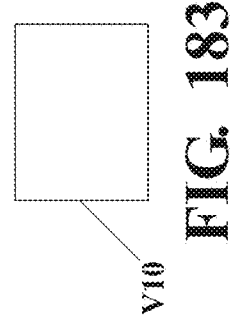
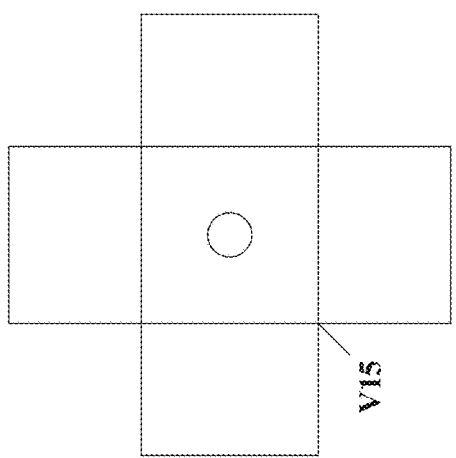
FIG. 183
FIG. 183A
FIG. 183B
FIG. 183C
FIG. 183D
FIG. 183E

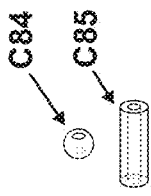
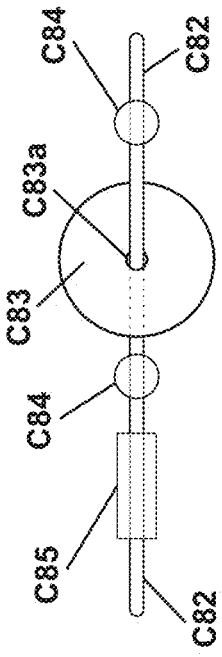
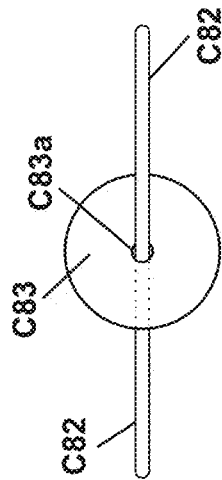
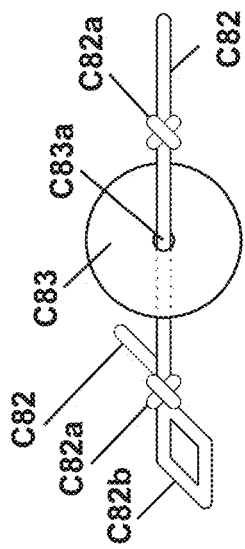
FIG. 185
FIG. 185A
FIG. 185B
FIG. 185C

CUSTOMIZABLE TENTING SYSTEM

RELATED APPLICATIONS

This application claims priority to and the benefit of Provisional Application No. 62/666,817 filed on May 4, 2018, the entire disclosure of which is hereby incorporated by reference.

FIELD OF THE TECHNOLOGY

The present invention generally relates to tents adapted for multiple uses and configurations. More particularly, the invention relates to customizable tents adapted to be combined together and associated adaptable rigging. It can also be produced in a size appropriate as a toy. The invention can also be created with computer generated imagery. The invention can also be created with virtual or augmented reality programming. The invention can also be 3D printed to be used as an educational tool.

BACKGROUND

Generally, tents can have many uses such as offering lodging for a family on vacation or shelter for a lone backpacker. Tents can also be used as an emergency shelter in a time of need or as housing in certain applications. Tents are available in various shapes, sizes and configurations. Riggings for tents also come in various forms. Unfortunately, each of the various tenting options are predisposed to be used for a limited if not singular application. Thus, tents intended for family camping are not suitable for backpacking or as an emergency shelter that may be used for an extended period of days. Even if limiting application to family camping, it is not uncommon for a family to own more than one tent where each tent has a particular size or application, and no ability to be combined together. Therefore, there is a need for a tent and rigging adaptable for multiple uses and configurations.

Various tents have been taught in the prior art. U.S. Pat. No. 4,072,158 to O'Brien, and U.S. Pat. No. 4,862,906 to Jordan are examples of tents intended to be used for tent camping. However, these tents have limited application and are not suitable for expansion and use in a multitude of applications and environments. Generally, prior art tents comprise a tenting material and hardware components without the ability to expand and be modified for many applications.

Further, while the prior art includes various uses of tents, ordinarily tents are generally used for camping without the need to be used in unforeseen survival and crisis situations. Thus, tents are not designed to be coupled with a wide assortment of accessories that make it desirable in many environments and weather conditions. Other tents may provide shelter, but they do not allow for various specific shapes and thus do not reflect the user's preferences. In addition, conventional tents serve only a single purpose and cannot be used for multiple purposes, which requires the purchase of multiple tents for different purposes and uses.

Therefore, there is a need in the art for a customizable tent having an ability to be combined with other similar tents and including an array of rigging and accessory options.

SUMMARY OF THE INVENTION

The invention is directed to two unique tent forms together with associated riggings and accessories. The first tent form is a single awning tent ("Single Awning") and the second tent form is a double awning tent ("Double Awning") as described herein (collectively, "tent," "tent shelter," or "shelter"). The Single Awning and Double Awning tent forms can be manipulated into different configurations and include related parts along with rigging apparatuses. The unique tent forms can be manipulated into multiple shapes depending on the user's preference. The outline of the Single Awning preferred shape (additional material can be outside the preferred shape) can be disclosed on a plane by coupling two isosceles right triangles with one rectangle (a quadrilateral with four right angles) that may or may not have four equal sides (square). The side (hypotenuse) of each isosceles right triangle has two 45-degree angles with adjacent sides of the rectangle. The longest sides (hypotenuse) of the two isosceles right triangles are equal and coupled to adjacent sides of the rectangle. The two right angles of the two isosceles right triangles are pointing away from each other. In embodiments, the tent includes various anchor points. The two isosceles right triangles are each divided in half to form two additional isosceles right triangles that can each be divided in half to form two additional isosceles right triangles. The angled corner points are the location of the preferred anchor points. A line connecting the 90-degree angle points of the two largest isosceles right triangles divides the rectangle in two equal parts. Preferred secondary anchor points can be added inside, outside or on preferred design shape outline.

The Single Awning preferred shape, manipulation lines and anchor points for the purpose of disclosure can be summarized. Shapes and lines on a plane comprising eight equal isosceles right triangles with equal hypotenuse and two equal rectangles (a quadrilateral with four right angles) that may or may not have four equal sides (square) that each have adjacent sides equal to the hypotenuse of the eight-equal isosceles right triangles that are preferably arranged and coupled. The outermost lines are the preferred design shape (additional material can be outside the preferred design shape outline). The lines inside the preferred design shape are the manipulation lines. The angle points are the preferred design anchor points. Preferred secondary anchor points (secondary anchor points are points that add utility but are not necessary to use) can be added inside, outside or on preferred design shape outline. The lengths of the sides of the rectangle will vary depending on the preferred use of the individual and the preferred materials used to manufacture or represent a preferred design.

The outline of the Double Awning preferred design shape (additional material can be outside the preferred design shape outline) can be disclosed on a plane by coupling two equal isosceles right triangles that have sides (legs) equal to two adjacent sides of two equal rectangles (a quadrilateral with four right angles) that may or may not have four equal sides (square). Two legs of the isosceles right triangles and two adjacent sides of both rectangles are equal. The equal sides of the two rectangles are coupled together. The 90-degree angle point of each of the isosceles right triangle with adjacent 90 degree are coupling points of the coupled rectangles. Four equal isosceles triangles that each have two legs equal to legs of the isosceles right triangle can be couple to fill the space between the rectangles and the isosceles right triangles. Lines can connect the outer most angle points of the combined eight shapes to the preferred design shape outline. Each of the isosceles right-angle triangles and the isosceles triangles can be divided into equal parts (four isosceles right triangles and eight right triangles). The total angled corner points are the location of the preferred anchor points. Preferred secondary anchor points can be added inside, outside or on the preferred design shape outline.

The Double Awning tent preferred design shape, manipulation lines and anchor points for the purposes of disclosure can be summarized. The shape, shapes and lines on a plane comprise four isosceles right triangles, eight right triangles and two equal rectangles (a quadrilateral with four right angles) that may or may not have four equal sides (square) that each have adjacent sides equal to the hypotenuse of the twelve triangles that are preferably arranged and coupled. The outermost lines are the preferred design shape (additional material can be outside the preferred design shape outline). The lines inside the preferred design shape are the manipulation lines. The angle points are the preferred design anchor points. Preferred secondary anchor points can be added inside, outside or on preferred design shape outline. The lengths of the sides of the rectangle will vary depending on the preferred use of the individual and the preferred materials used to manufacture or represent a preferred design.

The invention relates to a design concept including anchor points and lines of manipulation. Thus, the object of the present invention is to provide an improved, customizable tent system that is adopted to be used in various ways, such as an emergency, educational, recreational, military, toy, virtual reality game, computer or generated-imagery tent. A second object is to allow for ease of assembly and expandability to provide increased, yet fully protected, interior space.

In embodiments of the invention, the tent consists primarily of a flexible, rigid and combination of all materials that can be adapted to connect to other tents, and then used as a larger single shelter, and as a transitional housing unit capable of sleeping multiple persons. It is yet another object of this invention to provide a tent that can be utilized for a variety of different purposes.

This invention is designed to be coupled together to make one large pocket that can be filled with insulation. The tent zippers, snaps, clips, buttons or any means of coupling are used to connect the tent to the accessories, and also used to connect multiple tents together and create a single larger tent.

It is further an object of this invention to provide a rigging system for the disclosed tent embodiments that is adaptable and expandable and that is easy to use for different applications. The rigging system includes multiple embodiments such as a paracord ridge line, a guy-line and a tent stake for attachment.

A rectangle can be defined as a plane and a quadrilateral with four right angles. It can also be defined as an equiangular quadrilateral, since equiangular means that all of its angles are equal (360 degrees/4=90 degrees). It can also be defined as a parallelogram containing a right angle. A rectangle with four sides of equal length is a square.

A triangle can be defined as a plane with three straight sides and three angles. An isosceles right triangle is a right triangle that has its two legs equal in length. Since the two legs of the right triangle are equal in length, the corresponding angles would also be congruent.

In embodiments of the invention, the primary anchor points of the tent are located at the angle points. In embodiments of the invention, a secondary anchor point is defined as a point positioned inside, outside or on a tent top to stabilize the tent. It also serves as a connection point when combined with other tents. In embodiments of the invention, the anchor points can be replaced by an anchor apparatus or by any embodiment that can function appropriately based on the material used.

Manipulation lines are shown on tent embodiments as a point of manipulation that can be moved to a different degree angle that still has two planes which are coupled together. The manipulation lines show an approximate manipulation area based on the material used.

In embodiments of the invention, an anchor apparatus (means of coupling) is used as an attachment apparatus that can couple a tent to another tent, a tent to tent accessories, or a tent accessory to a tent accessory that includes a zipper, a hook and loop fastener, a snap, a clip, a button or an anchor apparatus that can couple to itself and then be coupled to the tent shelter or to a tent accessory.

In embodiments of the invention, tent accessories provide structural support, ventilation, electricity, openings, insulation, weather protection, flooring, screening, awning enclosure to expand the interior space, and material to capture or reflect radiant heat to the tent. Tent accessories also includes anchoring elements, and elements used to form different tent and awning configurations.

In embodiments of the invention, a ridge line of the tent is a line formed when a tent is flown. A shorter ridge line is formed when the tent awnings are closed, and the tent ends are folded closed. Another ridge line can be formed by opening one of the tent ends. When the tent is manipulated into a wedge configuration and combined with the same tent also formed in a wedge configuration, the top line of those two tent shelters combined will form a new ridge line.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale, and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

FIG. 9 shows a partial side view of an embodiment of the invention suspended between a fixed object on one side and secured to the ground on the other side;

FIG. 10 shows a side view of a closed configuration of an embodiment of the present invention;

FIG. 11 shows a side view of a partially open configuration of an embodiment of the invention;

FIG. 12 shows a side view of a partially open configuration of an embodiment of the invention;

FIG. 13 shows a side view of a fully open configuration of an embodiment of invention;

FIG. 19 shows a perspective view of a shelter ridge fly accessory including anchor points to be coupled with two or more single awning tent shelters;

FIG. 20 shows a perspective view of a shelter ridge fly accessory including anchor points coupled with two single awning tent shelters;

FIG. 21 shows a perspective view of a shelter ridge fly accessory including anchor points coupled with material that conducts electricity to be coupled with two single awning tent shelters;

FIG. 23 shows a top view of a double awning shelter's sidewalls coupled with a variety of what may represent doors, windows, vents or structural support components;

FIG. 24 shows a top view of a single awning shelter including pockets holding insulation panels;

FIG. 25 shows a top view of a double awning tent shelter having insulation panels coupled to each other and with the shelter by anchor points;

FIG. 26 shows a partial view of an insulation panel having anchor points for attachment;

FIG. 27 shows a front view of insulation panels coupled to the tent's portions by anchor apparatuses;

FIG. 46 shows a top view of two shelters that are uncoupled that can be coupled together with two side panel/floor bottom tent shelter accessories;

FIG. 47 shows a top view of two shelters that are coupled together with two side panel/floor bottom tent shelter accessories;

FIG. 51 shows a top view of a shelter floor laid flat so that it is coupled to a tent shelter or other shelter accessories;

FIG. 52 shows a top view of a shelter floor in the preferred shape of a bivy sack;

FIG. 53 shows a top view of a side panel/floor bottom tent shelter accessory deployed and laid flat;

FIG. 54 shows a view looking down on a bath tub floor design shelter bottom or a wade pool that is coupled with a tent shelter;

FIG. 55 shows a side view of a bath tub floor design or a wade pool that coupled with a shelter;

FIG. 56 shows a partial side view of a single awning shelter flying, the tent shelter suspended between two a fixed object;

FIG. 57 shows a view looking down on a shelter hammock accessory;

FIG. 60 shows a side view of a shelter frame apparatus;

FIG. 60A shows a side view of a shelter frame apparatus;

FIG. 61 shows a side view of simple hinge anchor apparatus;

FIG. 62 shows a side view of the tent shelter frame mechanical hinge anchor apparatus;

FIG. 63 shows a side view of the tent shelter frame apparatus with two female take down inserts coupled together;

FIG. 64 shows a perspective view of a weather resistant vent in a closed position that coupled to the tent shelter;

FIG. 65 shows a perspective view of a weather resistant vent in an open position that coupled to the tent shelter.

FIG. 66A shows a perspective view of a ⅓ twist compression coupler that can be coupled with the tent shelter and with the tent shelter accessories;

FIG. 66B shows a perspective view of a LED light with means of coupling;

FIG. 67 shows perspective views of an awning pole anchor cap;

FIG. 68 shows a perspective view of an opening plug/anchor apparatus that coupled to the tent shelter or the tent shelter anchor apparatus;

FIG. 69 shows a perspective view of an opening plug/anchor apparatus that is coupled to the tent shelter or the tent shelter anchor apparatus;

FIG. 70 shows a tent shelter curtain adaptor accessory that is coupled with the tent shelter expandable curtain and the tent shelter when being flown in FIG. 7;

FIG. 71 shows a fully deployed tent shelter expandable curtain;

FIG. 72 shows a non-deployed tent shelter expandable curtain;

FIG. 73 shows a view looking down on the tent shelter standard awning enclosure that is coupled with the tent shelter and that it may also be coupled with the tent shelter bottom;

FIG. 74 shows a side view of the tent shelter pitched with a frame pole;

FIG. 75 shows a side view of the tent shelter pitched with the tent shelter ridge frame apparatus and two tent shelter frame elevation apparatuses;

FIG. 76 shows a perspective view of the tent shelter ridge fly with one vertical weather fly-flap fully deployed;

FIG. 77 shows a side view of two tent shelters coupled with a tent shelter ridge fly with the vertical weather fly-flap deployed and anchored together with a ridge pole anchor apparatus pocket;

FIG. 78 shows a perspective view of a window;

FIG. 79 shows a perspective view of a hat that worn by a person or used to protect from weather;

FIG. 80 shows a perspective view of a vent;

FIG. 81 shows a top view of a tent shelter poncho that pitched in the same way as the tent shelter;

FIG. 82 shows an end view of a means of coupling the tent shelters together;

FIG. 83 shows a perspective view of a tent shelter hoody that is coupled with a tent shelter poncho;

FIG. 84 shows a top view of a poncho weather flap;

FIG. 85 shows a perspective view of a ball cap hoodie accessory that is coupled with a tent shelter poncho;

FIG. 95 shows a perspective view of two tent shelter simple hinges that are coupled together with a flange neck coupler and a flange neck coupler washer;

FIG. 96 shows a perspective view of a male flange neck coupler and a female flange neck coupler coupling together with two tent shelter simple hinges;

FIG. 97 shows a perspective view of simple hinge coupler components and a LED light housing;

FIG. 98 shows a perspective view of a means of coupling;

FIG. 99 shows a perspective view of a coupler assembly that couples four ten shelter simple hinges;

FIG. 100 shows a perspective view of a LED light coupler;

FIG. 100A shows a perspective view of a 90-degree anchor apparatus multiple pole coupler;

FIG. 100B shows a perspective view of the components of FIGS. 100 and 100A coupled together;

FIG. 101 shows a perspective view of the tent shelter simple hinge anchor apparatus coupled with the tent shelter frame pole button hole insert;

FIG. 102 shows a perspective view of the tent shelter simple hinge anchor apparatus;

FIG. 103 shows a perspective view of FIGS. 104 and 105 coupled together;

FIG. 104 shows a perspective view a tent shelter frame pole button hole insert coupled with a frame pole, the tent shelter frame pole button hole insert is also coupled with a frame pole that has multiple holes so that assembly length is preferably adjusted as shown in FIG. 111;

FIG. 105 shows a perspective view of a button hole coupler;

FIG. 106 shows a perspective view of the tent shelter mechanical hinge anchor apparatus coupled with the tent shelter frame pole button hole insert;

FIG. 107 shows a perspective view of the tent shelter male and female hinge with a female take down insert;

FIG. 108 shows a perspective view of the tent shelter male and female hinge coupled with piece of wood;

FIG. 109 shows a perspective view of the tent shelter male and female hinge coupled together in a 90-degree configuration;

FIG. 110 shows a perspective view of the tent shelter male and female hinge uncoupled;

FIG. 111 shows a perspective view of the components shown in FIG. 109 coupled together with the tent shelter frame pole button hole insert that is coupled to the tent shelter adjustable frame pole;

FIG. 112 shows a perspective view of the tent shelter male and female hinges coupled together in a 135-degree configuration to be used as a tent shelter frame elevation apparatus as seen in FIG. 75;

FIG. 113 shows a perspective view of the tent shelter simple hinge anchor apparatus;

FIG. 114 shows a perspective view of two tent shelters male and female hinges coupled to a ridge line frame pole with components illustrated in FIGS. 113 and 115;

FIG. 115 shows a perspective view of the tent shelter simple hinge anchor apparatus;

FIG. 116 shows a perspective view of the tent shelter male and female hinge coupler anchor apparatus where the male and female hinge coupler anchor apparatus are coupled with tent poles in a position where the tent poles can be parallel to each other;

FIG. 117 shows a perspective view of the components in FIG. 118 coupled with the tent shelter frame poles on other articles of manufacture;

FIG. 118 shows a perspective view of the components shown in FIG. 116 coupled together;

FIG. 119 shows a top view of the tent shelter 9 with anchor apparatus symbols where the tent shelter frame poles are coupled with the tent shelter simple hinge anchor apparatus and the tent mechanical hinge anchor apparatus. The frame poles are coupled with anchor apparatus in multiple configurations and coupled to the tent shelter so that material can be manipulated and held in place;

FIG. 120 shows the tent shelter with an anchor apparatus where the tent shelter frame poles are shown coupled with the tent shelter simple hinge anchor apparatus;

FIG. 121 shows a perspective view of an awning frame apparatus system that is a means of supporting and manipulating the tent shelter in an open, partially open and closed position;

FIG. 122 shows a perspective view of a container containing the tent shelter coupled with a single awning hinge apparatus and a frame apparatus system;

FIG. 123 shows a perspective view of the tent shelter coupled with a double awning hinge apparatus, a frame apparatus system, an awning pole and anchoring members for supporting and manipulating the tent shelter in an open, partially open and closed position;

Figure 124:
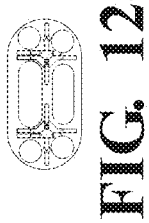
Figure 125:
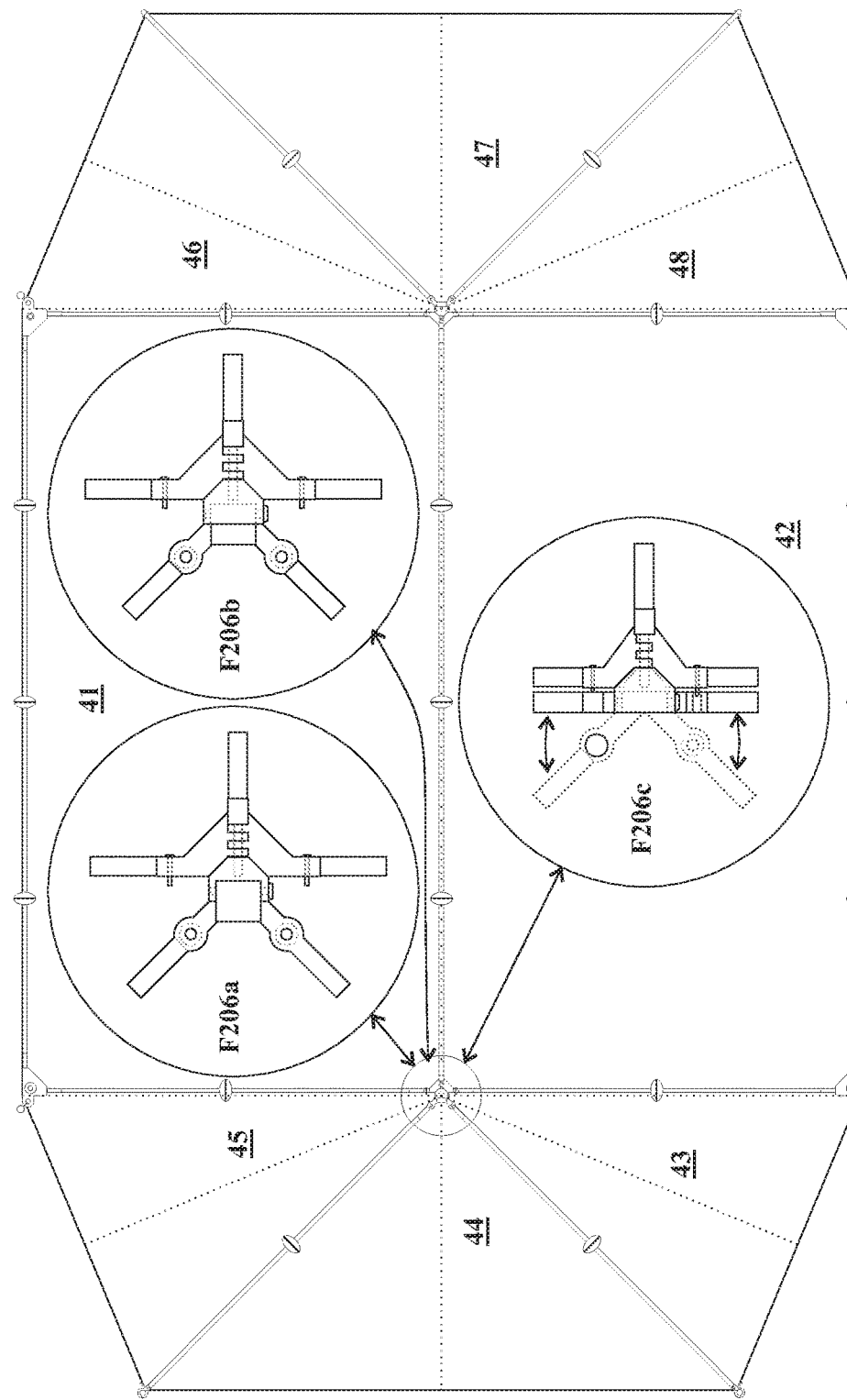
Figure 125A:
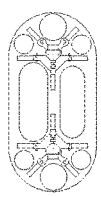
Figure 127:
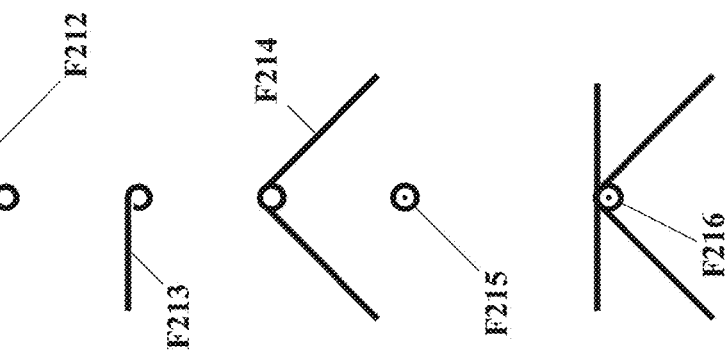
Figure 128:
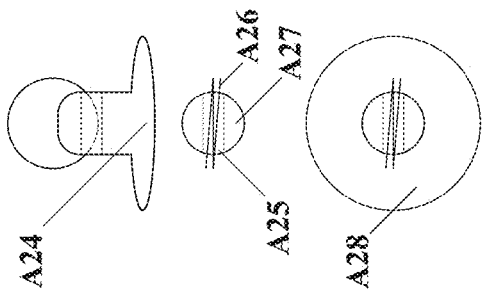
Figure 129:
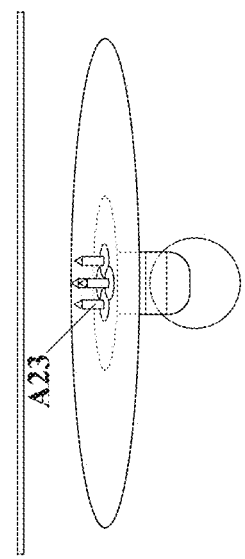

FIG. 124 shows a perspective view of a container containing the tent shelter coupled with a double awning hinge apparatus and frame pole system;

FIG. 125 shows a perspective view of the tent shelter coupled with an EZ-2 pitch double awning hinge apparatus, a frame apparatus system, an awning pole and anchoring members for supporting and manipulating the tent shelter in an open, partially open and closed position;

FIG. 125A shows perspective view of a container containing the tent shelter coupled with EZ-2 pitch double awning hinge apparatus and a frame apparatus system;

FIG. 126A to FIG. 126D show perspective views of multiple hinges apparatuses;

FIG. 127 shows a perspective view of simple tent shelter hinge apparatuses with awning hinge components;

FIG. 128 shows a perspective view an anchor apparatus coupled to material and to another anchor apparatus;

FIG. 129 shows a perspective view shows the means of coupling of FIG. 128.

Figure 130:
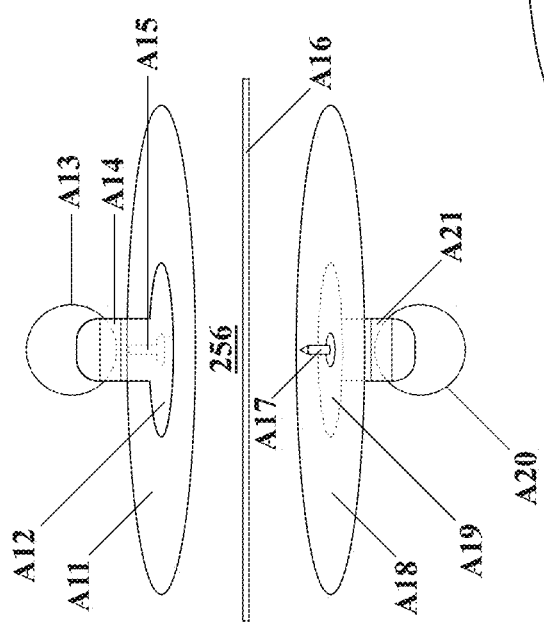

FIG. 130 shows a perspective views of an anchor apparatus, the middle view shows a minimal anchor apparatus body coupled to other tent shelter anchor apparatus if it is preferable.

Figures 131, 132:
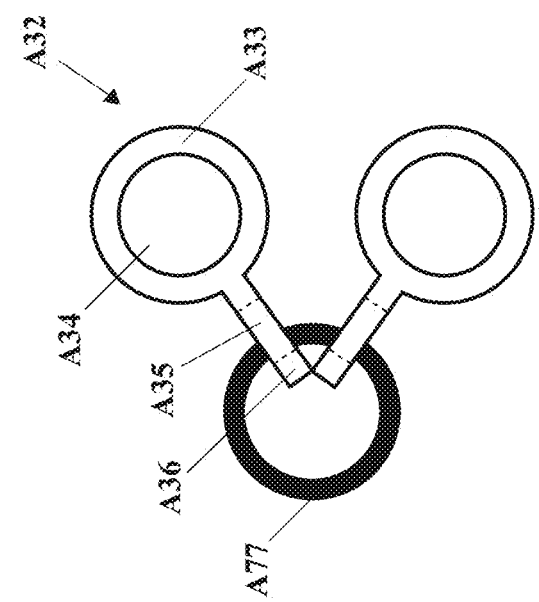

FIG. 131 shows a cross-sectional view of an off-set anchor apparatus coupled to the tent shelter or to a tent shelter anchor apparatus.

Figure 1:
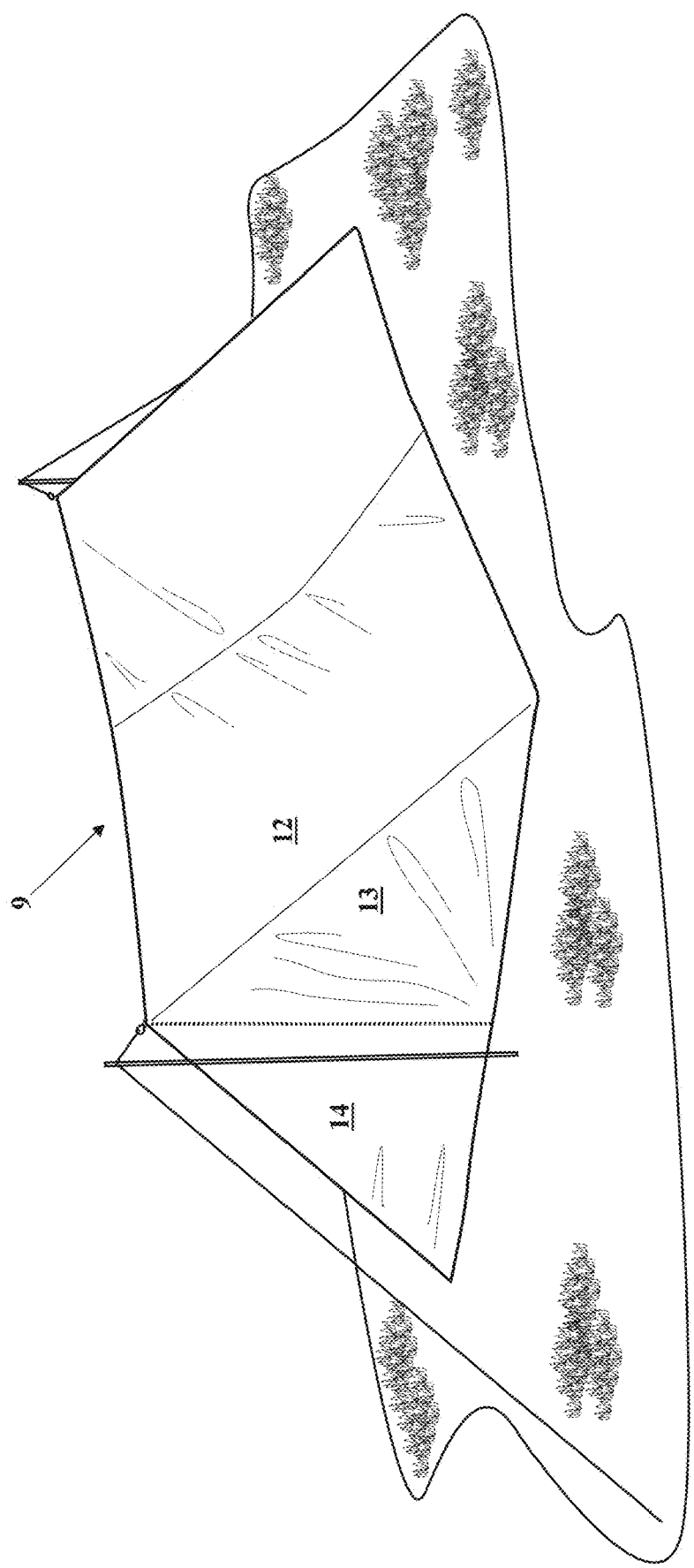
FIG. 1 shows an environmental view of a closed single awning customizable tent shelter of the invention (a.k.a Wiseman Shelter)
Figure 1A:
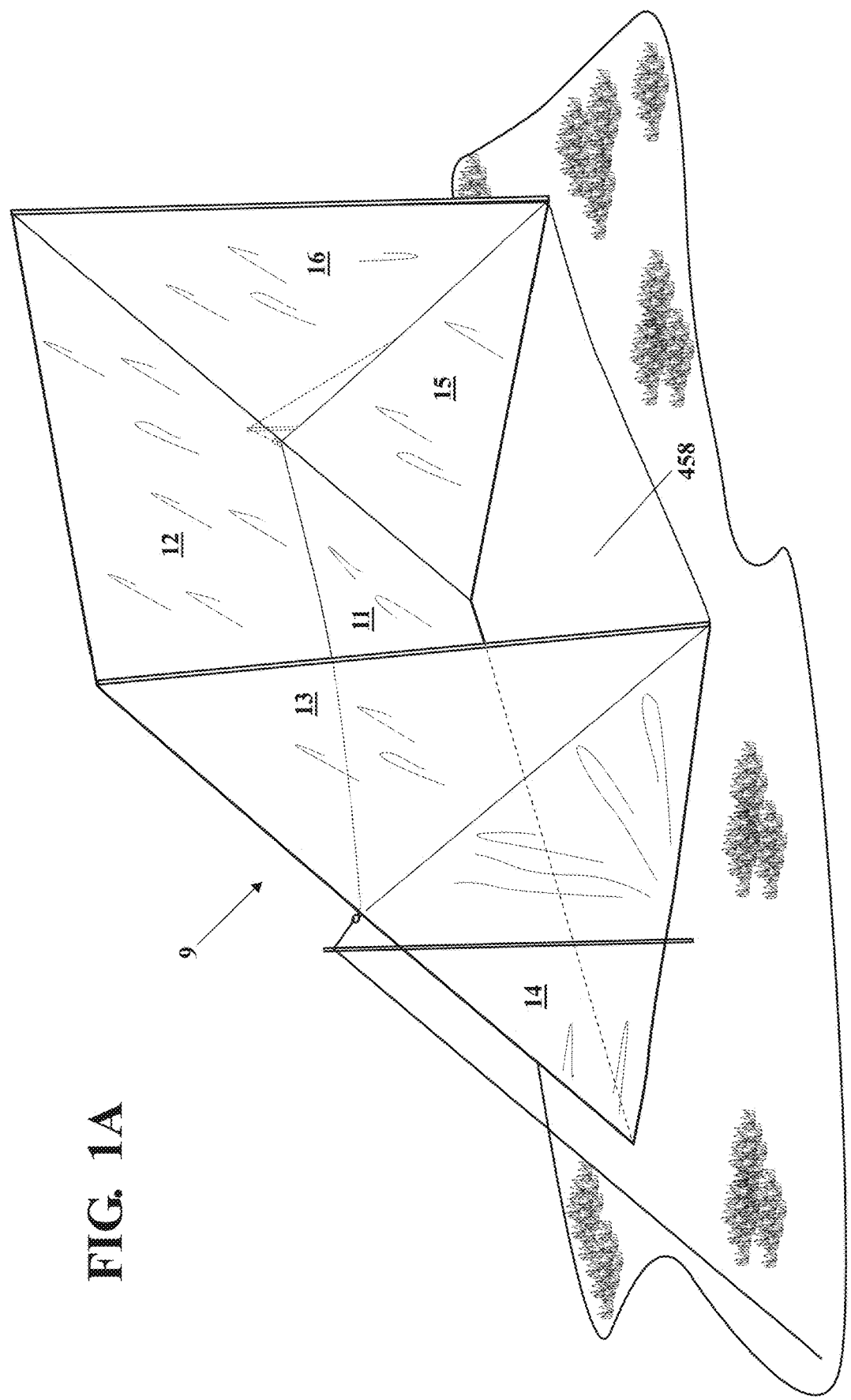
FIG. 1A shows an environmental view of an opened single awning customizable tent shelter of the invention.
Figure 1B:
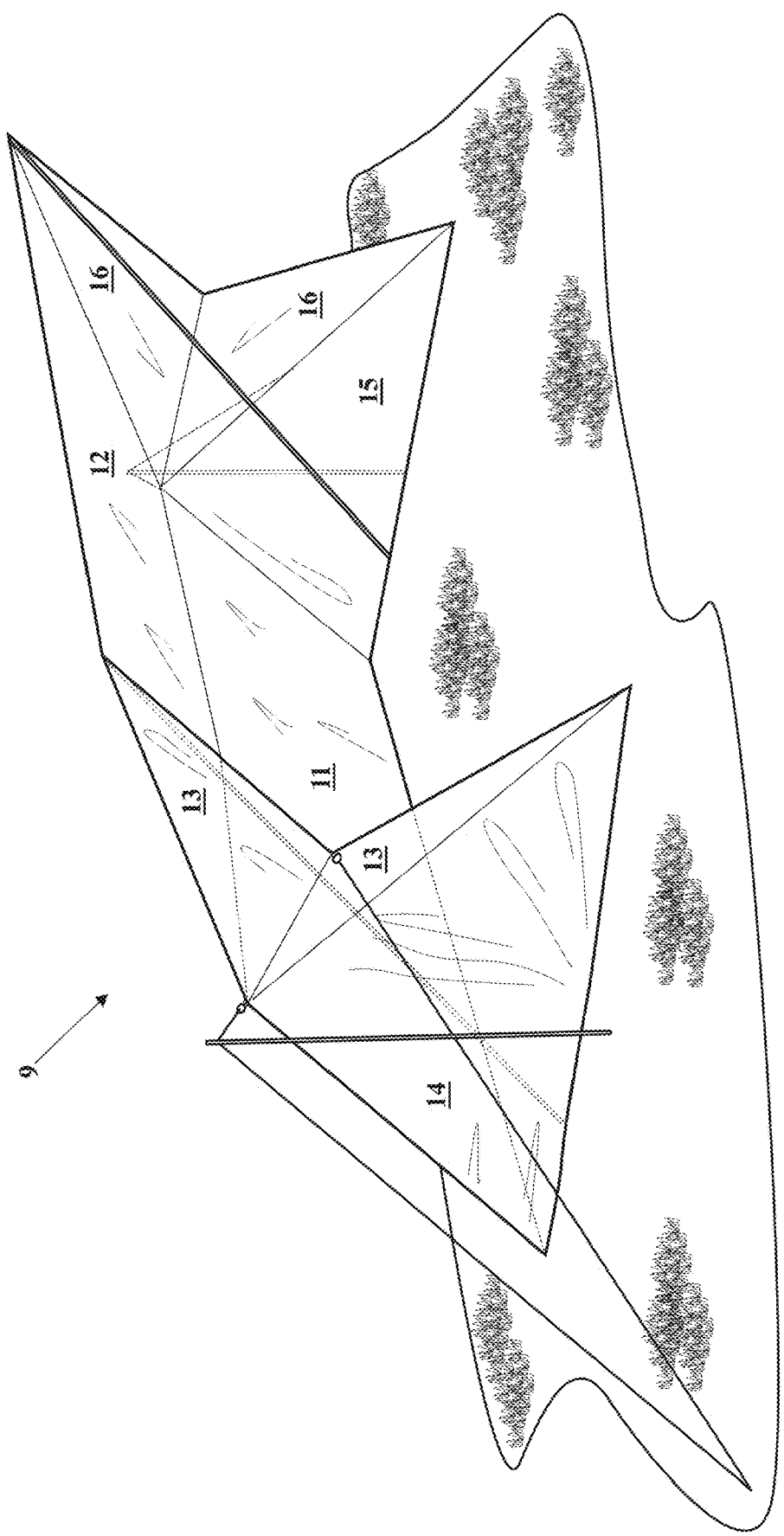
FIG. 1B shows an environmental view of a partially opened single awning customizable tent shelter of the invention.
Figure 1C:
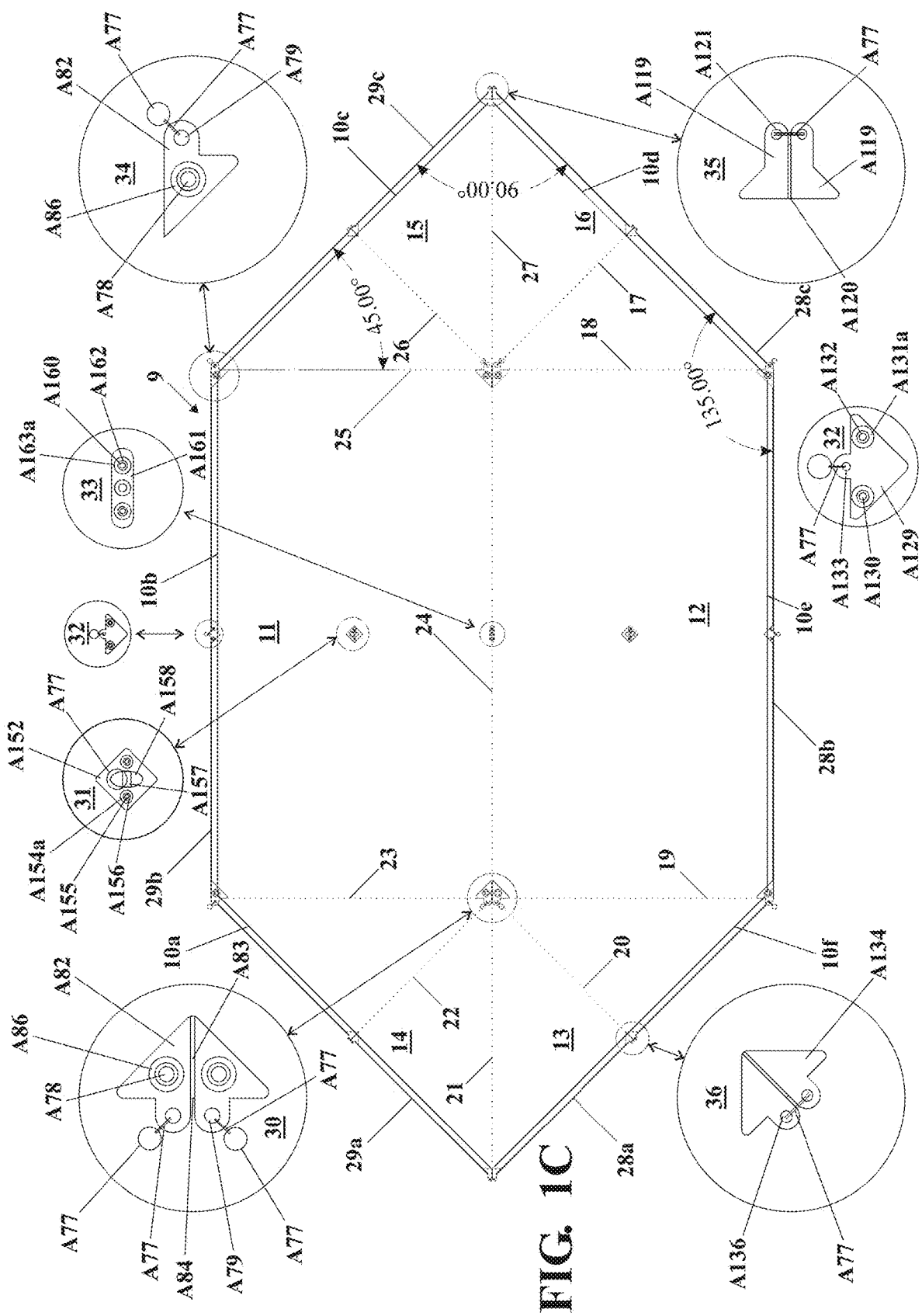
FIG. 1C shows a top view of a single awning customizable tent shelter of the invention with fold line locations.
Figure 2:
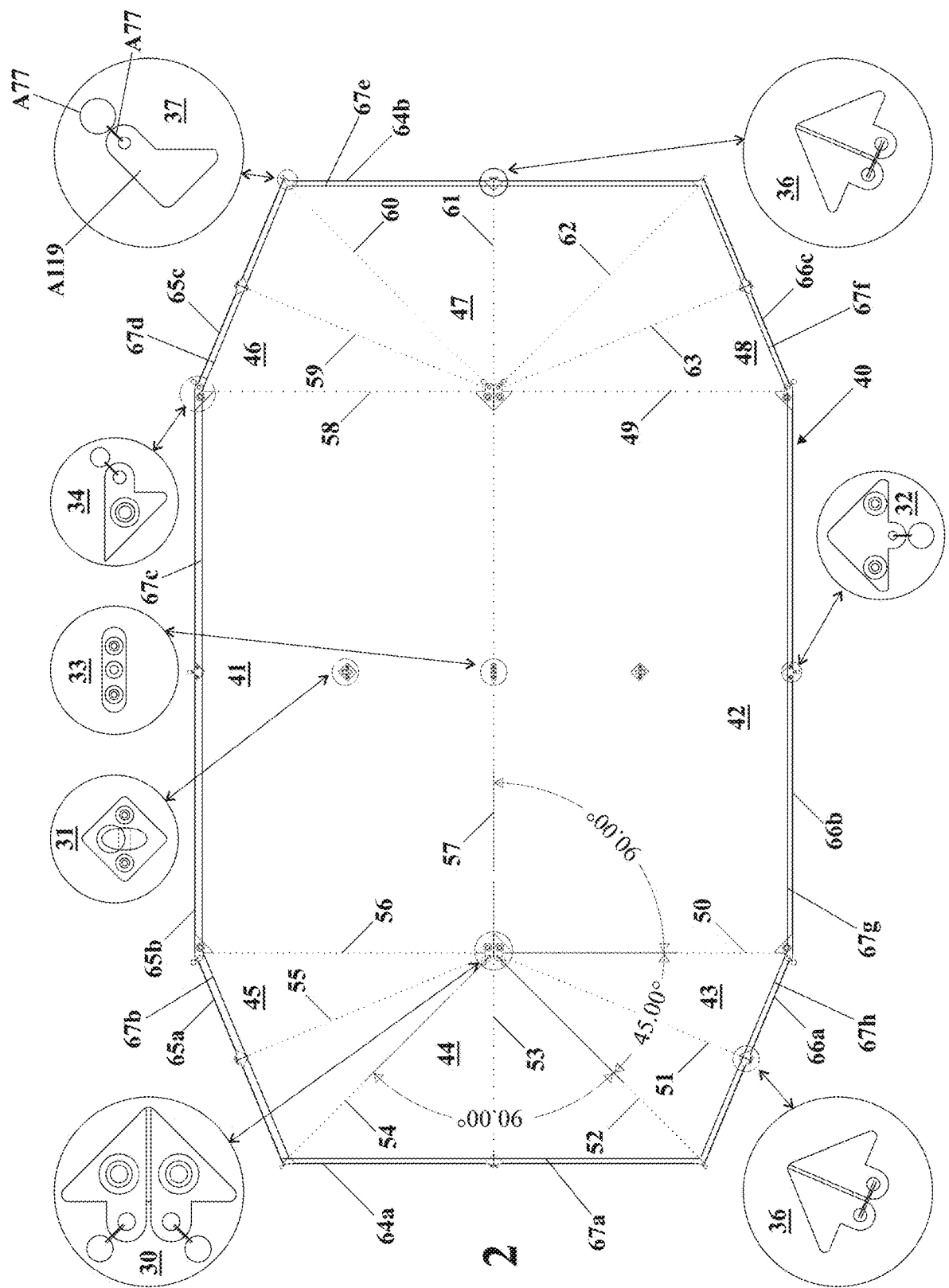
FIG. 2 shows a top view of a double awing customizable tent shelter of the invention customizable tent shelter with fold line locations.
Figure 15:
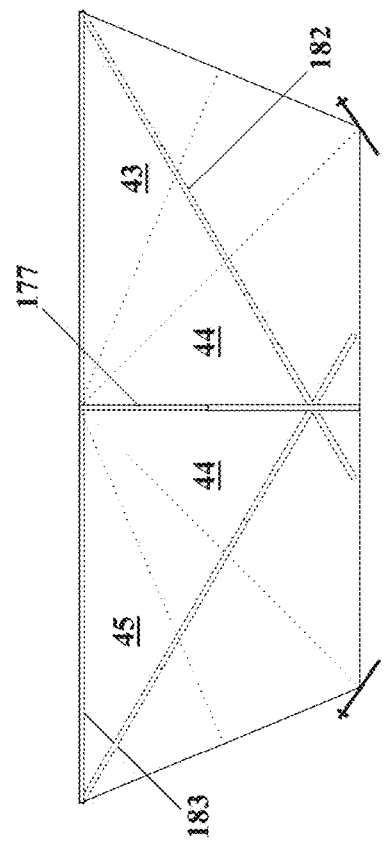
FIG. 15 shows a side view of a fully open configuration of a double awning tent shelter of the invention.
Figure 16:
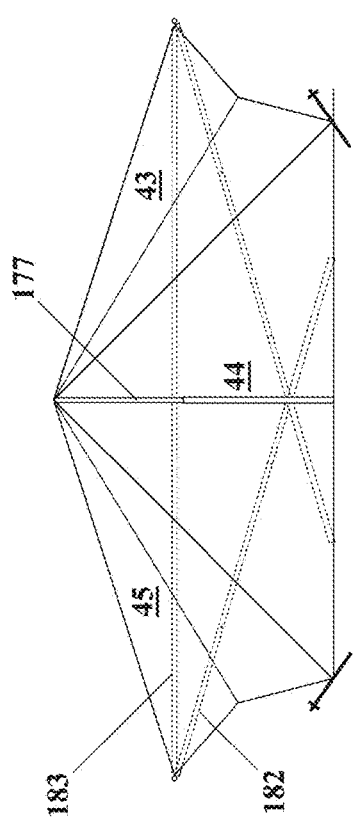
FIG. 16 shows a side view of a partially open configuration of a double awning tent shelter of the invention.
Figures 133, 134:
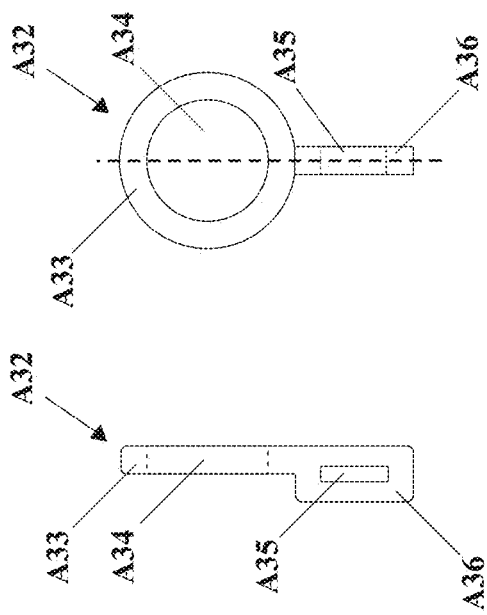
Figure 152:
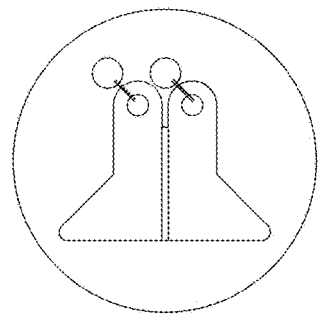
Figure 151:
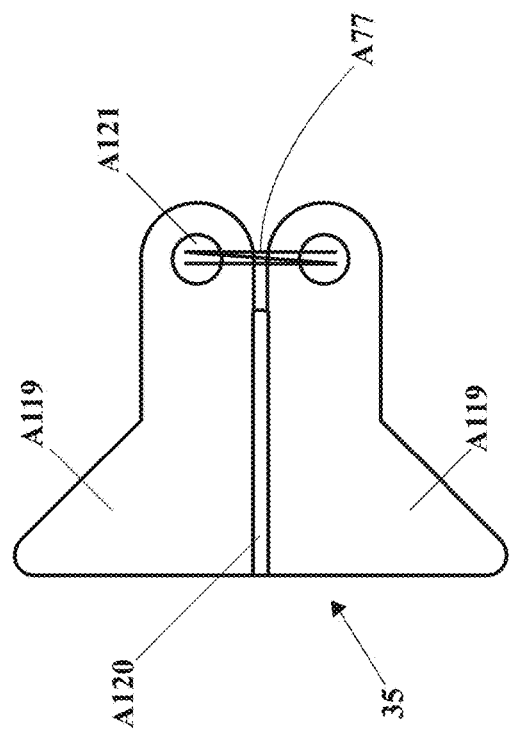
Figure 150:
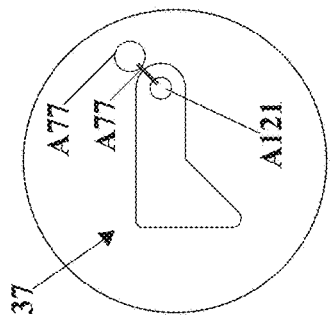
Figure 153:
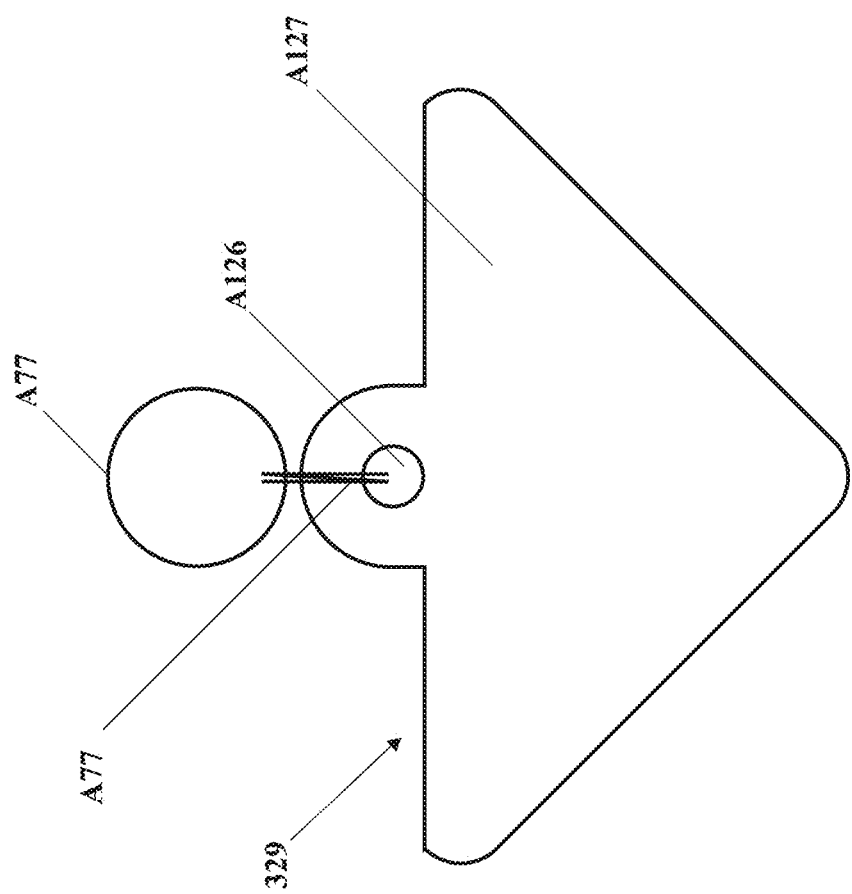
Figure 154:
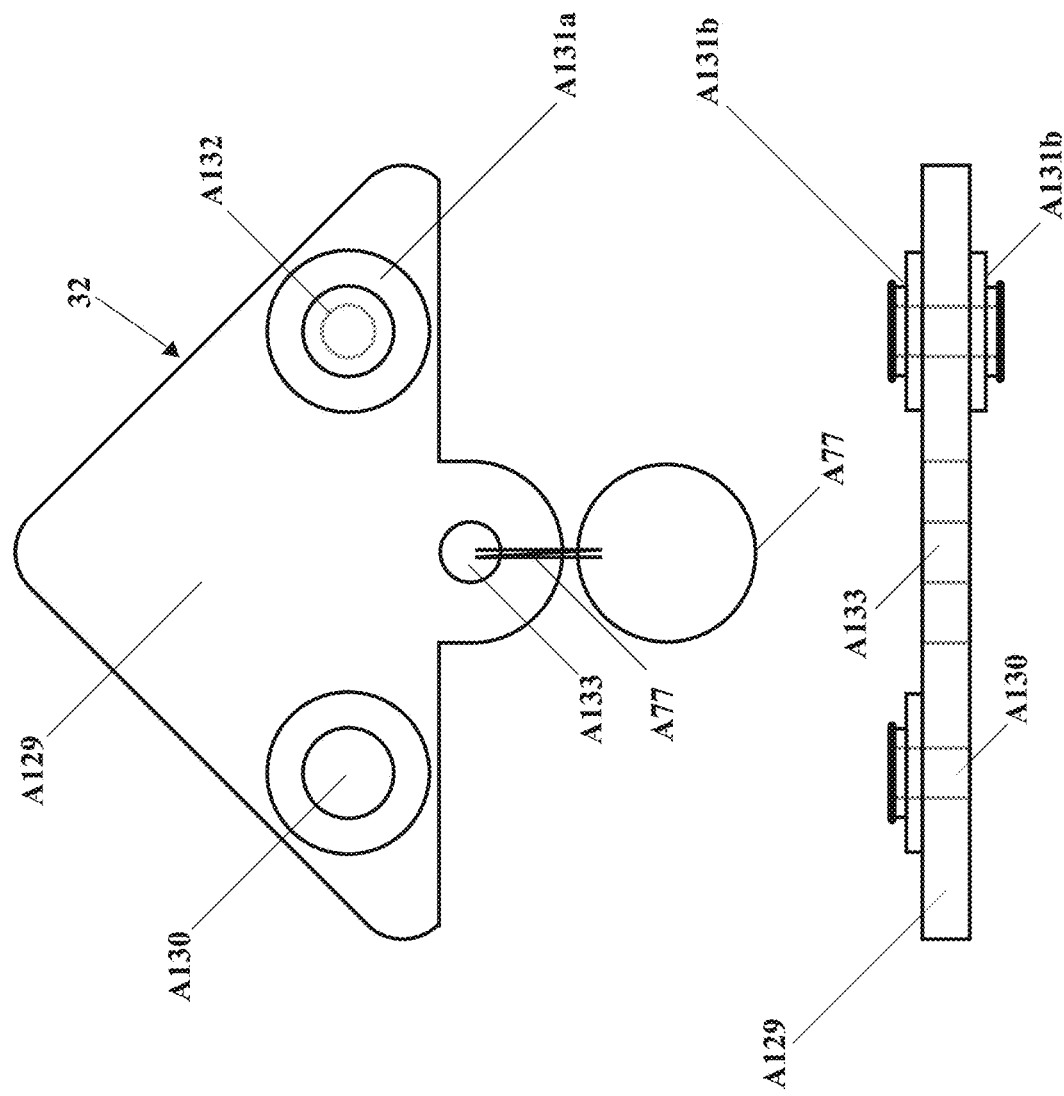
Figure 155:
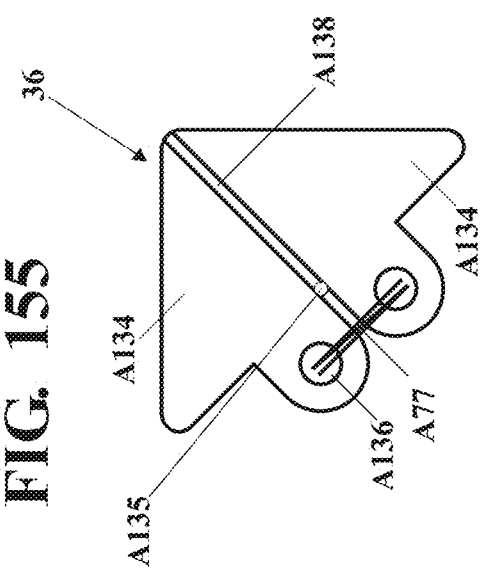
Figure 156:
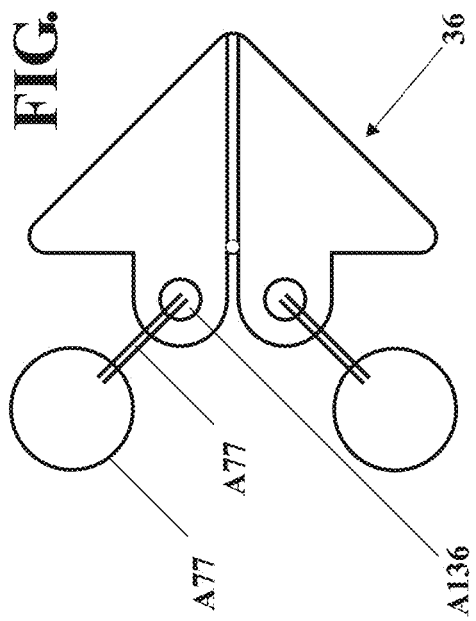
Figure 157:
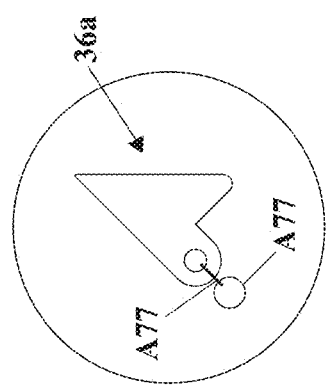
Figure 158:
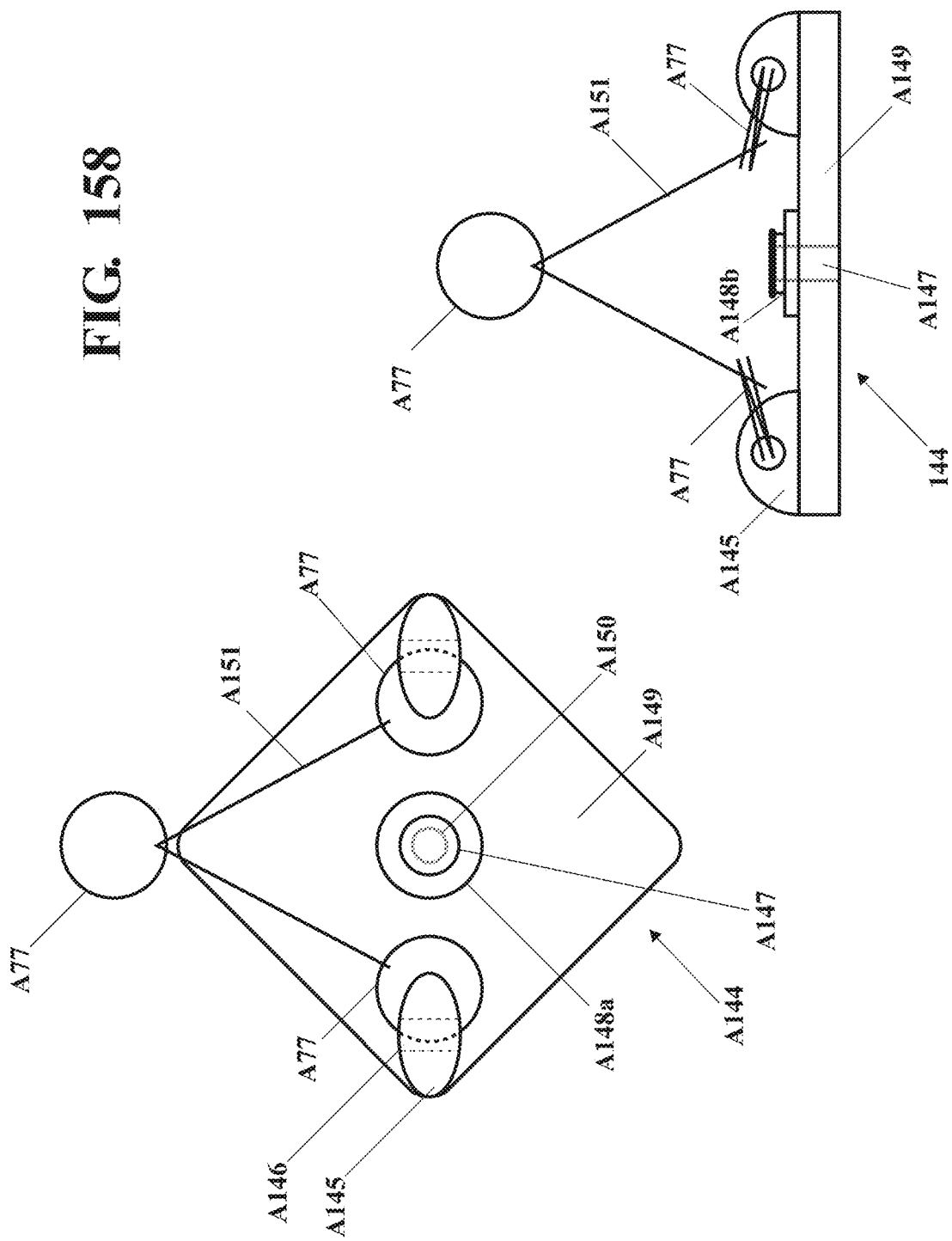
Figure 160:
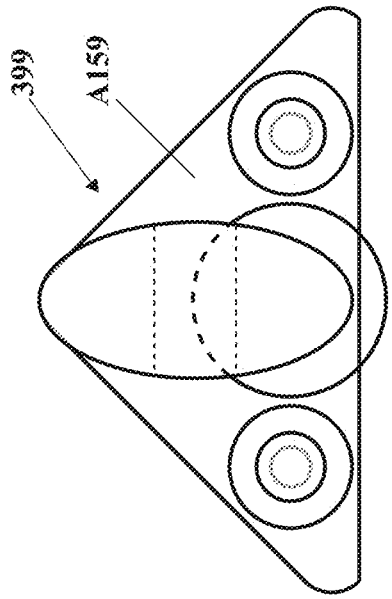
Figure 159:
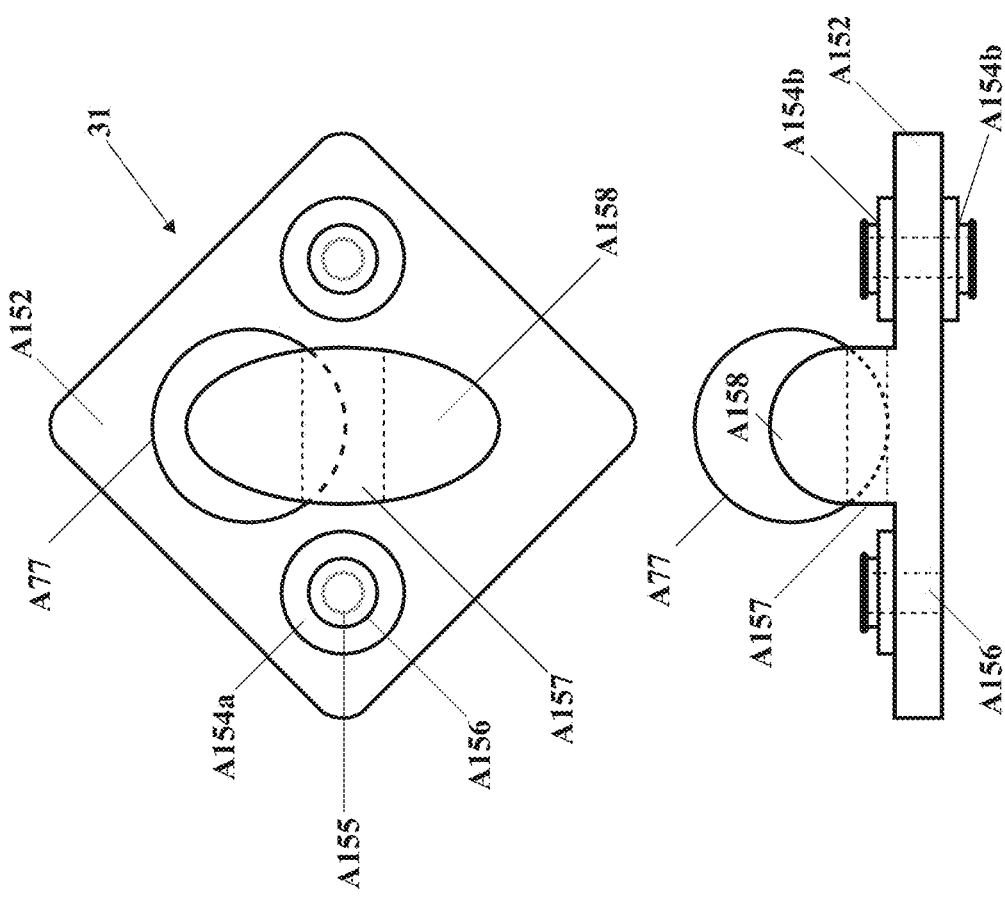
Figure 161:
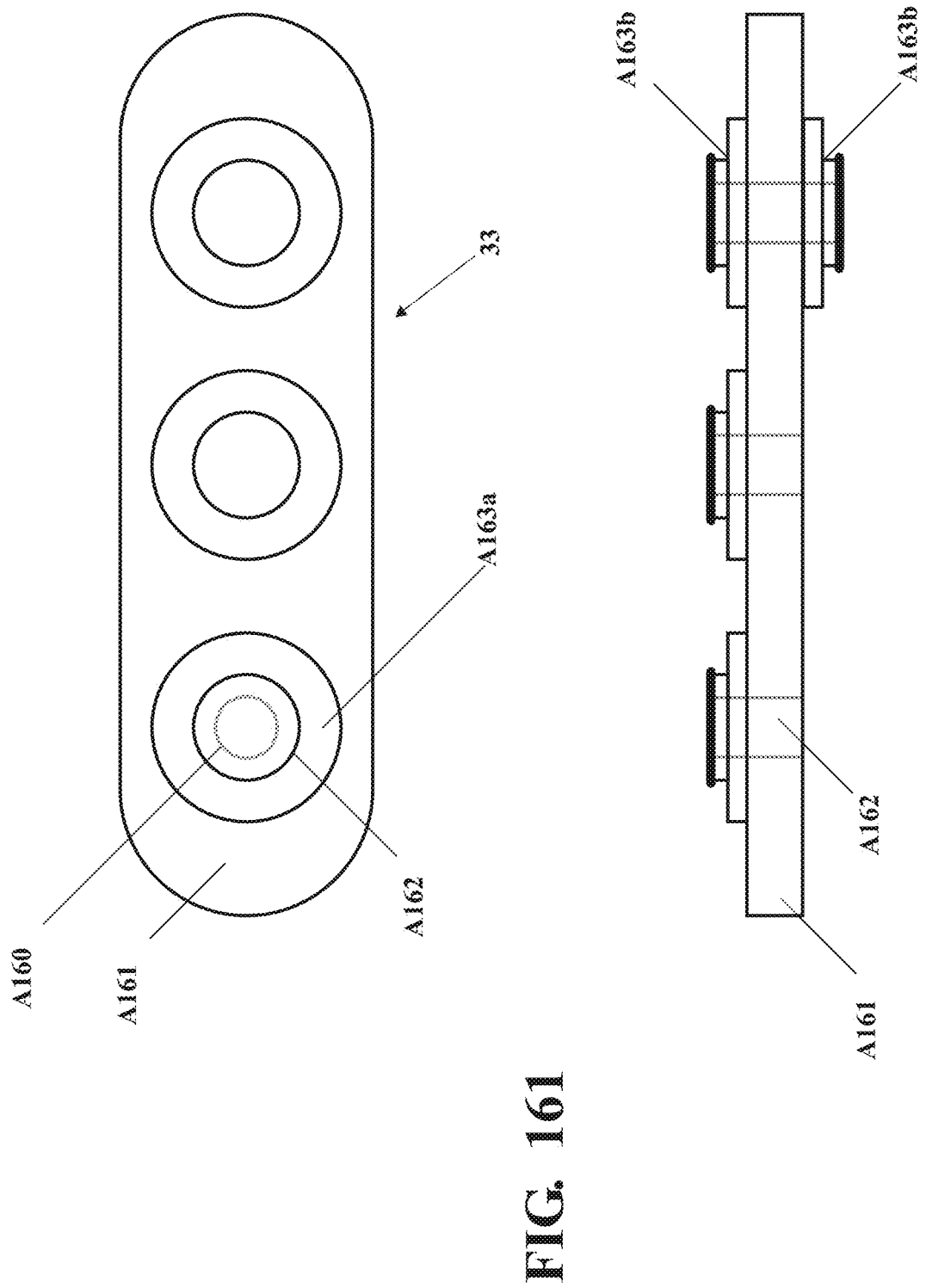
Figure 165:
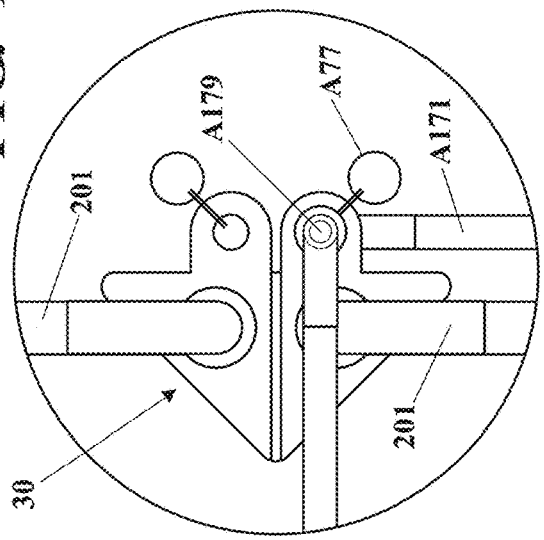
Figure 166:
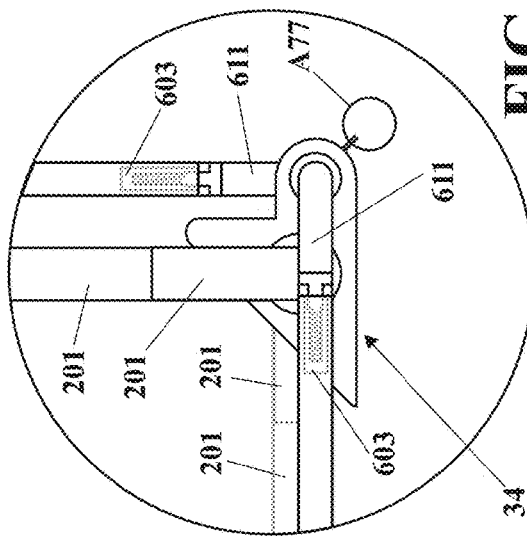
Figure 163:
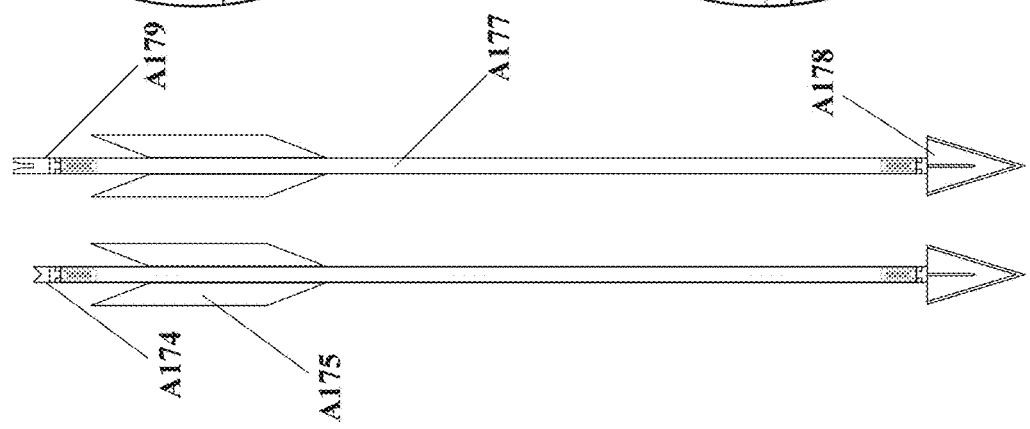
Figure 162:
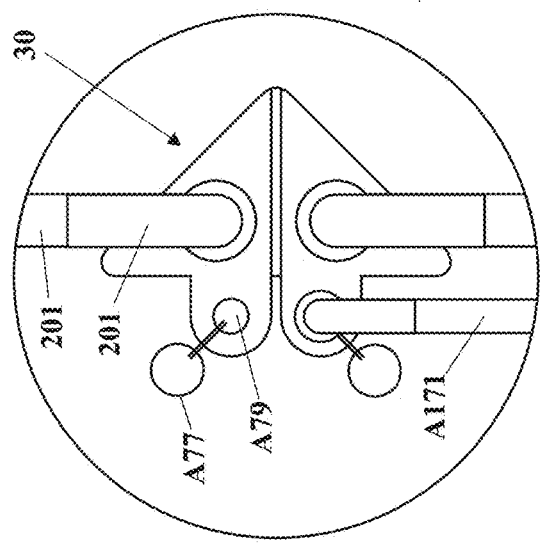
Figure 164:
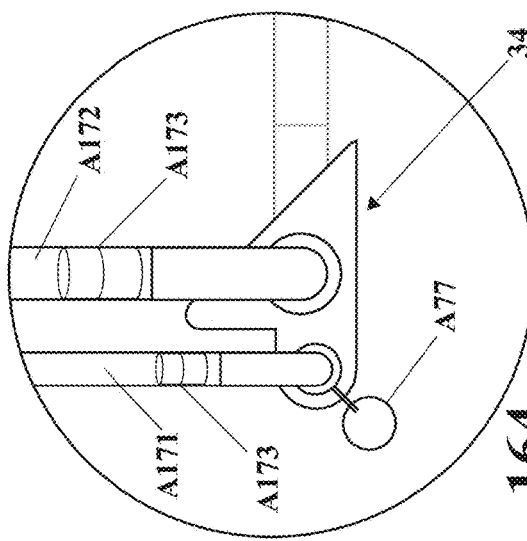
Figure 171:
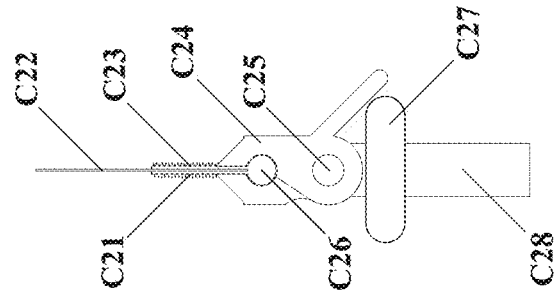
Figure 170:
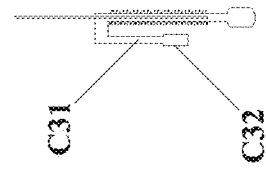
Figure 168:
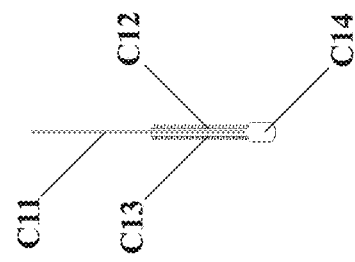
Figure 167:
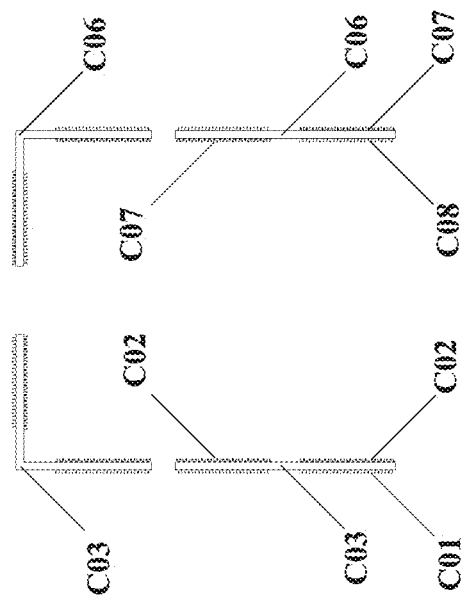
Figure 169:
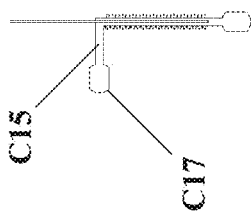
Figure 173:
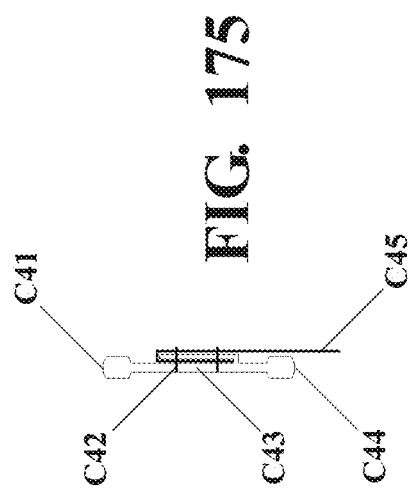
Figure 175:
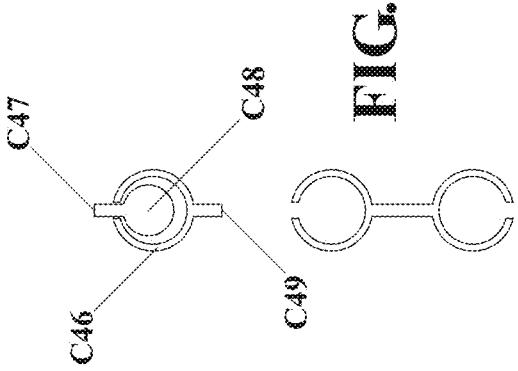
Figure 172:
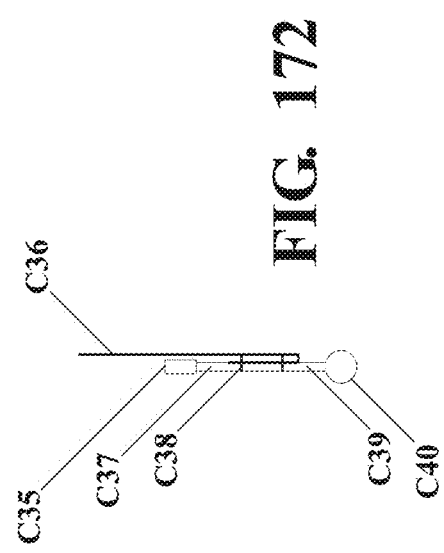
Figure 174:
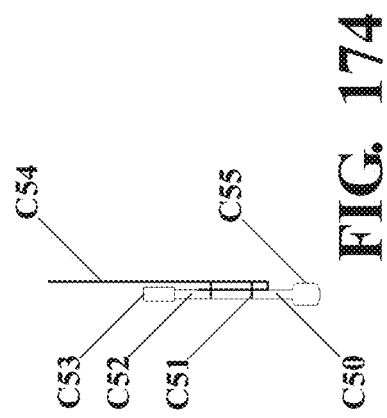
Figure 176:
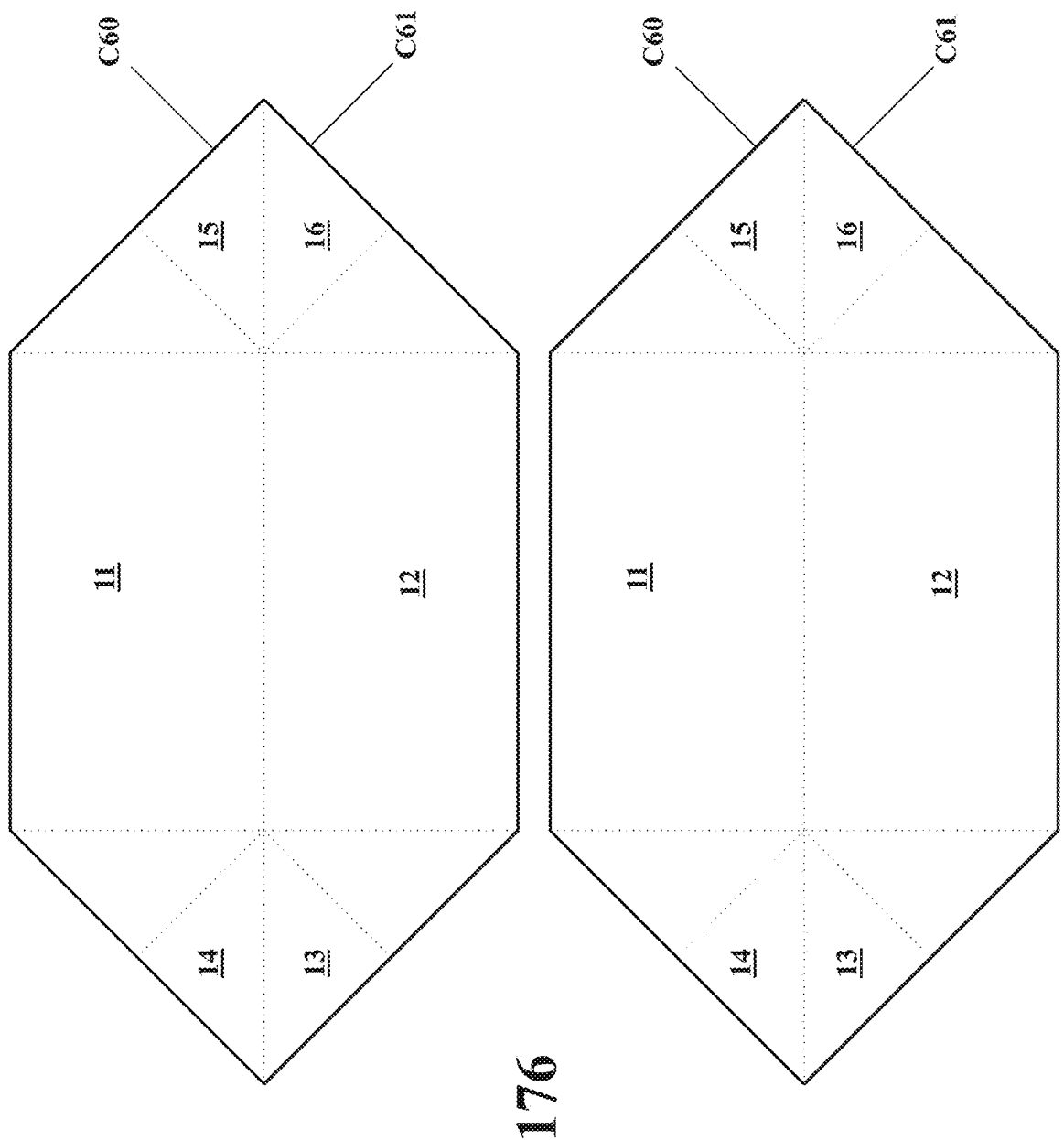
Figure 177:
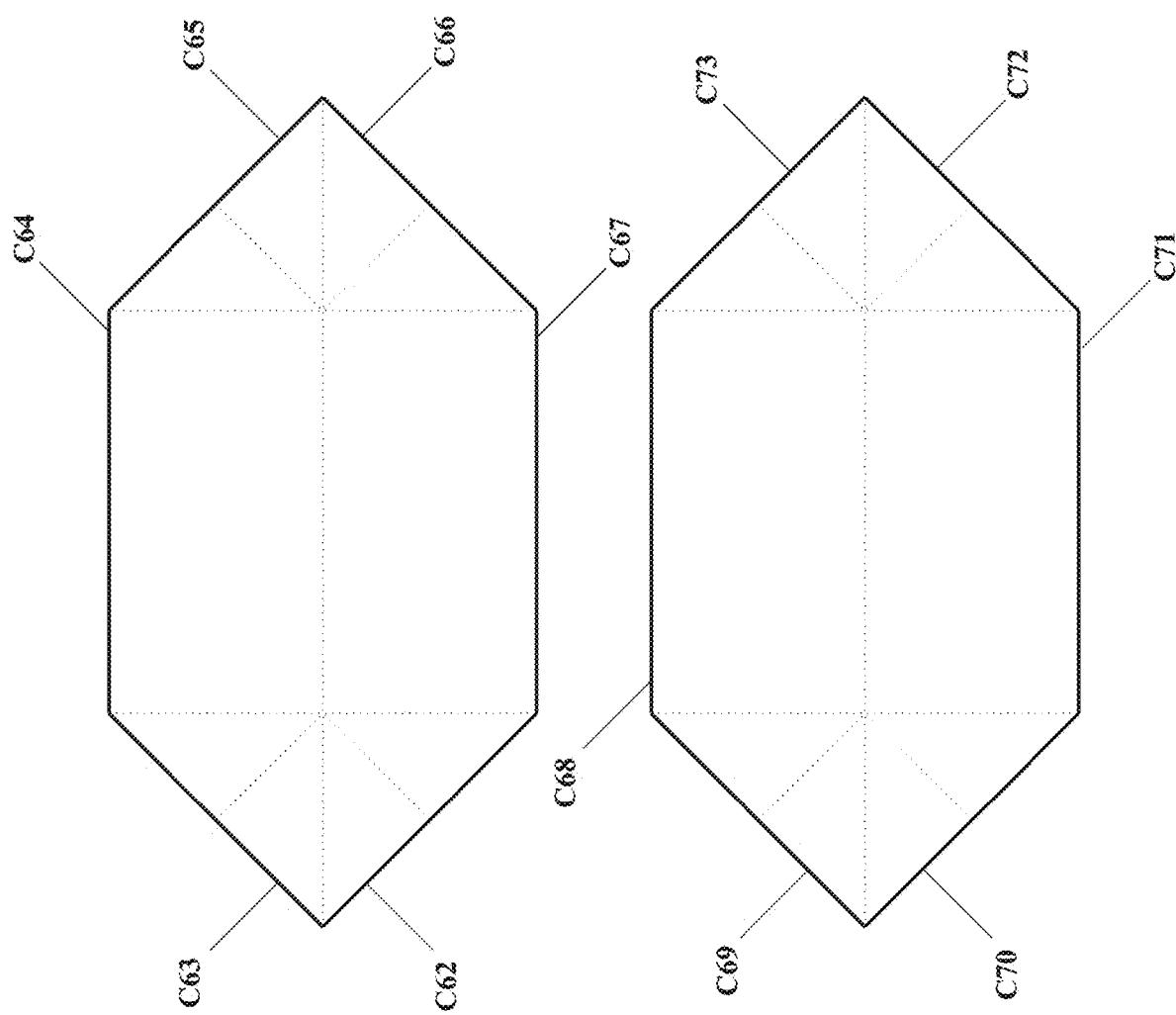
Figure 182:
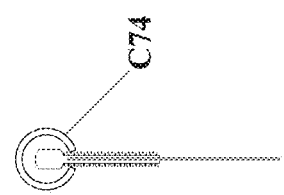
Figure 181:
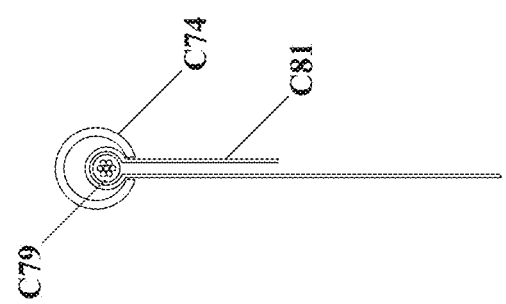
Figure 180:
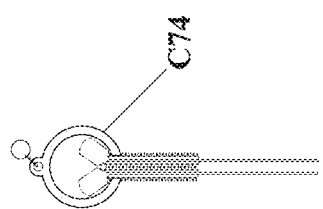
Figure 179:
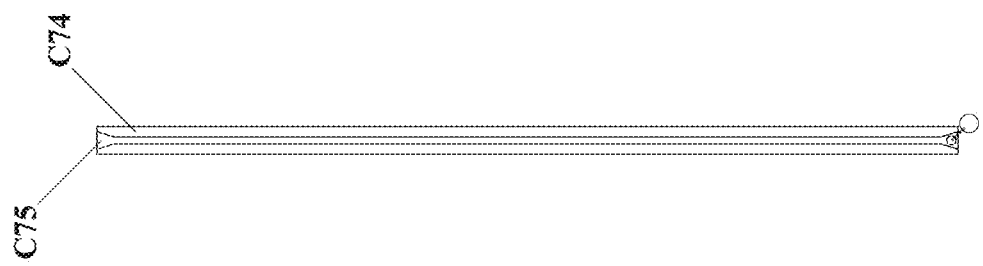
Figure 178:
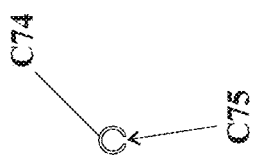
Figure 183G:
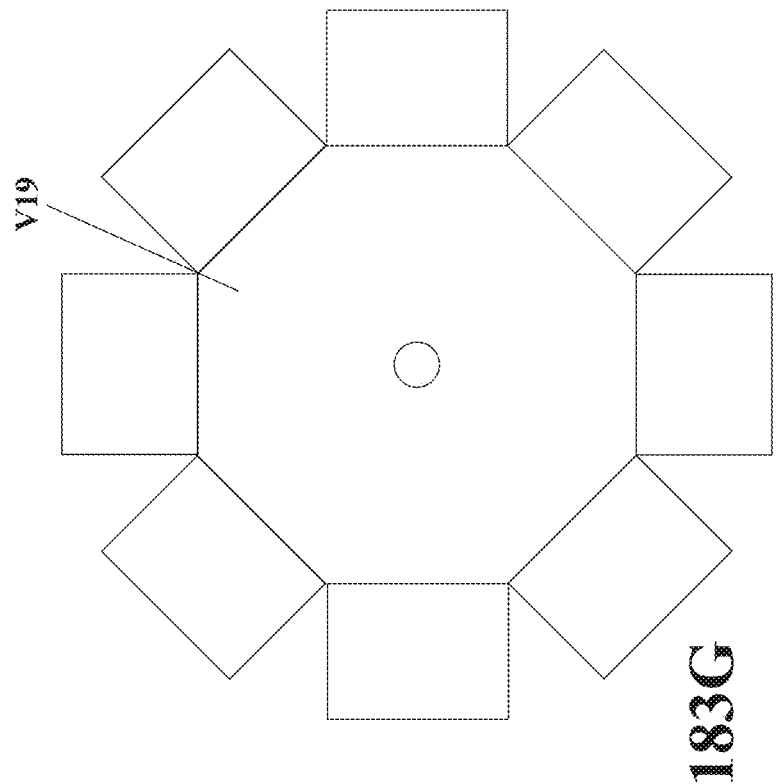
Figure 184:
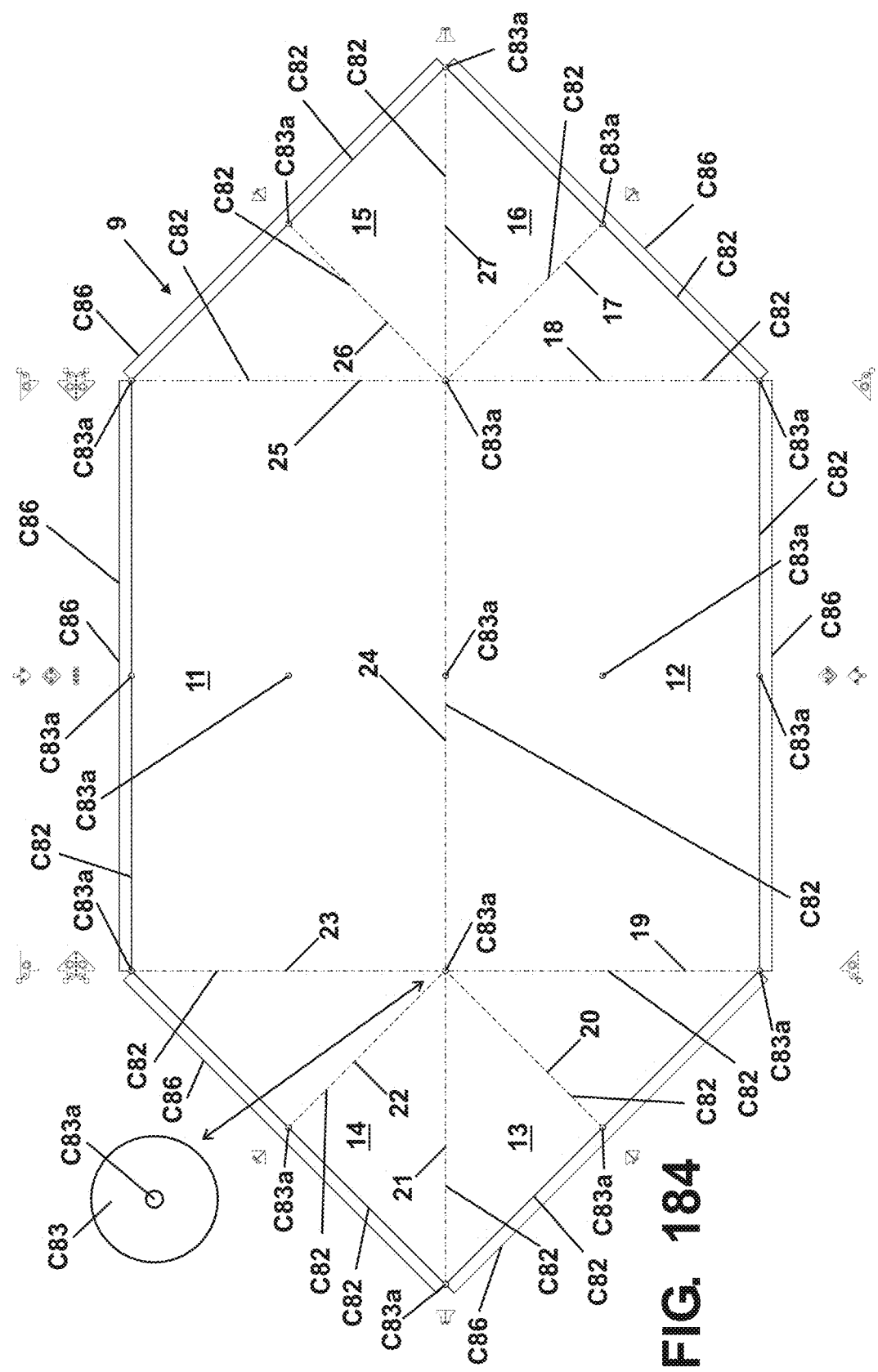
Figure 186:
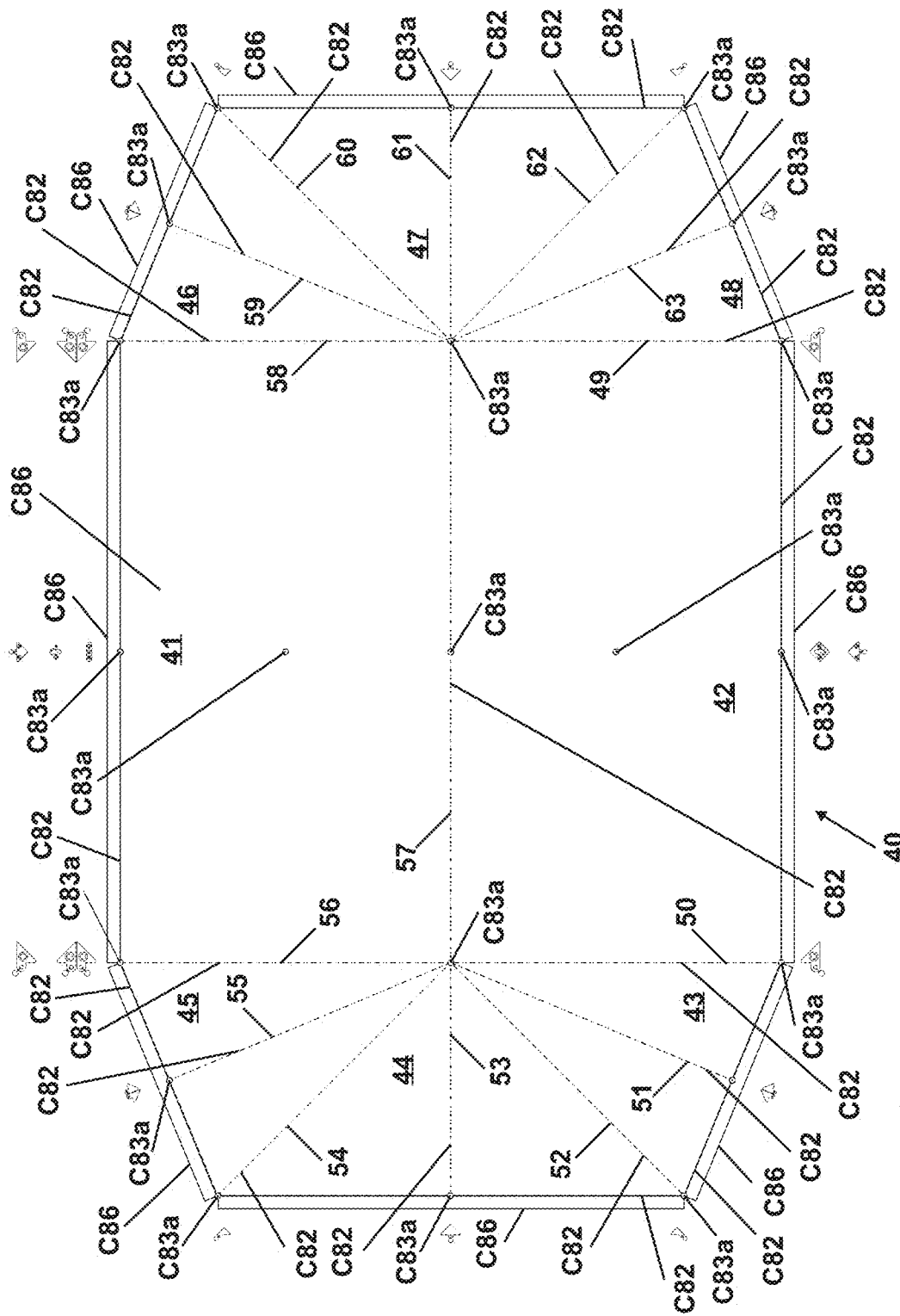
Figure 187:
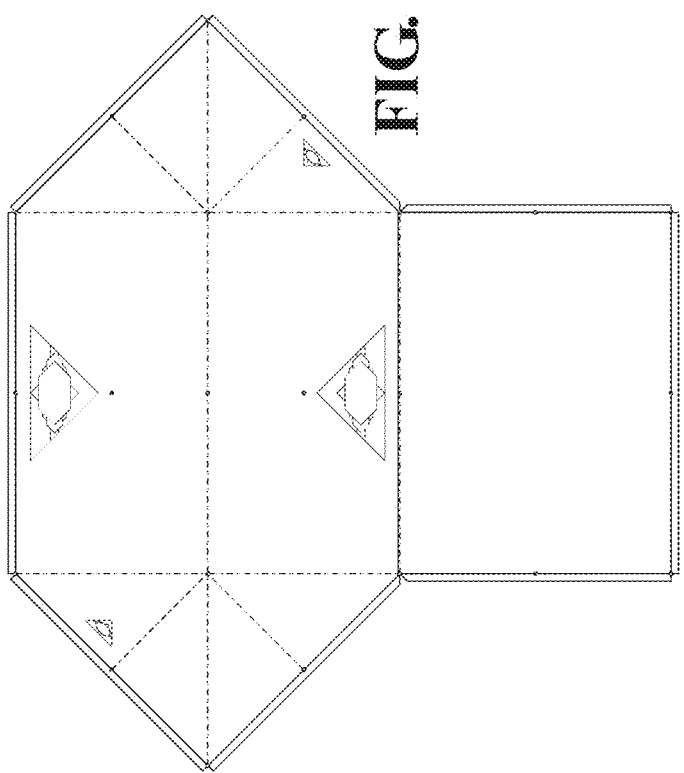
Figure 188:
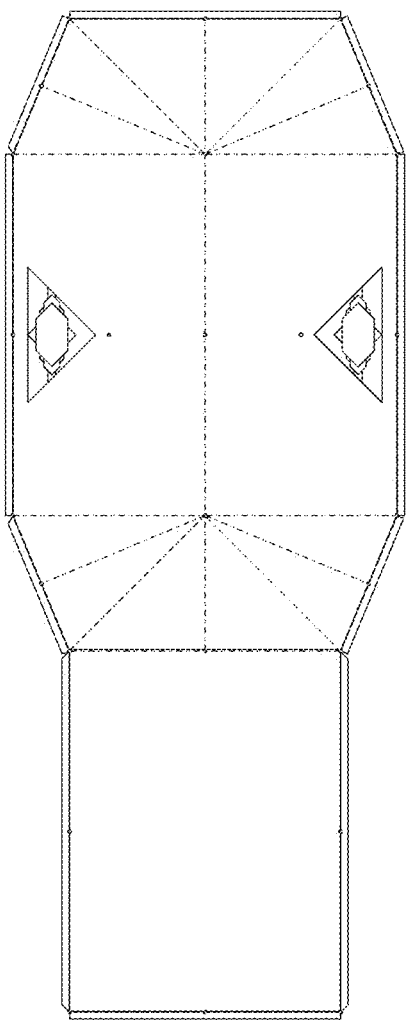
Figure 189:
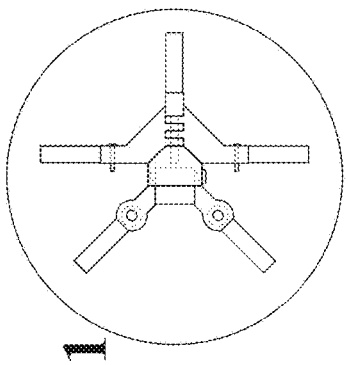
Figure 189A:
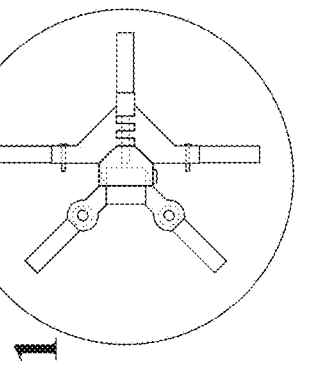
Figure 189B:
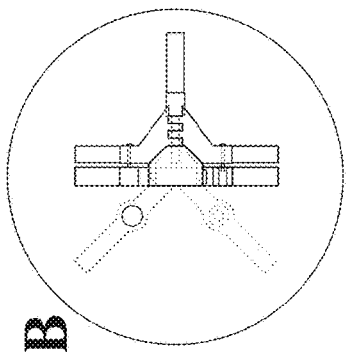
Figure 190:
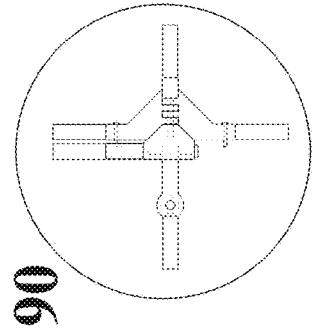
Figure 190A:
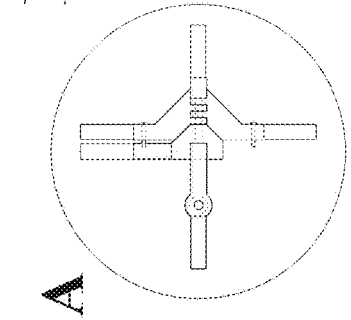
Figure 189C:
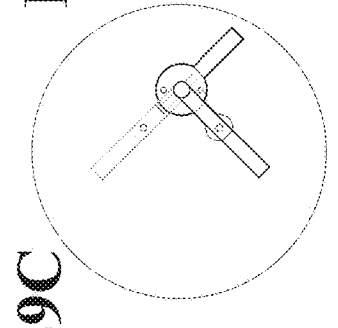
Figure 191:
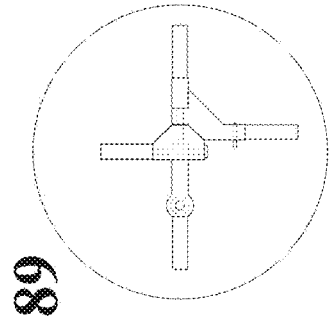
Figure 191A:
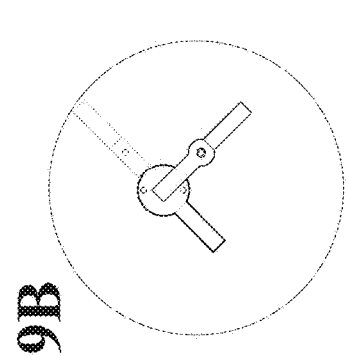
Figure 191B:
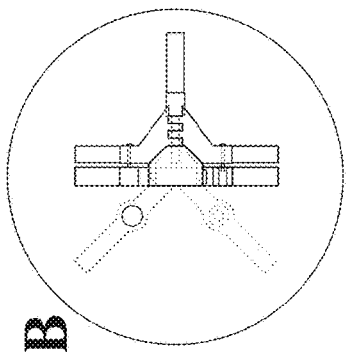
Figure 192A:
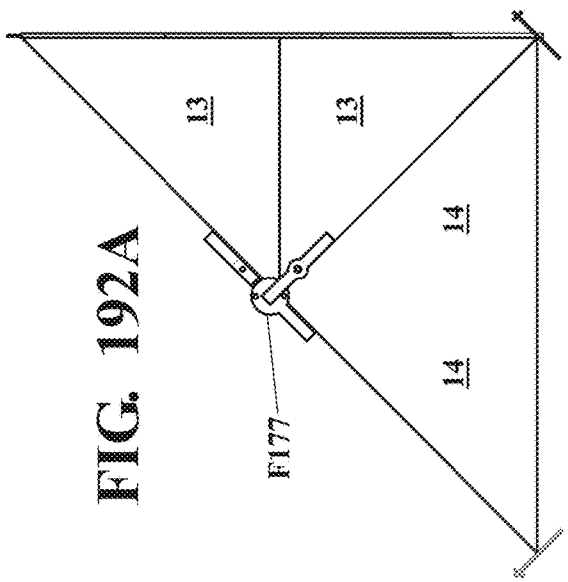
Figure 194A:
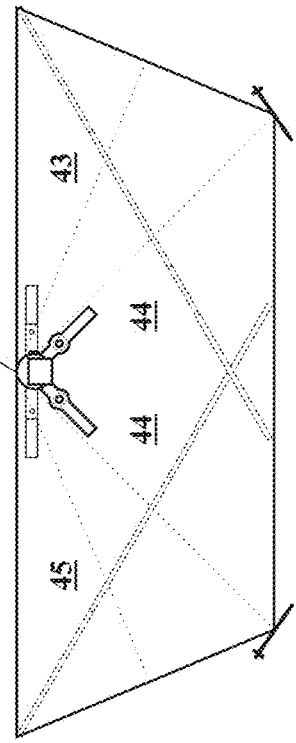
Figure 193:
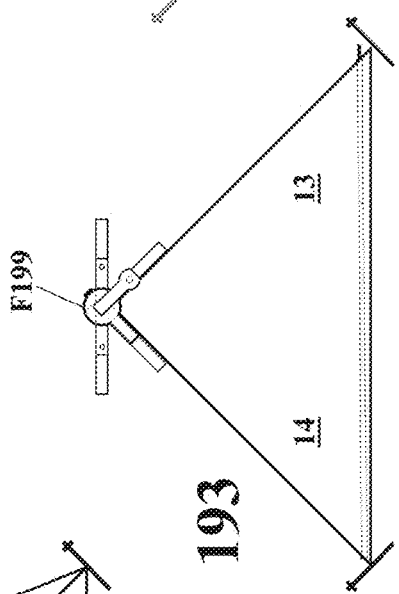
Figure 192:
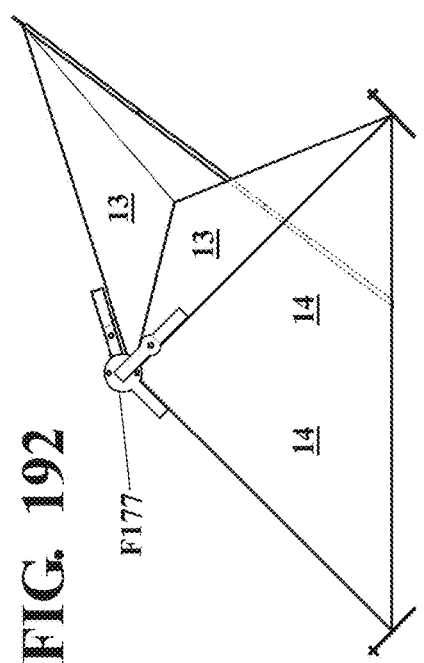
Figure 194:
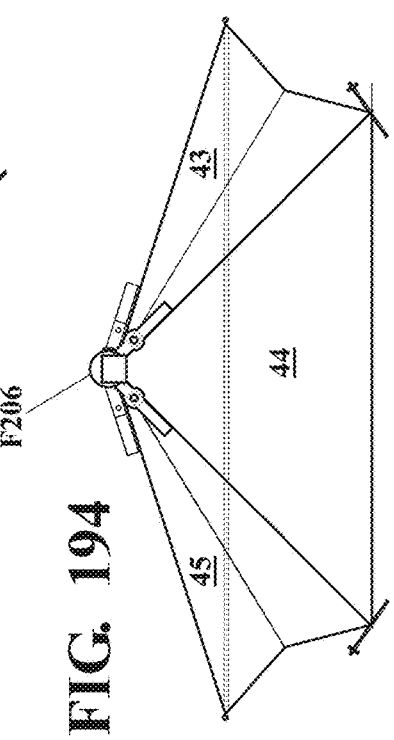
Figure 195:
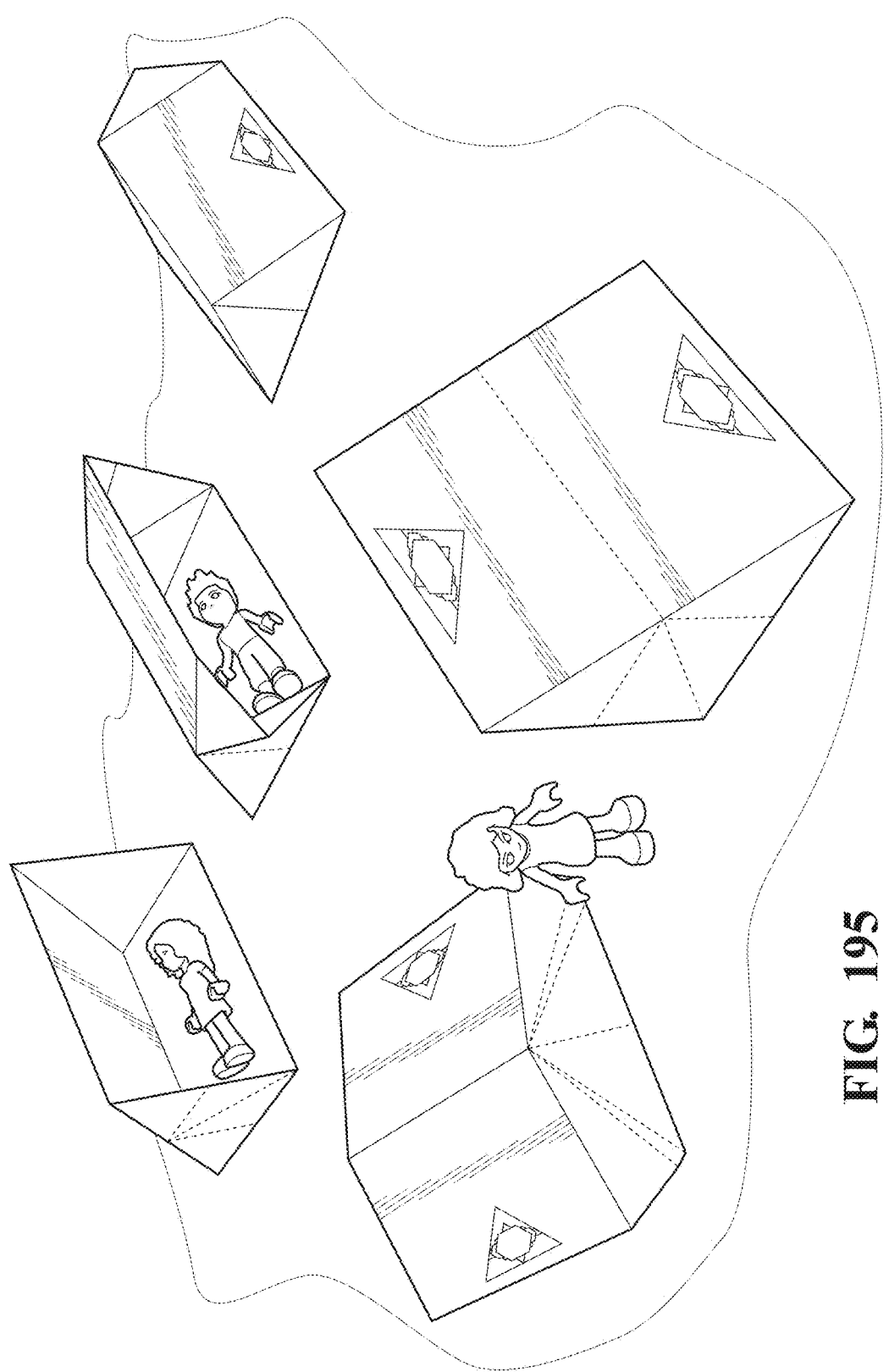

FIG. 132 shows a perspective view of an off-set anchor apparatus coupled to the tent shelter or the tent shelter anchor apparatus;

FIG. 133 shows a perspective view of an off-set anchor apparatus that is coupled to the tent shelter or the tent shelter anchor apparatus;

FIG. 134 shows a perspective view of two off-set anchor apparatuses coupled together by a split ring or other means of coupling;

FIG. 135 shows a perspective view of a tent shelter body material folded at a 90-degree angle showing a simple anchor apparatus coupled to it along with structural material coupled with the tent shelter body;

FIG. 136 shows a perspective view of a shelter body material folded at a 90-degree angle with structural material coupled to it;

FIG. 137 shows a perspective view of a simple material anchor apparatus coupled to the shelter material body;

FIG. 138 shows a perspective view of the edge of the shelter material body coupled with a simple material anchor apparatus;

FIG. 139 shows a perspective view of a heat resistant grommet that has extremely poor heat conductive properties with a threaded tube coupled to it;

FIG. 140 shows a perspective view of tent shelter body material folded at a 90-degree angle showing a simple anchor apparatus coupled to it;

FIG. 141 shows a perspective view of a grommet/anchor apparatus accessory housing coupled to the tent shelter or the tent accessories;

FIG. 142 shows a cross-sectional view of tent shelter material body coupled with the tent shelter anchor apparatus, coupled with the interior and exterior of the shelter material body where the interior and exterior body of the anchor apparatus do not necessarily have to be used together;

FIG. 143 shows a cross-sectional view of a threaded tub and a grommet hole tent shelter heat insulator that is made from heat resistant material with extremely low heat conductive properties;

FIG. 144 shows a perspective view of the components in FIGS. 142 and 143 coupled together;

FIG. 145 shows a perspective view of the tent shelter anchor apparatus that is not connected with anchor apparatus coupler material so that can be coupled to the tent shelter separately if desired;

FIG. 146 shows a cross-sectional view of a shelter material body and two reinforced material anchor apparatus;

FIG. 147 shows a perspective view of the tent shelter heat insulators coupled to a threaded tube;

FIG. 148 shows a perspective view of the tent shelter anchor apparatus;

FIG. 149 shows a perspective view of a shelter body material coupled with two reinforced material anchor apparatuses that are coupled to a heat resistant grommet;

FIG. 150 shows a perspective view of the tent shelter anchor apparatus in FIG. 2;

FIG. 151 shows a perspective view shows the tent shelter anchor apparatus in FIG. 1C that couples with the tent shelter coupled with the tent shelter;

FIG. 152 shows a perspective view of the tent shelter anchor apparatus in FIG. 151 with different split rings configuration;

FIG. 153 shows the tent shelter anchor apparatus coupled with the tent shelter;

FIG. 154 shows a top and a side views of the tent shelter anchor apparatus in FIG. 1C;

FIG. 155 shows a perspective view of the tent shelter anchor apparatus in FIG. 1C;

FIG. 156 shows a perspective view of the tent shelter anchor apparatus in FIG. 1C;

FIG. 157 shows a perspective view of one-half of the tent shelter anchor apparatus in FIG. 1C;

FIG. 158 shows a top and side views of the tent shelter anchor apparatus;

FIG. 159 shows a top and side views of the tent shelter anchor apparatus in FIG. 1C;

FIG. 160 shows a perspective view of the tent shelter anchor apparatus in FIG. 46;

FIG. 161 shows a top and side views of the tent shelter anchor apparatus in FIG. 1C;

FIG. 162 shows a perspective view of the tent shelter anchor apparatus in FIG. 1C coupled to tent frame poles and air ducts;

FIG. 163 shows a perspective view of arrows that can be used as the tent shelter frame poles;

FIG. 164 shows a perspective view of the tent shelter anchor apparatus in FIG. 1C coupled with the tent shelter frame poles and air duct having a battery technology;

FIG. 165 shows a perspective view of the tent shelter anchor apparatus in FIG. 1C with a mechanical coupler release apparatus releasing the tent frame pole;

FIG. 166 shows a perspective view the tent shelter anchor apparatus in FIG. 1C coupled to an air duct through a center opening and the anchor apparatus is coupled to a simple hinge, which is coupled to frame poles;

FIG. 167 shows a perspective view of a hooks and loops fastener coupling means;

FIG. 168 shows a perspective view of the tent shelter zipper with a hooks and loops coupling means;

FIG. 169 shows a perspective view of the tent shelter with a 90-Degree double zipper and with a hooks and loops coupling means;

FIG. 170 shows a perspective view of the tent shelter U-double zipper with a hooks and loops coupling means;

FIG. 171 shows a perspective view of tent shelter modified mechanical hinge coupled to the tent coupler apparatus;

FIG. 172, shows a perspective view shows the tent coupler apparatus coupled to the shelter zipper that is coupled to the tent shelter or the tent shelter accessory;

FIG. 173 shows a perspective view of the channel fastener body coupled with a channel fastener attachment part and also shows two channel fastener bodies coupled together;

FIG. 174 shows a perspective view of a secondary zipper coupled to the interior side of the tent shelter primary zipper that is coupled to the tent shelter or to the tent shelter accessory;

FIG. 175 shows a perspective view the tent shelter double zipper coupled to the tent shelter or the tent shelter accessory;

FIG. 176 shows a perspective view shows the tent shelter with means of coupling, for example, a zipper or a hook and loop fastener used to couple to multiple tent shelter or tent shelter accessories with means of coupling;

FIG. 177 shows a perspective view the peripheral edge of the tent shelter having different lengths and different means of coupling to zip/unzip different parts of the tent shelter;

FIG. 178 shows a top side view of a channel coupling enclosure device;

FIG. 179 shows a side view of channel coupling enclosure device;

FIG. 180 shows a perspective view of a channel coupling enclosure device coupled with two zippers that are attached to the tent or to the tent shelter accessory;

FIG. 181 shows a perspective view of a channel coupling enclosure device coupled with tent folded material;

FIG. 182 shows a perspective view of a channel coupling device coupled with one zipper that is coupled to the tent or to the tent shelter accessory;

FIGS. 183 to 183G show top views of multiple tent shelter configurations coupled to a tent shelter ridge fly or different shelter canopies;

FIG. 184 shows a top view of a printed shelter shown in FIG. 1C with openings for anchoring and coupling with a frame made of paracord at manipulation lines;

FIG. 185 shows a perspective view of a cordage stopper apparatus that adjusts the tent shelter using a paracord frame and that is also used as a weather resistant to openings in shelter;

FIG. 185A shows a perspective view of a paracord frame passing through the tent shelter material;

FIG. 185B shows a perspective view of a paracord frame passing through the tent shelter material that held in place by a cordage stopper apparatus;

FIG. 185C shows a perspective view of a paracord frame passing through the tent shelter material that is held in place by a paracord knot and has a loop as a means of coupling;

FIG. 186 shows a top view of a printed version of the tent shelter shown in FIG. 2 with openings for anchoring and coupling with a frame made of paracord at manipulation lines;

FIG. 187 shows a top view of a printed tent shown in FIG. 1C with a bottom;

FIG. 188 shows a top view of a printed tent shown in FIG. 2 with a bottom;

FIG. 189 shows an above view of a single awning hinge apparatus laid flat;

FIG. 189A shows a below view of a single awning hinge apparatus laid flat;

FIG. 189B shows a left side view of a single awning hinge apparatus rotated 90 degrees around a pivoting point;

FIG. 189C shows a right-side view of a single awning hinge apparatus rotated 90 degrees around a pivoting point;

FIG. 190 shows an above view of a double awning hinge apparatus laid flat;

FIG. 190A shows a below view of a double awning hinge apparatus laid flat;

FIG. 191 shows a top view of an EZ 2 double awning hinge apparatus laid flat;

FIG. 191A shows a bottom view of an EZ 2 double awning hinge apparatus laid flat;

to 191B shows a top view of an EZ 2 double awning hinge apparatus where four of its hinges are aligned parallel to each other;

FIG. 192 to shows a side view of a partially open configuration tent shelter in FIG. 11 coupled with a single awning hinge apparatus in FIG. 189;

FIG. 192A shows a side view of a fully open awning configuration in FIG. 13 coupled with a single awning hinge apparatus in FIG. 189;

FIG. 193 shows a side view of a closed configuration in FIG. 10 with a double awning hinge apparatus in FIG. 190;

FIG. 194 shows a side view of a partially open configuration of a double awning tent shelter in FIG. 16 with an EZ 2 double awning hinge apparatus in FIG. 191;

FIG. 194A shows a side view of a fully open configuration of a double awning tent shelter in FIG. 15 with an EZ 2 double awning hinge apparatus in FIG. 191;

FIG. 195 shows a perspective view of printed shelter tents shown in FIGS. 186 to 188 to be used for entertainment or education.

DETAILED DESCRIPTION OF THE DRAWINGS

Reference will now be made to the drawings in which the various elements of the present invention will be given numeral designations and in which the invention will be discussed to enable one skilled in the art to make and use the invention. Exemplary illustrations of the tenting apparatus of the invention are shown in the attached drawings. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

Referring to FIGS. 1 to 1B, environmental views of a single awing tent shelter 9 showing a closed, opened and partially opened awning.

Referring to FIG. 1C, a single awning customizable tent shelter 9 is made of a flexible sheet material or fabric for its main body and includes a first rectangular portion 11, second rectangular portion 12, first triangular portion 13, second triangular portion 14, third triangular portion 15, fourth triangular portion 16 and peripheral edges 28a, 28b, 28c, 29a, 29b and 29c that have attachment coupling apparatuses attached to its attachment points. Along the peripheral edge, there are attachment apparatuses 32, 34, 35 and 36 to form a single tent of the tent shelter 9 that can be used to connect to other tent shelters to form a bigger tent. Peripheral edges 28a, 28b, 28c, 29a, 29b and 29c also include attachment members, for example, tent zippers, snaps, clips, buttons or any means of coupling 10a, 10b, 10c, 10d, 10e, 10f to connect to other tent shelters or tent accessories.

The first rectangular portion 11 includes a primary anchor apparatus 30 which is attached to a primary anchor point for adjusting folds 19, 20, 21, 22, 23, 24, and a secondary anchor apparatus 33 for adjusting folds 21, 24, 27. The first rectangular portion 11 further includes anchor apparatuses 31, 32, 34 and fold locations 23, 24, 25 to manipulate the tent into desirable shapes. Attachments elements 31 and 32 are secondary anchor apparatuses to hold the tent material in position.

The anchor apparatus 30 has rigid portions and a flexible coupler A83 in the middle to assist with forming the selected folds into a desirable shape and for adjusting the tent shelter to the ridge line 24. The anchor apparatus 30 also has two interior holes A78 which are used to receive poles for structuring and supporting the tent in its erected triangular or rectangular sides form, and two exterior holes A79 that can be used to connect to tent shelter accessories. The exterior holes A79 can be used to connect to a split ring A77 that can be attached to another split ring A77 to be used as a ground anchor or as a loop when it is connected to another tent by a line such as a rope.

Figure 7:
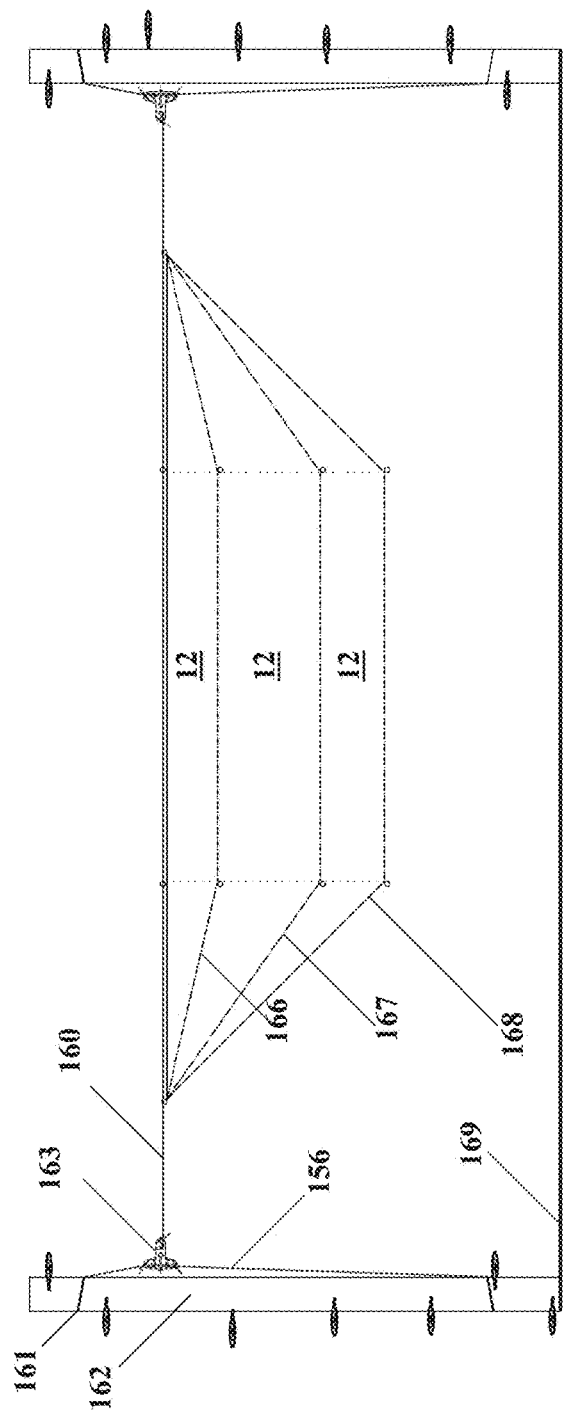
FIG. 7 shows a partial side view of an embodiment of the present invention suspended between two a fixed object.
Figure 8:
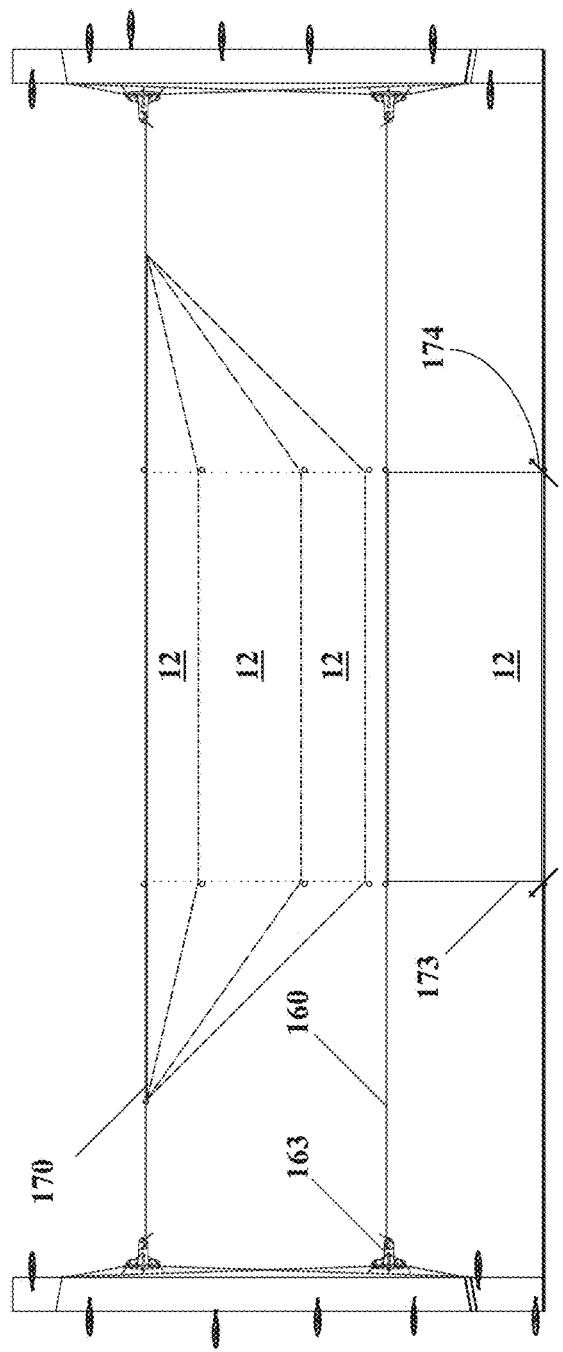
FIG. 8 shows a partial view of an embodiment of the invention as a flying shelter that is lowered so that the shelter can be anchored to a ground and be manipulated to an enclosed shelter.

The flexible portion of the coupler A83 in the middle of anchor apparatus has a hole A84 for the ridge line as shown in FIGS. 142 and 144 to pass through the middle part of the tent shelter from the exterior to the interior part of the tent shelter where the split rings A77 come towards the center for the purpose of coupling and adjusting as shown in FIGS. 7 and 8. The anchor apparatus 30 is shown in more detail in FIGS. 142 and 144.

Anchor apparatus 31 is a rigid portion having a circular side opening A156 that can be used to connect accessories to the tent. Anchor apparatus 31 also has a middle opening A157 that includes a raised portion A158 to be connected to other means of coupling for example, a split ring A77 as an anchor point.

Anchor apparatus 32 is a rigid portion having a circular side opening A130. The body A129 of the anchor apparatus 32 has a hole on its lower middle part attached to a split ring A77 that can be used for anchoring the tent to the ground with a stake or to be used to connect to another tent. Anchor apparatus 31 is disclosed in more detail in FIG. 154.

Anchor apparatus 33 is a rigid portion having three circular openings A162 for a line, cord, cable or wires to pass through from the exterior to the interior of it to shape the folds into a preferable shape and to supply the tent with electricity. The Anchor apparatus is disclosed in more detail in FIG. 161.

Anchor apparatus 34 is a half of the anchor apparatus 30 that is not connected with anchor apparatus coupler material A83. Anchor apparatus 34 is a half of anchor apparatus 30 because it is attached to a peripheral anchor point of the tent. Anchor apparatuses 32 and 34 can also be used to form a ridge line for example by using parachute cord ("paracord") if it is connected to another tent.

The triangular portions 13, 14, 15 and 16 further include anchor apparatuses 35 and 36. Anchor apparatus 35 is a rigid portion having a hole A121 connected to a split ring A77 to couple to another tent or to secure the tent to the ground when it is erected. The anchor apparatus 35 also includes a coupler material A120 connecting two anchor apparatus bodies A119 of anchor apparatus. Anchor apparatus 35 is disclosed in more detail in FIG. 151.

Anchor apparatus 36 is a rigid or flexible portion used to form folds 19, 20 and fold 21 in triangular portions 13 and 14 and folds 17, 18, 25, 26 in triangular portions 15 and 16 when it is anchored to anchor apparatus 30. Anchor apparatus 36 has a bendable portion A137 in the middle and a circular opening A135 that can be used for a chord or a line to pass through to reinforce the selected folds. Anchor apparatus 36 has a hole A136 that is connected to a split ring A77 to secure the tent to the ground. Anchor apparatus 36 is disclosed in more detail in FIG. 155.

Anchor apparatuses 30, 32, 34, 35, and 36 will allow another shelter to be coupled with the tent shelter 9 when the two shelters are in an open awning configuration. The anchor shown represents any anchor apparatus that is preferable when considering all of the other materials that make up the total shelter.

Tuning now to FIG. 2, in a second embodiment, double awning tent shelter 40 of the invention includes a first rectangular portion 41, second rectangular portion 42, first trapezoidal portion 43, second trapezoidal portion 45, third trapezoidal portion 46 and forth trapezoidal portion 48 and peripheral edges 64a, 64b, 65a, 65b, 65c, 66a, 66b, 66c that can have coupling elements. Along the peripheral edge of the double awning tent shelter 40 there are anchor apparatuses 34, 36 and 37. The manipulation lines 49, 50, 51, 52, 53, 54, 55, 56, 57, 58, 59, 60, 61, 62, 63 represent approximate folds in the material that will enable the shelter to be manipulated into desirable shapes. Along the peripheral edge of the double awning tent shelter 40 there are attachment members, for example, zippers, buttons, snaps, etc., 67a, 67b, 67c, 67d. 67e, 67f, 67g, 67h to connect to other tent or tent accessories.

Anchor apparatus 37 is a half of the anchor apparatus 35 that is not connected with anchor apparatus coupler material A120. Anchor apparatus 37 is a half of anchor apparatus 35 because it is attached to a peripheral anchor point of the tent. Unless specifically indicated otherwise, hereinafter, reference to "tent shelter" includes either the tent shelter 9 or the double awning tent shelter 40.

Figure 4:
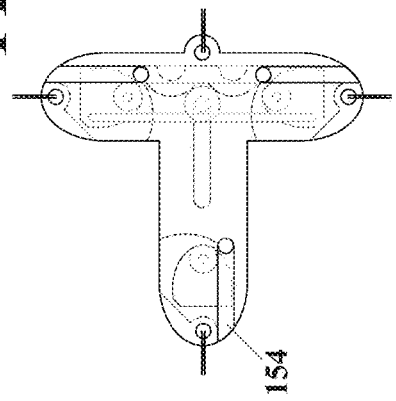
FIG. 4 shows a back view of a line adjustment anchor apparatus of FIG. 3.
Figure 3:
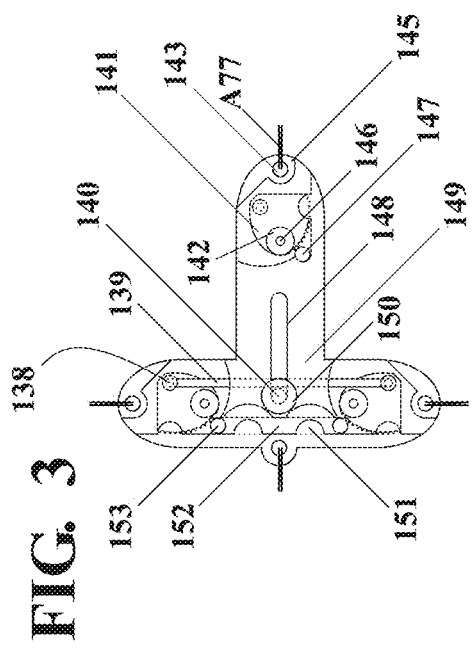
FIG. 3 shows a front view of an anchor apparatus of the invention.

Referring to FIG. 3 and FIG. 4, a line adjustment anchor apparatus of the invention used to adjust the ridge lines 24 and 57 of the tent shelters and to secure the tent shelter by having a cord pass through the openings of anchor apparatuses 30, 33, 35 as shown in FIGS. 7 and 8. The one end of the paracord or the like is attached to the anchor ridge line and the other end is attached to the anchor apparatus of the tent. The line adjustment anchor apparatus includes a main body 149 that has a frontal body 145 and a lateral body 151. The anchor apparatus body 145 has an exterior opening 143 that has a split ring A77 or other articles of manufacture coupled to it to provide anchor point to be coupled with the paracord or the like and interior openings 147 to allow paracord or the like to pass through the body.

The anchor apparatus frontal body 145 further includes a paracord grip cam 141 held in grip mode with a tension spring or some other mechanical means that has a washer 142 to serve as a spacer and a means of keeping the paracord grip cam able to be pivoted properly, and a channel 154 that will allow paracord to be loosely held in place as shown in FIG. 7. The paracord grip cam 141 is held in place by a pin 146 or other means of coupling for adjusting the paracord or the like. When the release button 158 moves along channel 154 by a simple rotation in the manner shown in FIG. 6, it releases paracord 160.

Figure 6:
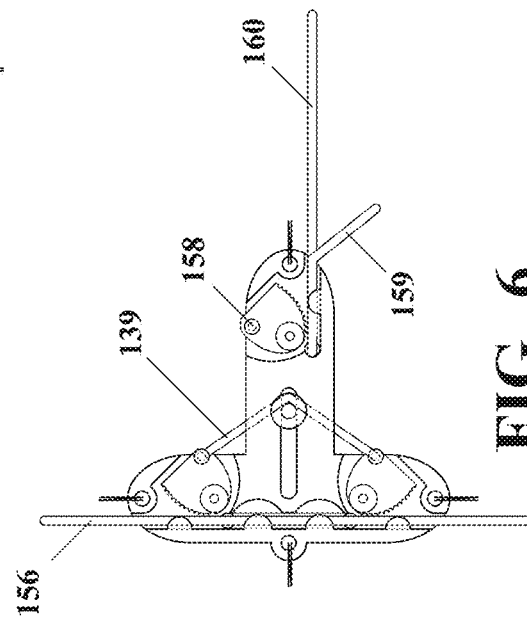
FIG. 6 shows a detailed view of a parachute cord connected by two-line adjustment anchor apparatuses.

The anchor apparatus lateral body 151 has exterior openings and interior openings 153 to allow paracord or the like to pass through the body 151, and it has a channel 152 that will allow paracord 156 to be loosely held in place as shown in FIG. 6.

The anchor apparatus body 151 further includes an anchor point 138 that allows a paracord grip cam to be released individually or with another paracord grip cam and it has a paracord grip cam connector 139 that connected to channel 148 to guide multiple paracord grip cam release slide. The line adjustment anchor apparatus further includes a multiple paracord grip cam release slide 140 and a washer 150 that hold the multiple paracord grip cam release slide in place. The release button 140 when it moves along the channel 148 pulls in the connector 139, which is connected to the tensioning cam and puts it in a release mode.

Figure 5:
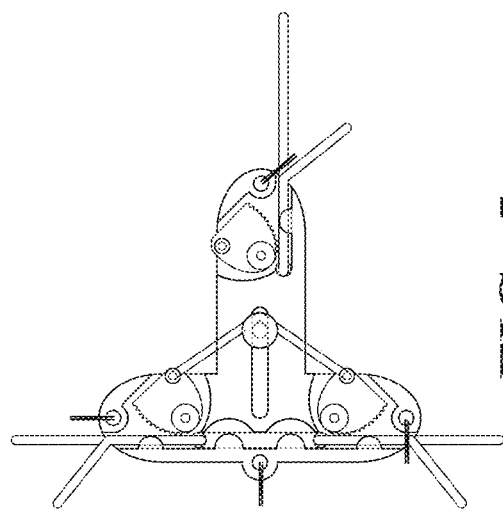
FIG. 5 shows a front view of a line adjustment anchor apparatus of FIG. 3.

Referring to FIGS. 5 and 6, a line adjustment anchor apparatus with three pieces of paracord or the like where they would be held securely if not in a release mode (as seen in FIGS. 5 and 6). FIG. 6 shows a paracord 156 that can be anchored at the top and bottom so the line adjustment anchor apparatus can be moved along the anchored paracord. FIG. 6 also shows a paracord grip cam connector 139, a paracord grip cam 158 that is held in release mode, and the lag end 159 of a paracord or the like. A piece of paracord 160 is held in place and can be put under tension by the two-line adjustment anchor apparatuses.

Referring to FIG. 7, tent shelter in one of many desirable shapes 166, 167, and 168 being pitched by attaching it to a paracord 160 or rope or the like that is held in place and can be put under tension by two paracord line adjustment anchor apparatuses 163 that are anchored to a tree, post or another object 162 that is on the ground, floor or other surface 169. The line adjustment anchor apparatuses 163 are also connected to paracord 156 to allow the line adjustment anchor apparatuses 163 to move up and done to form many desirable shapes.

Referring to FIG. 8, the tent shelter is seen being pitched as a flying shelter 170 by attaching it to paracord 160 that is held in place and put under tension by two paracord line adjustment anchor apparatuses 163. FIG. 8 also shows an adjustment to a ridge line paracord height to allow the use of a tent stake 174 to manipulate the shelter to an open bottom enclosed shelter 173.

Referring to FIG. 9, a single awning tent shelter is being coupled to a ridge line paracord 178 that is anchored to an object 179 from one end and a ridge line pole 177, which is coupled to anchor apparatuses 30 (not shown) and a paracord and shelter guy-line 176 that is secured to the ground by a tent stake 175.

Referring to FIG. 10, the tent shelter can be enclosed when the tent portions 13 are folded against portion 14. The channel 181 is used to enclose the peripheral edge of tent portion 13. The channel 181 is detached in this figure, but it is in close proximity to the peripheral edge of the tent portion 13 to be coupled to the tent's folded edges. The tent is being pitched using a tent stake 175 that is coupled to anchor apparatus 36 (not shown).

Referring to FIGS. 11 to 13, a side view of an open configuration of the tent shelter including an awning adjustment pole 182 to manipulate the structure of the tent. FIG. 11 shows a partially open shelter by using an awning pole 182 that is being coupled to anchor apparatus 34 as seen in FIG. 1C, and it is being anchored to the ground. FIG. 12 shows a partially open shelter; and FIG. 13 shows a fully open shelter. The guy-lines 176 and the stake 175 are not shown in FIGS. 10 and 13.

Figure 14:
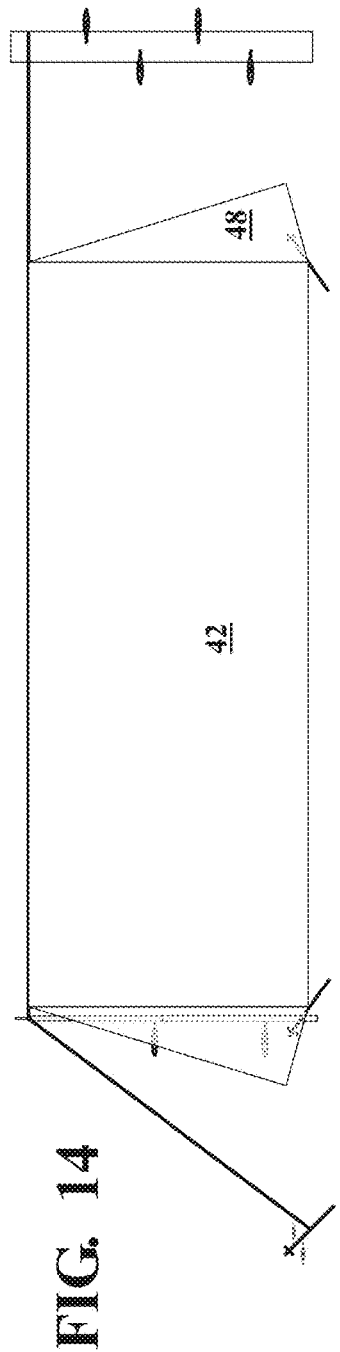
FIG. 14 shows a side view of a closed configuration of a double awning tent shelter of the invention.

Referring to FIG. 14, a tent shelter as shown in FIG. 2 being pitched with basic accessories to have both awnings closed. Channel 181 is not shown but it is coupled to peripheral edge 43 of the tent shelter as seen in FIG. 2.

Referring to FIGS. 15 and 16, a tent shelter as shown in FIG. 2 is pitched with basic accessories to have both awnings open. FIG. 16 includes an awning adjustment pole 183 used to hold two awnings open through coupling to anchor apparatus 34 (not shown). Ridge line support pole 177 is coupled to anchor apparatus 34 of the tent portions 41 and 42 to hold the tent shelter up. The guy-lines and the stakes are not shown.

Figure 17:
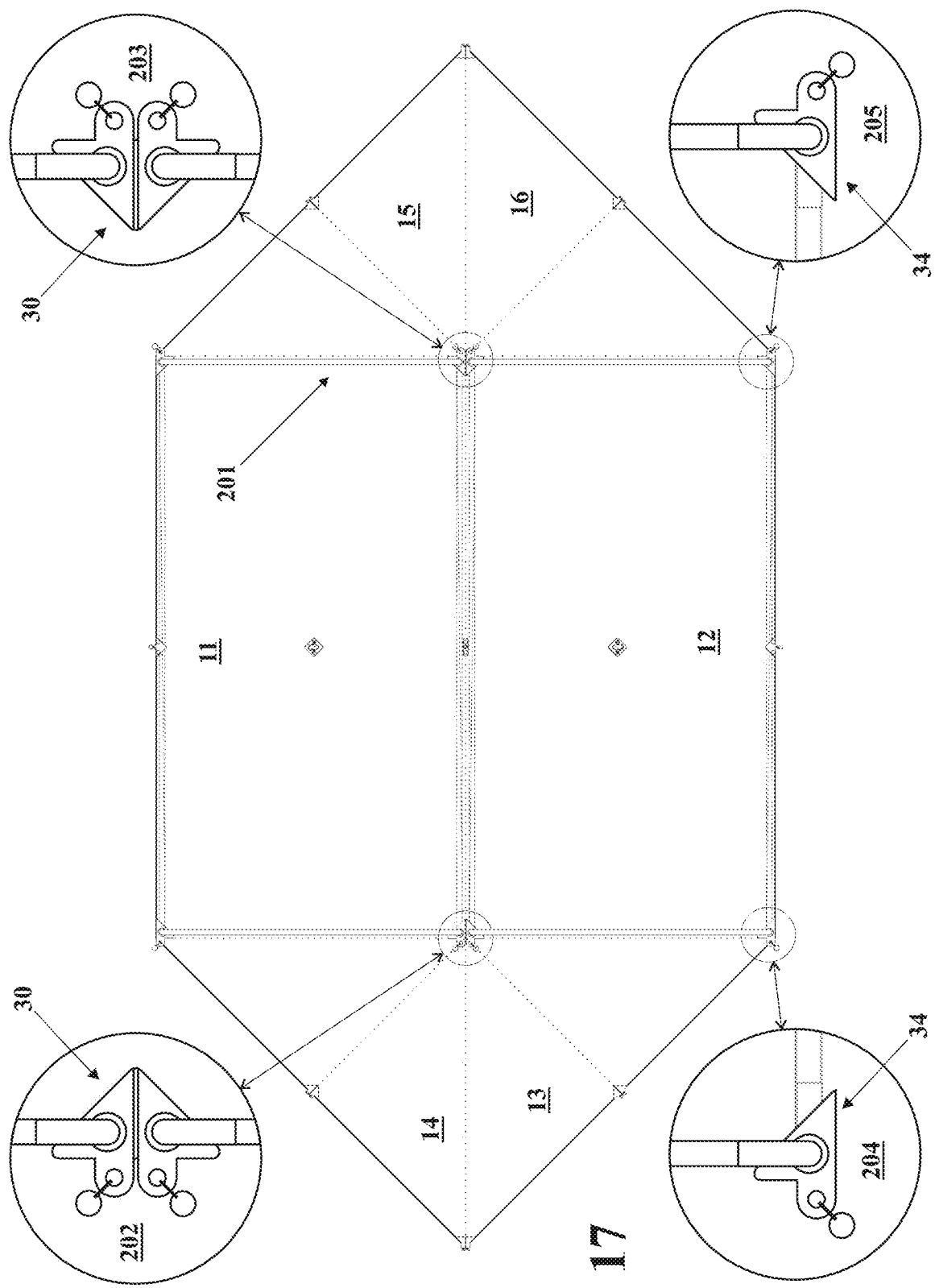
FIG. 17 shows a top view of a single awning shelter having connected ducts that are attached to the tent's side walls.

Referring to FIG. 17, the tent shelter as shown in FIG. 1C including a flexible or rigid duct 201 coupled with anchor apparatuses 30 and 34 (as shown in enlarged portion 202, 203, 204, and 205) that are coupled to the tent shelter. The duct is used to transfer air or fluid. The air or fluid may change temperature as it passes through the duct. The duct may also be used as a heat exchanger. The rigid duct is also used as a support frame system to manipulate the tent shelter to have a variety of awning opening configurations. The rigid duct is additionally coupled with a rigid duct hinge apparatus (not shown) that may allow the awning frame to be operated together or separately.

Figure 18:
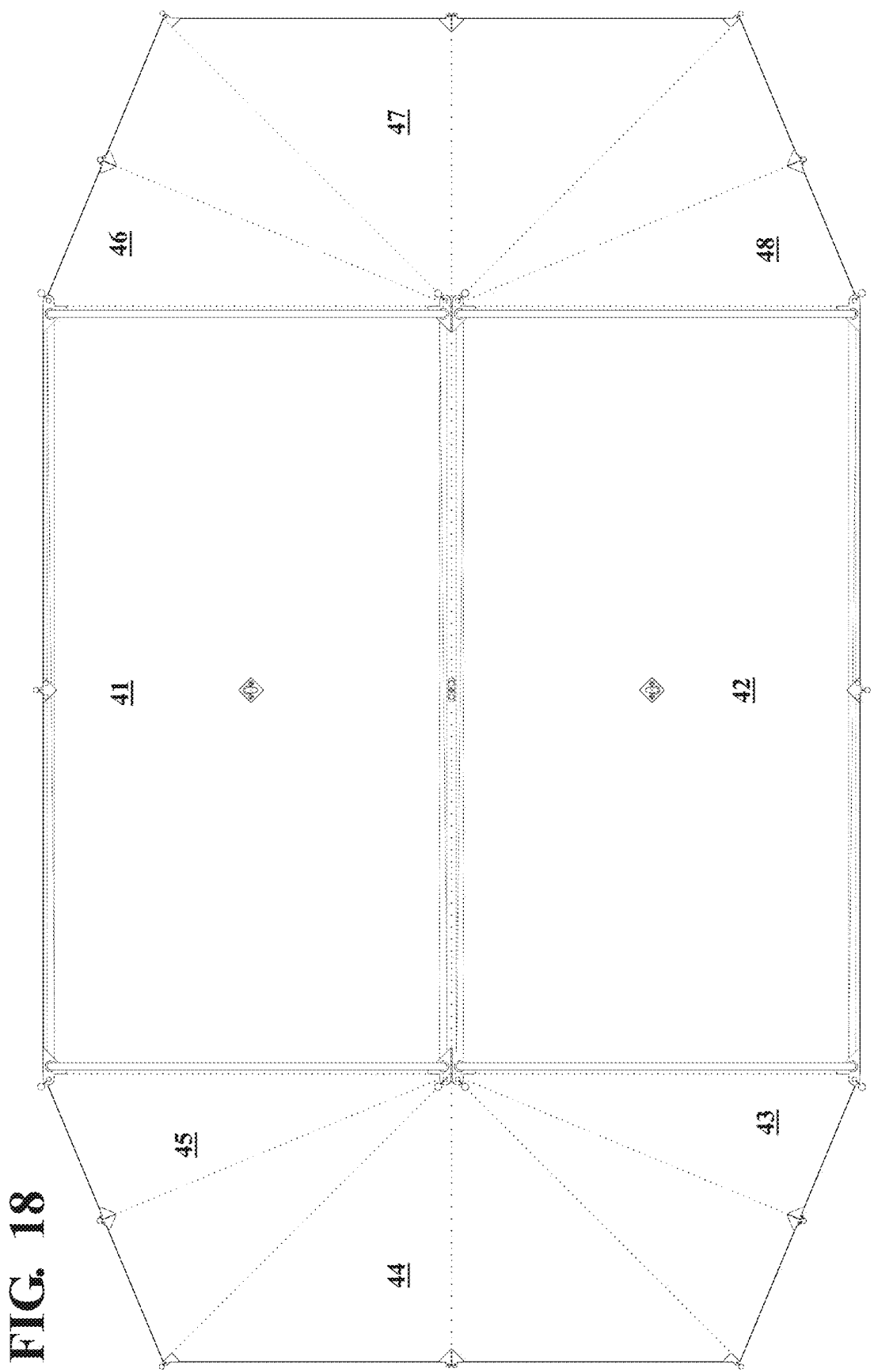
FIG. 18 shows a top view of a double awning shelter having connected ducts that are attached to the tent's side walls.

Referring to FIG. 18, the tent shelter as shown in FIG. 2 includes a flexible or rigid duct coupled with anchor apparatuses 30 and 34 that are coupled to the tent shelter. The duct is used to transfer air or fluid. The air or fluid may change temperature as it passes through the duct. The duct may also be used as a heat exchanger. The rigid duct is also used as a support frame system to manipulate the tent shelter to have a variety of awning opening configurations.

Referring to FIGS. 19 and 20, a shelter ridge fly accessory 210 includes means of coupling 213 two tent shelters. FIG. 19 shows a shelter ridge fly accessory including a vertical weather fly flap 211 that is deployed and coupled with the tent shelter using anchor apparatus 30 as seen in FIG. 1C and shown in enlarged portions 215 as an option of coupling means. Enlarged portion 214 shows anchor apparatus 30 of the tent attached to the ridge fly. This ridge weather fly flap 212 can provide additional weather resistance to the interior of the tent shelter. The tent shelter ridge fly accessory 210 may also be coupled with other articles of manufacture that may allow them to be coupled with the anchor apparatus of the tent shelter. The disclosure of FIG. 19 is shown in more detail in FIG. 40.

In FIG. 20, an enlarged portion 216 of an anchor apparatus 30 as seen in FIG. 1C is coupled to a duct or a framing support. The anchor apparatus 30 as seen in FIG. 1C has a gap in the middle for offsetting the anchor apparatus to be adjusted with the tent shelter. The two anchor apparatuses 34 are connected together by split rings.

Referring to FIG. 21, a shelter ridge fly accessory 210 coupled with anchor apparatus 30 is coupled with material that conducts electricity as shown in enlarged portion 218. Enlarged portion 219 shows as anchor apparatus 33 of the tent coupled to the ridge fly material that conducts electricity. The anchor apparatus may have connection points that other accessories and/or other articles of manufacture can be connected to. The shelter ridge fly accessory 210 can have an embedded electrical wire with a wire harness terminal for powering the holes of anchor apparatuses 30 and 33.

Figure 22:
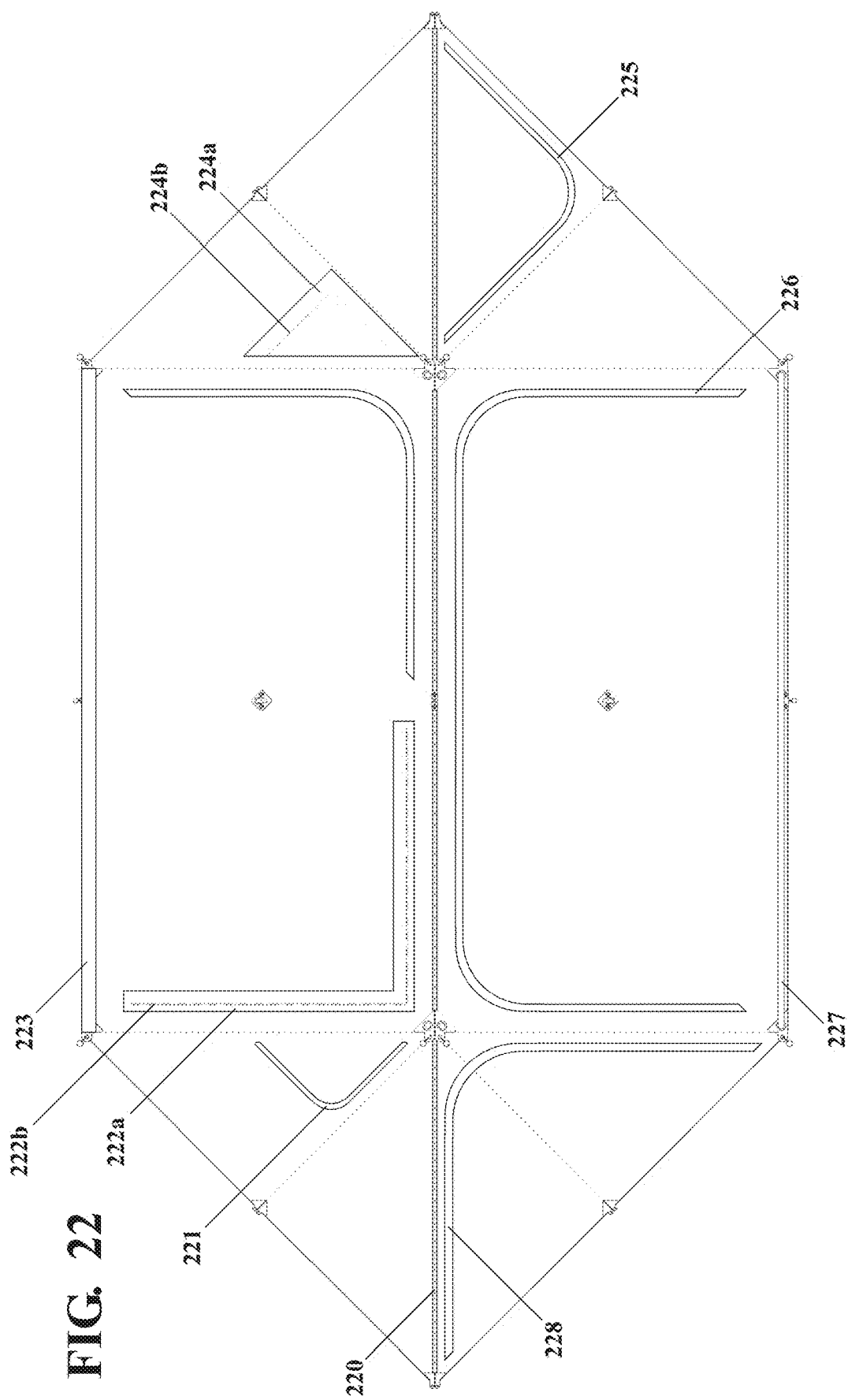
FIG. 22 shows a top view of a single awning shelter's sidewalls coupled with a variety of what may represent doors, windows, vents or structural support components.

Referring to FIG. 22, the tent shelter as shown in FIG. 1C, includes a nylon webbing that increases ridge line tension strength 220 located on the top center of the tent. The tent sidewalls are coupled with a variety of what may represent as doors 226 and 228, windows 225 and 222a with a flap for covering the zipper ends, 222b which is a zipper means of coupling, a vent 221 having a weather flap 224a to protect the zipper, and a zipper that is coupled with the tent to create a vent. A pole shelter awning sleeve 223 along with a rigid duct or a solid pole 227 is coupled to a grommet or to anchor apparatus 34 that may provide a frame support for a tent shelter.

Referring to FIG. 23, the tent shelter as shown in FIG. 2, includes a nylon webbing that increases ridge line tension strength 229 located on the top center of the tent. The tent sidewalls are coupled with a variety of what may represent as doors 231, vents, along with a weather flap 230 that can be manually opened or closed. Pole shelter awning sleeve 223, along with a rigid duct or a solid pole 227 is coupled to a grommet or to anchor apparatus 34 that may provide a structural frame support for the tent shelter.

Referring to FIG. 24, the tent shelter as shown in FIG. 1C, includes pockets that may hold insulation panels. The tent shelter pockets are stuffed with material that have insulation value. Insulation panels 232, 233, 234, 236, and 237, 239 are shown in a fitted pocket that is coupled with a shelter by the anchor apparatus. This figure also shows a vent with an insulation panel 240 that is coupled with the tent shelter. The tent has a vent with a weather flap 230 that is manually zipped opened or closed. An anchor attachment point 238 is in the insulation panel 237 and will allow anchor apparatus to function properly.

Referring to FIG. 25, the tent shelter as shown in FIG. 2, includes insulation panels 243, including a portion 244 that has anchor points to be coupled with the tent shelter. The insulation panels 243 may also be coupled with a tent shelter by coupling means 241 (or other means of coupling) as is shown in an enlarged portion. The insulation panel 243 has an anchor attachment point 242 which will allow anchor apparatus to function properly.

Referring to FIG. 26, an insulation panel 245 has a vent 247. This panel is shown being coupled to an insulation panel 243 by an anchor point 246, and it is stored flat so that when shelter is pitched there will be access to the shelter door. When the shelter is manipulated into a closed shape this insulation panel may rotate down to provide insulation between the shelter door and the interior of the shelter. The insulation panel portion 249 has anchor points 248 that are used to couple with a tent.

Referring to FIG. 27, an insulation panel 243 is shown.

Figure 28:
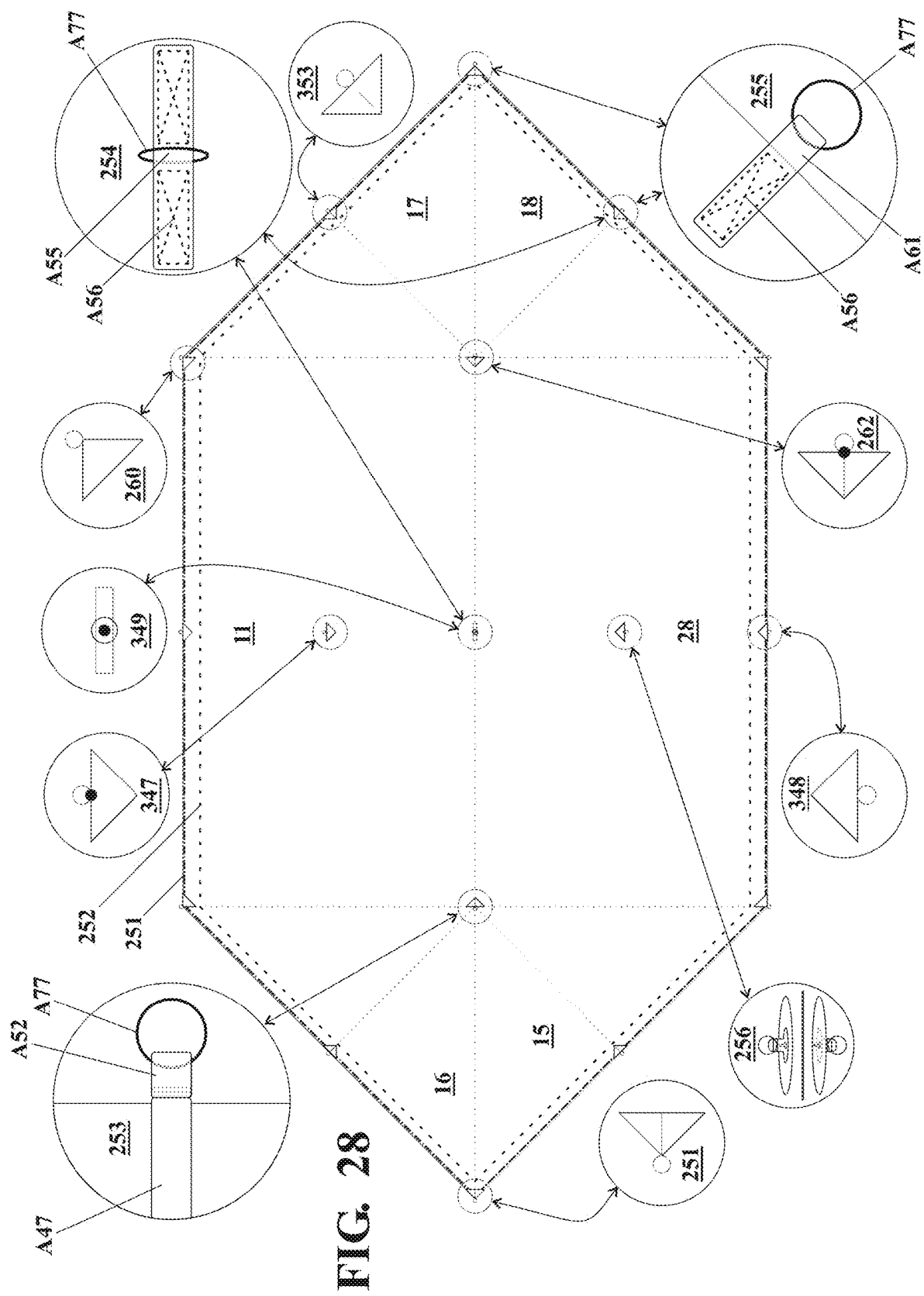
FIG. 28 shows a top view of a single awning tent shelter having multiple means of coupling on the edge of the shelter on, or in close proximity to the edge of a shelter.

Referring to FIG. 28, the tent shelter as shown in FIG. 1C with multiple means of coupling 251 and 252 that can be a zipper, a loop-and-hook fastener, a snap or a clip on the edge of the tent shelter, and on, or in close proximity to the edge of a shelter. The means of coupling may connect two shelters, a shelter to itself and a shelter to other shelter expansion accessories. Two shelters can be coupled together so as to make one large pocket that can be filled with some material that will provide insulation. This figure also shows symbols that represent multiple anchor apparatuses as well as any anchor apparatus known to those skilled in the art.

As is shown, an anchor apparatus 253 includes a nylon webbing material A47 and a split ring anchor A77. The anchor apparatus 253 is coupled to a shelter in place of anchor apparatus 30 as shown in FIG. 1C. Anchor apparatus 253 is described in more detail in reference to FIG. 136. As is shown, anchor apparatus 254 includes a nylon webbing material A47 and a split ring A77. Anchor apparatus 254 is coupled to a shelter as a means of coupling in place of anchor apparatus 33, as shown in FIG. 1C. Anchor apparatus 254 is described in more detail in reference to FIG. 137. An anchor apparatus 255 includes a nylon webbing material A477 and a split ring A77. Anchor apparatus 255 is coupled to a tent shelter in place of anchor apparatus 36, as shown in FIG. 1C. Anchor apparatus 255 is described in more detail in reference to FIG. 138. An anchor apparatus 256 is coupled to the tent shelter through its male and female ends and used in place of anchor apparatus 31 shown in FIG. 1C. Anchor apparatus 256 is described in more detail in reference to FIG. 128. Anchor apparatuses 347, 348, 349, 351 and 353 are used in the place of anchor apparatuses 32, 33, 34, 35 and 36 shown in FIG. 1C. Anchor apparatuses 347, 348, 349, 351 and 353 are disclosed in more detail in reference to FIG. 34.

Figures 29, 30:
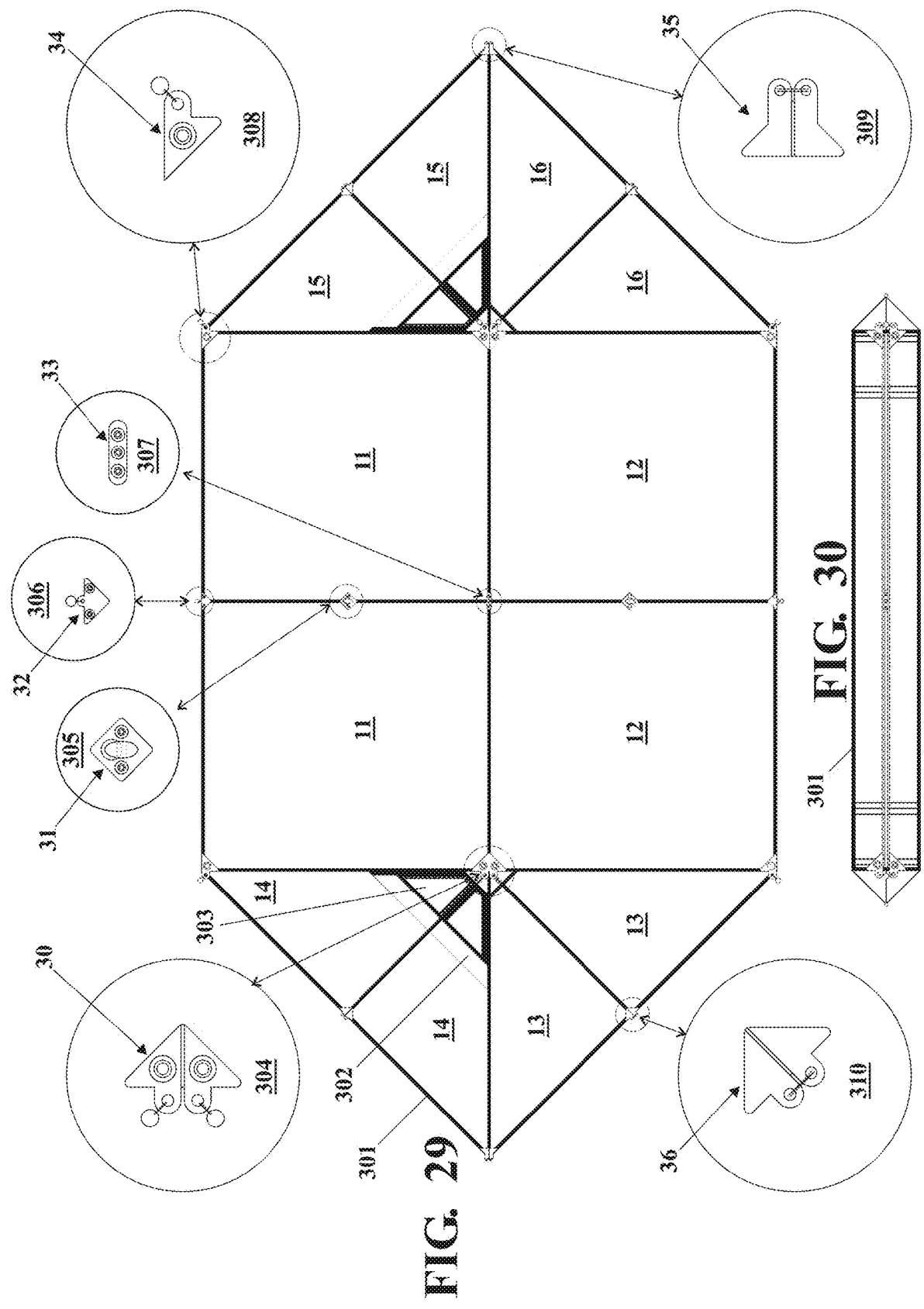
FIG. 29 shows a top view of a single awning tent shelter coupled with a flexible frame material or materials that works with the manipulation lines and it is coupled with the tent shelter accessories where a flexible frame material is for structural support and to provide material that anchor apparatus and accessories can be coupled to with weld or glue.
FIG. 30 shows a perspective view of a shelter ridge fly accessory coupled with a flexible frame material.

Referring to FIG. 29, the tent shelter as shown in FIG. 1C is coupled with a flexible frame material 301 or materials that may allow the shelter material to be manipulated while helping the material to not be misshaped. It also shows how a flexible frame material or materials work with manipulation lines. The flexible frame is coupled with shelter accessories and other articles of manufacture. The flexible frame material 301 may have anchor apparatuses glued or welded to it. A weather flap material 302 helps protect the interior of the shelter. A shelter vent 303 is manually opened or closed. The tent shelter vent is welded or glued to the embedded frames. The shelter's vents may also be permanently open when the shelter material is not breathable so as to maintain good breathable air quality in the interior of the shelter. Anchor apparatuses 304, 305, 306, 307, 308, 309, and 310 previously seen as anchor apparatuses 30, 31, 32, 33, 34, 35 and 36 in FIG. 1C are shown in a different embodiment where they are glued or welded to the flexible material.

Referring to FIG. 30, a shelter ridge fly is coupled with a flexible frame material 301 or materials that allows the shelter material to be manipulated while helping the material to not be misshaped. The flexible frame is coupled with accessories and other articles of manufacture.

Figure 31:
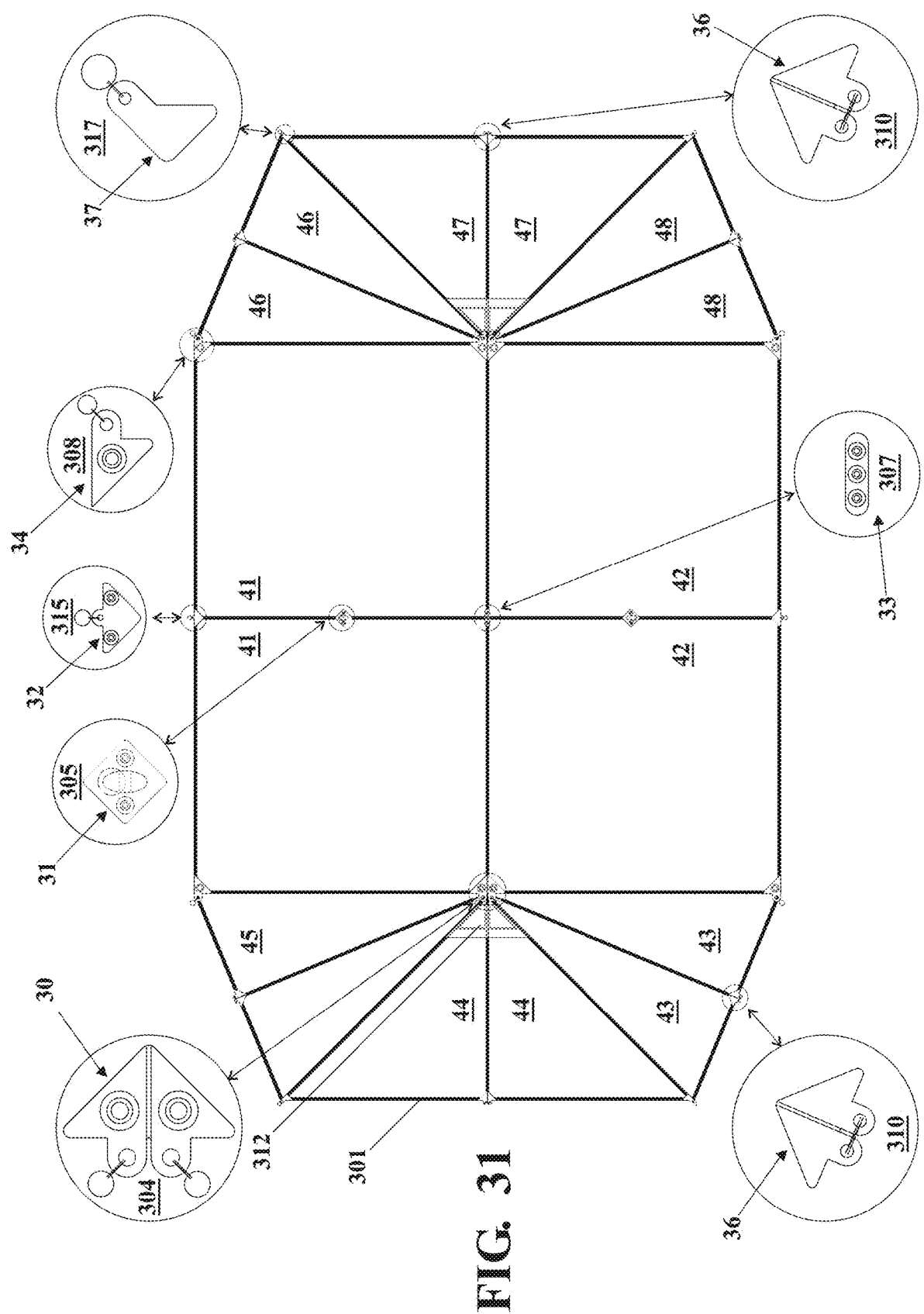
FIG. 31 shows a top view of a double awning tent shelter coupled with a flexible frame material or materials that allow the shelter material to be manipulated while helping the material to not be misshaped.

Referring to FIG. 31, the tent shelter as shown in FIG. 2 is coupled with a flexible frame material or materials that allow the shelter material to be manipulated while helping the material to not be misshaped. The flexible frame material or materials work with manipulation lines. The flexible frame is coupled with shelter accessories and other articles of manufacture. A vent with a weather flap material 312 helps to protect the interior of the shelter that can be zipped, buttoned or snapped open. Anchor apparatuses 304, 305, 306, 307, 308, 309, 310 and 317 previously seen as anchor apparatuses 30, 31, 32, 33, 34, 36 and 37 in FIG. 2 are shown in a different embodiment where they are glued or welded to the flexible material.

Figure 32:
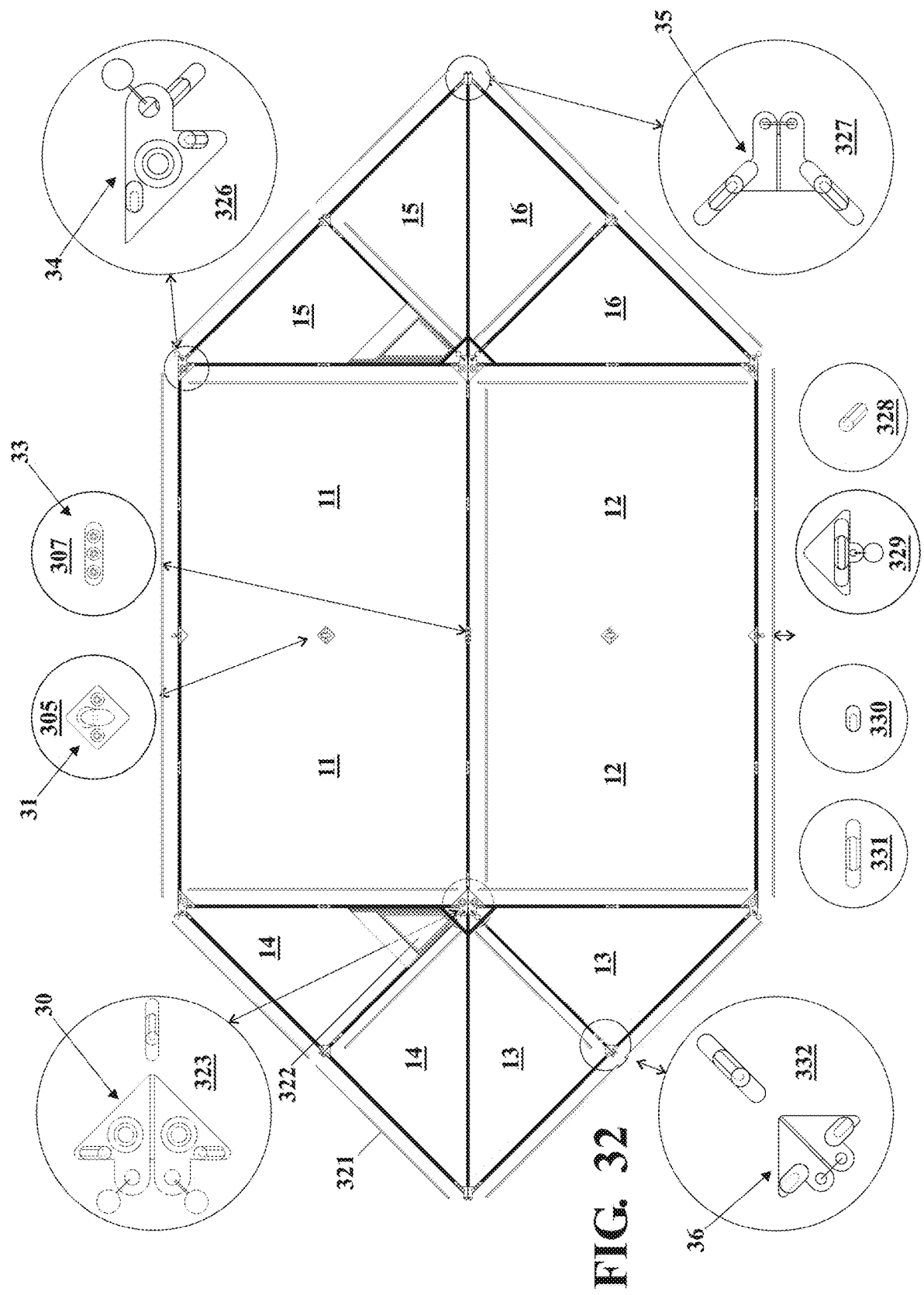
FIG. 32 shows a top view of a single awning tent shelter having an anchor apparatus, along with a frame pole snap apparatus coupled with a flexible frame material or materials that may allow the shelter material to be manipulated while helping the material to not be misshaped.

Referring to FIG. 32, the tent shelter as shown in FIG. 1C is coupled with anchor apparatuses 323, 326, 327, 329 and 332, along with a frame pole snap apparatuses 328, 330, and 331 to provide extra structural support as shown in enlarged portions with a flexible frame material or materials that may allow the shelter material to be manipulated while helping the material to not be misshaped. The flexible frame material or materials are adapted to work with manipulation lines. It also shows rigid or flexible poles 321 that are coupled with frame pole snap apparatuses. A shelter vent 322 is manually opened or closed. Shelter vents may also be permanently open when the shelter material is not breathable so as to maintain good breathable air quality in the interior of the shelter. A frame pole snap apparatus is also shown. Anchor apparatuses 305 and 307 are coupled with flexible frame material with the tent.

Figure 33:
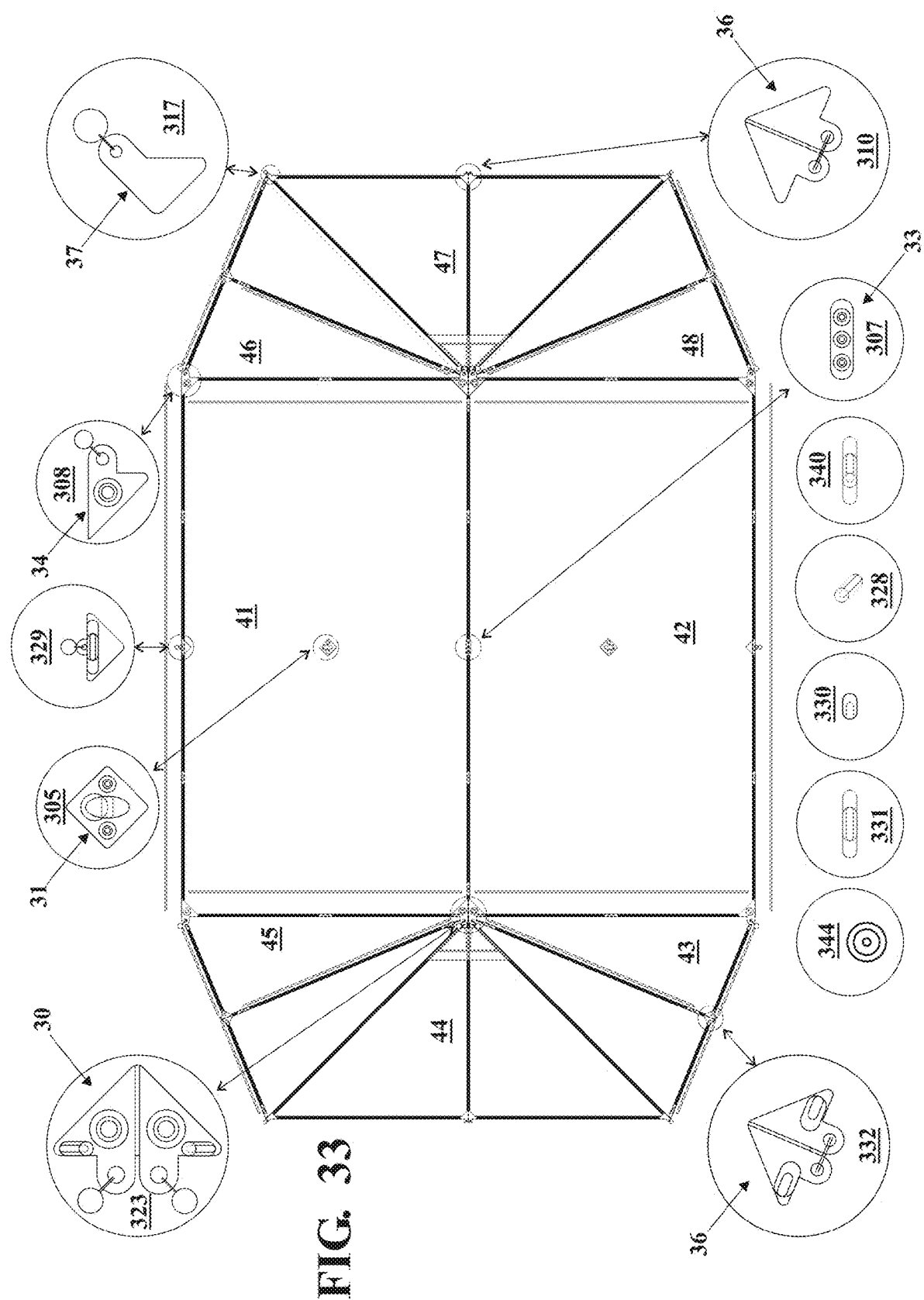
FIG. 33 shows a top view of a double awning tent shelter coupled with a flexible frame material or materials that may allow the shelter material to be manipulated while helping the material to not be misshaped.

Referring to FIG. 33, the tent shelter as shown in FIG. 2 is coupled with anchor apparatuses 323, 329 and 332, along with a frame pole snap apparatuses 328, 330, and 331 to provide extra structural support as shown in enlarged portions with a flexible frame material or materials that may allow the shelter material to be manipulated while helping the material to not be misshaped. The flexible frame material or materials are adapted to work with manipulation lines. This figure also shows rigid or flexible poles 321 that are coupled with frame pole snaps apparatus 340, 328, 330, 331, 344. Anchor apparatuses 305 and 307, 308, 310, and 317 couple the flexible frame material of the tent. Anchor apparatus 344 has an has an opening that allows a paracord to pass through the anchor apparatus from the exterior to the interior.

Figure 34:
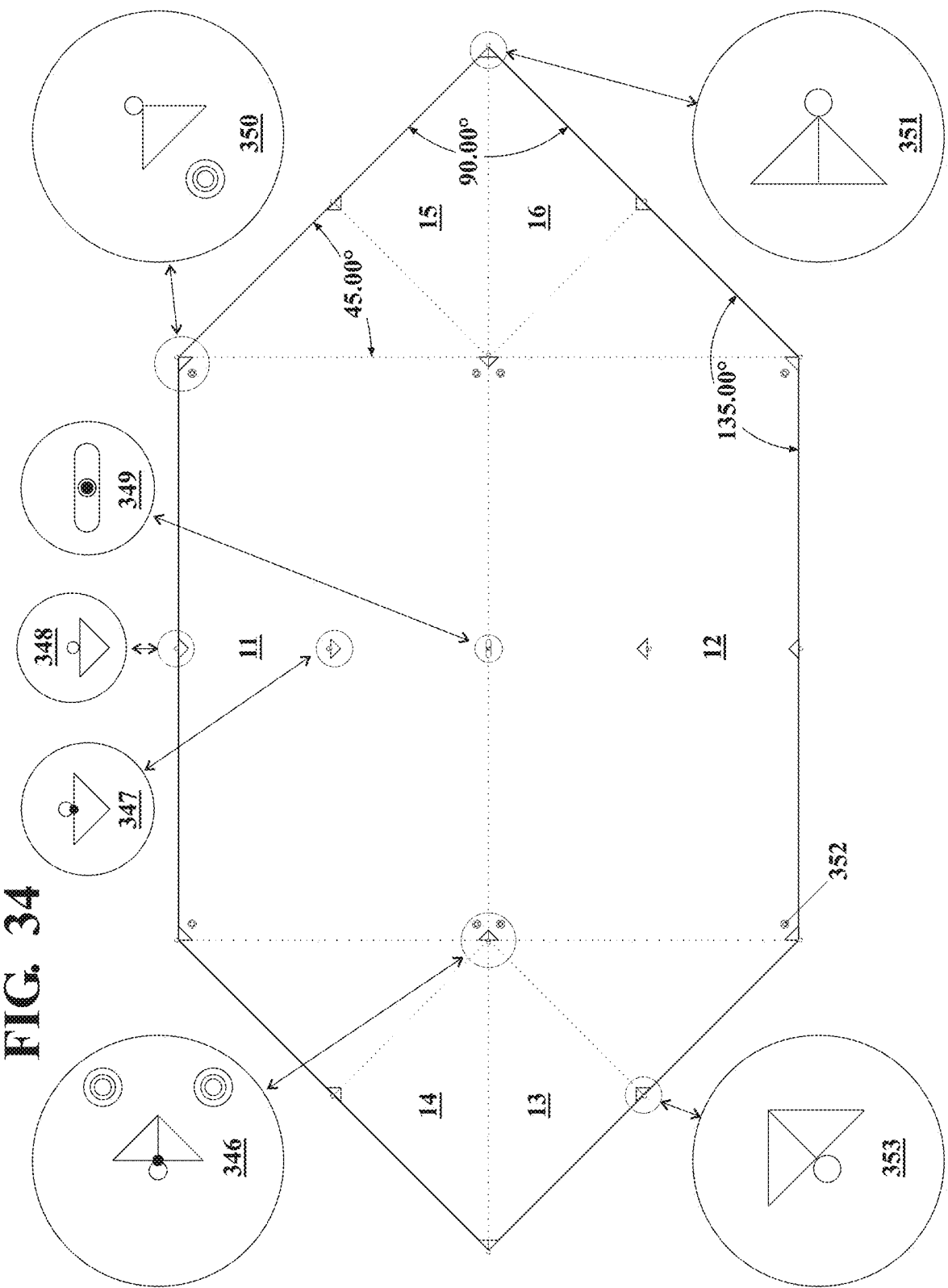
FIG. 34 shows a top view of a single awning tent shelter coupled with anchor apparatus that can be coupled with ridged or flexible duct or other accessories.

Referring to FIG. 34, the tent shelter as shown in FIG. 1C includes peripheral anchor attachment points coupled to anchor apparatuses 348, 350, 351 and 353 having an anchor member like a split ring attached to it to allow other articles of manufacture to pass through to be anchored. The tent shelter is coupled with anchor apparatus 352 like a grommet, which can be coupled with a ridged or flexible duct or other accessories. The tent shelter has interior anchors 346, 347, and 349 having a solid circular portion where another shelter or preferable accessory can be coupled. The circular portions in the interior apparatuses 346, 347, and 349 can also allow a paracord to pass through from the exterior to the interior or to be anchored with another tent shelter to form a pocket tent. Anchor apparatus 346 is used in place of anchor apparatus 30 in FIG. 1C. The interior anchor apparatus' circular portion shown with anchor apparatus 346 has a coupler material manipulation line that is a preferred location for one of two ridge line openings that allow the shelter to be pitched between two anchor attachment points with paracord or similar cordage to support the interior of the ridge line and anchor to two exterior anchor points. It also preferable to have a drip preventer locking device that is coupled with a cordage and the shelter. It is preferable to couple a weather proof device with the opening that will provide a weather proof chase for paracord, similar cordage or cable. An anchor apparatus 350 includes a portion like a grommet that can be coupled to the tent material for coupling insulation panels or to other tent accessories. Anchor apparatus 350 also has a simple anchoring apparatus for anchoring the tent shelter to another tent or to the ground using a stake and a split ring.

Figure 35:
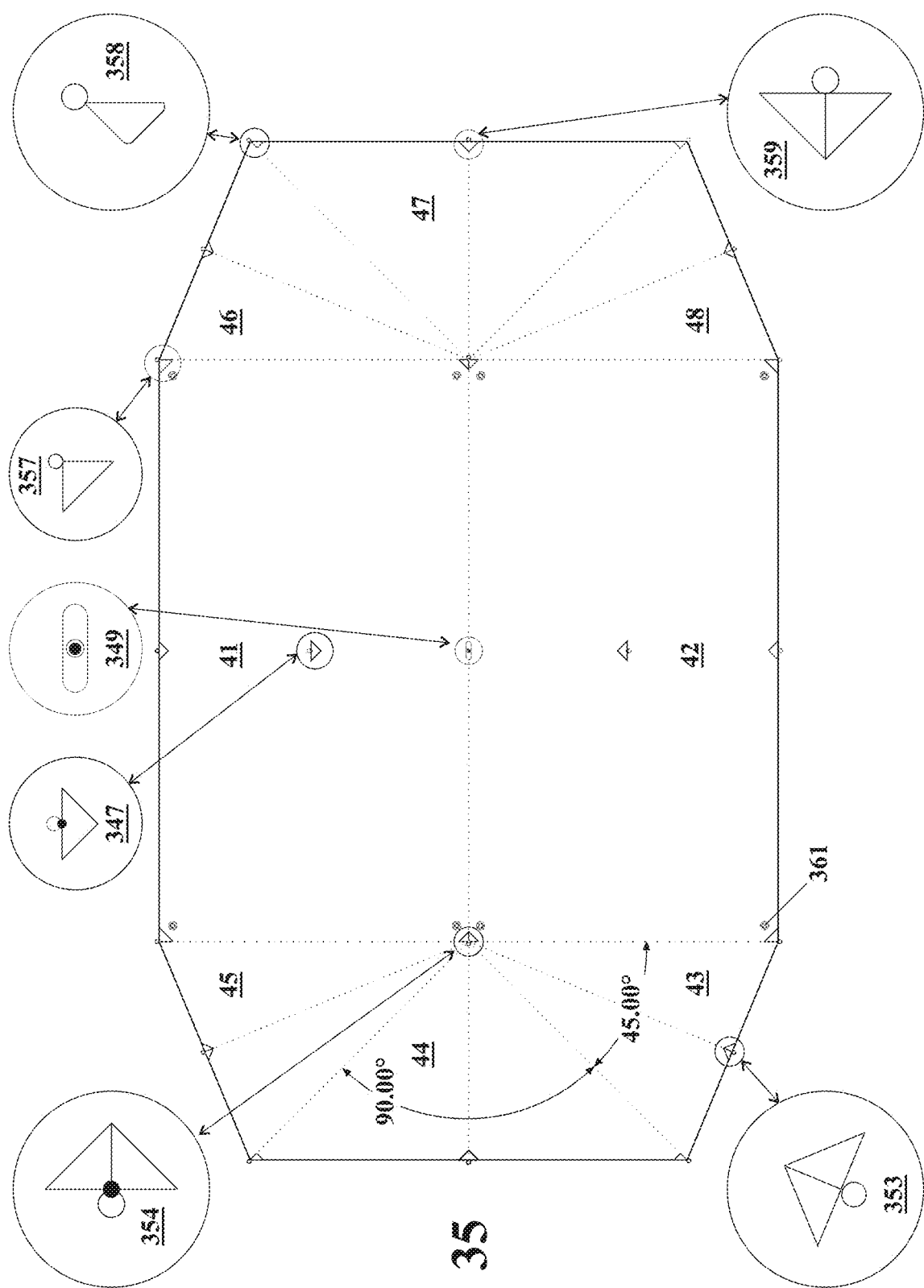
FIG. 35 shows a top view of a double awning tent shelter coupled with anchor an apparatus that can be coupled with a ridged or flexible duct or other accessories.

Referring to FIG. 35, the tent shelter as shown in FIG. 2 includes anchor attachment points coupled to anchor apparatus 357, 358, 359, and 353 having an anchor member like a spilt ring or other means of coupling that allow other articles of manufacture to pass through or be anchored. The tent shelter is coupled with anchor apparatus 361 which couples with a ridged or flexible duct or other accessories. The tent shelter has interior anchors 354, 347, and 349 to allow another shelter to be coupled with it through the anchors' solid circular portion. The interior anchors 354, 347, and 349 circular portion allows a paracord to pass through it from the exterior to the interior or to be anchored. The circular portion of interior anchor apparatus has a coupler material manipulation line that is a preferred location for one of two ridge line openings that allow the shelter to be pitched between two anchor attachment points with paracord or similar cordage. It is also preferable to have a drip preventer locking device that is coupled with the cordage and the shelter. The anchor apparatus shown represents any anchor apparatus that is preferable when considering all of the other materials that make up the total shelter.

FIG. 35 also shows an opening on the ridge line so that a paracord, similar cordage or cable can be used to support the interior of the shelter and anchor to two exterior anchor attachment points. It is preferable to couple a weather proof device with the opening of the ridge line that will provide a weather proof chase for paracord, similar cordage or cable.

Figure 36:
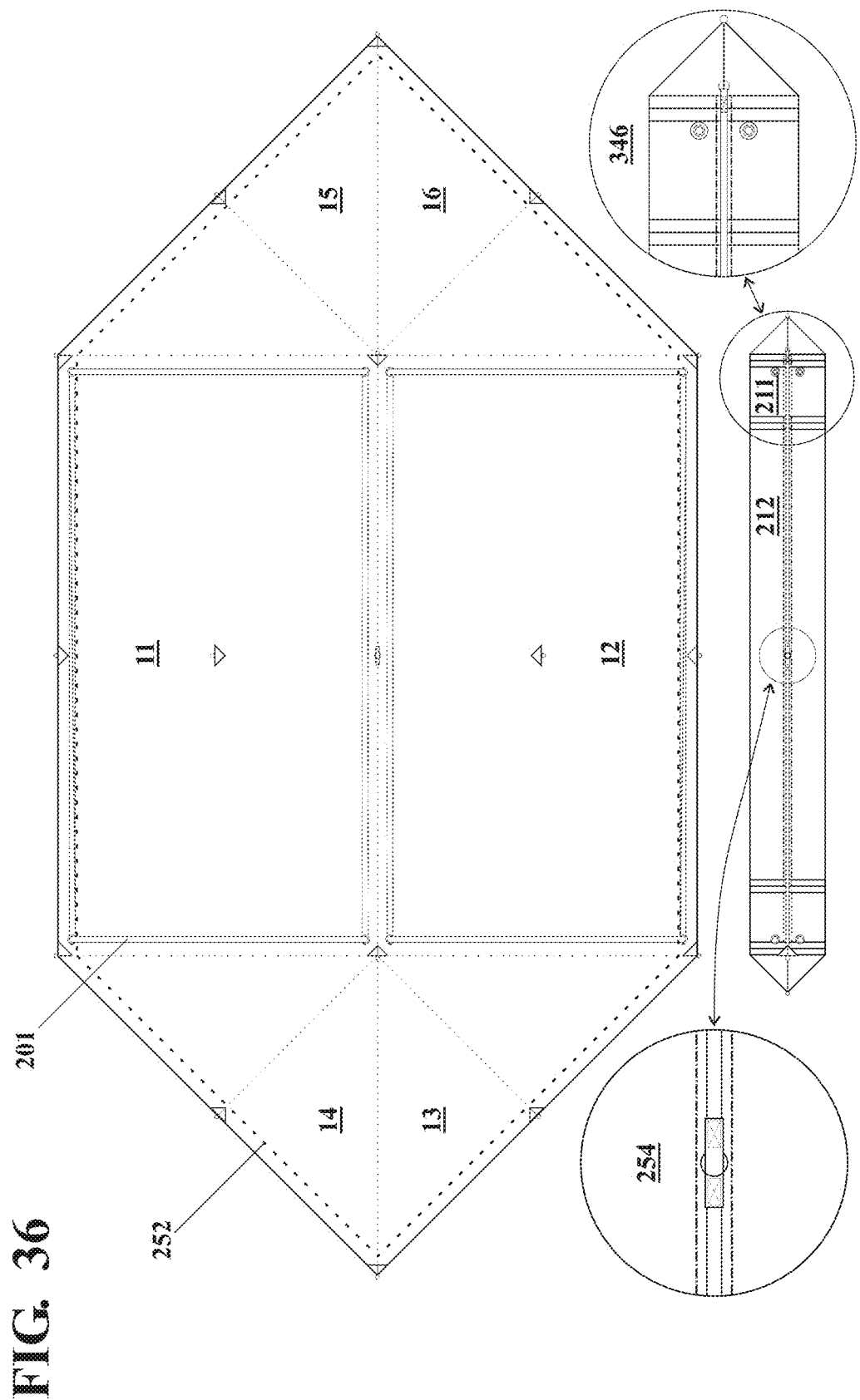
FIG. 36 shows a top view of a single awning tent shelter coupled with an anchor apparatus that is coupled with a ridged or flexible duct or other accessories.

Referring to FIG. 36, the tent shelter as shown in FIG. 1C is coupled with an anchor apparatus, which is coupled with a rigid or flexible duct 201 or other accessories. FIG. 36 also shows means of coupling 252 used to couple to a second shelter or shelter accessories. Anchor apparatuses 346, and 254 represent any anchor apparatus that is preferable when considering all of the other materials that make up the total shelter.

Figure 37:
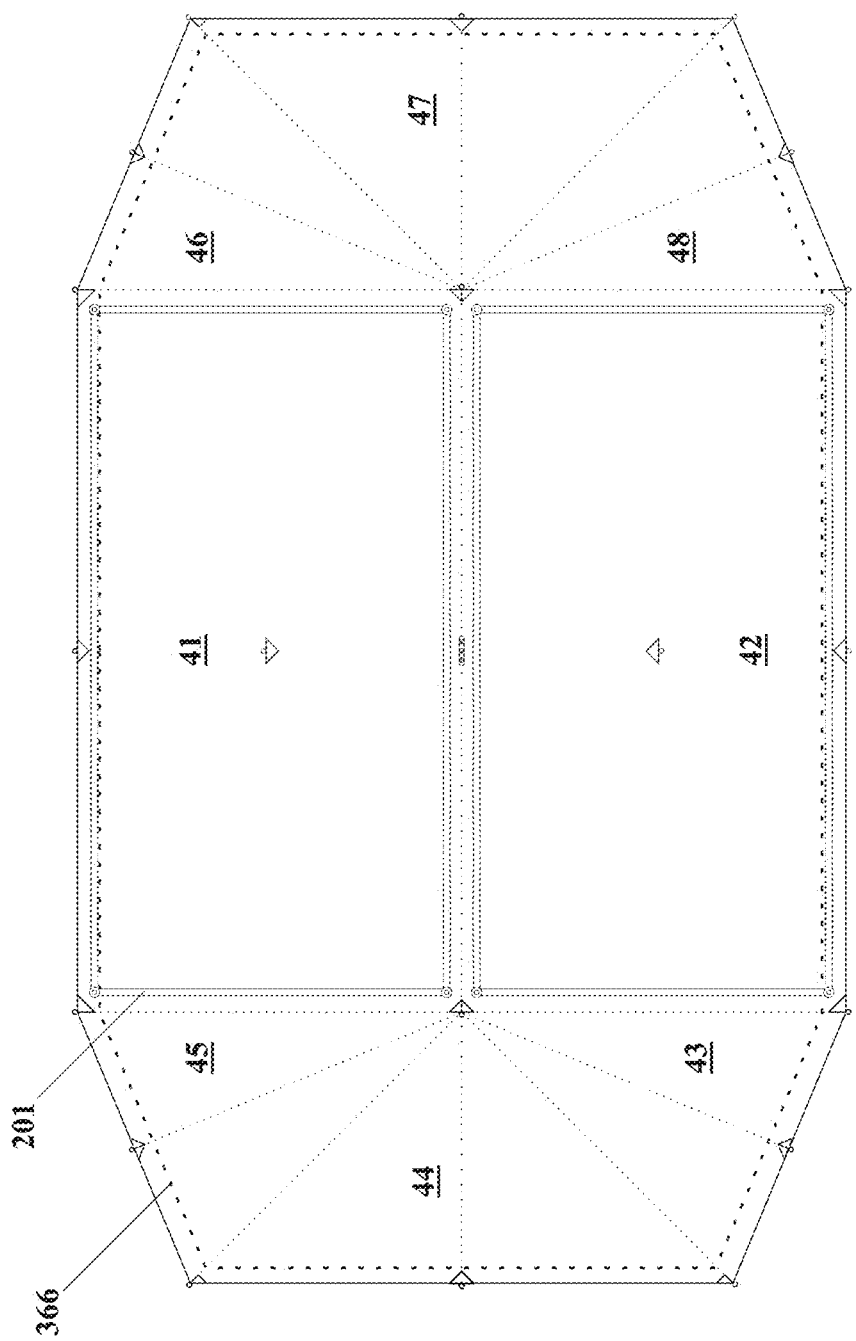
FIG. 37 shows a top view of a double awning tent shelter coupled with an anchor apparatus that is coupled with a ridged or flexible duct or other accessories.

Referring to FIG. 37, the tent shelter as shown in FIG. 2 is coupled with an anchor apparatus, which is coupled with a rigid or flexible duct 201 or other accessories. FIG. 37 also shows a means of coupling 366 to a second shelter or shelter accessories.

Figure 38:
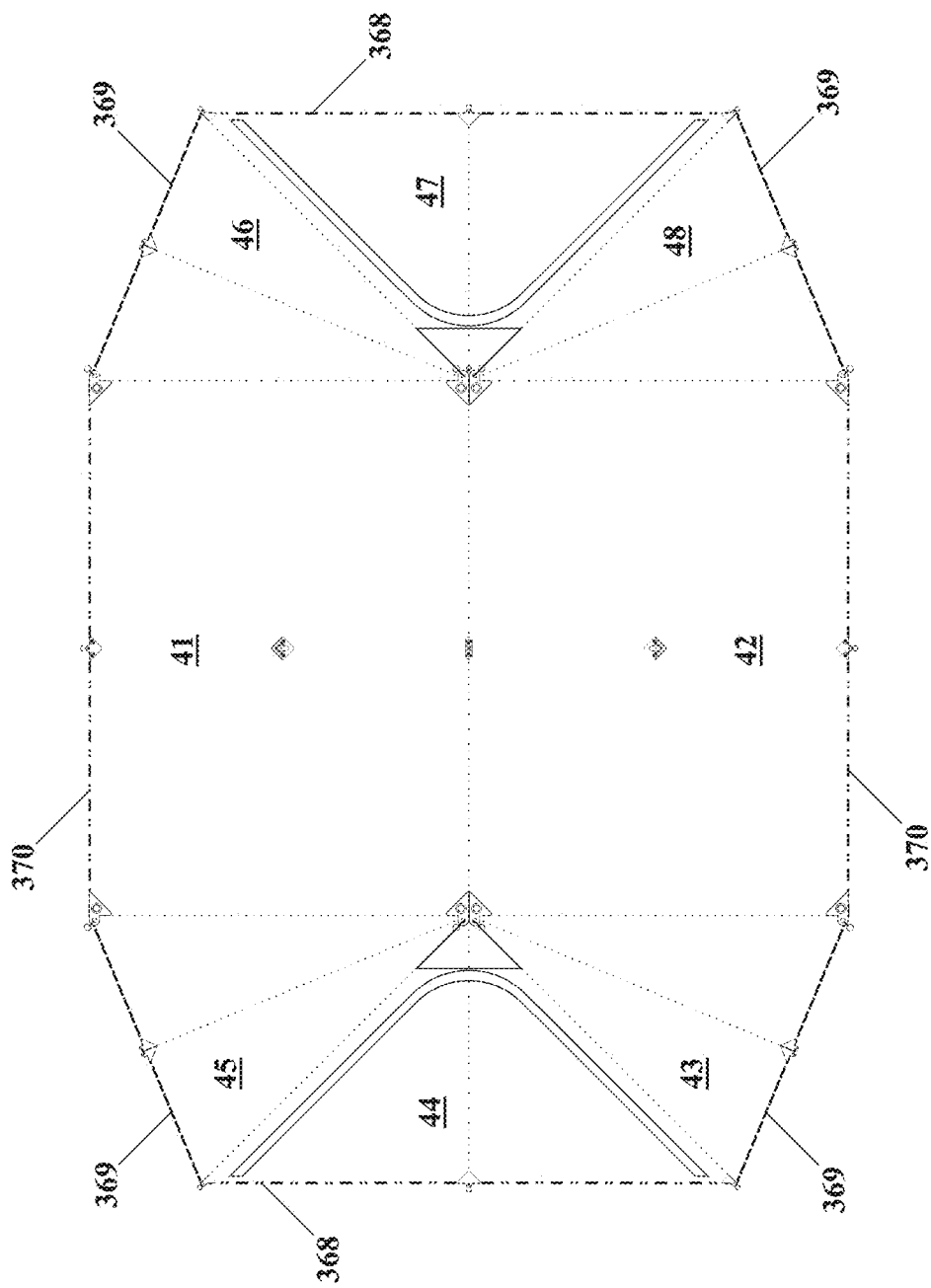
FIG. 38 shows a perspective view of a double awning tent shelter coupled with an anchor apparatus that can be coupled with a square bottom accessory.

Referring to FIG. 38, the tent shelter as shown in FIG. 2 is coupled with a square bottom accessory through different options of means of coupling, for example zippers, buttons, or snaps 368, 369, and 370. Means of coupling 368 can be different means of coupling than 369 and 370.

Figure 39:
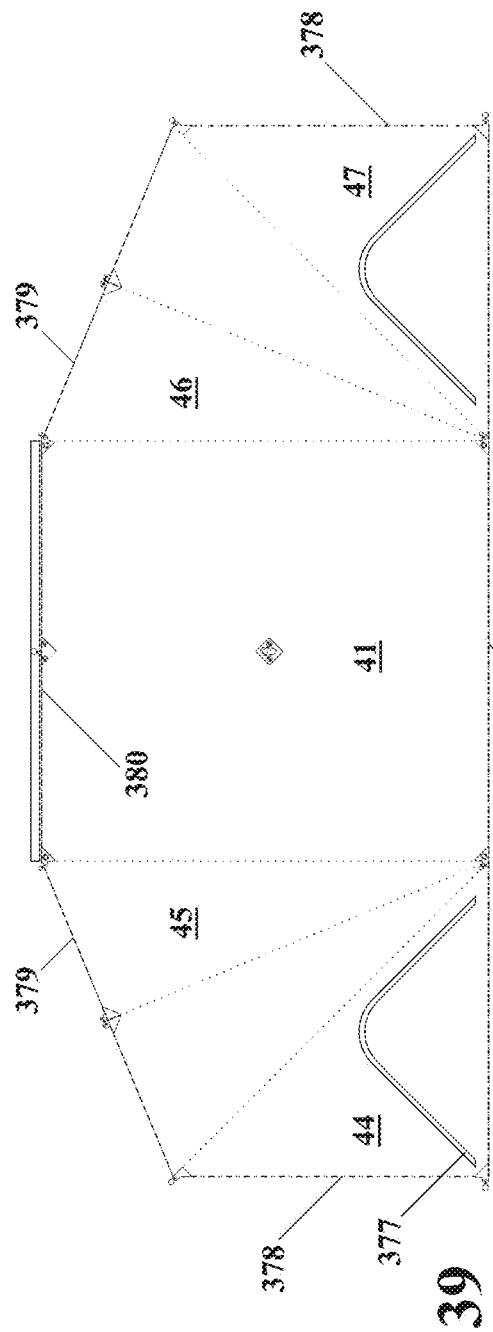
FIG. 39 shows a top view of one-half of double awning tent shelter in a position to be coupled to a shelter ridge fly.
Figure 42:
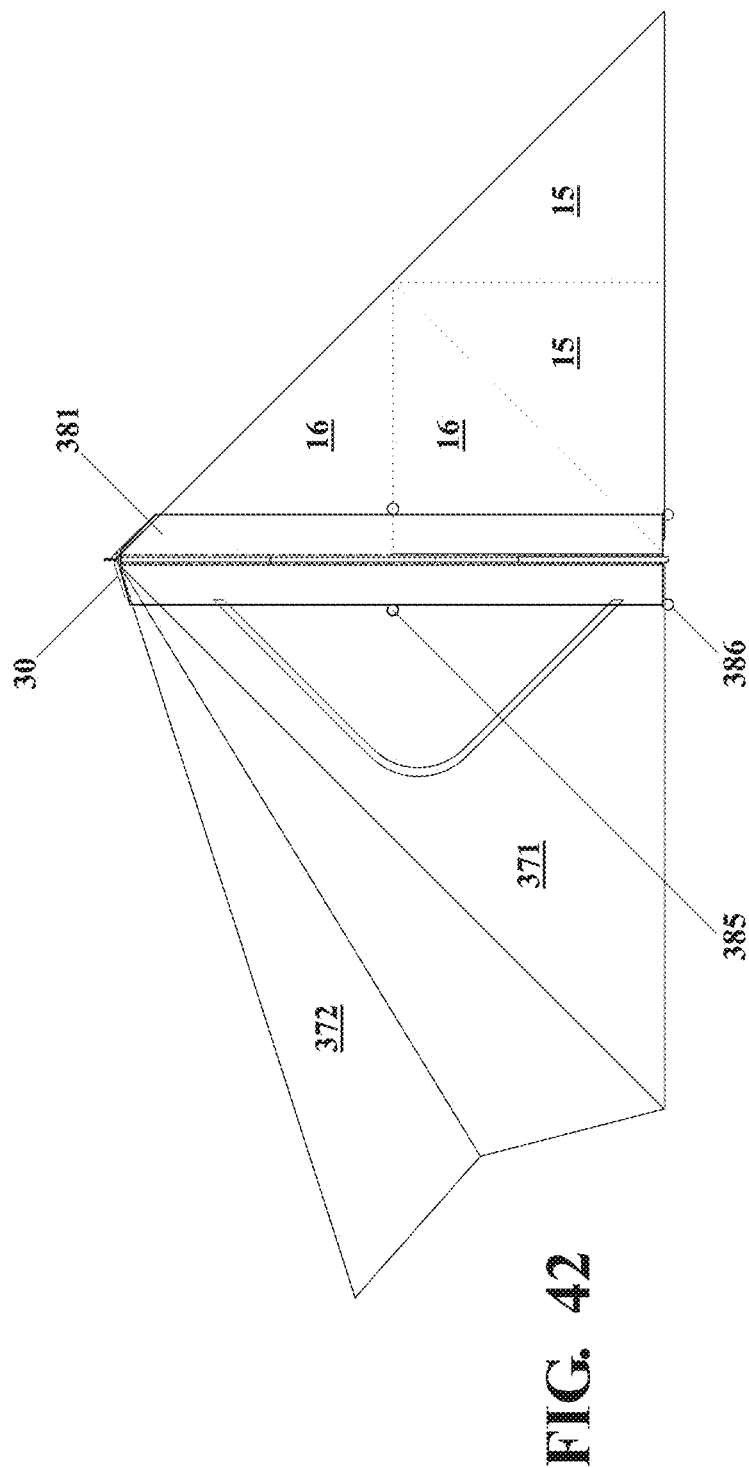
FIG. 42 shows a perspective view of a half double awning tent shelter coupled with a shelter ridge fly that is coupled with a single awning shelter by an anchor apparatus.

Referring to FIG. 39, shows half of the tent shelter as shown in FIG. 2 having portions 44, 45, 46 and 47. The tent shelter has a means of coupling 376 that is coupled to a shelter ridge fly means of coupling 383 as shown in FIG. 42. A door 377 is coupled to portion 44. The peripheral edge coupling means 378, 379 and 380 are also shown.

Figure 40:
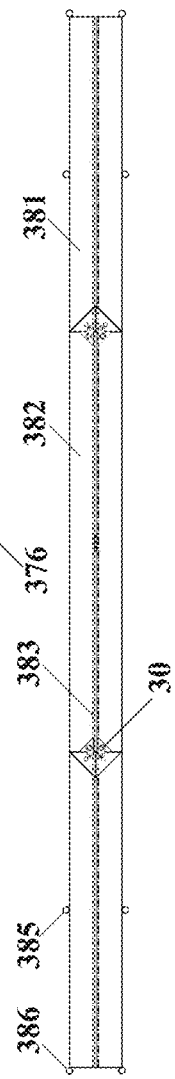
FIG. 40 shows a perspective view of a vertical weather fly flap that is deployed and coupled with anchor apparatuses.

Referring to FIG. 40, a shelter ridge fly accessory includes a vertical weather fly flap 381 (also 211 where it is folded and stored as shown in FIG. 19) that is fully deployed and coupled with a shelter by a means of coupling 383 (as shown in FIGS. 19, 20, and 21). The vertical fly flap 381 may provide additional weather resistance to the interior of the shelter by connecting to a tent shelter by means of coupling 383 (also 213 in FIG. 19). A vertical weather fly flap 381 has anchor points 385 and 386 shown with a simple circle symbol for an anchor point that is coupled to an anchor apparatus 30 as shown in FIG. 2. A ridge weather fly flap 382 (also 212 in FIG. 19) that provides additional weather resistance to the interior of the shelter.

Figure 41:
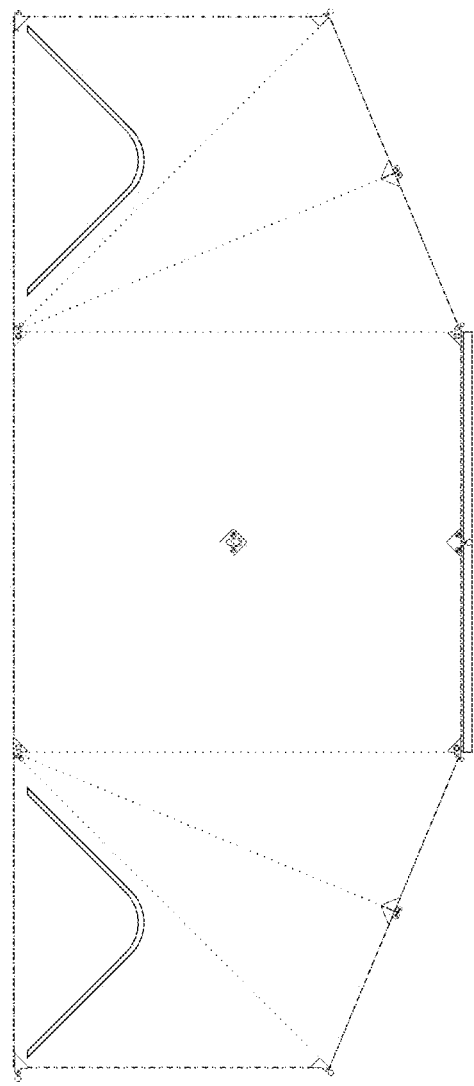
FIG. 41 shows a top view of a shelter fly fully deployed between two half double awning shelters.

Referring to FIG. 41, a half of the tent shelter as shown in detail in FIG. 39 that has been rotated 180 degrees so that it will be shown in a position that may allow it to be coupled with FIG. 40 through means of coupling 376 to means of coupling 383 of the shelter ridge fly accessory.

Referring to FIG. 42, a tent shelter as shown in FIG. 1C and a half tent shelter as shown in FIG. 2 can be coupled together by using a shelter ridge fly accessory shown in FIG. 40 that is coupled with a single awning shelter by coupling means 383 (not shown). An anchor apparatus 30 is coupled to means of coupling 383 of the shelter ridge flab 381 to hold the tent shelters in place.

Figure 43:
FIG. 43 shows a perspective view of a tent shelter ridge fly that is coupled with or pitched with the shelter top.
Figure 45:
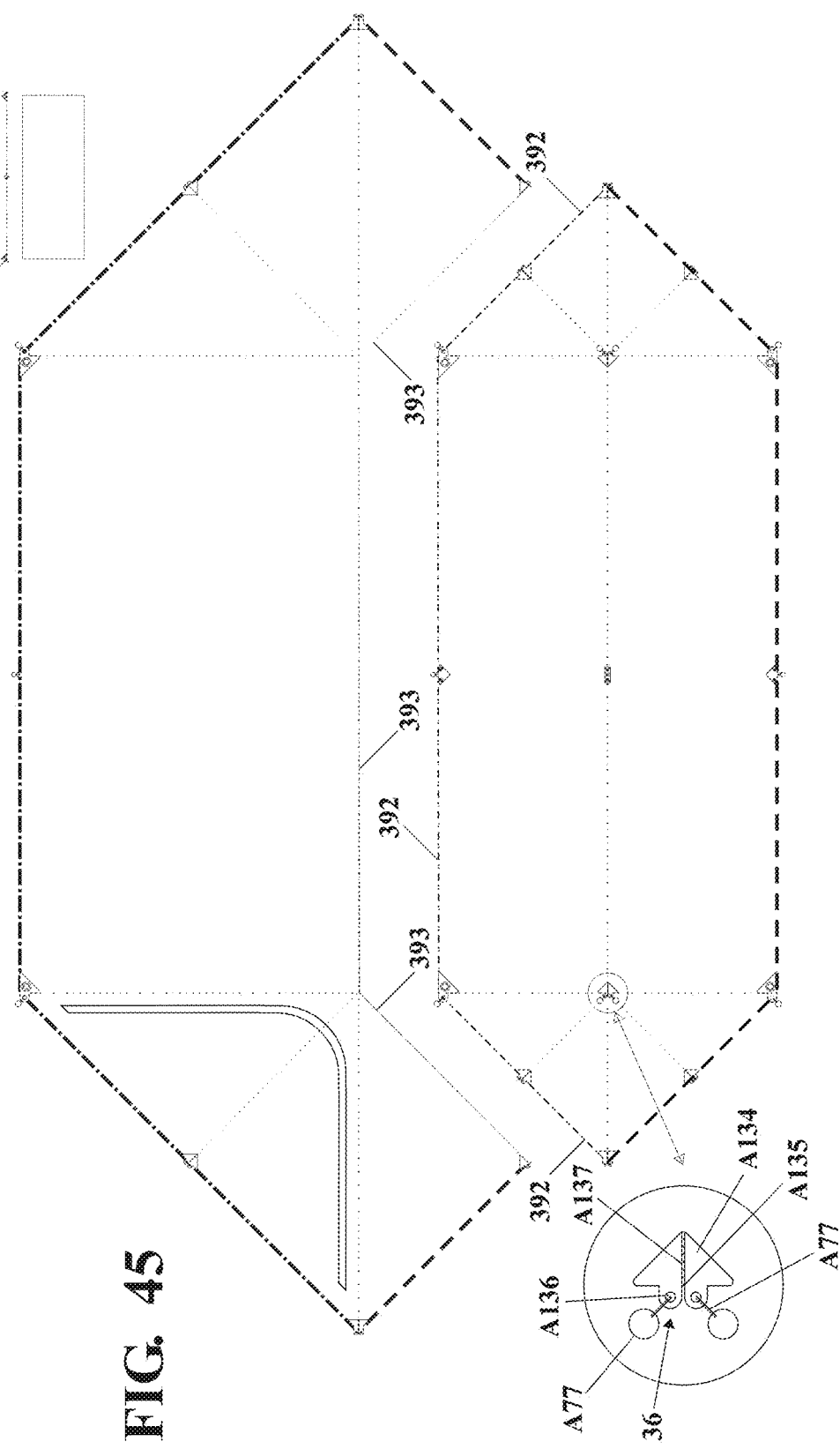
FIG. 45 shows a top view of a tent shelter having a portion uncoupled that used as a tent shelter.

Referring to FIG. 43, a shelter ridge fly is shown coupled with or pitched with the shelter top as shown in FIG. 45.

Figure 44:
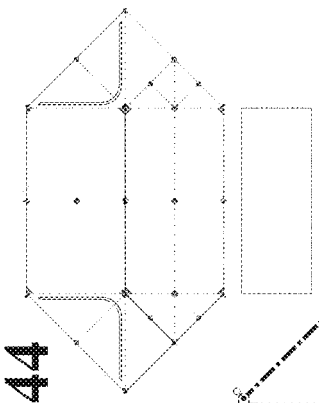
FIG. 44 shows a top view of a single awning shelter coupled to other shelter accessories by coupling means, and a bottom that can be coupled with the portion to be uncoupled.

Referring to FIG. 44, a tent shelter is shown having a portion uncoupled that is used as a shelter and replaced with a rectangular panel accessary as a shelter bottom for the uncoupled shelter.

Referring to FIG. 45, a tent shelter is coupled to other shelter accessories by coupling means (for example a zipper, a snap or a hook-and-loop fastener) 392 and 393. This shelter has a part of itself uncoupled so that a bottom or side panel accessory that is shown as a rectangle on the bottom of FIG. 44 takes its place and can be coupled to the shelter. The shelter would then become one-half of an open bottom vestibule. A full open bottom vestibule can be pitched with multiple single awning shelters. It may be preferable to add weather flaps where shelters and accessories meet to provide additional protection to the tent shelter interior spaces. The uncoupled part having an anchor apparatus 36 as seen in FIG. 1C would function as a ridge line anchor apparatus when this portion of a shelter is uncoupled and pitched so that it can be manipulated into preferable shapes.

Referring to FIG. 46, two shelters are coupled together with two side panel/floor bottoms shelter accessories as shown in FIG. 47 (also FIG. 53). A portion of a shelter 395 may be uncoupled and deployed and then coupled to a portion of a shelter or to be used as a shelter bottom. The portion 395 is disclosed in more detail in FIG. 53. The portions are coupled by means of coupling (for example a zipper, a snap, or a hook-and-loop fastener) 396, 397, 398. An anchor apparatus 399 may be preferable to be coupled with another shelter. Depending on the preference, the four portions can be coupled together to form a large single awning.

Referring to FIG. 47, two shelters are coupled together and coupled with two side panel/floor bottom shelter accessories as shown in FIG. 46 (also FIG. 53). FIG. 47 also shows multiple components that are coupled together to make a shelter. A shelter coupled with two side panels/floor bottoms deployed may form one-half of a bottomless vestibule.

Figure 48:
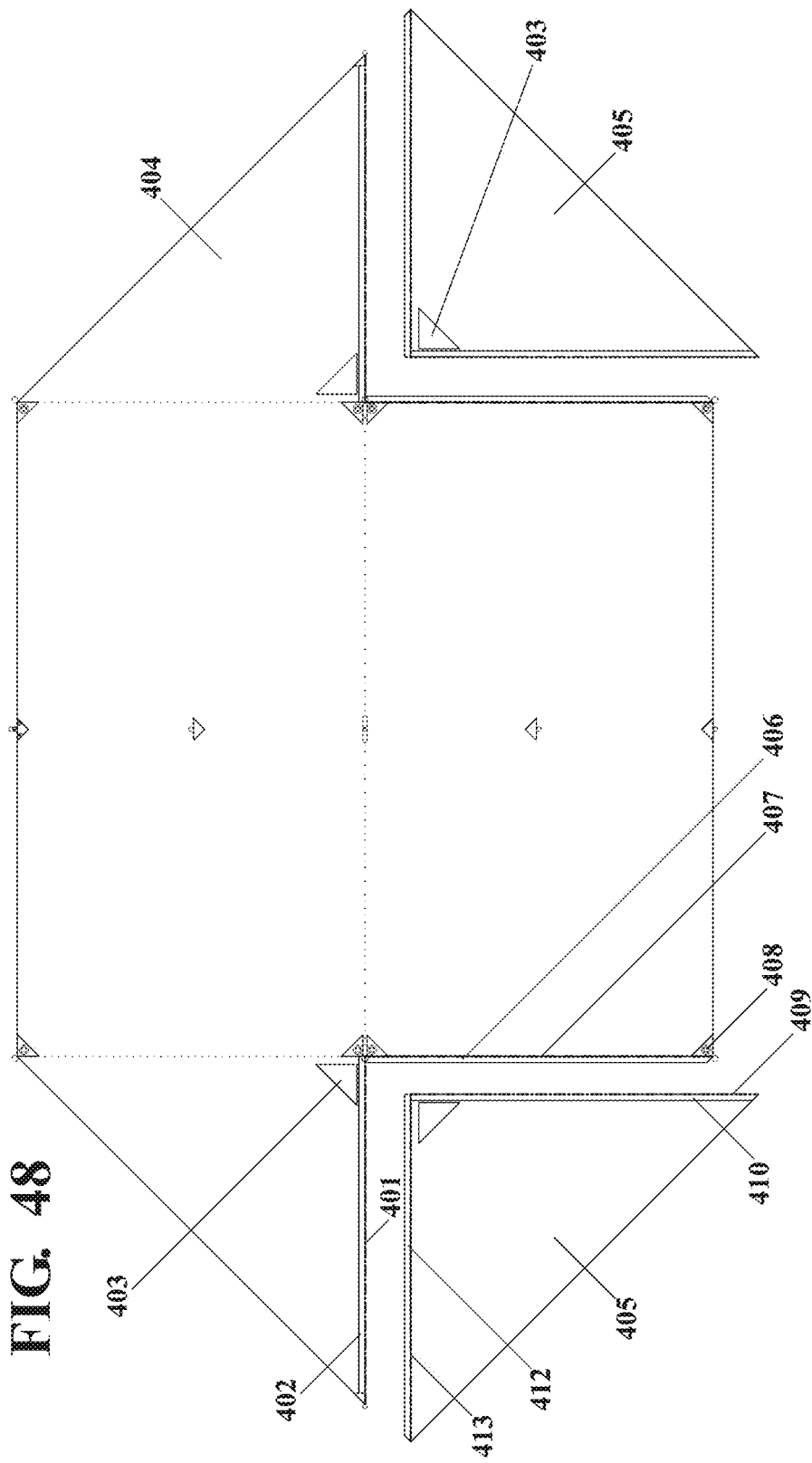
FIG. 48 shows a top view of the tent shelter insulated accessories that are coupled with a single or double awning tent shelter by a means of coupling.

Referring to FIG. 48, shelter insulated accessories 404 and 405 are made of a material that may have a heat reflective component. The shelter insulated accessories 404 and 405 are coupled with a single or double tent shelter (or with each other) by a means of coupling, for example a zipper 401 that is coupled to zipper 413, and zipper 407 that is coupled to zipper 409, or a hook-and-loop fastener means of coupling 406 that is coupled to 410, and 402 is coupled to 412. A vent 403 provides ventilation when an insulated accessory is pitched with a vented shelter. An anchor apparatus 408 may allow the insulated accessory to be coupled with an anchor apparatus of the shelter.

Figure 49:
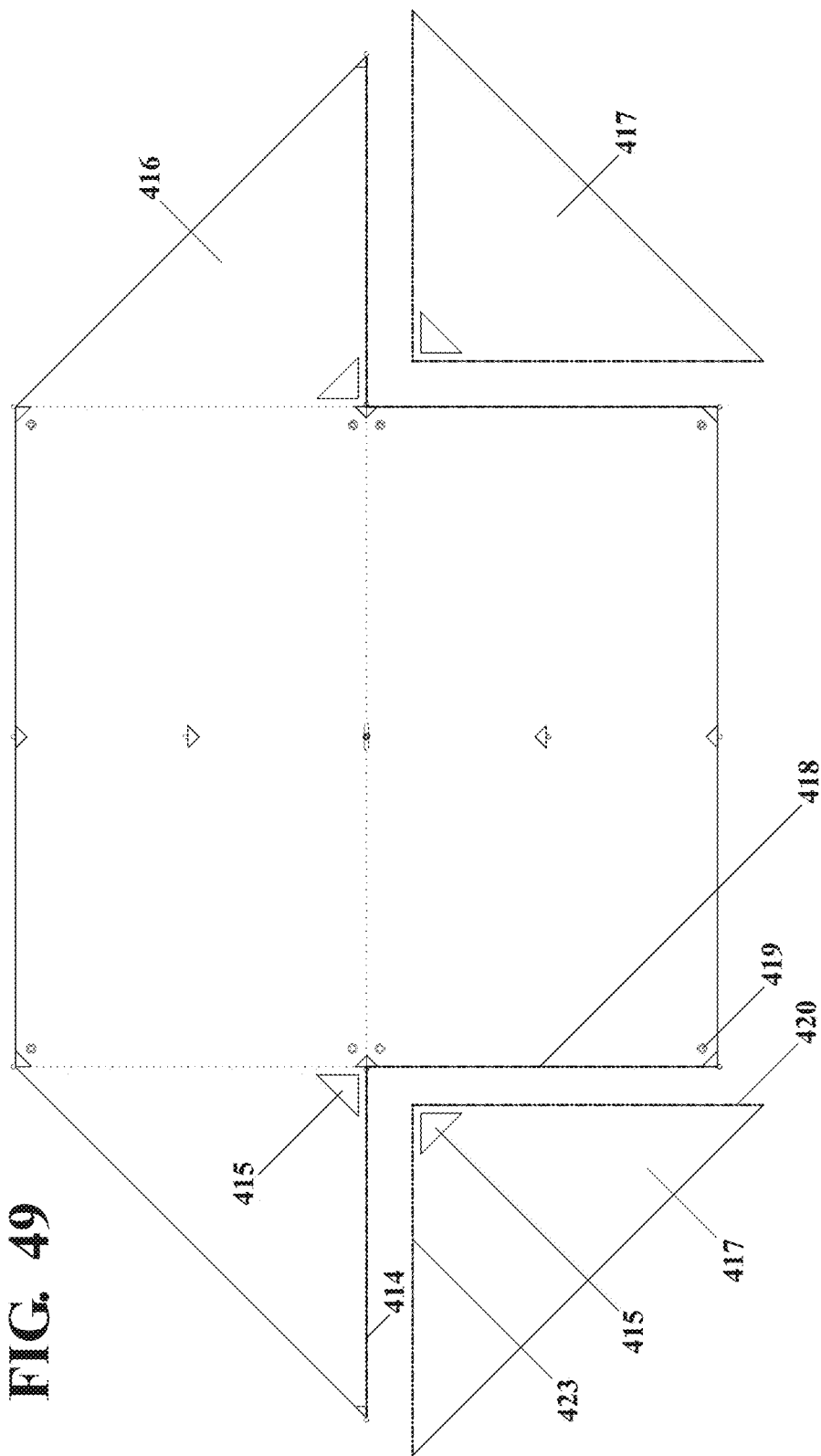
FIG. 49 shows a top view of shelter reflective accessories that are coupled with a single or double awning tent shelter by means of coupling.

Referring to FIG. 49, shelter reflective accessories 416 and 417 are coupled with a single or double tent shelter (or with each other) by means of coupling 414, 423, 420, and 418. An anchor apparatus 419 that may allow an insulated accessory to be coupled with an anchor apparatus of a tent shelter. A vent 415 will allow ventilation when pitched with a vented shelter.

Figure 50:
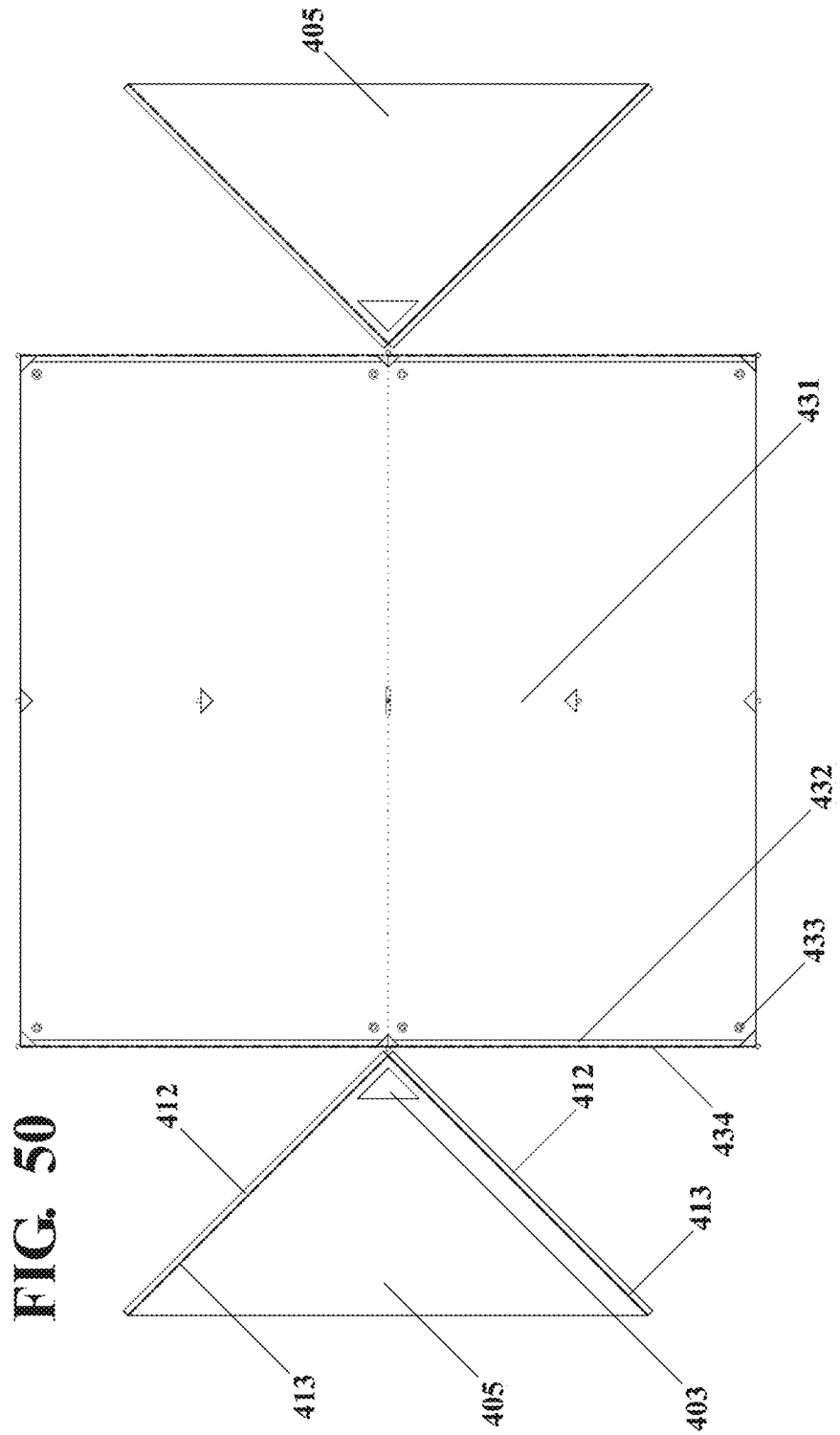
FIG. 50 shows a top view of shelter reflective insulated accessories that are coupled with a single or double awning tent shelter by means of coupling.

Referring to FIG. 50, shelter insulated accessories reflective material 405, and 431 are coupled with a single or double awning shelter. The shelter insulated accessories reflective material 405 has a means of coupling such as a hook-and-loop fastener 412, which is used to be coupled with a hook-and-loop fastener 432 of the shelter insulated accessories reflective material 431. The shelter insulated accessories reflective material 405 also has a means of coupling, for example a zipper 413, which is used to couple with a zipper 434 of the shelter insulated accessories reflective material 431. The shelter insulated accessories reflective material 405 also includes a vent 403, which will allow ventilation when pitched with a vented tent shelter. The shelter insulated accessories reflective material 431 has an anchor apparatus 433 which allows insulated accessory to be coupled with an anchor apparatus of the shelter.

Referring to FIG. 51, a bivy sack/shelter floor is laid flat having means of coupling 456 so that it can be coupled to itself, a shelter or other shelter accessories. A dotted line 457 shows where a folded edge would be if the bivy sack/shelter floor was coupled to itself.

A bivy sack/shelter floor also has a coupling means 459 which follows the outer shape of the bivy sack/shelter floor so that it can be coupled to the shelter.

An enlarged portion AA shows a coupling means 459 following the outer shape of the bivy sack/shelter floor so that it can be coupled to the shelter. A coupling means 460 is a means of coupling to itself. The coupling means 460 matches up with a coupling means 466 when folded and coupled together to form the desirable shape of a bivy sack as shown in FIG. 52.

An enlarged portion BB shows a coupling means 461, which is means of coupling to itself, and also a means of coupling to the shelter. The coupling means 461 and coupling means 463 are coupled together at the starting point of each coupling means. The coupling means 464 is a means of coupling to the shelter or a shelter accessory.

An enlarged portion CC shows a coupling means 465 following the outer shape of the bivy sack/shelter floor so that it can be coupled to a shelter or a shelter accessory and is also a means to couple with a second bivy sack/shelter floor. If two bivy sack/shelter floors were coupled together it would be similar to what is shown in FIG. 54. A coupling means 466 is a means of coupling to itself. And a coupling means 467 is a means of coupling to a shelter accessory.

An enlarged portion DD shows a coupling means 468 following the outer shape of the bivy sack/shelter floor so that it can be coupled to the shelter. A coupling means 469 is a means of coupling to itself. The coupling means 469 would match up with a coupling means 474 when folded and coupled together to form the desirable shape of a bivy sack.

An enlarged portion EE shows a coupling means 470, which is a means of coupling to itself, and it is also a means of coupling to the shelter. The coupling means 470 and coupling means 472 are coupled together at the starting point of each coupling means. A coupling means 473 is a means of coupling to the shelter or a shelter accessory.

An enlarged portion FF shows a coupling means 475 following the outer shape of the bivy sack/shelter floor so that it can be coupled to a shelter, and is also a means to couple with a second bivy sack/shelter floor. If two bivy sack/shelter floors were coupled together it is similar to what is shown in FIG. 54. A coupling means 474 is a means of coupling to itself and a coupling means 476 is a mean of coupling to a shelter accessory.

Referring to FIG. 52, a bivy sack/shelter floor 458 is in the preferred shape of a bivy sack. It may be desirable to put a sleeping bag inside it and keep the coupling partially open. If the preferred shape is as a bivy sack, it may be desirable to fill it with natural debris or other articles of manufacture that would provide additional comfort or insulation value if used as a mattress. The material of the bivy sack/shelter floor 458 may be water proof. The material may have heat reflection properties. A material may be selected that is preferable when considering all of the other materials that make up the total shelter.

Referring to FIG. 53, a side panel/floor bottom shelter accessory is deployed and laid flat. FIG. 53 also shows a portion of the tent shelter 395 as shown in FIG. 46. A coupling means 477 is a means of coupling to a shelter to form a larger shelter. A coupling means 478 is a means of coupling to two shelters as seen in FIG. 47. A manipulation line 479 (similar to manipulation line 21) represents an approximate fold in the material that will enable the shelter to be manipulated into desirable shapes. A coupling means 480 is a means of coupling to a shelter accessory, and is a means of coupling to a bivy sack/shelter floor. A coupling means 481 is a means of coupling to a shelter where the awning is coming down. A coupling means 482 is a means of coupling to a shelter as a bottom.

Referring to FIG. 54, a view looking down on a bath tub floor design shelter bottom or a wade pool that is coupled with a shelter made of a material 484 that is durable enough to be desirable as a membrane between the exterior ground/floor and interior of the shelter. The material may also be waterproof. A coupling means 483 is a means of coupling to a shelter, and a coupling means 485 is a means of coupling to a shelter or to a shelter accessory.

Referring to FIG. 55, a side view of a bath tub floor design is shown or a wade pool that coupled with a shelter. The coupling means 485 is a means of coupling to a shelter or to a shelter accessory. A standing edge 488 meets material 484 to create the bath tub.

Referring to FIG. 56, a tent shelter is shown flying. A side view of FIG. 57 is also shown in close proximity to the flying shelter showing a desirable shape that may be able to be coupled to a shelter. All manipulation lines are not shown.

Referring to FIG. 57, a view is shown looking down on a shelter hammock accessory having anchor attachment points that can be coupled with guy lines or is staked to the ground if pitched as a ground shelter. A coupling means 489 is a means to coupling to a shelter. A coupling means 490 is a means of coupling that can be uncoupled to be used as an entry door or uncoupled so that a no see through mesh panel may be exposed to provide ventilation. A coupling means 491 is a means of coupling that can be uncoupled to be used as an entry door or uncoupled so that a no see through mesh panel may be exposed to provide ventilation.

Figure 58:
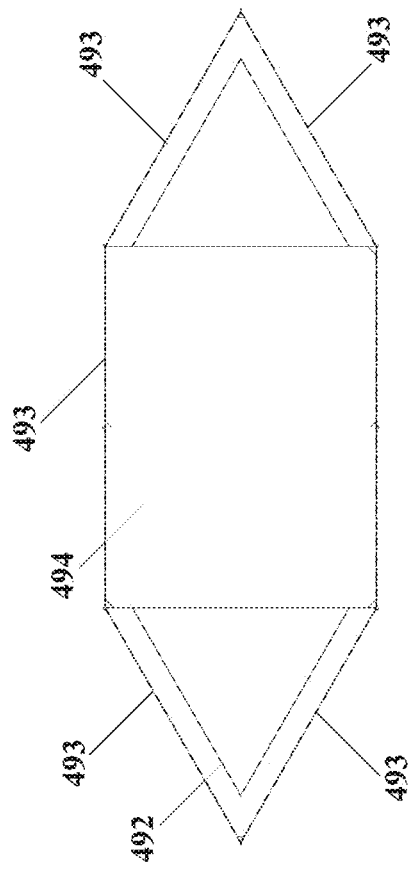
FIG. 58 shows a view looking down on a flying shelter bottom accessory.

Referring to FIG. 58, a view is shown looking down on a flying shelter bottom accessory having anchor points that can be coupled with guy lines or staked to the ground if pitched as a ground shelter. The bottom can be made of a material 494 that may be durable enough to be desirable as a membrane between the exterior ground/floor and interior of the shelter, and a material that may be waterproof. A coupling means 492 is a means of coupling that can be uncoupled to be used as an entry door or uncoupled so that a no see through mesh panel may be exposed to provide ventilation. The coupling means 493 is a means of coupling to the shelter.

Figure 59:
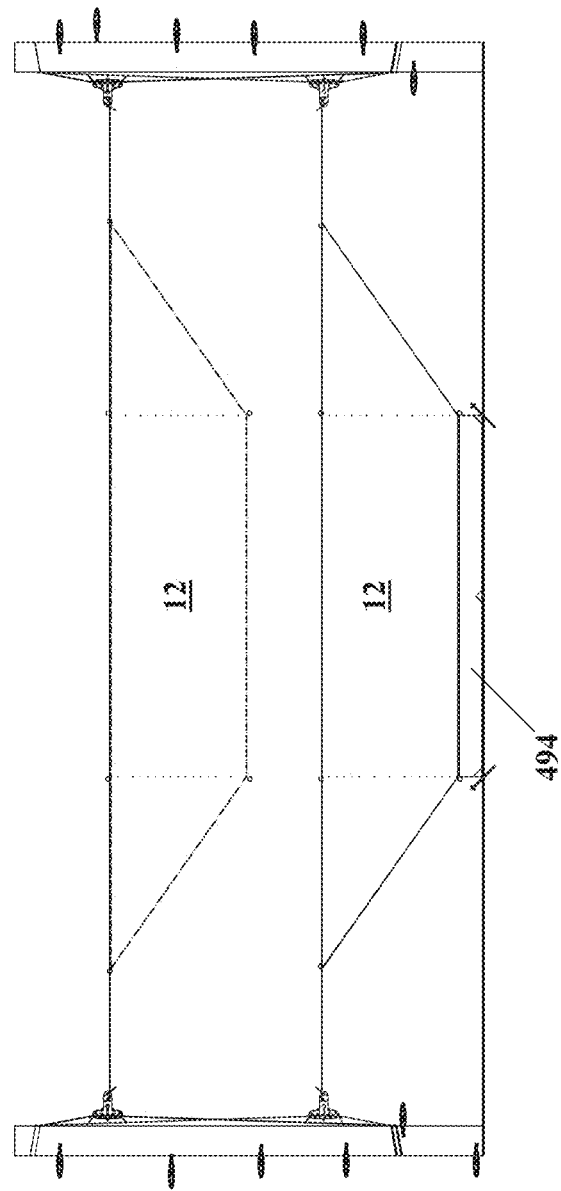
FIG. 59 shows a view looking down of a shelter pitched with a flying shelter bottom anchored to what may be the ground or a floor.

Referring to FIG. 59, a side view is shown of the tent shelter flying high enough to the ground, as described in FIGS. 7 and 8, pitched with a flying shelter bottom that is shown in FIG. 58 and anchored to what may be a ground or a floor. All manipulation lines are not shown.

Referring to FIG. 60, a shelter frame apparatus 601 coupled to a pole F159 is shown. The shelter apparatus 601 has a male take-down insert 606 and a female take-down insert 603. The female take-down insert 603 has an opening 604 that couples with the male portion 608 of the male take-down inserts 606. The female take-down insert has an insert shoulder 607 and the male take-down insert has an insert shoulder 609. A run-out shoulder 605 helps to keep the take down inserts centered with the shelter frame apparatus.

Referring to FIG. 60A, a shelter frame apparatus 616 including a female take down insert 603 coupled with a male take down insert 611 through means of coupling 611. The male take down insert has a hole 612 to couple to an opening of an anchor apparatuses in FIG. 1C. The hole 612 is used to couple with a single threaded flange 625 or a double threaded flange 620. The double threaded flange 620 includes a means of coupling 617, a neck 618 and a flange body 619. The single double flange 625 includes a means of coupling 621, a neck 622, a body 623 and a nut flange 624. The female take down insert is used to couple to a frame tent pole.

Referring to FIG. 61, a shelter simple hinge anchor apparatus 600 is shown that is also shown in more detail in FIG. 102.

Referring to FIG. 62, a shelter frame mechanical hinge anchor apparatus 602 is shown that is also shown in more detail in FIG. 106.

Referring to FIG. 63, a shelter frame 601 is shown with two females take-down inserts coupled together and connected by a double male take-down insert coupler 610.

Referring to FIG. 64, a weather resistant air flow vent apparatus 722 is shown in a closed position. A vent air flow apparatus 722 includes a sphere housing 723 having a neck with means of coupling 725 to couple to a tent shelter by inserting the means of couplings 725 into an opening A78 of anchor apparatuses 30 and 34 in FIG. 1C. The means of coupling 725 is coupled in place by a threaded nut 739 in FIG. 66A. A vent air flow apparatus adjustment connector 726 is connected to a vent air flow apparatus 722 that is connected to an anchor pivot point 724 for the vent air apparatus.

Referring to FIG. 65, a weather resistant vent is shown in an open position that is coupled to the tent shelter representing airflow 727 into and out of the vent apparatus.

Referring to FIGS. 66A and 66B, an LED light 733 is shown that may be coupled with the tent shelter and with the tent shelter accessories by coupling the LED light 733 to a coupler housing 735 that includes one-third turn means of coupling 734, and coupling the one-third turn means of coupling 734 to the coupler one-third twist compression fitting 728 having a housing 732. The one-third turn means of coupling 731 has a threaded nut 739 and a flexible O-ring 730. The threaded nut 739 will couple with a flexible O-ring 730 and the coupler housing 732.

Referring to FIG. 67, a means of coupling 736 is shown having a cap housing flange 738 that will be seated on an opening A78 of anchor apparatuses 30 and 34 in FIG. 1C or a grommet on the tent shelter material, and a cap housing 737 that will allow an awning pole end to be coupled to a tent anchor apparatus or a grommet for coupling with tent shelter.

Referring to FIG. 68, an opening plug anchor apparatus is shown that is coupled to the tent shelter or the tent shelter anchor apparatus that includes a plug flange 739 with a hole coupler 740 and a hole coupler mechanism 741.

Referring to FIG. 69, a stopper anchor apparatus is shown that has an anchor point 742 coupled with a split ring A77 or another anchor device and plug flange 744 with a hole coupler 745 that can be used to couple to an openings A78 of anchor apparatus 30 or any other tent openings.

Referring to FIG. 70, a curtain adaptor accessory is shown having a means of coupling 801 to couple to another tent shelter adaptor accessory, a means of coupling 802 to couple to the tent shelter expandable curtain, and a means of coupling 803 to couple to the tent shelter.

Referring to FIG. 71, a fully deployed tent shelter expandable curtain is shown coupled to the tent shelter through a means of coupling 805 and to the tent shelter bottom that may have a bathtub design through a means of coupling 809, and to another tent shelter expandable curtain through a means of coupling 812. The expandable curtain has two portions of no see through mesh fabric 804 that is lined with a weather flap 806 that will help to keep weather from the interior of the tent shelter, and a curtain bottom 810 made of a material preferably a material that is appropriately durable, along the curtain's peripheral edges. The curtain also has an anchor apparatus 811. The portions of the curtain are coupled together by means of coupling 807 and 808.

Referring to FIG. 72, a non-deployed curtain is shown having its portions coupled together 814 including a curtain top 813 and a curtain bottom 810, and an anchor apparatus 816.

Referring to FIG. 73, a tent shelter standard awning enclosure 851 is shown that can be coupled with the tent shelter through a means of coupling 829 and that it may also be coupled with the tent shelter bottom by a means of coupling 827.

The tent shelter standard enclosure 851 is made of a material that may be no see through mesh, clear plastic, vinyl, or any other preferable material 830 that extends at an angle of approximately 40.10 degrees 828. The enclosure has a weather flap 826 that will help to protect the interior of the tent shelter.

Referring to FIG. 74, the tent shelter standard awning enclosure 851 is shown coupled with the tent shelter. An awning support pole 850 (shown as an awning adjustment pole 182 in FIG. 11) is used to hold the awning in the desired position. The anchor apparatus (non-shown) that is coupled with the tent shelter will hold the bottom of the awning support pole in place. An awning pole shelter sleeve 223 (shown in FIG. 22) is also shown. The anchor apparatus, guy-lines and stakes that may be necessary for a preferred pitching are not shown.

Referring to FIG. 75, a tent shelter bottom 858 pitched with a tent shelter ridge frame apparatus 854 that is coupled to tent shelter frame poles 855 to form the A-frame tent shelter and to two tent shelter frame elevation apparatus 856 that are coupled to the tent shelter frame poles 855 and 857.

Referring to FIG. 76, a tent shelter ridge fly with one vertical weather fly flap 212 is fully deployed having anchor apparatuses 863 and 864 and another vertical flap 211 folded. The shelter ridge fly is coupled to the tent shelters by a double-sided zipper or by two anchor apparatuses 30 (as shown in FIG. 1C).

Referring to FIG. 77, two tent shelters are coupled with a tent shelter ridge fly with the vertical weather fly flap deployed and anchored.

Referring to FIG. 78, a material that is preferable for a window is coupled to coupling means 906.

Figure 90:
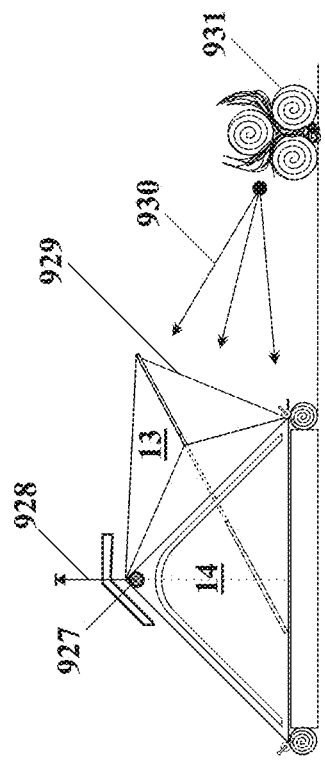
FIG. 90 shows a side view of the tent shelter poncho pitched from a single anchor point connected to a tent shelter ridge line pole.

Referring to FIG. 79, a hat that is worn by a person or used to protect from weather to shed off rain from an opening 909. The hat includes a hat rim flap 905, a hole 904 where a paracord may pass through for the purpose of pitching the shelter from above with the tent shelter frame pole supporting the ridge line of the tent shelter as shown in FIG. 90.

Referring to FIG. 80, a vent is coupled to a coupling means 906.

Referring to FIG. 81, a tent shelter as a poncho that is pitched in the same way as the tent shelter having an opening 909 that may allow a person to insert their head so as to wear the shelter as a poncho. It also has a means of coupling 906 to couple to the tent shelter accessories. A rectangle gray scale line 907 represents a variety of accessories that may create a weather flap around the opening 909. The lines 910 show the triangle ends and anchor apparatus of the tent shelter poncho manipulated and coupled in place so that a preferable shape of a rectangle may be formed. A pouch 908 can store the triangle end of a tent shelter poncho.

Referring to FIG. 82, a means of coupling around the opening 909 of the poncho that used for sealing the opening 909, include a channel fastener and channel fastener C46 attachment part C48, this means of coupling is explained in more detail in FIG. 173.

Referring to FIG. 83, a tent shelter hoodie provides some additional protection from weather for someone wearing it coupled with a tent shelter poncho.

Referring to FIG. 84, a tent shelter poncho weather flap 915 has an anchor apparatus 913 on its edges, and coupling means 912 to couple to the tent shelter poncho. The tent shelter poncho weather flap may also have a component that will allow it to perform with the tent shelter ridge line. FIG. 84 also shows a means of coupling 914 to the tent shelter poncho, and a hole 911 where a paracord passes through for the purpose of pitching the shelter from above with a tent shelter frame pole supporting the ridge of a tent shelter as shown in FIG. 90.

Referring to FIG. 85, a ball cap hoodie accessory is shown that can be coupled with a tent shelter poncho for protection.

Figures 86, 87, 88:
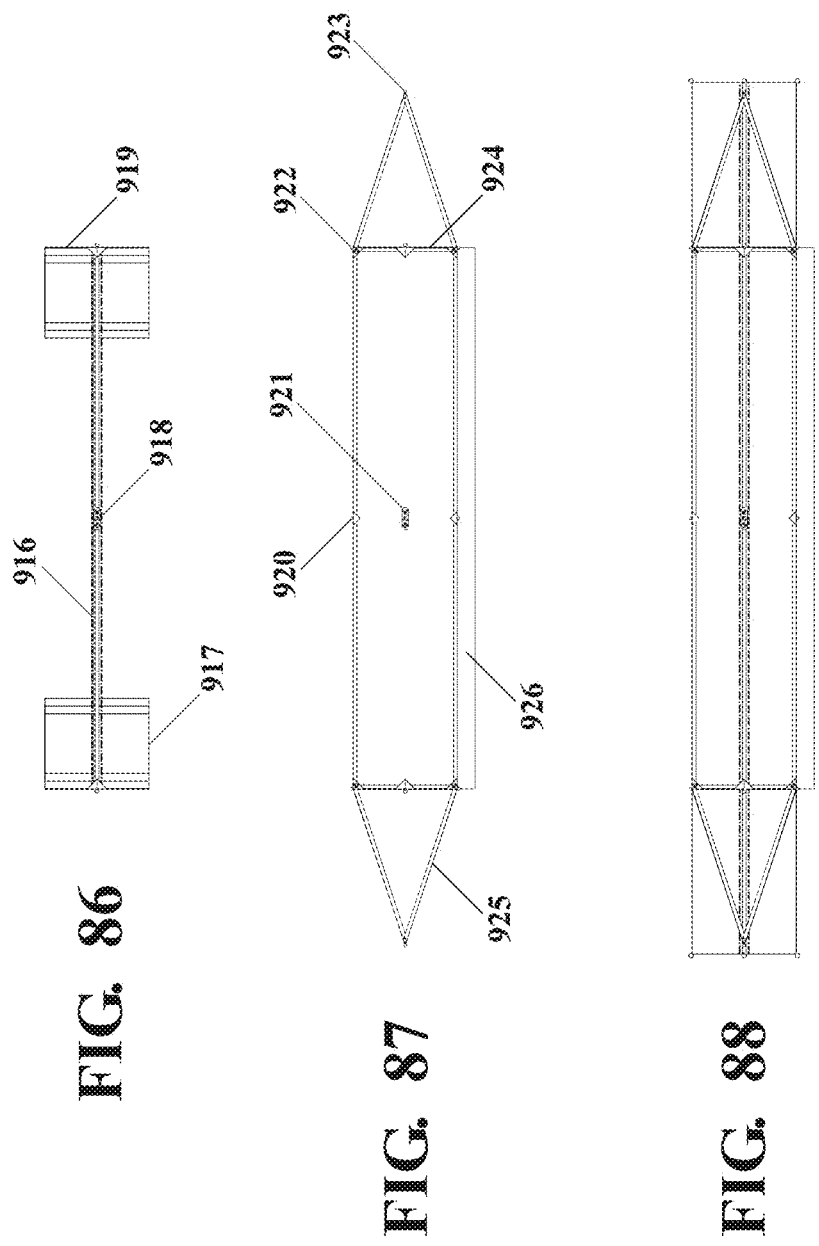
FIG. 86 shows a perspective view of a ridge coupler apparatus.
FIG. 87 shows a perspective view of a super awning enclosure.
FIG. 88 shows a top view of FIG. 86 coupled with FIG. 87 to form a tent shelter ridge super fly accessory coupled with two or more tent shelters.

Referring to FIG. 86, a ridge coupler apparatus provides the function of the ridge flap 212 shown in FIG. 19, and an expansion to the shelter having an anchor apparatus 918 and means of coupling 916 to couple with the tent shelter. FIG. 86 also shows a vertical weather fly flap 917 that is deployed and coupled with a shelter having a means of coupling 919 to couple to a means of coupling 924 as shown in FIG. 87.

This vertical weather fly flap may provide additional weather resistance to the interior of the shelter.

Referring to FIG. 87, a modified awning enclosure is shown as described in FIG. 73 including a weather flap 926 and anchor apparatuses 920, 921, 922 and 923. The awning enclosure also includes a means of coupling 924 that couples to a means of coupling 919, and a means of coupling 925 that couples to the tent shelter.

Referring to FIG. 88, a ridge coupler apparatus as shown in FIG. 86 is coupled with the awning enclosure (shown in FIG. 87) to form a shelter ridge super fly accessories coupled with two tent shelters to provide weather protection where two shelters are in the wedge position or to expand the space in a single shelter. The shelter ridge super fly accessory can also be coupled with other articles of manufacture that allow them to be coupled with the anchor apparatus of the tent shelter.

Figure 89:
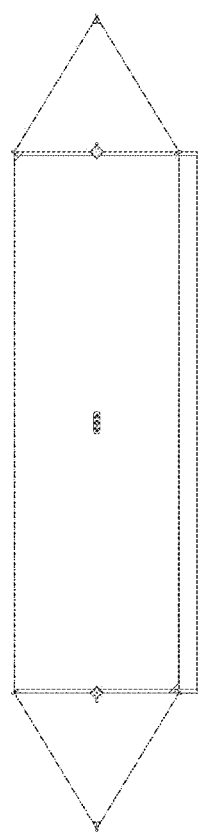
FIG. 89 shows a perspective view of a super awning enclosure that is made from material that allows radiate heat to pass through it while being resistant to heat.

Referring to FIG. 89, an awning enclosure as shown in FIG. 73 is made from material that allows radiate heat to pass through it while being resistant to heat.

Referring to FIG. 90, the tent shelter poncho is pitched from a single anchor point 928 above the tent shelter and connected to a tent shelter ridge line pole 927. The tent shelter poncho is anchored to deadfall trees with deadfall anchor nail and washer. The tent shelter poncho is coupled with an awning enclosure 929. FIG. 90 also shows a log fire 931 that is radiating heat 930 into the tent shelter poncho through the awning enclosure 929.

Figure 91:
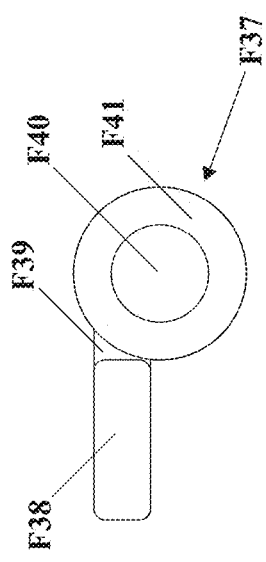
FIG. 91 shows a perspective view of a tent shelter simple hinge anchor apparatus with multiple anchor points.

Referring to FIG. 91, a tent shelter has a simple hinge anchor apparatus F37 having a means of coupling F38 to a tent shelter frame pole F159, and simple hinge F41 with simple hinge opening F40. The coupling means F38 and the simple hinge F41 are connected by a simple hinge neck F39. The means of coupling F38 and the simple hinge neck F39 are offset from the hinge opening F40 and the simple hinge F41 so that when coupled with tent frame poles F159 a position where the tent poles can be parallel to each other can be achieved (as shown in FIG. 119, the frame poles are coupled with an anchor apparatus in a fully closed position F157).

Figure 92:
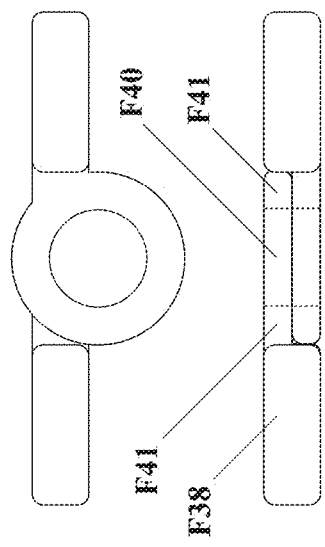
FIG. 92 shows a perspective view of two tent shelter simple hinge anchor apparatuses that are aligned and ready to be coupled together.

Referring to FIG. 92, two tent shelter simple hinge anchor apparatuses F37 are shown aligned and ready to be coupled together.

Figure 93:
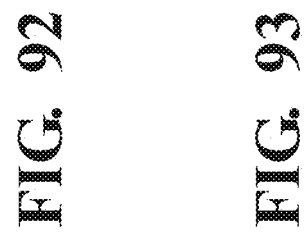
FIG. 93 shows a side view of two tent shelter simple hinge anchor apparatuses that are aligned and ready to be coupled together as shown in FIG. 92.
Figure 119:
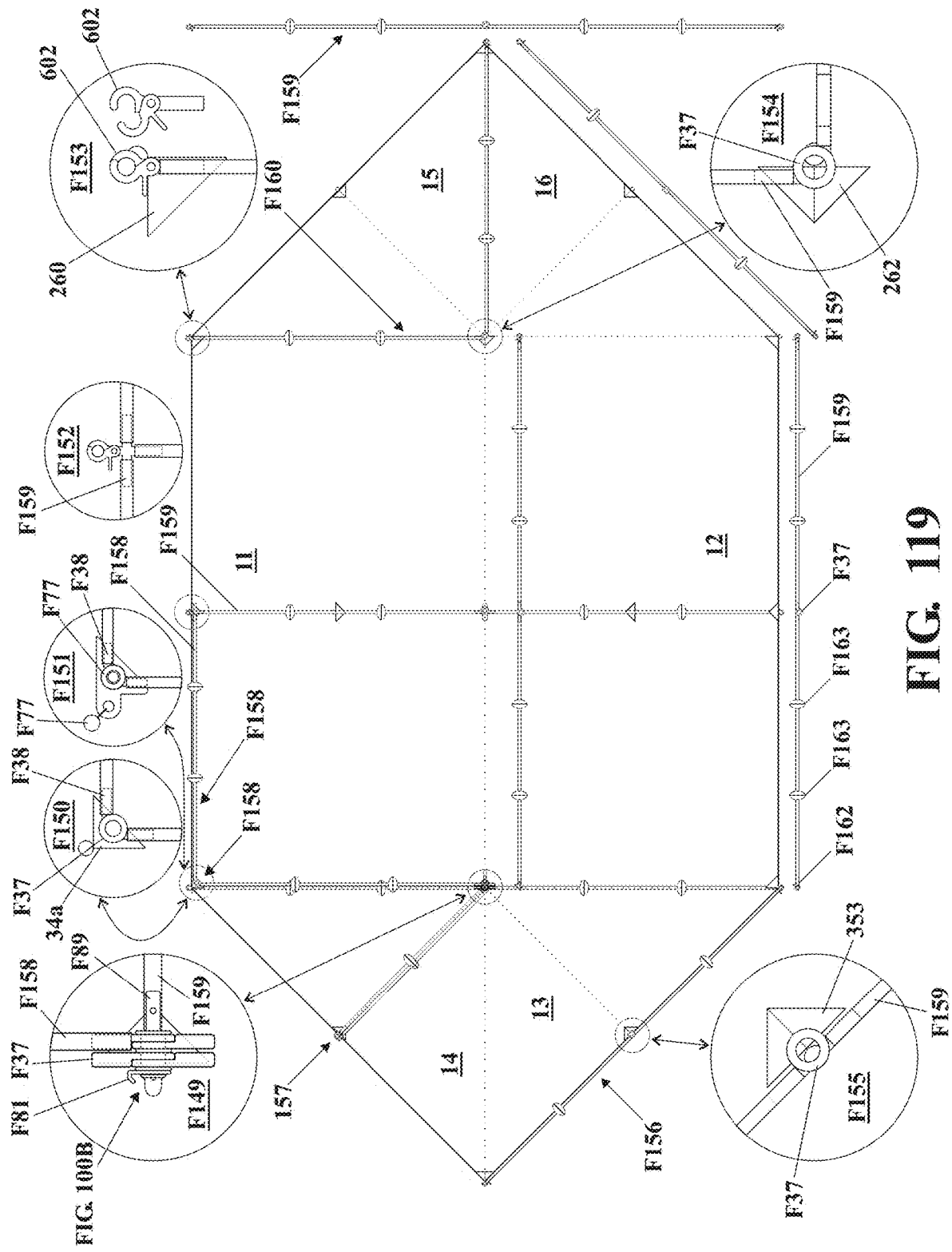

Referring to FIG. 93, two tents shelter simple hinge anchor apparatuses F37 as means of coupling to an anchor apparatus attached to the shelters shown is aligned and ready to be coupled together having a means of coupling F38 to a tent shelter frame pole F159 as shown in FIG. 119.

Figure 94:
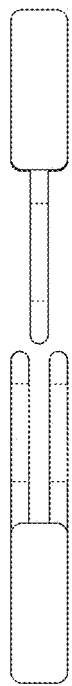
FIG. 94 shows another side view of FIG. 92 of two tent shelter simple hinge anchor apparatuses that are aligned and ready to be coupled together.

Referring to FIG. 94, two tent shelter simple hinges F37 are aligned similarly as shown in FIG. 93.

Referring to FIG. 95, two tents shelter simple hinges F37 are coupled together with a flange neck coupler F48 and a flange neck coupler washer F46. The flange neck coupler F48 has a flange neck coupler opening F47.

Referring to FIG. 96, a male flange neck coupler F53 and a female flange neck coupler F54 are coupling together two tents shelter simple hinges F37. The male flange neck coupler F53 includes a means of coupling F51 to the female flange neck coupler F54, and an opening F52 in the male flange neck coupler F53. The female flange neck coupler F54 has an opening F55, a neck F57 and a means of coupling F56 to the male flange neck coupler F53.

Referring to FIG. 97, simple hinge coupler components are shown including an LED light housing F58, a LED light flange F59, a means of coupling F60, a coupler tube with a means of coupling F61 on the interior and exterior of the tube, a spacer washer F62, a means of coupling F63, and means of coupling F64 to the shelter frame pole F159.

Referring to FIG. 98, it shows a view of FIG. 97 that is a coupler tube F61 with a means of coupling on the interior and exterior of the tube having a spacer washer F62.

Referring to FIG. 99, a coupler assembly is shown that couples four tent shelters with simple hinges F37 including a flange nut F67, a flange F68, a hook anchor washer F69, a hook anchor apparatus F70 coupled to the hook anchor washer F69, a hook anchor washer opening F71, and a spacer washer F72.

Referring to FIG. 100, an LED light coupler is shown including an LED light housing F91, an LED F92, a LED light flange F93, a coupler neck F94, and a coupler button F95 to couple the component as shown in FIG. 100A.

Referring to FIG. 100A, coupling components are shown including a hook anchor washer F81, a hook anchor apparatus F82 coupled to the hook anchor washer F81, a flange neck spacer F84, a flange neck F85. A means of coupling F89 has a flange neck button hole coupler F88 and a hole F90 that couples with item F95 to hold all the coupling components in place as shown in FIG. 100B. The means of coupling F89 is for coupling to a shelter frame pole F159 (not shown).

Referring to FIG. 100B, a coupled simple hinge assembly is made up from the components shown in FIGS. 100 and 100A.

Referring to 101, the tent shelter simple hinge anchor apparatus 600 is coupled with a tent shelter frame pole button hole insert F101.

Referring to FIG. 102, a tent shelter simple hinge anchor apparatus 600 has a simple hinge F96, a simple hinge opening F99 and means of coupling F97 and F98 to couple with a tent shelter frame pole button hole insert F101 to couple to a tent frame pole F159 (not shown).

Referring to FIG. 103, it shows a top view of the apparatus as shown in FIGS. 104 and 105 coupled together.

Referring to FIG. 104, a frame pole button hole insert F101 is shown including an insert neck housing F101a, a means of coupling F100 and an opening F104 that will couple with a button hole coupler as shown in FIG. 105. The button hole insert F101 is used to couple to a tent frame pole F159 (not shown). The button hole insert can also be used to couple to a pole for length adjustment through the button coupler F103 if the tent frame poles have multiple openings.

Referring to FIG. 105, a button hole coupler F102 is shown including a button coupler spring F102a and a button coupler F103.

Referring to FIG. 106, a tent shelter mechanical hinge anchor apparatus 602 is coupled with the tent shelter frame pole button hole insert F101 as shown in FIG. 104. A dotted line F105 illustrates the anchor apparatus open and close mechanism. The tent shelter mechanical hinge anchor apparatus 602 is shown in a closed position F106. The tent shelter mechanical hinge has a pivot point F108 and a simple hinge hook F107. The assembly of the mechanical hinge anchor apparatus 602 coupled with the tent shelter frame pole button hole insert F101 is used to couple with a tent frame pole and will be held in place by a flange F109 with a split ring anchor A77.

Referring to FIG. 107, a tent shelter male simple hinge F114 and a tent shelter female simple hinge F128 is shown. The male hinge includes a male hinge body F111 having a means of coupling F110 coupled. A means of coupling F112 couples the male hinge body F111 to the male's meaning of coupling F110. The male hinge body F111 also includes a 135-degree stopper F113, and a hole 115 for a hinge pin F125 to couple to it. The male's simple hinge F114 goes inside the slot between the two holes F116 in a female hinge for a hinge pin F125. The female simple hinge F128 has a hinge body F117 and a means of coupling F121. A female hinge body F117 coupled to a male take down insert F118 and a female take down insert F119.

Referring to FIG. 108, a tent shelter has a male and female hinges coupled with piece of wood F120 or other article of manufacture for framing the tent shelter in place of tent frame poles.

Referring to FIG. 109, a tent shelter male and female hinges coupled together in a 90-degree configuration by using a hinge pin F125. A hinge pin F125 couples the male and female hinges through the holes F114 and F116. The hinge pin F125 has a hole F126 for a paracord to pass through that will hold the male and female hinges in place. The male and female hinges have holes F127 to couple to split rings A77 for anchoring. The 90-degree hinges configuration is used to form and support the A-frame of the tent shelter as shown in FIG. 75.

Referring to 110, the tent shelter male and female hinges are uncoupled. The tent shelter frame pole button hole insert F101 coupled with female hinge to couple to a frame pole.

Referring to FIG. 111, components shown in FIG. 109 are coupled together with the tent shelter frame pole button hole insert F101 coupled to the tent shelter adjustable frame pole F123, which includes an adjustment holes F124 for adjusting the length of a pole. The male and female hinges can be coupled to tent poles, articles found in nature or articles of manufacture. The male and female hinges can connect to any anchor point on the tent and the hinges are affixed to the tent shelter through a paracord going through holes F114 and F116.

Referring to FIG. 112, the tent shelter has a male and female hinge coupled together in a 135-degree configuration for elevating the tent as shown in FIG. 75.

Referring to FIG. 113, the tent shelter has a simple hinge anchor apparatus F134 including a simple hinge F135, a spacer washers F136, a neck F137, and a means of coupling F138 to couple with the male hinge and female hinges to form an anchor point.

Referring to FIG. 114, two tent shelters male and female hinges are coupled to a ridge line frame pole or articles found in nature or articles of manufacture with the tent shelter simple hinge anchor apparatus F134 in FIG. 113. One pair of the hinge couples with articles found in nature, or articles of manufacture form the awning configuration and the other pair form the A-frame. This hinge-ridge line pole assembly is used in the same manner as F149 in FIG. 119. The spacer F136 is shown between the two male and female hinges. FIG. 115 also shows a tent shelter simple hinge anchor apparatus F139 in FIG. 115 coupled with articles found in nature or articles of manufacture to couple to the tent shelter on the awning periphery anchor points.

Referring to FIG. 115, a tent shelter simple hinge anchor apparatus F139 has a simple hinge F139a and a means of coupling F140.

Referring to FIG. 116, an anchor apparatus F143 that has an opening F141 and a means of coupling F142 that may also be used like a simple hinge F37.

FIG. 116 also shows a coupling line F146 where the tent shelter male coupler anchor apparatus F147 and female hinge coupler anchor apparatus F145 have coupled together by a means of coupling F142.

Referring to FIG. 117, the components in FIG. 118 are coupled with the tent shelter frame poles or other articles of manufacture to provide an off-set that can connect to male and female hinges where the tent poles can be parallel to each other. FIG. 117 also illustrate two tent shelters simple hinge anchor apparatuses F139.

Referring to FIG. 118, the components as shown in FIG. 116 are coupled together.

Referring to FIG. 119, the tent shelter has anchor apparatuses 260, 262, 348 and 353 as shown in FIG. 28 and anchor apparatus 34 as shown in FIG. 1C. The tent shelter frame poles F159 are coupled with the tent shelter simple hinge anchor apparatus F37 as shown in FIG. 91 and the tent mechanical hinge anchor apparatus 602 as shown in FIG. 106. The frame poles F159 are coupled with anchor apparatuses in multiple configurations and coupled to the tent shelter so that material can be manipulated and held in place. The frame poles F159 with anchor apparatuses include a shelter mechanical hinge anchor apparatus F162, a coupling point symbol F163 for the tent shelter frame pole (i.e., a stretchable material, shock cord), the tent shelter simple hinge F73 is coupled to the tent shelter frame poles or other articles of manufacture. The frame pole F159 with a different length can be coupled to the tent shelter. The frame poles F159 shown in a 90-degree at F160 and F158 are coupled with anchor apparatus of the tent shelter. The frame poles F159 coupled with the tent shelter simple hinge F37 is folded on itself F157 and coupled with an anchor apparatus of the tent.

The simple hinges F37 shown in FIG. 91 and a 90-degree anchor apparatus multiple pole coupler in FIG. 100B as seen before are shown in a different embodiment F149 coupled together. The coupling means F38 of simple hinge anchor apparatus F37 are inserted and coupled to the tent frame pole F159. The two hinges are then held together by means of coupling F89 in FIG. 100B. The frame poles F159 with the anchor apparatuses are attached to the tent by using a hook anchor apparatus F81 that is hooked to opening of tent Anchor apparatus 30 in FIG. 1C that has a split ring or other means of coupling attached to it so that can then be attached to rope or a cord for anchoring.

The simple hinge F37 couples with the tent shelter by using the coupling means F38. The simple hinge F37 lines up with the grommet on the tent or an anchor apparatus 34a as shown in F150. A split ring A77 or other means of manufacturing will pass through the opening of the grommet or an opening F40 of an anchor apparatus to create a loop. Multiple different embodiment F153, F154 and 155 using a different anchor apparatus on the different portions of the tent are available. The Simple hinge anchor apparatus F37 is also shown in F151 coupled with poles F159 lines up with the opening of the grommet coupled to anchor apparatus or the tent shelter.

A mechanical hinge tri-pole coupler lines up with an anchor apparatus 348 (not shown) for coupling tri-poles as shown in F152. A mechanical hinge anchor apparatus 602 in a closed and open position coupled with an anchor apparatus 260 that is coupled on the tent as shown in F153.

Figure 120:
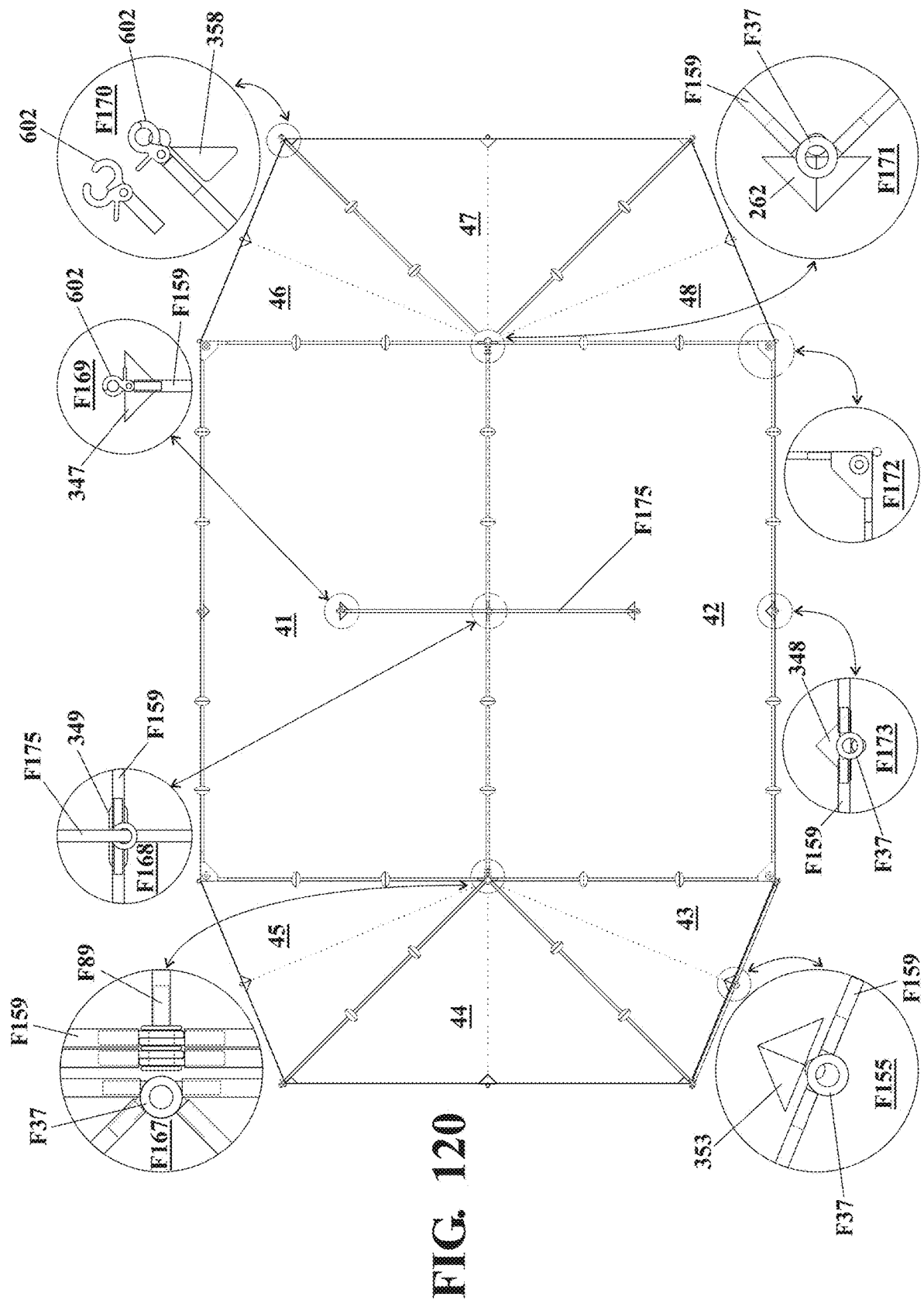

Referring to FIG. 120, the tent shelter is as shown in FIG. 2 with anchor apparatuses 347, 348, 349, and 353 as shown in FIG. 28. The tent shelter frame poles F159 are shown coupled with the tent shelter simple hinge anchor apparatus F37, the tent shelter mechanical hinge anchor apparatus 602 and a 90-degree anchor apparatus two pole coupler F101. The frame poles are coupled with anchor apparatuses are in multiple configurations and are coupled to the tent shelter so that material can be manipulated and held in place.

Four simple hinges F37 inserted in the frame pole F159 and coupled together by a 90-degree anchor apparatus multiple pole coupler assembly shown in FIG. 100A that lines up with anchor apparatus 262 coupled the shelter tent as shown in F167.

A simple hinge F37 where coupling frame poles F159 where a bendable frame F175 can go through the opening F40 of the simple hinge F37 for structuring or as a means for coupling to the tent anchor member as shown in F168. The simple hinge F37 with the tent frame poles in F168 lines up with anchor apparatus 349 in FIG. 28 on the shelter tent. A mechanical hinge anchor apparatus 602 in a closed position that is coupled to the tent frame pole and lines up with the anchor apparatus 349 in FIG. 28 that is coupled to the tent as shown in F169. The tent shelter frame pole F175 is coupled with two mechanical hinge anchor apparatuses.

A mechanical hinge anchor apparatus 602 in a closed and opened position in a new embodiment F170 coupled with the tent frame poles F159 and lines up with anchor apparatus 358 in FIG. 28. A simple hinge F37 in FIG. 91 coupled with two tent shelter frame poles F159 and lines up with anchor apparatus 262 as shown in F171.

A 90-degree anchor apparatus two poles coupler F172 that lines up with the tent grommet or an anchor apparatus on the tent peripheral edge. The anchor apparatus two poles coupler has a split ring A77 that is used for anchoring the tent shelter to the ground or to couple to another tent shelter. Two simple hinges F37 coupled with the tent frame poles F159 that lines up with the tent anchor apparatus 348 and 353 as shown in F173 and F155.

Figures 121, 122:
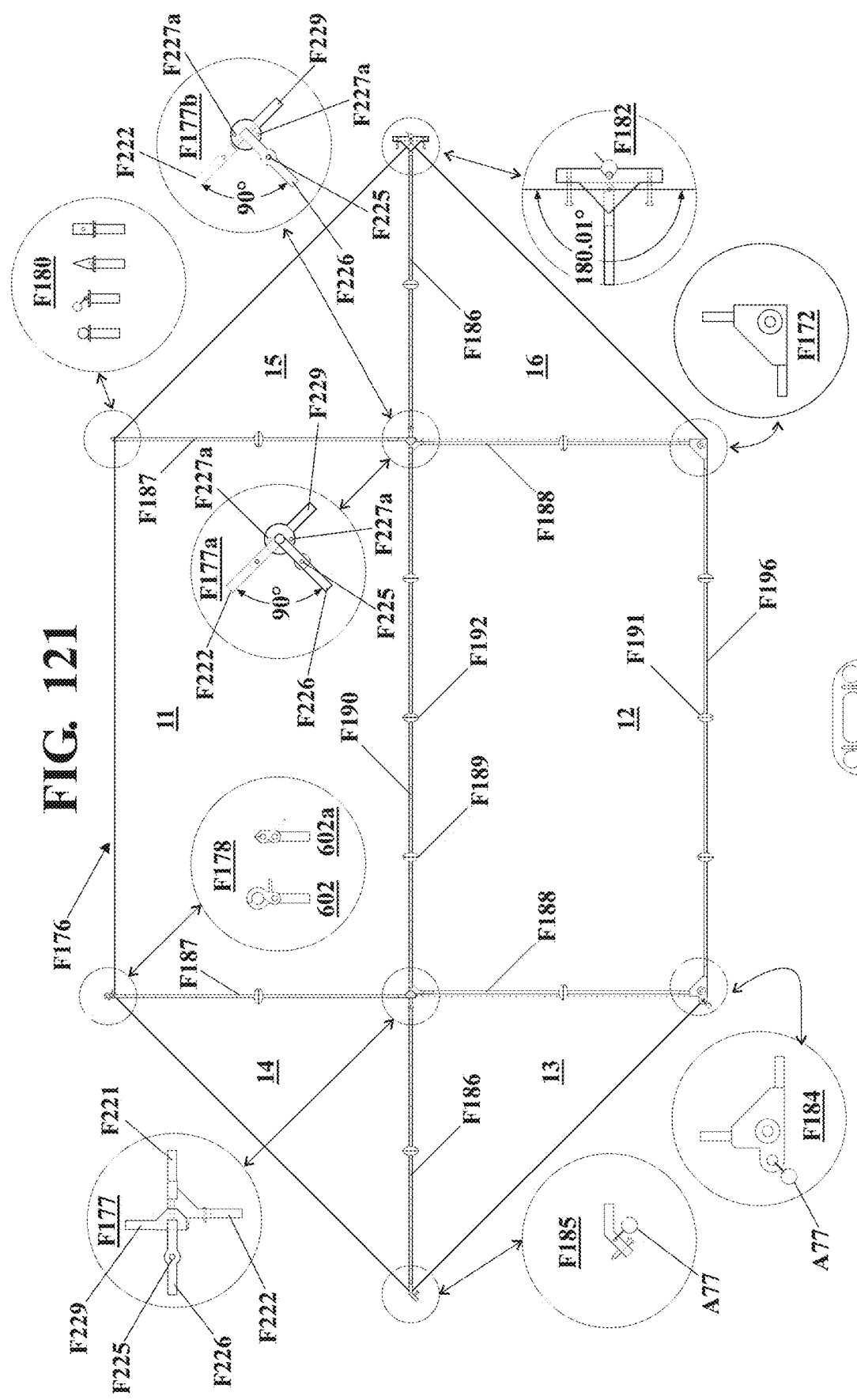

Referring FIG. 121, shows a variety of the tent shelter anchor apparatuses are coupled with the tent shelter frame poles system F176. FIG. 121 also shows two EZ pitch single awning hinge apparatuses F177 coupled to the tent shelter frame poles F196, F188, F187, F190, F186 and anchor members to allow the manipulation of the tent shelter in an open, partially open and closed position.

An EZ pitch single awning hinge apparatus F177 showing laid flat. The EZ pitch single awning hinge apparatus F177 has two holes F227 located in its body F277 that lines up with the tent shelter anchor apparatus to couple to the shelter. The EZ single awning hinge apparatus A177 has four extension parts F221, F222, F226 and F229 that will couple with the tent poles to provide different awning configurations and tent structural support. The EZ single awning hinge F177 is disclosed in more detail in FIGS. 126A and 126B.

This FIG. also shows a right-side view of an EZ pitch single awning hinge apparatus F177a and a left side view of an EZ pitch single awning hinge apparatus F177b illustrating how this hinge coupled with the tent pole and anchoring members can manipulate the tent shelter 9 to be pitched with the awning pole 182 in FIG. 11 that is anchored to the anchoring apparatuses or anchor members to form a fully open, partially open or a closed awning tent shelter. The hinge of an EZ pitch double awning hinge apparatus coupled with the tent pole to form a wedge shape with awning open configuration. The hinge of an EZ pitch single awning hinge apparatus when coupled to the shelter can form a closed configuration when it rotates 90-degrees around the pivoting point. The hinge of an EZ pitch double awning hinge apparatus may operate in a similar manner.

A tent shelter mechanical hinge apparatus 602 and a tent shelter modified mechanical hinge apparatus 602a shown coupled with the tent shelter and the frame pole through the shelter frame pole button hole insert (not shown) F178. If the shelter frame pole button hole insert F101 is not used, then the length of tent poles F187, F186, and F188 and F190 and F196 can be adjusted through a pole adjustment mechanism (not shown).

A simple anchor apparatus, a piercing anchor apparatus, and a modified simple anchor apparatus shown in F180 having a hole that can be used to couple to a split ring. The simple anchor apparatus is used as an anchor point that is coupled to a tent frame pole on one end and anchored to the ground or coupled to another tent shelter on the other end. The piercing anchor apparatus is also used for anchoring to a solid surface or an icy surface.

An anchor apparatus F182 that will assist the tent shelter to rotate 90 degrees on a point in order to change the open awning side of the tent shelter. This anchor apparatus is disclosed in more detail in FIG. 126D.

An anchor apparatus F184 having attachment ends that coupled to two tent shelter frame poles, and an opening that lines up with Anchor apparatus 34 in FIG. 1C, and opening that is used to couple to a split ring or other article of manufacture to anchor to the ground or used for coupling to another tent shelter.

An anchor apparatus F185 having an end to couple with the tent shelter frame pole F186 and another end having a hole to connect to a split ring. The shelter anchor apparatus can be coupled to a desirable surface with a screw, steel cut nail or .22 cal nail gun. In an emergency situation a person who cannot be moved lying on black top or concrete may need a shelter.

FIG. 121 also shows the tent shelter frame pole F186, F187, F188, F190, and F196 with means of coupling F186, F191, F191 for coupling two tent poles frames together and partially uncoupling so the pole frames can be stored in a container. When F189 is uncoupled it can be used to fold the pole down to connect the pole to F191 or F192 if it is desirable for frame poles to be uncoupled but remain tethered together as shown in FIG. 122.

Referring to FIG. 122, a container containing the tent shelter is coupled with an EZ single awning hinge apparatus and a frame pole system. The EZ single awning hinge apparatus and a frame pole system F176 coupled together with shock cord. The frame pole system requires retractable anchor apparatus or retractable frame poles that is preferable when collapsing the tent shelter is coupled to an EZ single awning hinge and a frame pole system. The tent shelter bottom and an emergency blanket may also be in the container.

Figure 123:
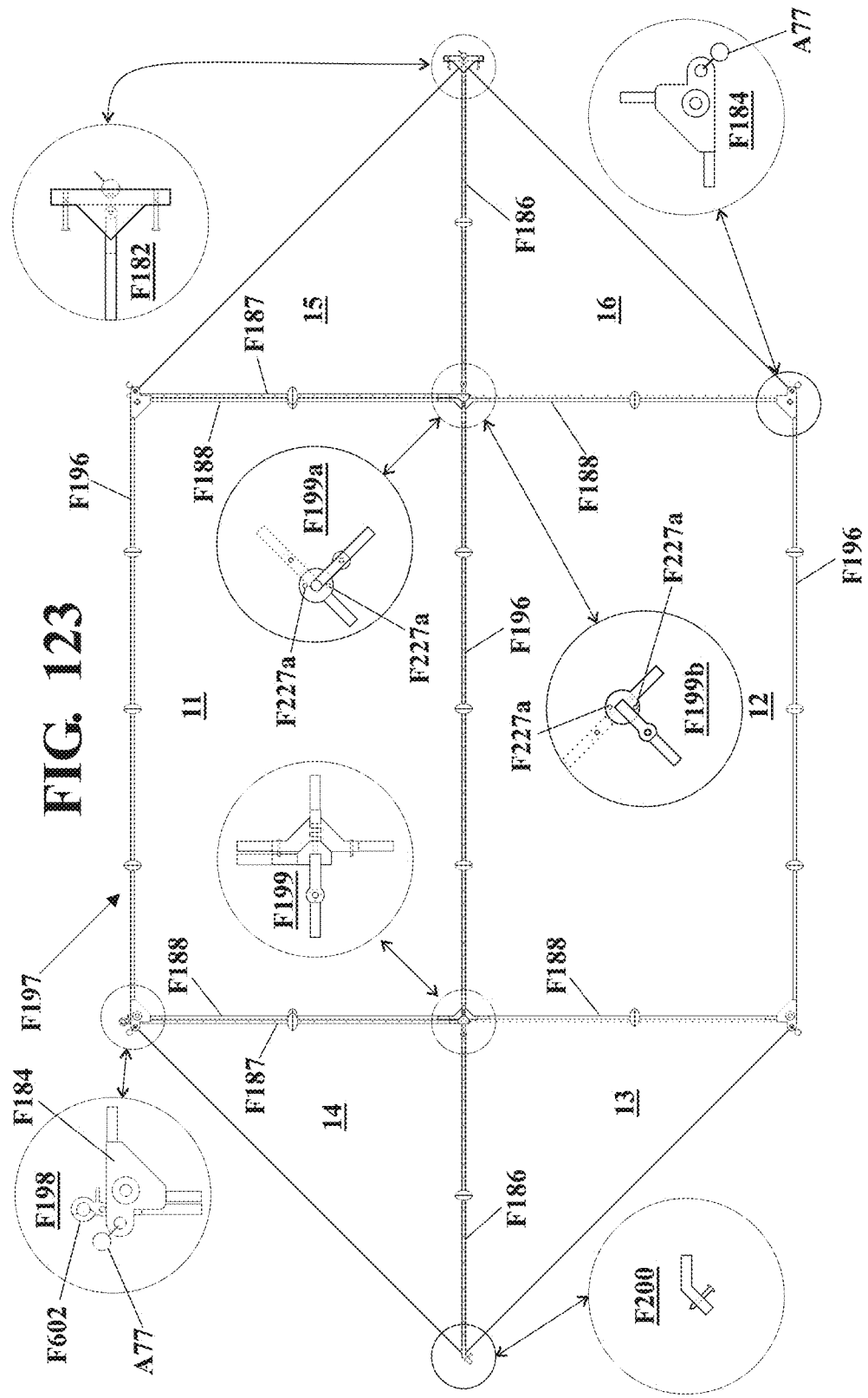

Referring to FIG. 123, a variety of the tent shelter anchor apparatuses coupled with a second awning apparatus frame system F197. FIG. 123 also shows two EZ pitch double awning hinge apparatus coupled to the tent shelter frame poles to allow the manipulation of the tent shelter in an open, partially open and closed position.

An anchor apparatus F184 shown in a new embodiment F198 coupled to two frame poles F196 in front of the tent shelter mechanical anchor apparatus 602 that is coupled with the tent shelter frame pole F187.

This FIG. also shows an EZ Pitch double awning hinge apparatus F199 laid flat. The EZ pitch double awning hinge apparatus F199 has two holes F227 located in its body F277 that lines up with the tent shelter anchor apparatus to couple to the shelter. The EZ double awning hinge apparatus A199 has five extension parts F217, F221, F222, F226 and F229 that will couple with the tent poles to provide different awning configurations and tent structural support. The EZ double awning hinge F177 is disclosed in more detail in FIG. 126A.

A tent shelter anchor apparatus F200 coupled with the tent shelter frame pole on one end and couple to a desirable surface with a screw, steel cut nail or .22 cal nail gun on another end. In an emergency situation a person who cannot be moved lying on black top or concrete may need shelter.

This FIG. also shows a left side view F199a and a right-side view F199b of an EZ pitch double awning hinge apparatus F199 illustrating how this hinge manipulates the tent shelter to be pitched with the awning fully open, partially open or closed. The hinge F226 of an EZ pitch double awning hinge apparatus system F197 coupled with the tent pole to form a wedge shape with awning open configuration. The hinge of an EZ pitch double awning hinge apparatus when coupled to the shelter can form a wedge configuration when it rotates 90-degrees around the pivoting point F224.

Referring to FIG. 124, a container containing the tent shelter is coupled with an EZ double awning hinge apparatus F199 and EZ frame pole system F197. EZ double awning hinge apparatus F199 and EZ frame pole system F197 coupled together with shock cord. The frame pole system F197 requires retractable anchor apparatus or retractable frame poles that is preferable when collapsing the tent shelter coupled to an EZ hinge and EZ frame pole system. The tent shelter bottom, emergency blanket and other small containers are also in the container.

Referring to FIG. 125, the tent shelter is in an embodiment with an EZ Up-2 pitch double awning hinge apparatus F206. FIG. 125 shows a variety of the tent shelter anchor apparatuses coupled with the tent shelter frame poles system F204. FIG. 125 also shows two EZ-2 pitch double awning hinge apparatus F206 coupled to the tent shelter frame poles to allow the manipulation of the tent shelter in an open, partially open and closed position F206a, F206b, and F206c. The tent shelter EZ-2 pitch double awning hinge is disclosed in more detail in FIG. 126C.

Referring to FIG. 125A, a container containing the tent shelter coupled with an EZ 2 pitch double awning hinge apparatus F206 and the frame pole system F204. EZ 2 double awning hinge apparatus F206 and the frame pole system F204 coupled together with shock cord. The frame pole system F204 may require retractable anchor apparatus or retractable frame poles that is preferable when collapsing the shelter coupled to an EZ 2 double hinge and a frame pole system. A shelter bottom, emergency blanket and other Small containers are also in the container.

Figure 126C:
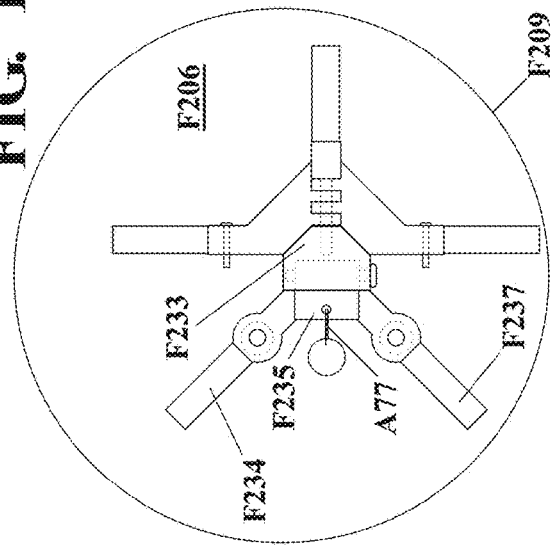
Figure 126D:
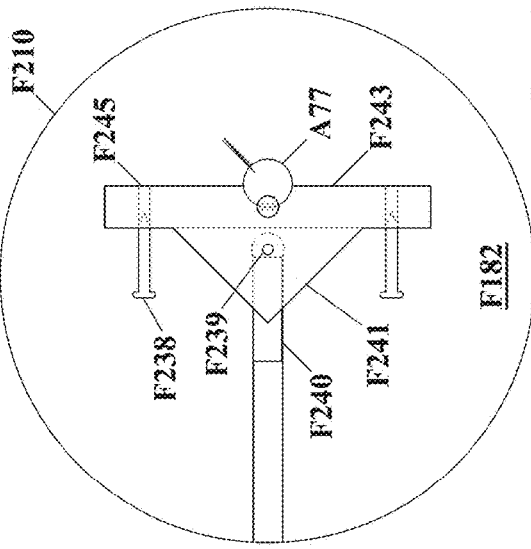
Figure 126A:
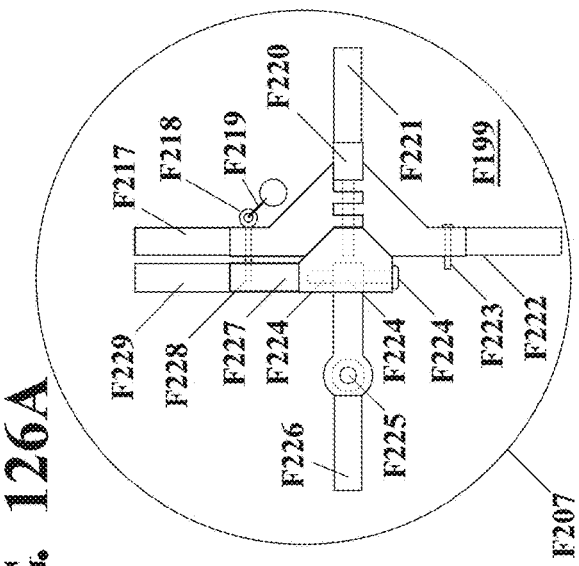

Referring to views of hinge assemblies (FIGS. 126A, 126B, 126C, and 126D) FIG. 126A shows an awning hinge with a means of coupling F217 and F222 that can be used to couple to a frame pole. The awning hinge has a locking mechanism F218 with an anchor apparatus F219 that can have a spring assist mechanism (not shown), a magnetic coupling mechanism (not shown) going through a hinge hole F228 in the hinge body F227 to hold it in place. The awning hinge has a locking device F223 that can be coupled with a hole F225 in the hinge assembly.

FIG. 126A also shows a secondary hinge pin F220 that can have a means of coupling two of its ends to couple to a tent frame pole through the hinge pin F221 on one end and to the awning hinge and the hinge body F229 on the other end through one or more hinge openings in the hinge assemblies. A hinge pin F224 goes through a hinge hole (not shown) of the hinge body and is coupled with an awning hinge that may also have hinge holes for coupling. A hinge has a means of coupling F226 to couple to a frame pole and to the hinge body. A hinge body has a means of coupling F229 to a frame pole or other article of manufactures. The hinge F226 is rotatable perpendicularly to the hinge pin F220 to create an A frame and the hinge body and the awning hinge are rotatable around the axis of the hinge pin F220 to follow hinge F226 as shown in an enlarged portion F199 in FIG. 123.

Figure 126B:
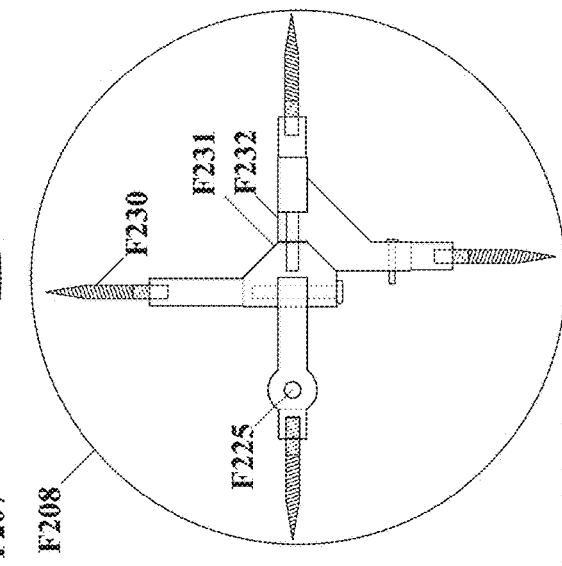

Referring to FIG. 126B, a hinge assembly body having a hole 231 for coupling a hinge assembly body with a hinge pin F232 and that is also coupled to a hinge by a coupling a device attached to it a hole F225. The end of the hinge can be coupled to a tent frame pole adaptor as shown in FIG. 104 or to be coupled to an article found in nature, i.e., a stick.

Referring to FIG. 126C, a hinge assembly is shown for the tent shelter in FIG. 2 including a hinge assembly body F233 that may also have holes for coupling the hinge knuckle F235 having extended ends with means of coupling F234 to frame poles, to a shock cord or other article of manufacture. The hinge knuckle F235 has a hole to connect to a split ring anchor A77. The awning hinge has locking devices F218 and F223 to lock the ends of the hinge knuckle's means of coupling F234 and F237.

Referring to FIG. 126D, hinge assembly is shown that lines up with anchor apparatus 35 on the tent as shown in FIG. 1C and includes a hinge base body F243, and a hinge pin channel F241 having a hole for a hinge pin F239 to go through and couples to a hinge F240. The hinge F240 couples to a tent frame pole, to a shock cord or other article of manufacture. A hole F245 is in the hinge body where a nail, screw or other anchor apparatus F238 can pass through and anchor the hinge base body to a solid surface. The hinge base body F243 is coupled with a split ring anchor A77 for anchoring. This hinge assembly uses the hinge pin F239 for rotating hinge F240 downwards to form a wedge tent that can have one side or both sides open as an elevated cover when the tent portions are secured to an object by using anchor 30 as shown in FIG. 1C.

Referring to FIG. 127, a simple tent shelter hinge apparatuses F216 that is comprised of the component detailed above is to be used for a tent shelter. If a tent shelter hinge apparatus is not desirable, then simple hinges F212 or F213 may be left out of the assembly. A ridge pole that couples with a flange bolt F215, a simple hinge F212 that has a means of coupling, a simple hinge F213 that has a means of coupling, which is a piece of material that is bent so it can perform as a simple hinge. A-Frame apparatus F214, which is extensions that have a means of coupling. The flange bolt F215 will pass through the opening of the F211, F212, and the opening of the A-frame F214 where then the flange bolt will be coupled to the tent shelter ridge pole to secure the poles and simple hinges in place. The Flange bolt has a means of coupling that will line up with Anchor apparatus 30 or other anchor members to couple to the tent shelter.

Referring to FIG. 128, an anchor apparatus 256 is coupled to tent material A16 through the anchor apparatuses' male and female ends. A female end of the anchor apparatus has a body A12 glued or welded to a reinforcement material A11 to distribute the pull on the tent material A16 when the anchor apparatus is locked on the tent material A16. An anchor apparatus body A12 also has two openings, an opening A14 to connect to a split ring A13 or another means of coupling and an opening A15 that couples with the male coupling part A17 of the male end of the apparatus. The male end of the anchor apparatus has a body A19 coupled to a reinforcement material A18. The male body A19 also has an opening to connect to a split ring A20 or another means of coupling.

Referring to FIG. 129, an anchor apparatus with three male coupling parts in the male body are coupled to three female opening parts A23 in the female body.

Referring to FIG. 130, a side and a top view of an anchor apparatus is shown without the reinforcement material shown in FIG. 128.

Referring to FIG. 131, an off-set anchor A32 is shown having a primary body A33 with an opening A34, and a secondary body A36 with an opening A35 where a split ring A77 passes through as shown in FIG. 134. The off-set anchor A32 couples to the tent shelter or the tent shelter anchor apparatus.

Referring to FIG. 132, is a side view of the off-set anchor A32 shown in FIG. 131.

Referring to FIG. 133, is another side view of an off-set anchor A32 shown in FIG. 131.

Referring to FIG. 134, is two off-set anchor A32 having a primary A33 with an opening A34 that is coupled to an anchor apparatus opening to connect to a split ring A77 or other means of coupling that passes through an opening A35 of a secondary body A36 of each off-set A32.

Referring to FIG. 135, a tent shelter body material A45, is a 90-degree fold A46 in the tent shelter body material that shows the thickness of the shelter body material, a structural material A47 that is similar or dissimilar to nylon webbing 253 in FIG. 28 stitched to the tent shelter body material that has an attached split ring A77 or a loop connected to it for anchoring purposes. The structural A47 has a hole A48 that aligns with a hole on the tent material body ridge line so that a paracord, similar cordage or cable supports the interior of the ridge line. It is preferable to couple a weatherproof device with the hole to provide a weather proof chase for paracord, similar cordage or cable. These structural materials can be use as simple material anchor apparatus in place of the anchor apparatuses disclosed in FIGS. 1C and 2.

A heat resistant grommet A49 is also coupled to a shelter body material hole A48, for example it is coupled near location points for anchor apparatuses 30 or 34 as shown in FIG. 1C. The grommet A49 may also have extremely poor heat conductive properties. The grommet can also be used for ventilation.

Referring to FIG. 136, a structural material A47 is coupled to the shelter material body A45 having a hole A48 on the ridge line that aligns with the hole on the structural material so that a paracord, similar cordage or cable supports the interior of the ridge line. It is preferable to couple a weather proof device with the hole A48 to provide a weather resistance for the tent. The structural material is folded on it itself on the end part to create a loop A52 as simple material anchor apparatus so that a split ring can connect it to be used for anchoring.

Referring to FIG. 137, a structural body material A47 is stitched in its flat position to a shelter material body A45 by means of coupling A56 creating a hole A55 between structural body material, the simple material anchor apparatus and the shelter material body to be used as an anchor point by using a split ring A77 or other preferred means of anchoring.

Referring to FIG. 138, a structural body material is stitched in its flat material to a shelter material body A45 by means of coupling A56. The end of the structural material is folded to create a loop A61 in the material that is used as an anchor point to connect to a split ring A77 or other preferred means of anchoring.

Referring to FIG. 139, a threaded tube A62 is shown through a hole of a heat resistant grommet A49 that has extremely poor heat conductive properties. This grommet is used as a simple means of coupling to shelter accessories to hold them in place.

Referring to FIG. 140, is a flipped view of FIG. 135 showing an outer edge A64 and inner edge A66 of heat resistant grommet A49 coupled to the tent shelter material body A45 by an opening A65 in the shelter material body A45. This opening needs to be reinforced by coupling it with desirable material that will provide additional desirable properties.

Referring to FIG. 141, an anchor apparatus accessory 728 (also shown in FIG. 66a) having a coupler housing 732 that includes a one-third turn means of coupling 731 that is coupled with the accessory housing threaded nut 729. A threaded nut 729 will be couple with a flexible O-ring 730 and the coupler housing 732. The O-ring 730 is to be seated on the raised portion A86 of the anchor apparatus 30 where anchor apparatus accessory 728 is to be connected to the raised potion A86 by the one-third click means of coupling to connect other accessories to the tent shelter and to created a seal by having the he O-ring 730 seated on the raised portion A86 of anchor apparatus 30.

Referring to FIG. 142, a shelter tent material body A74 is coupled with the tent shelter anchor apparatus 30 as shown in FIG. 1C. The anchor apparatus 30 is manufactured with a wide variety of known and unknown materials, for example rubber, plastic, etc. It may be desirable to have a wide variety of thicknesses and means of coupling.

The anchor apparatus 30 as shown in FIG. 1C includes a body A82 having an interior opening A78 and an exterior opening A79. The interior opening has a raised portion A86 that can be used to connect to washer or flange that is seated on top of the raised potion A86 to create a seal. The anchor apparatus 30 has a flexible bendable portion material coupler A83, which connects the two anchor apparatus bodies A82 that may have a hole A84 where the ridge line passes from the exterior to the interior depending on the thickness of the interior anchor apparatus body. The width of the coupler material may need to be increased so that a 90-degree or a 180-degree fold is possible. FIG. 142 also shows an offset anchor A32 as shown in FIG. 132 coupled to the exterior openings A79 where a split ring A77 which can pass through for anchoring. A threaded tube A81 passes through the interior opening A78 of an exterior anchor apparatus body A82 for connection from one side to the other.

FIG. 142 also shows an anchor apparatus 30a which includes a body A72 with the interior side of the anchor apparatus 30 and a flexible bendable portion material coupler A83 which connects the two anchor apparatus bodies A72.

Referring to FIG. 143, a threaded tube A81 is shown through a hole of a heat insulator grommet A88 that is made from heat resistant material with extremely low heat conductive properties.

Referring to FIG. 144, a tent shelter A74 is coupled to anchor apparatuses 30 and 30a as shown in FIG. 142 and a threaded tube A81 as shown in FIG. 143 through a hole of a heat insulator grommet A88.

Referring to FIG. 145, the tent shelter has anchor apparatuses 34 and 34a that are not connected with anchor apparatus coupler material A83 so that they are coupled to the tent shelter separately if desired.

Referring to FIG. 146, a simple anchor apparatus A105 is used in place of anchor apparatus 30 as shown in FIG. 1C having a reinforcement material A109 including a heat resistant grommet A108 with a hole A114. Simple anchor apparatus A105 has a bendable portion A106 having a hole A107 to allow a paracord to through to form the tent ridge line. An anchor apparatus A105 also has an anchor member A111 to anchor to the pole or to the ridge line. The simple anchor apparatus A105 is coupled with the tent shelter material body A112.

Referring to FIG. 147, the tent shelter has a heat insulator A116 coupled to a threaded tube A115 that is inserted into the hole A114 of the grommet A108.

Referring to FIG. 148, is a half of the tent shelter anchor apparatus A105 that can be in place of anchor 34 as shown in FIG. 1C with an anchor member A111 to anchor the tent to the ground.

Referring to FIG. 149, a shelter body material A112 is coupled with two reinforced material A109 of anchor apparatus A105 that are coupled to a heat resistant grommet A108. The tent shelter heat insulator A116 is also shown inserted into the grommet A108.

Referring to FIG. 150, is the tent shelter anchor apparatus 37 as shown in FIG. 2, which is a half of anchor apparatus 35 coupled with the tent shelter having a hole A121 where a split ring A77 or other means of coupling can attach to for anchoring.

Referring to FIG. 151, is the tent shelter anchor apparatus 35 as shown in FIG. 1C that couples with the tent shelter. The anchor apparatus 35 includes an anchor apparatus body A119, a coupler material A120 connecting the two anchor apparatus bodies A119. The body A119 has a hole A121 that connect to a split ring A77. Depending on the thickness of the interior anchor apparatus body the width of the coupler material may need to be increased so that a 90-degree or a 180-degree fold may be possible.

Referring to FIG. 152, is a different way of anchoring the tent shelter to the ground using anchor apparatus 35 as shown in FIG. 1C.

Referring to FIG. 153, is the tent shelter anchor apparatus 329 including a body of A127 having a hole A126 to connect to a split ring A77 or other means of coupling, so that it can be used for anchoring the tent to the ground or to connect to another tent shelter.

Referring to FIG. 154, is a side and a top view of the tent shelter anchor apparatus 32 as shown in FIG. 1C that couples with the tent shelter. The anchor apparatus 32 has an anchor apparatus body A129 and an opening A130 that can be connected to an insulator A132. The opening A130 has a raised portion A131a to couple with a variety of the tent shelter accessories. This opening can also be coupled with a wiring harness, or it is desirable to couple the shelter body and anchor apparatus with an embedded electrical system. The opening A130 also has a raised portion A131b that connects to another means of coupling such as a snap through the openings to snap the wiring harness. This anchor apparatus may not have a raised portion if desired. The anchor apparatus 32 is connected to a split ring A77 through a hole in the anchor apparatus body A133.

Referring to FIG. 155, is the tent shelter anchor apparatus 36 as shown in FIG. 1C that couples with the tent shelter. The anchor apparatus 36 is manufactured with a wide variety of known and unknown materials, it is desirable to have a wide variety of thicknesses and means of coupling. The anchor apparatus 36 includes an anchor apparatus body A134, and an opening in the anchor apparatus body A136 that is connected to the other opening through a split ring A77 or other means of coupling. An anchor apparatus 36 also includes a bendable coupler material A137 that connects that the two anchor apparatus bodies A134. The bendable coupler material A137 has a hole A135 for a cord or other material to pass through. Depending on the thickness of the anchor apparatus body the width of the coupler material may need to be increased so that a 90 degree or a 180-degree fold may be possible.

Referring to FIG. 156, is a different way of anchoring the tent shelter to the ground using anchor apparatus 36 as shown in FIG. 1C that couples with the tent shelter. The anchor apparatus is manufactured with a wide variety of known and unknown materials, it is desirable to have a wide variety of thicknesses and means of coupling. The openings A136 are connected to a split ring A77 or other means of coupling to anchor the tent to the ground with a stake.

Referring to FIG. 157, is an anchor apparatus 36a, which is a half of the tent shelter anchor apparatus 36 that couples with the tent shelter. The anchor apparatus 33 has an opening to connect to a split ring A77 or other means of coupling to couple the tent to the ground.

Referring to FIG. 158, shows a side and a top view of a tent shelter anchor apparatus 144 that can be used in place of anchor apparatus 31 as shown in FIG. 1C coupled with the tent shelter. The anchor apparatus is manufactured with a wide variety of known and unknown materials, it is desirable to have a wide variety of thicknesses and means of coupling. The anchor apparatus 144 has an anchor apparatus body A149 having a middle opening A147 coupled to a raised portion A148a and heat insulator A150. The raised portion A148a is coupled with a snap A148b to cover the middle opening A147 or a snap-in power coupler. It may be desirable to not have this raised portion of the anchor apparatus body. The opening A147 can also be coupled with a variety of the tent shelter accessories. The opening A147 can also be coupled with a wiring harness or it is desirable to couple the shelter body and anchor apparatus with an embedded electrical system. The anchor apparatus body A149 also has two side openings A146 coupled with a raised portion A145 and also connects to a split ring A77 or other means of coupling. This figure also shows a connector A151 that couples with the three split rings.

Referring to FIG. 159, is a side and a top view of the tent shelter anchor apparatus 31 as shown in FIG. 1C coupled with the tent shelter. The anchor apparatus is manufactured with a wide variety of known and unknown materials, it is desirable to have a wide variety of thicknesses and means of coupling. The anchor apparatus 31 has an anchor apparatus body A152, a side opening A156 that is connected to a raised portion A154a. The raised portion A154a is coupled with a snap A154b that can cover the opening A156 or a snap that can snap-in a power coupler. It is desirable to not have this as a raised portion of the anchor apparatus body. The opening A156 can also be connected to a heat insulator A155. The side opening A156 is also coupled with a variety of the tent shelter accessories. Th side opening A156 can also be coupled with a wiring harness or it may be desirable to couple the shelter body and anchor apparatus with an embedded electrical system. The anchor apparatus 31 also has a middle opening A157 that includes a raised portion A158 to be connect a split ring A77 as an anchor point.

Referring to FIG. 160, is the tent shelter anchor apparatus 399 as shown in FIG. 46 that couples with the tent shelter. The parts of anchor apparatus 399 are the same as anchor apparatus 31 except that the body A159 is shaped to be coupled to another anchor apparatus 399 to form a bigger shelter. The anchor apparatus is manufactured with a wide variety of known and unknown materials, it may be desirable to have a wide variety of thicknesses and means of coupling.

Referring to FIG. 161, a side and a top view of the tent shelter anchor apparatus 33 is coupled with the tent shelter.

The anchor apparatus 33 is manufactured with a wide variety of known and unknown materials. It is desirable to have a wide variety of thicknesses and means of coupling. The anchor apparatus 33 includes an anchor apparatus body A161 that has three opening A162 which are connected to a raised portion A163a. The raised portion A163a is coupled with a snap A163b to cover the opening A162 or a snap-in power coupler. The opening A162 can also be coupled with a variety of the tent shelter accessories. The opening A162 can also be coupled with a wiring harness or if it is desirable to couple the shelter body and anchor apparatus with an embedded electrical system. It is preferable to not have a raised portion of the anchor apparatus body. The opening A162 can also connect to the tent shelter heat insulator A160. The opening A162 can also be used as an anchor point to be anchored above.

Referring to FIG. 162, is the tent shelter anchor apparatus 30 as shown in FIG. 1C coupled with a ridged/flexible duct 201 in FIG. 17 or other accessories. The ridged/flexible duct 201 having a means of couplings showing in FIG. 66b (not shown) that is coupled to the opening of anchor apparatus 30 with two one-third twist compression fittings means of coupling as shown in FIG. 66a (not shown) to lock the duct with the tent. The one-third twist compression fittings are coupled to anchor apparatus 30 by a flange that is coupled to the one-third twist compression fittings. This FIG. also shows a tent shelter frame pole A171 coupled to a shelter frame apparatus 616 shown in FIG. 60A that is coupled to the opening A79 of tent shelter anchor apparatus 30.

Referring to FIG. 163, arrows are used to couple with tent shelter anchor apparatus coupler 616. An arrow including an arrow bolt knock A174, an arrow fletching A175, an arrow knocks A176, an arrow shaft A177, and an arrow tip A178A. Arrow tips and arrow knocks may be unscrewed so that multiple arrows coupled together. The arrows are used in place of the tent frame poles A171.

Referring to FIG. 164, is the tent shelter anchor apparatus 34 coupled to the tent shelter anchor frame poles A171 and A172 having a battery technology A173 built in it or inserted into it.

Referring to FIG. 165, is the tent shelter anchor apparatus 30 as shown in FIG. 1C coupled with ridged/flexible duct or other accessories as shown in FIG. 162. This FIG. also shows the uncoupling means A179 to uncouple the shelter frame apparatus 616 from the tent shelter anchor apparatus 30.

Referring to FIG. 166, is tent shelter anchor apparatus 34 in FIG. 1C coupled with ridged/flexible duct 201 or other accessories. This FIG. also shows the tent shelter anchor apparatus 34 coupled to the tent shelter frame pole A171 by using the tent shelter frame apparatus coupler 616 in FIG. 60A.

Referring to FIG. 167, is a means of coupling with a flexible tent material. This means of coupling is used to attach two tent shelters together. It can also be used to couple the tent shelter to a tent shelter accessory. The material together with means of coupling may help keep the weather on the exterior of the shelter. A hook C01, C08 and loop means of coupling C02, and C07 is used. A flexible material C03 and C06 may be used to offer some weather proofing when coupled to two tent shelters.

Referring to FIG. 168, is a tent shelter zipper with hooks C12 and loops C13 on its side that has a zipper coupler C14 coupled to the peripheral edge of the tent shelter C11 or to shelter accessories on its side used to couple the tent shelter C11 to the tent shelter accessories. The tent shelter zipper is used to couple two tent shelters together, a tent shelter or the tent shelter accessories.

Referring to FIG. 169, is a tent shelter 90-degree double zipper with hooks and loops as explained in reference to FIG. 168 used to couple the tent shelter to tent shelter accessories or another tent shelter with a zipper body C15 and a secondary zipper head C17. The primary zipper is coupled to the peripheral end of the tent shelter and the secondary zipper is attached to the interior side material of the zipper. The secondary zipper is used to couple the tent to the tent accessory.

Referring to FIG. 170, is a tent shelter U-double zipper used to couple the tent shelter to the tent shelter accessories with zipper body C31 and a secondary zippers C32 used in the same way as shown in FIG. 169.

Referring to FIG. 171, is a tent shelter modified mechanical hinge apparatus C24 coupled to a coupler apparatus C26 with a hook C21 and a loop C23 used to couple to the tent shelter or the tent shelter accessory C22. The modified mechanical hinge C24 has a hinge pin C25 and a means of coupling C28. This figure also shows a hinge movement stopper C27 that locks the mechanical hinge from pivoting.

Referring to FIG. 172, is a tent coupler apparatus coupled to the shelter zipper that is coupled to the tent or the tent shelter accessory C36 by a stitching coupling mechanism C38. The zipper includes a zipper head C35 and zipper body C37. A coupler apparatus C40 includes a body C39 coupled to the interior side of the zipper.

Referring to FIG. 173, is a channel fastener C46 having channel fastener body C49 coupled with a channel fastener attachment part C48 having channel fastener attachment part body C47 that is used as an anchor apparatus. The channel fastener body C49 is coupled to the tent shelter or the tent shelter accessary. This figure also shows the channel fastener body C49 can be coupled to a second C49 by inserting the end of channel fastener body into the other channel fastener body.

Referring to FIG. 174, is a tent shelter secondary zipper coupled to the interior side of the tent shelter primary zipper that is coupled to the tent shelter or to the tent shelter accessory C54 through a means of coupling C51. The tent shelter double zipper includes zipper body C52 and a primary zipper head C55. The secondary has a zipper having a head C53 and a body C50 coupled to the interior side of the primary zipper. The secondary zipper can be used to couple the tent accessory to the tent shelter.

Referring to FIG. 175, is the tent shelter double zipper coupled to the tent shelter or the tent shelter accessory C45 through means of coupling C42. A primary zipper has a head C41 and a body C43. A second zipper has a head C44 and a body that is coupled to the interior side of the primary zipper.

Referring to FIG. 176, are two tent shelters that can be coupled together and that can also be coupled to tent shelter accessories. The tent shelter zipper or a loop fastener or other means of coupling C60 can be coupled to a tent shelter zipper or to a hook fastener or other means of coupling C61. The bottom sides of the peripheral edge of the tent shelter have a hook fastener means of coupling and the upper sides of the peripheral edge has a loop fastener means of coupling.

Referring to FIG. 177, are two tent shelters that can be coupled together and that can also be coupled to the tent shelter accessories having shelter zippers or other means of coupling C62 to C73.

Referring to FIG. 178 (also a channel 181 as shown in FIGS. 10 and 11), is an end side view of the length of a channel coupling enclosure device having a body C74 having anchoring element and an opening along the length of the coupling device C75. The channel coupling enclosure device may be any desirable length. This figure also shows a means of coupling a tent shelter to another of a tent shelter. It also shows a means of coupling a tent shelter to a tent shelter accessory. It also shows a means of coupling to a tent shelter frame. It also shows a means of gathering material along a manipulation line of a tent shelter. This may be preferable to provide support framing.

Referring to FIG. 179 (also with reference to FIG. 181), is a side view of (as shown in FIG. 178) showing an opening C75 along the length of the channel coupling enclosure device and the body of the coupling device C74.

Referring to FIG. 180, is a view shown in FIGS. 178 and 179 coupling two coupling apparatuses as shown and disclosed in reference to FIG. 168.

Referring to FIG. 181, is a view of a channel 181 (as shown in FIG. 179) coupled with material folded C81 of the tent shelter around a piece of paracord C79 or other item of manufacture. The material is coupled together so that the paracord C79 has limited movement.

Referring to FIG. 182, is a view as shown in FIGS. 178 and 179 coupled with one coupling apparatus shown and disclosed in reference to FIG. 168.

Referring to FIG. 183, is a tent shelter foot print V10 pitched with awning open or closed.

Referring to FIG. 183A, are two tent shelters V11 pitched with a tent shelter ridge fly V12.

Referring to FIG. 183B, are three tent shelters V13 coupled with a three-sided community tent shelter.

Referring to FIG. 183C, are four tent shelters coupled with a four-sided community shelter V15, Referring to FIG. 183D, are five tent shelters coupled with a five-sided community shelter V16, Referring to FIG. 183E, are six tent shelters coupled with a six-sided community shelter V17. Multiple sided community tent shelters have items of manufacture frame systems that include, but not limited to, easy the assemble frame system or easy pitch collapsible frame system. With multiple sided community tent shelters coupled with tent shelters, there may be weather flaps and means of coupling to provide additional protection to the interior from exterior weather. Multiple sided community tent shelters may have docking panels that may make it possible to have an enclosed tent shelter for privacy or to make individual micro climates. The docking panels make it possible to have a multiple sided community tent shelter enclosed without coupling with other tent shelters. It is preferable to have multiple sided community tent shelters made out of ridged materials that will provide solid structures for a variety of climates.

Figure 183F:
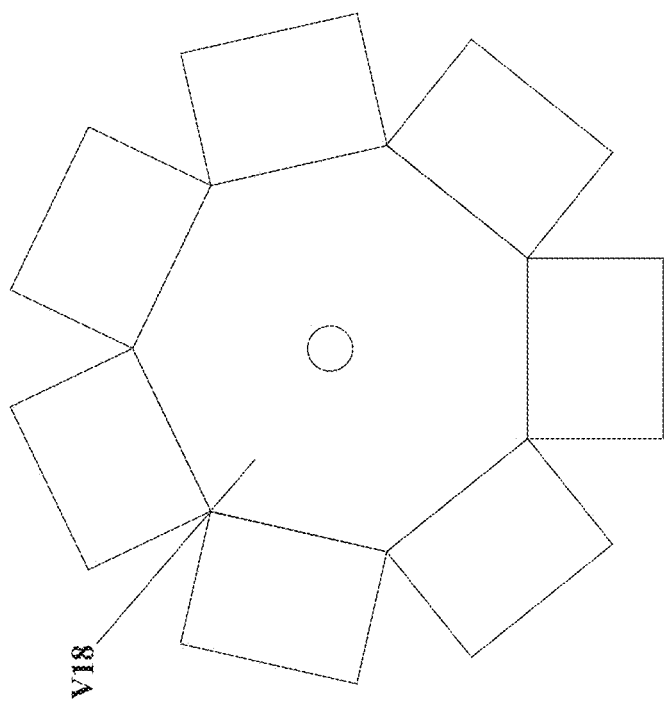

Referring to FIG. 183F, are seven tent shelters coupled with a seven-sided community shelter.

Referring to FIG. 183G, are eight tent shelters coupled with an eight-sided community shelter.

Referring to FIG. 184, is a printed tent version on material as shown in FIG. 1C having attachment locations C83a for allowing a paracord C82 to pass through to from the tent folds 17, 18, 19, 20, 21, 22, 23, 24, 25, 26, and 27 as shown in FIG. 1C. A reinforcement material C83 can be used to hold a paracord C82 in place. The printed tent has extra material C86 along the peripheral line that can be used for hemming or for a weather flap. This FIG also shows attachments element in FIG. 1C that can be printed on material or 3D printed to be used for reinforcing the shape of the tent and to allow the tent to be manipulated.

Referring to FIG. 185, is a cordage stopper apparatus that has a hole for the cordage to go through and seal the holes on the ridge line (holding mechanism are not show).

Referring to FIGS. 185A to 185C, are shown a paracord passing through the tent attachment locations to form a tent shelter frame that is locked in place by a formation of a knot C82a where the end of the paracord can also be used as an anchor point C82b. This FIG. also shows another way for locking the paracord in place by using a cordage stopper C84 and C85. This FIG. also show a paracord passing through a hole in the reinforcement material that is coupled to the tent. The use of a reinforcement material C83 is not necessary to hold the paracord C82 in place.

Referring to FIG. 186, is a printed version of the tent shelter as shown in FIG. 2 that can also be 3D printed having primary attachment locations and secondary attachment locations for allowing a paracord C82 to pass through to from the tent folds 49, 50, 51, 52, 53, 54, 55, 56, 57, 58, 59, 60, 61, 62, and 63 as shown in FIG. 2. The paracord C82 is held in place by a hole C83a in a reinforcement material C83. A reinforcement material C83 can be used to hold a paracord C82 in place. The printed tent has extra material C86 along the peripheral line that can be used for hemming or for a weather flap. This FIG also shows attachments element in FIG. 2 that can be printed on material or 3D printed to be used for reinforcing the shape of the tent and to allow the tent to be manipulated.

Referring to FIG. 187 is a printed tent as shown in FIG. 1C with a bottom.

Referring to FIG. 188 is a printed tent as shown in FIG. 2 with a bottom.

Referring to FIGS. 189 to 191B, are views of an awning hinge anchor apparatus that when coupled with a pole rigging system and a tent, it can anchor, manipulate, adjust and support the tent shelter as shown in FIGS. 192 to 194A.

Referring to FIGS. 192 to 193, are different awning configurations of tent shelter 9 formed by using different hinge assemblies in FIGS. 121, 126A coupled with a pole rigging system.

Referring to FIGS. 194 to 194A, are different awning configurations of tent shelter 40 formed by using the EZ 2 double awning hinge apparatus in 126C coupled with a pole rigging system.

Referring to FIG. 195, is a printed tent shown in FIGS. 1C and 2 in a size of a toy or in a video game used with a computer-generated person for the purpose of entertainment or education.

Several embodiments have been discussed in the foregoing description, however, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A customizable tenting system comprising:
    a tent top material having location points for coupling, wherein the tent top material comprises a rectangular portion, at least a first and second triangular portions on opposing sides of the rectangular portion, wherein the first and second triangular portions comprise two sides of equal length and a base, wherein the base of the first and second triangular portions are parallel to each other;

a tent coupling apparatus adapted to couple the customizable tent to at least one of another tent and an accessory;
a plurality of anchor points disposed in the periphery of the tent top material, wherein the anchor points are adapted to couple with an anchor apparatus, wherein the anchor apparatus is adapted to couple the tent top material to at least one of a surface and other structure;
a plurality of manipulation positions extending along lines in proximity to the location points, wherein the manipulation positions are adapted to guide the forming of a plurality of shapes of the tent top material, wherein the tent top material is adapted to be configured in a plurality of forms and attach to another tent along at least one side of the rectangular portion between the first and second triangular portions to form at least two tents of same or different configurations; and
a hinged framing apparatus, wherein the framing apparatus comprises at least seven ridged members and two hinges wherein each of the ridged members attach at one end to one of the two hinges, wherein the hinged framing apparatus is coupled to at least one of the plurality of anchor points.

2. The customizable tenting system of the claim 1, wherein the first and second triangular portions each comprise additional triangular portions wherein all of the triangles are right triangles, wherein at least one of the lines forming the triangular portions define the manipulation portions extending from a mid-portion of a side of the rectangular portion to the periphery of the tent top material.

3. The customizable tenting system of claim 1, wherein along a line bisecting the middle of the rectangular portion and extending through the triangular portions are at least two central anchor points adapted to connect with an anchoring apparatus to hold up and suspend the tent top material above the ground.

4. The customizable tenting system of claim 3, wherein the central anchor points are adapted to attach to the anchor apparatus, wherein the anchor apparatus comprises at least one of a split ring, cord, and stake.

5. The customizable tenting system of claim 1, wherein the anchor apparatus comprises at least one of a split ring, cord, and stake.

6. The customizable tenting system of claim 1, wherein the tent top material is configurable into the plurality of forms including a fully enclosed form, a side open half-way form, a side fully open form, and an end open form.

7. The customizable tenting system of claim 1, wherein the hinged framing apparatus is an embedded frame, wherein the embedded frame follows along at least some of the lines of the manipulation portions on the tent top material, wherein the embedded frame is adapted to form a plurality of shapes in conformity with the tent top material.

8. The customizable tenting system of claim 1, further comprising a frame hinge anchor apparatus that is adopted to be used with the tent top material.

9. The customizable tenting system of claim 1, wherein at least one of the tent top material, manipulation lines and location points are 3D printed.

10. The customizable tenting system of claim 1, wherein the tent top material has an opening in around the middle and is adaptable for use as a poncho.

11. The customizable tenting system of claim 1, wherein the base of the first and second triangular portions meet with the ends of the rectangular.

12. The customizable tenting system of claim 1, wherein the base of the first and second triangular portions are distal to the ends of the rectangular portion, wherein on each side of the first and second triangular portions are additional triangular portions having two sides of equal length.

13. The customizable tenting system of claim 12, wherein the tent top material is bisected lengthwise down the middle of the rectangular portion, wherein the tent top material is adapted to be used as two separate tent structures together as one tent structure.

14. A customizable tenting system comprising:
a tent top material having location points for coupling, wherein the tent top material comprises a rectangular portion, at least a first and second triangular portions on opposing sides of the rectangular portion;
a tent coupling apparatus adapted to couple the customizable tent to at least one of another tent and an accessory;
a plurality of anchor points disposed in the periphery of the tent top material, wherein the anchor points are adapted to couple with an anchor apparatus, wherein the anchor apparatus is adapted to couple the tent top material to at least one of a surface and other structure;
a plurality of manipulation positions extending along lines in proximity to the location points, wherein the manipulation positions are adapted to guide the forming of a plurality of shapes of the tent top material, wherein the tent top material is adapted to be configured in a plurality of forms and attach to another tent along at least one side of the rectangular portion between the first and second triangular portions; and
an anchor apparatus for coupling with one of the anchor points and anchoring the tent top material to a surface or an object, wherein the anchor apparatus comprises a T-shaped member having a first, second and third cam actuator adapted to hold a line between the cam and the body of the T-shaped member, wherein the anchor apparatus is adapted to receive and hold in place up to three lines.

15. A customizable tenting system comprising:
a tent top material having location points for coupling, wherein the tent top material comprises a rectangular portion, at least a first and second triangular portions on opposing sides of the rectangular portion;
a tent coupling apparatus adapted to couple the customizable tent to at least one of another tent and an accessory;
a plurality of anchor points disposed in the periphery of the tent top material, wherein the anchor points are adapted to couple with an anchor apparatus, wherein the anchor apparatus is adapted to couple the tent top material to at least one of a surface and other structure;
a plurality of manipulation positions extending along lines in proximity to the location points, wherein the manipulation positions are adapted to guide the forming of a plurality of shapes of the tent top material, wherein the tent top material is adapted to be configured in a plurality of forms and attach to another tent along at least one side of the rectangular portion between the first and second triangular portions; and
a hinged framing apparatus, wherein the framing apparatus comprises at least seven ridged members and two hinges wherein each of the ridged members attach at one end to one of the two hinges, wherein the hinged framing apparatus is coupled to at least one of the plurality of anchor points.

16. The hinged framing apparatus of claim 15, wherein the hinges are adapted to hold in a multitude of predefined positions the at least seven ridged members, wherein the hinges allow for holding in position the forms of the plurality of shapes of the tent top material.

17. A customizable tenting system comprising:
- a tent top material having location points for coupling, wherein the tent top material comprises a rectangular portion, at least a first and second triangular portions on opposing sides of the rectangular portion, wherein the first and second triangular portions comprise two sides of equal length and a base, wherein the base of the first and second triangular portions are parallel to each other;
- a tent coupling apparatus adapted to couple the customizable tent to at least one of another tent and an accessory;
- a plurality of anchor points disposed in the periphery of the tent top material, wherein the anchor points are adapted to couple with an anchor apparatus, wherein the anchor apparatus is adapted to couple the tent top material to at least one of a surface and other structure;
- a plurality of manipulation positions extending along lines in proximity to the location points, wherein the manipulation positions are adapted to guide the forming of a plurality of shapes of the tent top material, wherein the tent top material is adapted to be configured in a plurality of forms and attach to another tent along at least one side of the rectangular portion between the first and second triangular portions to form at least two tents of same or different configurations;
- a second tent top material having the same shape and size as the tent top material, wherein the second tent top material is coupled to the tent top material along one side of the rectangular portion; and
- two square tent portions adapted to each couple to one side of the triangular portions between the tent top material and the second tent top material, wherein each end of the tent top material and the second tent top material forms a new triangular portion;
- wherein the combination of the tent top material, the second tent top material and the two square tent portions form a new tent formation adapted to couple to another of the new tent formation, thereby further expanding the structure of the tenting system.

* * * * *